US007672674B2

(12) United States Patent
Mahany

(10) Patent No.: US 7,672,674 B2
(45) Date of Patent: *Mar. 2, 2010

(54) REMOTE RADIO DATA COMMUNICATION SYSTEM WITH DATA RATE SWITCHING

(75) Inventor: Ronald L. Mahany, Cedar Rapids, IA (US); Pamela Lucken, legal representative, Cedar Rapids, IA (US)

(73) Assignee: Broadcom Corporation, Irvine, CA (US)

( * ) Notice: Subject to any disclaimer, the term of this patent is extended or adjusted under 35 U.S.C. 154(b) by 806 days.

This patent is subject to a terminal disclaimer.

(21) Appl. No.: 10/833,023

(22) Filed: Apr. 27, 2004

(65) Prior Publication Data

US 2004/0203834 A1    Oct. 14, 2004

Related U.S. Application Data

(63) Continuation of application No. 10/057,816, filed on Jan. 24, 2002, which is a continuation-in-part of application No. 09/934,457, filed on Aug. 21, 2001, now abandoned, and a continuation-in-part of application No. 09/799,340, filed on Mar. 5, 2001, now abandoned, said application No. 09/934,457 is a continuation of application No. 08/551,442, filed on Nov. 1, 1995, which is a continuation of application No. 07/910,865, filed on Jul. 6, 1992, now abandoned, which is a continuation-in-part of application No. 07/980,947, filed on May 26, 1992, now abandoned, and a continuation-in-part of application No. 07/864, 300, filed on Apr. 6, 1992, now abandoned, said application No. 09/799,340 is a continuation of application No. 09/123,876, filed on Jul. 28, 1998, now abandoned, which is a continuation of application No. 08/476,550, filed on Jun. 6, 1995, now Pat. No. 5,862, 171, which is a continuation of application No. 08/270, 107, filed on Jun. 30, 1994, now Pat. No. 5,425,051, which is a continuation of application No. 07/973,237, filed on Nov. 9, 1992, now abandoned.

(30) Foreign Application Priority Data

Aug. 3, 1989 (EP) .................. 89114386
Jun. 7, 1990 (WO) .............. PCT/US90/03282

(51) Int. Cl.
*H04Q 7/20* (2006.01)
(52) U.S. Cl. .................... 455/452.2; 455/513
(58) Field of Classification Search .............. 455/450, 455/451, 452.1, 504, 506, 509, 513, 452.2; 370/329, 346, 449
See application file for complete search history.

(56) References Cited

U.S. PATENT DOCUMENTS 3,745,464 A    7/1973 Lee (Continued)

FOREIGN PATENT DOCUMENTS

AU    632055    4/1993

(Continued)

OTHER PUBLICATIONS

Fifer et al., "The Low Cost Packet Radio", IEEE Proceedings, vol. 75, No. 1, pp. 33-43, Jan. 1987.

(Continued)

*Primary Examiner*—Nguyen Vo
(74) *Attorney, Agent, or Firm*—McAndrews, Held & Malloy, Ltd.

(57) ABSTRACT

Systems and methods that provide wireless communications are provided. One or more of the systems and methods may include, for example, selecting a lower data rate or a higher data rate based upon at least an evaluation of the operating conditions of a radio network. The evaluation may include, for example, computing a weighted signal strength measurement in which the weighting gives emphasis to the lower signal strength measurements of fading radio frequency signals.

88 Claims, 69 Drawing Sheets

U.S. PATENT DOCUMENTS

| | | | |
|---|---|---|---|
| 3,755,782 A | 8/1973 | Haas | |
| D230,859 S | 3/1974 | Kurosu | |
| 3,968,435 A * | 7/1976 | Stover | 455/82 |
| 4,020,527 A | 5/1977 | O'Neill | |
| 4,047,151 A | 9/1977 | Rydbeck et al. | |
| 4,069,392 A | 1/1978 | Goldenberg et al. | |
| 4,110,558 A * | 8/1978 | Kageyama et al. | 375/357 |
| 4,112,421 A | 9/1978 | Freeny, Jr. | |
| 4,141,492 A | 2/1979 | Michel et al. | |
| 4,247,908 A * | 1/1981 | Lockhart et al. | 709/245 |
| 4,309,764 A | 1/1982 | Acampora | |
| 4,355,399 A | 10/1982 | Timor | |
| 4,418,277 A | 11/1983 | Tremmel et al. | |
| 4,438,511 A | 3/1984 | Baran | |
| 4,495,619 A | 1/1985 | Acampora | |
| 4,569,421 A | 2/1986 | Sandstedt | |
| 4,578,820 A | 3/1986 | Highton | |
| 4,606,044 A * | 8/1986 | Kudo | 379/22.02 |
| 4,611,181 A | 9/1986 | Fukumura et al. | |
| 4,620,114 A | 10/1986 | Moon | |
| 4,628,193 A | 12/1986 | Blum | |
| 4,639,914 A | 1/1987 | Winters | |
| 4,641,318 A | 2/1987 | Addeo | |
| 4,672,658 A | 6/1987 | Kavehrad | |
| 4,675,863 A | 6/1987 | Paneth et al. | |
| 4,685,149 A | 8/1987 | Smith et al. | |
| 4,701,923 A | 10/1987 | Fukasawa et al. | |
| 4,718,081 A * | 1/1988 | Brenig | 455/438 |
| 4,720,829 A | 1/1988 | Fukasawa et al. | |
| D295,411 S | 4/1988 | Cho et al. | |
| 4,756,007 A | 7/1988 | Qureshi et al. | |
| 4,773,032 A | 9/1988 | Uehara et al. | |
| 4,784,450 A | 11/1988 | Jain | |
| 4,785,450 A | 11/1988 | Bolgiano | |
| 4,789,983 A | 12/1988 | Acampora | |
| 4,793,812 A | 12/1988 | Sussman et al. | |
| D299,234 S | 1/1989 | Kajita | |
| 4,809,257 A | 2/1989 | Gantenbein et al. | |
| 4,817,089 A | 3/1989 | Paneth | |
| 4,842,966 A | 6/1989 | Omori et al. | |
| 4,850,009 A * | 7/1989 | Zook et al. | 379/93.17 |
| D303,112 S | 8/1989 | Desrochers | |
| 4,857,716 A | 8/1989 | Gombrich et al. | |
| 4,890,332 A | 12/1989 | Takahashi | |
| 4,910,794 A | 3/1990 | Mahany | |
| 4,930,140 A | 5/1990 | Cripps et al. | |
| 4,931,250 A | 6/1990 | Grezczuk | |
| 4,939,731 A | 7/1990 | Reed | |
| 4,984,247 A | 1/1991 | Kaufmann | |
| 5,029,183 A | 7/1991 | Tymes | |
| 5,054,111 A | 10/1991 | Goodwin | |
| 5,056,109 A | 10/1991 | Gilhousen et al. | |
| 5,070,536 A | 12/1991 | Mahany et al. | |
| 5,095,535 A * | 3/1992 | Freeburg | 455/278.1 |
| 5,101,406 A | 3/1992 | Messenger | |
| 5,103,459 A | 4/1992 | Gilhousen et al. | |
| 5,117,504 A | 5/1992 | Dennerlein et al. | |
| 5,142,550 A | 8/1992 | Tymes | |
| 5,197,061 A | 3/1993 | Halbert-Lassalle et al. | |
| 5,204,876 A | 4/1993 | Bruckert et al. | |
| 5,235,614 A | 8/1993 | Bruckert | |
| 5,278,866 A | 1/1994 | Nonami | |
| 5,282,222 A | 1/1994 | Fattouche et al. | |
| 5,321,721 A | 6/1994 | Yamaura | |
| 5,414,796 A | 5/1995 | Jacobs et al. | |
| 5,425,051 A | 6/1995 | Mahany | |
| 5,483,676 A | 1/1996 | Mahany et al. | |
| 5,491,727 A | 2/1996 | Petit | |
| 5,577,087 A | 11/1996 | Furuya | |
| 5,708,680 A | 1/1998 | Gollnick | |
| 5,844,893 A | 12/1998 | Gollnick et al. | |
| 5,862,171 A | 1/1999 | Mahany | |
| 5,896,561 A | 4/1999 | Schrader et al. | |
| 5,940,771 A | 8/1999 | Gollnick et al. | |
| 7,206,592 B1 | 4/2007 | Gollnick et al. | |
| 2003/0078006 A1 | 4/2003 | Mahany | |
| 2003/0174764 A1 | 9/2003 | Mahany | |
| 2004/0023651 A1 | 2/2004 | Gollnick et al. | |
| 2004/0073933 A1 | 4/2004 | Gollnick et al. | |
| 2004/0203834 A1 | 10/2004 | Mahany | |
| 2005/0089084 A1 | 4/2005 | Mahany | |
| 2005/0195859 A1 | 9/2005 | Mahany | |
| 2007/0293258 A1 | 12/2007 | Gollnick et al. | |

FOREIGN PATENT DOCUMENTS

| | | |
|---|---|---|
| CA | 1316218 | 4/1993 |
| DE | 3408680 | 9/1984 |
| EP | 0273080 | 6/1988 |
| EP | 0298750 | 11/1989 |
| EP | 0 353 759 | 2/1990 |
| EP | 0353759 | 2/1990 |
| GB | 2223914 | 11/1992 |
| JP | 57-159148 | 10/1982 |
| JP | 59-39150 | 3/1984 |
| JP | 62-281533 | 12/1987 |
| JP | 63004729 A | 1/1988 |
| JP | 63026134 A | 2/1988 |
| JP | 63-141432 | 6/1988 |
| JP | 63-184420 | 7/1988 |
| JP | 63-252047 | 10/1988 |
| JP | 64-51838 | 2/1989 |
| JP | 1-122241 | 5/1989 |
| JP | 1-122242 | 5/1989 |
| JP | 1-149627 | 6/1989 |
| JP | 1-170147 | 7/1989 |
| JP | 2-35848 | 2/1990 |
| JP | 2-220526 | 9/1990 |
| JP | 02274131 A | 11/1990 |
| JP | 3-60251 | 3/1991 |
| JP | 62-45231 | 9/1994 |
| JP | 62-45232 | 9/1994 |
| WO | WO 8808140 | 10/1988 |
| WO | WO 90/13187 | 11/1990 |
| WO | WO 9016033 | 12/1990 |

OTHER PUBLICATIONS

Fischer et al., "Wide-Band Packet Radio For Multipath Environments", IEEE Transactions On Communications, vol. 36, No. 5, pp. 564-576, May 1988.

Fischer et al., "Wide-Band Packet Radio Technology", IEEE Proceedings, vol. 75, No. 1, pp. 100-115, Jan. 1987.

Jacobs, et al., "General Purpose Packet Satellite Networks", IEEE Proceedings, vol. 66, No. 11, pp. 1448-1467, Nov. 1978.

Jacobsmeyer J., "Adaptive Trellis Coded Modulation For Bandlimited Meteor Burst Channels", IEEE Journal on Selected Areas In Communications, vol. 10, No. 3, pp. 550-561, Apr. 1992.

Jacobsmeyer J., "Adaptive Information Rate Performance On Bandlimited Meteor Burst Channels: Empirical Results", Ninth Annual International Phoenix Conference On Computer and Communications, pp. 254-261, Mar. 21-23, 1990.

Jacobsmeyer J., Adaptive Trellis Coded Modulation For Bandlimited Meteor Burst Channels, Military Communications Conferences, MILCOM 89, Conference Record, Bridging the Gap. Interoperability, Survivability, Security, pp. 418-422, Oct. 15-18, 1989.

Jacobsmeyer J., An Adaptive Modulation Scheme For Bandwith-Limited Meteor-Burst Channels, Military Communications Conference, MILCOM 88, Conference Record, 21$^{st}$ Century Military Communications—What's Possible?, pp. 933-937, Oct. 23-26, 1988.

Massoumi, S. et al., "Adaptive Trellis Coded Modulation For Mobile Communications", IEEE Pacific Rim Conference on Communications, computers and signal Processing, pp. 538-541, May 9-10, 1991.

Snytkin, I., Adaptive Communications Systems Employing Spread-Spectrum Signals Based On Nonlinear Recurrent Sequences, Telecommunications and Radio Engineering, Scripta Technica, Inc., vol. 46, No. 3, pp. 161-162, Mar. 1991.
CCITT Recommendation V.32bis, A Duplex Modem Operating At Data Signaling Rates Of Up To 14 400 bit/s For Use On The General Switched Telephone Network And on Leased Point-To-Point 2-Wire Telephone-Type Circuits (Study Group XVII), Feb. 22, 1991.
CCITT Recommendation V.32, A Family Of 2-Wire, Duplex Modems Operating At Data Signaling Rates Of Up To 9600 bit/s For Use On The General Switched Telephone Network And On Leased Telephone-Type Circuits-Data Communication Over The Telephone Network-Study Group XVII, pp. 234-251, Jan. 1, 1989.
Viterbi et al., "A Pragmatic Approach To Trellis-Coded Modulation", IEEE Communications Magazine, pp. 11-19, Jul. 1989.
Viterbi et al., "Trellis-Coded MPSK Modulation For Highly Efficient Military Satellite Applications", Military Communications Conference, MILCOM 88, "21st Century Military Communications—What's Possible?", pp. 647-651, Oct. 23-26, 1988.
Weitzen J., et al., "A High Speed Digital Modem For The Meteor Scatter Channel", Proceedings Of The Seventeenth Annual Conference On Information Sciences And Systems, p. 344-349, Mar. 23-25, 1983.
Hansson U., et al., "Dual Rate Mobile Data System", IEEE International Symposium On Personal Indoor And Mobile Radio Communications, pp. 520-524, Oct. 19-21, 1992.
Jubin et al., "The DARPA Packet Radio Network Protocols", IEEE Proceedings, vol. 75, No. 1, pp. 21-32, Jan. 1987.
Product Brochures (BCMSA002314-2345), 1991.
Amended Preliminary Invalidity Contentions with Exhibit C, Feb. 21, 2006.
Defendant And Counterclaim Plaintiff Qualcomm Incorporated's Final Invalidity Contentions, With Exhibit A, Nov. 21, 2006.
Antonio et al., "OmniTRACS: A Commercial Ku-Band Mobile Satellite Terminal And Its Applicability To military Mobile Terminals," MOLCOM 88, 1988 IEEE Military Communications Conference, Oct. 23-26, 1988.
Filip et al., "Adaptive Modulation As A Fade Countermeasure: An Olympus Experiment," International Journal Of Satellite Communications, vol. 8, pp. 31-41, Jan. 1990.
Fralick et al., "Technological Considerations For Packet Radio Networks", AFIPS Conference Proceedings, 1975 National Computer Conference, May 19-22, 1975.
Goodman et al., "Combined Source And Channel Coding For Matching The Speech Transmission Rate To The Quality Of The Channel", GLOBECOM '83, IEEE Global Telecommun. Conf., IEEE 1982, vol. 1, pp. 316-321.
Goodman et al., "Combined Source And Channel Coding For Variable-Bit-Rate Speech Transmission", The Bell System Technical Journal, vol. 62, No. 7, Sep. 1983.
Goodman et al., "Quality of Service And Bandwith Efficiency Of Cellular Mobile Radio With Variable Bit-Rate Speech Transmission," IEEE Trans. On Vehicular Technology, Aug. 1983, vol. VT-32, No. 3, pp. 211-217.
Goodman et al., "Transmission Errors And Forward Error Correction In Embedded Differential Pulse Code Modulation," Bell System Technical Journal, vol. 62, No. 9, Nov. 1983.
Goodman, "Embedded DPCM For Variable Bit Rate Transmission," IEEE Trans. On Communications, vol. COM-28, No. 7, pp. 1040-1046, Jul. 1980.
Norand History, 1989.
Norand CA5950 Communications Adapter Specifications, 1991.
Norand Data Collection System: 7527 Emulation Products, Technical Overview, Edition 1.0, Sep. 1991.
Norand 1000 Series Modular RF Terminals, The Family Of Terminals That Fits Your Needs, 1993.
Norand 1000 Series Systems, A Breakthrough Flexibility For Pocket RF, 1991.
Norand RT/DT 1100 Radio Data Terminal, Compact, Pocket-Sized Terminal Offers Scanning And Memory Capabilities Simply By Changing Modules, 1992.

Norand 3000 Series Radio Data Terminal User's Guide, NPN:961-047-017, Jul. 1990.
Intermec RT 5900 Mobile-Mount Terminal Specification, Aug. 2, 2000.
Intermec Hand-Held Terminals Product Profile, 1700 Series, 1990.
Gollnick, Norand, Models RC3250 & RC3240 RF Network Controllers 225-445-XXX, Theory Of Operation, Document No. 561-014-035, Revision: A, Dec. 16, 1991.
Norand RC3240/RC3250 Network Controller, Service Instruction Book, 980-000-095, 1$^{st}$ Edition, Mar. 1992.
Defendant Qualcomm Incorporated's Second Supplemental Responses To Plaintiff Broadcom Corporation's First Set Of Interrogatories (Nos. 1-19), Mar. 1, 2006.
Ali et al., "Interference Rejection in Direct-Sequence Spread Spectrum by Chip-Code Processing," IEEE International Symposium, King's College, University of London, England, Sep. 1990.
Allpress, et al., "An Investigation of RAKE Receiver Operation in an Urban Environment for Various Spreading Bandwidth Allocations," Feb. 1992, pp. 506-510.
Ananasso, et al., Satellite Applications of Spread Spectrum Frequency Hopping Techniques, 1989 IEEE.
Ayers, "Selection of a Forward Error Correcting Code for the Data Communication Radio Link of the Advanced Train Control System," 1990, IEEE Transactions on Vehicular Technology, p. 247-254.
Bausbacher, "Transmission Parameter Selection in an Adaptive Packet-Radio Network," Tactical Communications Conference, Fort Wayne, Indiana, Apr. 1990.
Bingham, Multicarrier Modulation for Data Transmission: An Idea Whose Time Has Come, 1990 IEEE.
Estabrook, et al., "A 20/30 GHZ Personal Access Satellite System Design," 1989 IEEE.
Filip, et al., "Optimum Utilization of the Channel Capacity of a Satellite Link in the Presence of Amplitude Scintillations and Rain Attenuation," 1990 IEEE.
Gilhousen, et al., "Increased Capacity Using CDMA for Mobile Satellite Communications," May 1990, IEEE Journal on Selected Areas in Communications, p. 503-514.
Goodman, et al., "Spread-Spectrum Moblie Radio with Variable-Bit-Rate Speech Transmission," 1982 IEEE.
Grover, et al., "Simulations and Experimental Studies on the Concept of a Rate-Adaptive Digital Subscriber Loop (RA-DSL)," 1991 IEEE.
Gupta, "Variable Coded MFSK Signaling in an Adaptive Wideband High-Throughput RF/MBC System," Milcom 91 Conference Record, 1991.
Hagenauer, et al., "On Hybrid Trellis-Coded 8/4 PSK Modulation Systems," 1989 IEEE.
Hagenauer, et al., "The Performance of Rate-Compatible Punctured Convolutional Codes for Digital Mobile Radio," 1990 IEEE.
Jacobsmeyer, "Adaptive Data Rate Communications for High Frequency Radio Channels," 1991 IEEE.
Jacobsmeyer,"Message Waiting Time Performance for Meteor-Burst Communication Systems," 1989 IEEE.
Kim, "Adaptive Rate Coding in Frequency-Hopped Random Access Communications Systems," IEEE Global Telecommunications Conference, Orlando, Florida, Dec. 6-9, 1992.
Mazur, et al., "Adaptive Forward Error Correction Techniques in TDMA," Sep. 19-23, 1983, Phoenix, Arizona.
Mui, "Variable Rate Signaling in Conjunction with Coding for Meteor Burst Communications," 1991 IEEE.
Murota, et al., GMSK Modulation for Digital Mobile Radio Telephony, IEEE Trans. On Comm., vol. COM-29, No. 7, Jul. 1981, pp. 1044-1050.
Pahlavan, et al., "Spread-Spectrum Multiple-Access Performance of Orthogonal Codes for Indoor Radio Communications," May 1990, IEEE Transactions on Communications, pp. 574-577.
Petit, "Clover-II: A technical Overview," ARRL Amateur Radio, Sep. 27-29, 1991, pp. 124-129.
Schilling, et al., "Meteor Burst Communications for LPI Applications," 1990 IEEE.
Smith, "Multi-Waveform Technologies for Multi-Mission Radio Applicaitons," 1991 MILCOM.
Smith, et al., "A Dual Frequency-Band, Dual Bit-Rate Payload Concept for Communications Satellites," Sixth International Conference on Digital Satellite Communications, Sep. 19-23, 1983, IEEE Catalog No. 83CH1848-1, pp. XI9-XI17.
Stuber, et al., "An Adaptive Rate Algorithm for FH/BFSK Signaling," 1988 IEEE.
Sundberg, et al., "Hybrid Trellis-Coded 8/4 PSK Systems," 1989 IEEE.
Wicker, "Hybrid-ARQ Reed-Solomon Coding in an Adaptive Rate System," 1989 IEEE.
Willis, "Fade Counter measures Experiment," 1990 IEEE, London.
Willis, "Fade counter-measures applied to transmissions at 20/30 GHz," Electronics & Communication Engineering Journal, Apr. 1991.
Yates, "An Adaptive Rate Digital Transmission Scheme for Satellite Links Affected by Rain," 1986 ICDSC-7.
Zhang, et al., "An Integrated Voice/Data System for Mobile Indoor Radio networks," 1990 IEEE.
Norand RT3210 Radio Data Terminal ("Norand RT3210 System"), 1989.
RB2212 Base Radio Transceiver, Appendix B, 1987 and 1990.
RB3000 Base Radio Transceiver, 1990.
Defendant Qualcomm Incorporated's Supplemental Responses To Plaintiff Broadcom Corporation's First Set Of Interrogatories (Nos. 1-19), Feb. 17, 2006.
Defendant Qualcomm Incorporated's Fifth Supplemental Responses To Plaintiff Broadcom Corporation's First Set Of Interrogatories (Nos. 2-4, 6 And First Supplemental Response To Interrogatory No. 18), Jan. 31, 2007.
Goodman, "Quality Of Service And Bandwidth Efficiency Of Cellular Mobile Radio With Variable-Bit-Rate Speech Transmission", $33^{rd}$ IEEE Vehicular Technology Conference, IEEE 1983, pp. 316-321.
Hansson et al., "Multilevel Frequency Modulation In Mobitex", Diploma Thesis, Dept. of Information Theory, Chalmers Univ. of Tech., Sep. 1991 (Swedish article; English translation of abstract only).
Henry et al., "HF Radio Data Communication", Communications Quarterly, Spring 1992, pp. 11-24.
Hughes et al., "The Use Of Spread-Spectrum Coding As A Fading Countermeasrue At 20/30 Hz", ESA Journal, vol. 11, No. 4, 1987.
Jacobs et al., "The Application Of A Novel Two-Way Mobile Satellite Communications And Vehicle Tracking System To The Transportation Industry", IEEE Transactions On Vehicular Technology, vol. 40, Issue No. 1, Feb. 1991, pp. 57-63.
Jakes, Microwave Mobile Communications, 1974, Ch. I., Multipath Interference, pp. 11-78.
Kahn et al., "Advances In Packet Radio Technology", IEEE, vol. 66, No. 11, Nov. 1978, pp. 1468-1496.
Petit, "The Cloverleaf Performance-Oriented HF Data Communication System," $9^{th}$ Computer Networking Conference, Sep. 22, 1990, pp. 191-194.
Steele et al., "Variable Rate QAM For Data Transmission Over Rayleigh Fading Channels," Keynote Paper, Wireless '91, The Third National Seminar & Workshop On Wireless Personal Communications, Calgary, Alberta, Jul. 9, 1991, pp. 1-14.
Steele., "Deploying Personal Communication Networks", IEEE Communications Magazine, Sep. 1990, pp. 12-15.
Tomlinson et al., "Fade Countermeasures at Ka Band: Direct Inter-Establishment Communications Equipment (DICE)", Electronics Division Colloquium on Results Of Experiments Using The Olympus Satellite, Dec. 17, 1993, pp. 4/1-4/6.
Web, "QAM: The Modulation Scheme For Future Mobile Radio Communications?", Electronics & Communication Engineering Journal, Aug. 1992, pp. 167-176.
Ziemer et al., "Principles Of Communications, System, Modulation And Noise", 1976, pp. 93, 135, 160, 154.
Gibilisco et al., Encyclopedia of Electronics, $2^{nd}$ edition, 1990, p. 697.
OmniTRACS system, invented and sold by Qualcomm, first sold at least as early as Oct. 12, 1988 to Schneider National, Inc. (B-18).
DARPA packet radio network, in public user prior to Nov. 9, 1991 (B-26).
RB2212 Base Radio Transceiver, 1990.
Clover-I and Clover-II Systems, invented by Raymond Petit and in public use prior to Nov. 9, 1992.

Dixon, Spread Spectrum Systems, $2^{nd}$ ed., 1984, p. 9, 13, 19-20, 25-26, 58, 84-89, 91-98.
Korn, Digital Communications, Chapters 2, 3, and 12, 1985.
Lee et al., Digital Communications, pp. 214-217, 426-439, 1988.
Kimon et al., "Differential Detection of Gaussian MSK in a Mobile Radio Environment", IEEE Trans. On Vehicular Tech., vol. VT-33, No. 4, Nov. 1984, pp. 307-320.
Murota et al., "Dual Rate Mobile Data System", IEEE International Symposium on Personal Indoor and Mobile Radio Communications, pp. 520-524, Oct. 19-21, 1992.
Plaintiff Broadcom Corporation's Disclosure Of Asserted Claims And Final Infringement Contentions, Broadcom Corp. v. Qualcomm Inc., Case No. 8:05-cv-467, United States District Court for the Central District of California, Exhibit B (pp. 5, 8 and 11), Alleged Admissions 1 and 2 (QPSK and 16QAM are distinct modulation "types"), and 3 (GMSK and 8PSK are distinct modulation "types"), Nov. 1, 2006.
Plaintiff Broadcom Corporation's Second Amended Disclosure Of Asserted Claims And Preliminary Infringement Contentions, Broadcom Corp. v. Qualcomm Inc., Case No. 8:05-cv-467, United States District Court for the Central District of California, Exhibit C (pp. 8, 11 and 13), Alleged Admissions 4 and 5 (QPSK and 16QAM are distinct modulation "types"), and 6 (GMSK and 8PSK are distinct modulation "types"), Sep. 22, 2006.
Qualcomm's Preliminary Invalidity Contentions with Exhibits A-1 through A-35 and B-1 through B-22, Broadcom Corp. v. Qualcomm, Inc., U.S. District Court for the Central District of California, Southern Division, SACV05-0467-JVS (RNBx), Jan. 30, 2009.
Benice, R.J. et al., "Adaptive Modulation and Error Control Techniques," IBM Corporation, 1966 (made available in 1977).
Magazanik, USSR Author's Certificate No. 462292, published Feb. 28, 1975.
Salikov, USSR Description of Invention for Inventor's Certificate No. 1585902 A1, published Aug. 15, 1990.
Acampora, A., "The Use of Resource Sharing and Coding to Increase Capacity of Digital Satellites," IEEE Journal of Selected Areas in Communications, vol. SAC01, No. 1, Jan. 1983.
Khan, M.H. et al., Adaptive Forward Error Control for Digital Satellite Systems, IEEE Trans. On Aerospace and Electronic Systems vol. AES-21, No. 4, pp. 547-558, Jul. 1985.
Cimini, Jr., L. et al., Analysis and Simulation of a Digital Mobile Channel Using Orthogonal Frequency Division Multiplexing, IEEE Transactions on Communications, v. 33, n. 7, pp. 665-675, Jul. 1985.
Acampora, A., A Wireless Network for Wide-Band Indoor Communications, IEEE Journal on Selected Areas in Communications, vol. SAC-1, No. 5, pp. 796-805, 1987.
Baier, A., Bit Synchronization and Timing Sensitivity in Adaptive Viterbi Equalizers for Narrowband-TDMA Digital Mobile Radio Systems, IEEE Vehicular Technology Conference, vol. 38, pp. 377-384, Jun. 1988.
Goode, S.H., "A Comparison of Gaussian Minimum Shift Keying to Frequency Shift Keying for Land Mobile Radio," IEEE Vehicular Technology Conference, vol. 34, pp. 136-141, May 1984.
GSM 05.04, Jul. 15, 1988.
"Cellular System Mobile Station-Land Station Compatibility Specification," IS-3-D, Electronic Industries Association, Mar. 1987.
Hirade, K. et al., "Digital Transmission Technology for Mobile Radio Communication," Institute of Electronics, Information and Communication Engineers, Feb. 1982.
Korn, I., "GMSK with Limiter Discriminator Integrator Detection in Satellite Mobile Channel," IEEE Proceedings, vol. 136, pt. 1, No. 5, pp. 361-366, Oct. 1989.
Maloberti, A., "Radio Transmission Interface of the Digital Pan European Mobile System," IEEE $39^{th}$ Vehicular Technology Conference, vol. 2, pp. 712-717, May 1989.
Meyers, R.A., et al., "Synthesiser Review for Pan-European Cellular Radio," Proc. IEEE Colloquium on VLSI Implementations for $2^{nd}$ Generation Digital Cordless Mobile Telecommunications Systems, 8/1-8/8, 1990.
Thomas, C.M. et al., "A New Generation of Digital Microwave Radios for U.S. Military Telephone Networks," IEEE Transactions on Communications, vol. COM-27, No. 12, pp. 1916-1928, Dec. 1979.

Exhibits A-E of Plaintiff Broadcom Corporation's Preliminary Infringement Contentions for the '051 Patent and Related Cross-Claim, *Broadcom Corporation* v. *Qualcomm Incorporated*, Case No. SACV05-0467-JVS (RNBx), U.S. District Court for the Central District of California—Southern Division, Jan. 9, 2009.

CCITT v. 29, "9600 Bits Per Second Modem Standardized For Use On Point-To-Point 4-Wire Leased Telephone-Type circuits," Nov. 1, 1988.

CITT v.22bis, "2400 Bits Per Second Duplex Modem Using The Frequency Division Technique standardized For Use On The General Switched Telephone Network And On Point-To-Point 2-Wire Leased Telephone-Type Circuits", Nov. 1, 1988.

CCITT v22, "1200 Bits Per Second Duplex Modem Standardized For Use In The General Switched Telephone Network And On Point-To-Point 2-Wire Leased Telephone-Type circuits," Nov. 1, 1988.

Order re Claim Construction, Sep. 11, 2006.

Tentative Order re Claim Construction, Jul. 31, 2006.

Expert Report of Professor Donald Cox Concerning Claim Construction For U.S. Patent No. 5,425,051, Apr. 24, 2006.

Declaration of Bernard Sklar, Ph.D. In Support Of Qualcomm's Claim Construction For U.S. Patent No. 5,425,051, Apr. 22, 2006.

Salmasi, A., et al., "On the System Design Aspects of Code Division Multiple Access (CDMA) Applied to Digital Cellular and Personal Communications Networks," 41$^{st}$ IEEE Vehicular Technology Conference, St. Louis, MO, pp. 57-62, May 19-22, 1991.

Sklar, B., Digital Communications, Fundamentals and Applications, Prentice-Hall, Inc., pp. 52-53, 202-203, 595-596, 1988.

Kaltenmeier, et al. "A Subband Coder for Digital Speech Transmission in the Digital Cellular Radio System CD 900," Nordic Seminar on Digital Land Mobile Radiocommunication, pp. 279-285, Feb. 5-7, 1985.

Lender, "The Duobinary Technique for High-Speed Data Transmission," IEEE Transactions on Communication and Electronics, vol. 82, pp. 214-218, May 1963.

Salz, "An Experimental Digital Multilevel FM Modem," IEEE Transactions on Communication Technology, vol. COM-14, No. 2, pp. 259-265, Jun. 1966.

USPTO, U.S. Appl. No. 10/057,816, Office Action mailed Mar. 28, 2005 including Notice of References Cited, 12 pages.

USPTO, U.S. Appl. No. 10/057,816, Office Action mailed Mar. 20, 2007 including Notice of References Cited, 15 pages.

USPTO, U.S. Appl. No. 10/057,816, Office Action mailed Nov. 14, 2007 including Notice of References Cited, 18 pages.

USPTO, U.S. Appl. No. 10/057,816, Office Action mailed Feb. 20, 2008, 8 pages.

USPTO, U.S. Appl. No. 10/057,816, Office Action mailed Mar. 14, 6 pages.

USPTO, U.S. Appl. No. 10/057,816, Notice of Allowance mailed Aug. 26, 2008 including Lists of References Cited by Applicant and Considered by Examiner, 7 pages.

Order re Claim Construction for the '051 Patent, *Broadcom Corp.* v. *Qualcomm, Inc.*, U.S. District Court for the Central District of California, Southern Division, SACV05-0467-JVS (RNBx), Mar. 11, 2009.

European Search Report for Application No. EP 89114386, Feb. 25, 1991.

International Search Report for International Application No. PCT/US90/03282, Nov. 26, 1990.

Publication of Norand Corporation entitled "Norand 1200 Portable FM Terminal Data Transceiver Network", 6 pages, 1985.

\* cited by examiner

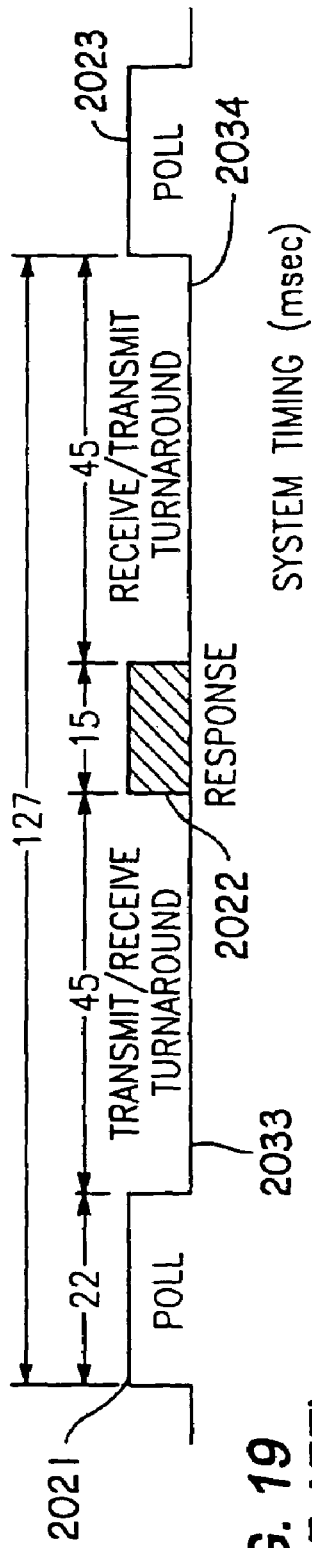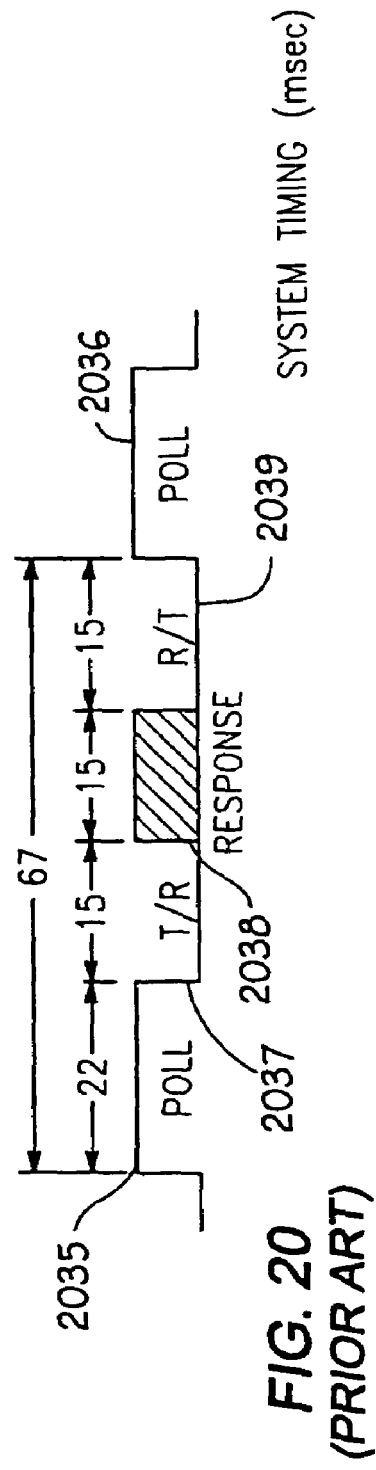
FIG. 19 (PRIOR ART)
FIG. 20 (PRIOR ART)

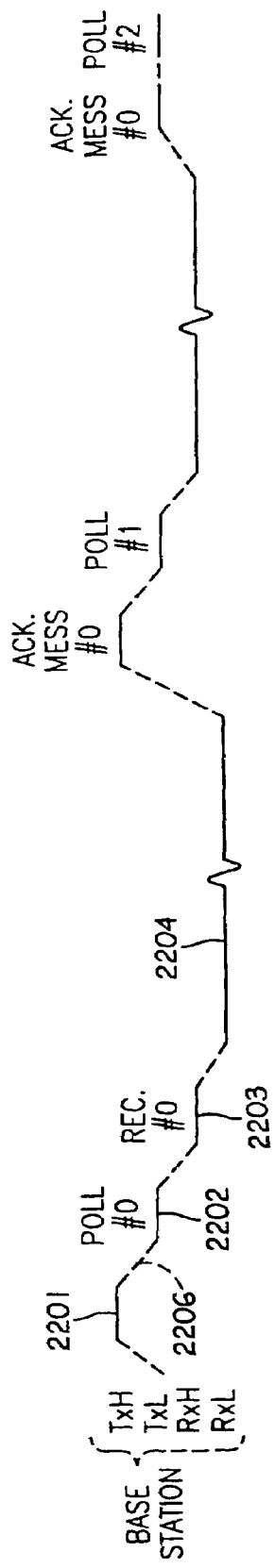
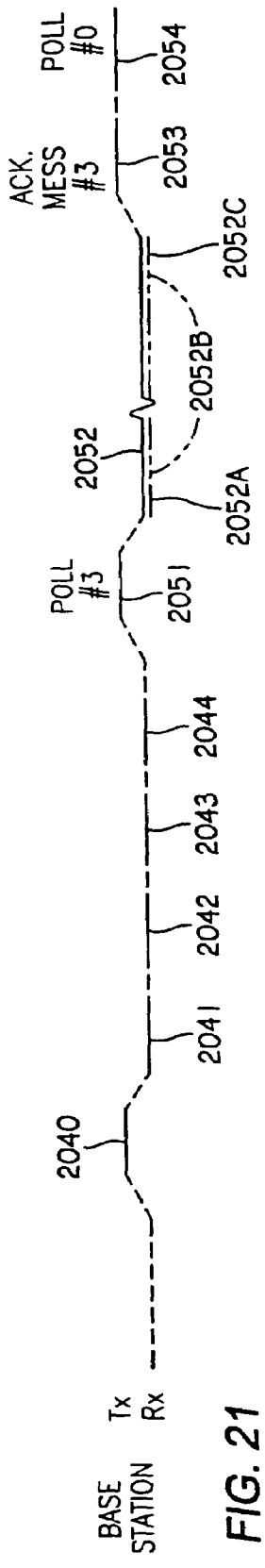
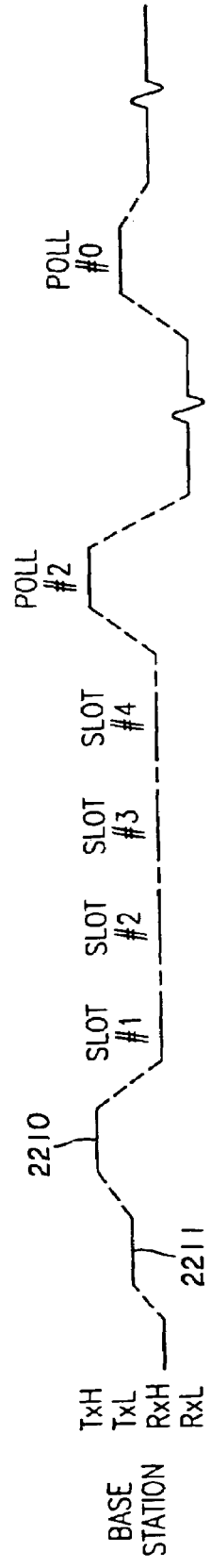
FIG. 33
FIG. 21
FIG. 34

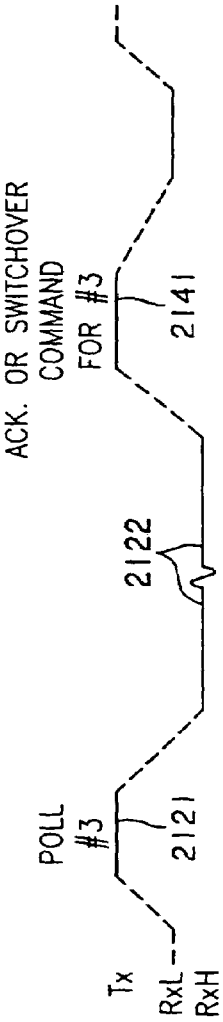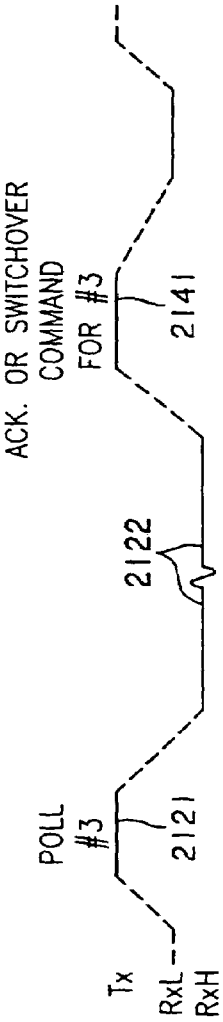

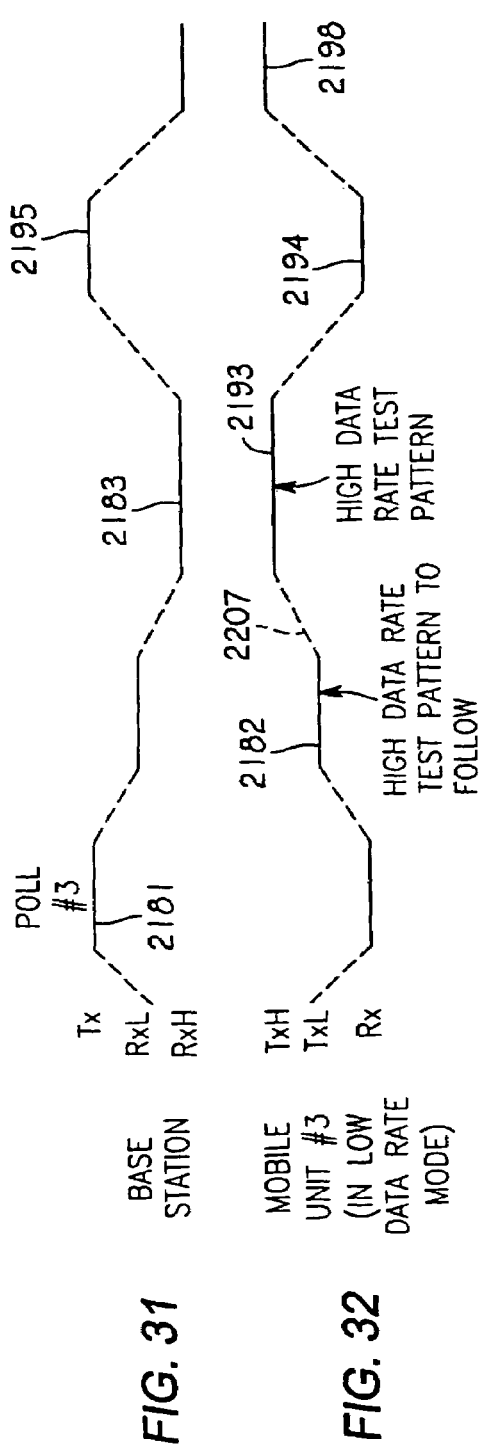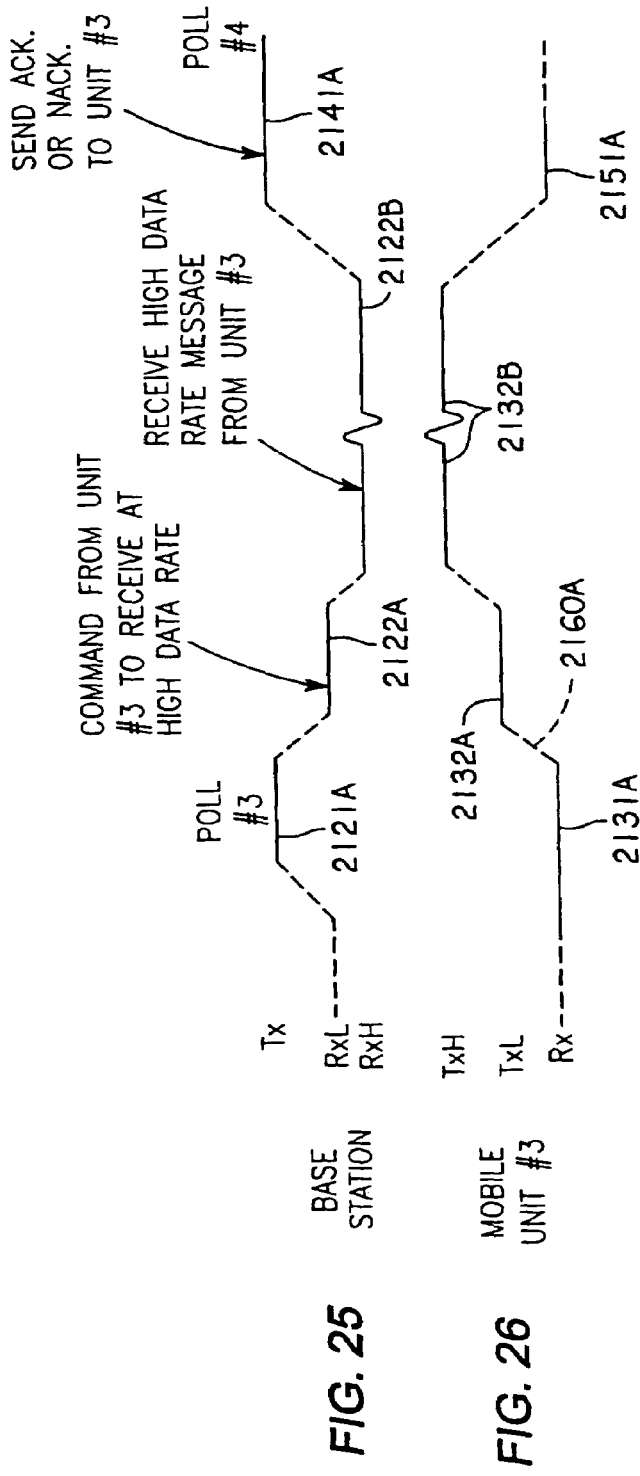

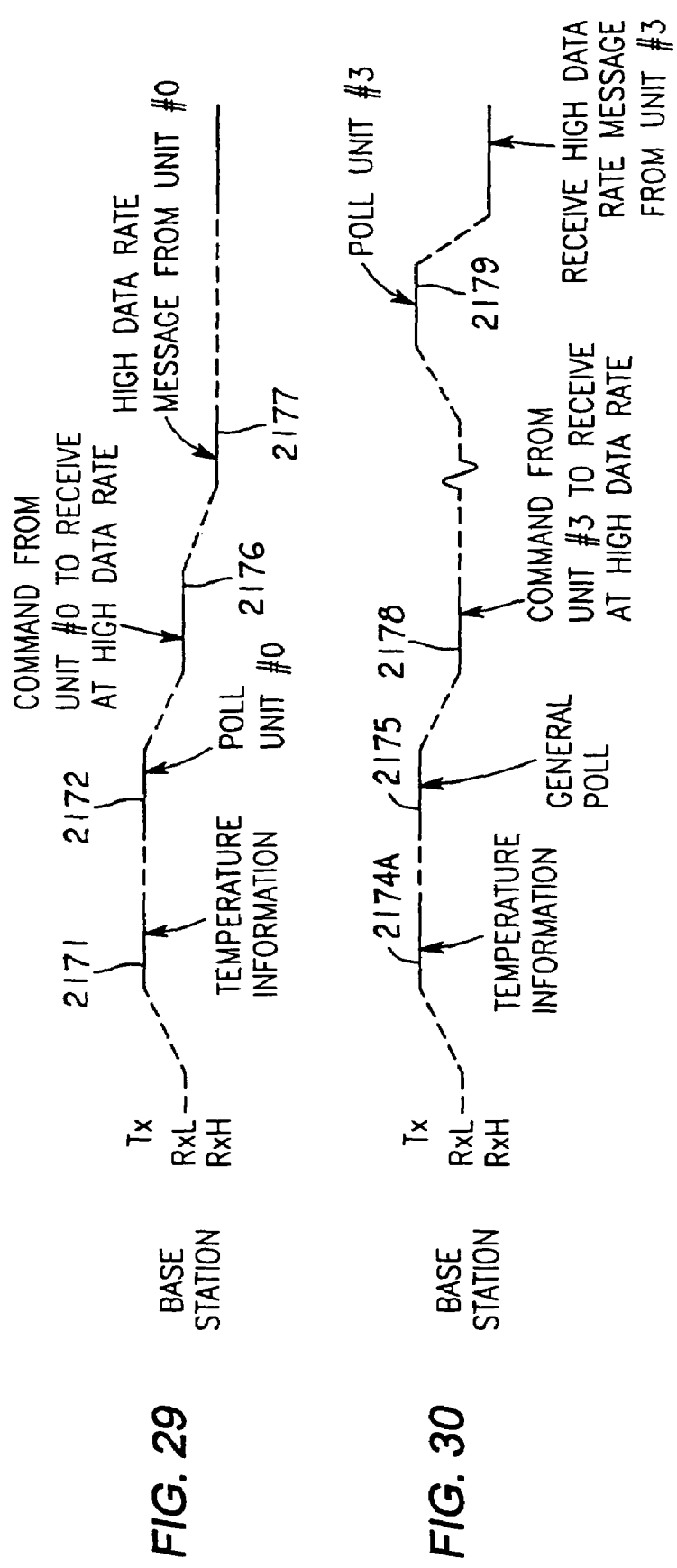

FIG. 51A ① TRANSMIT ???
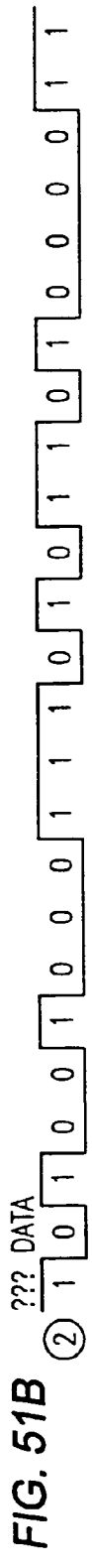
FIG. 51B ② ??? DATA
FIG. 51C ③ SELECT
FIG. 51D ④ ??? DELAY
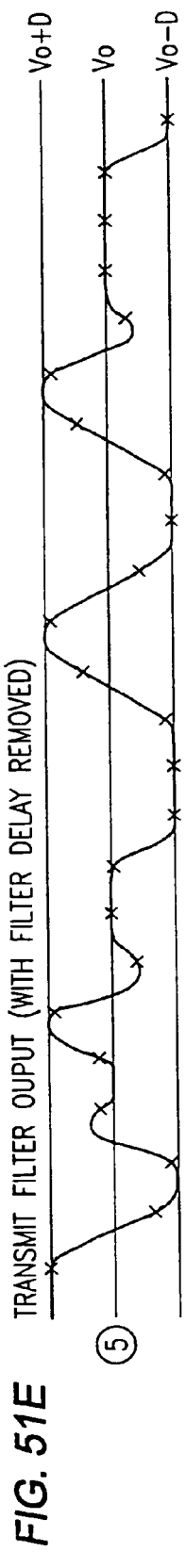
FIG. 51E ⑤ TRANSMIT FILTER OUPUT (WITH FILTER DELAY REMOVED)
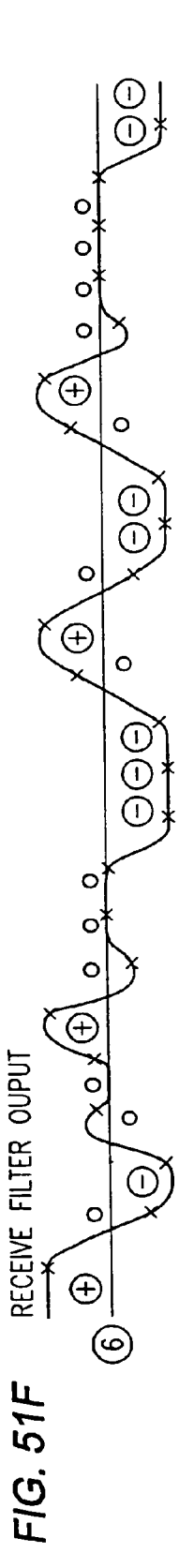
FIG. 51F ⑥ RECEIVE FILTER OUPUT
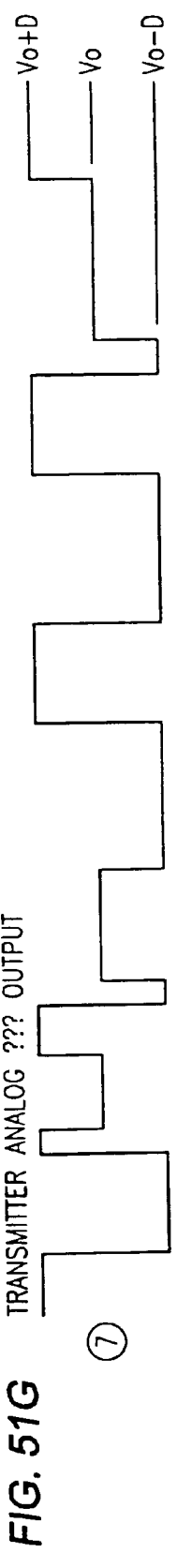
FIG. 51G ⑦ TRANSMITTER ANALOG ??? OUTPUT

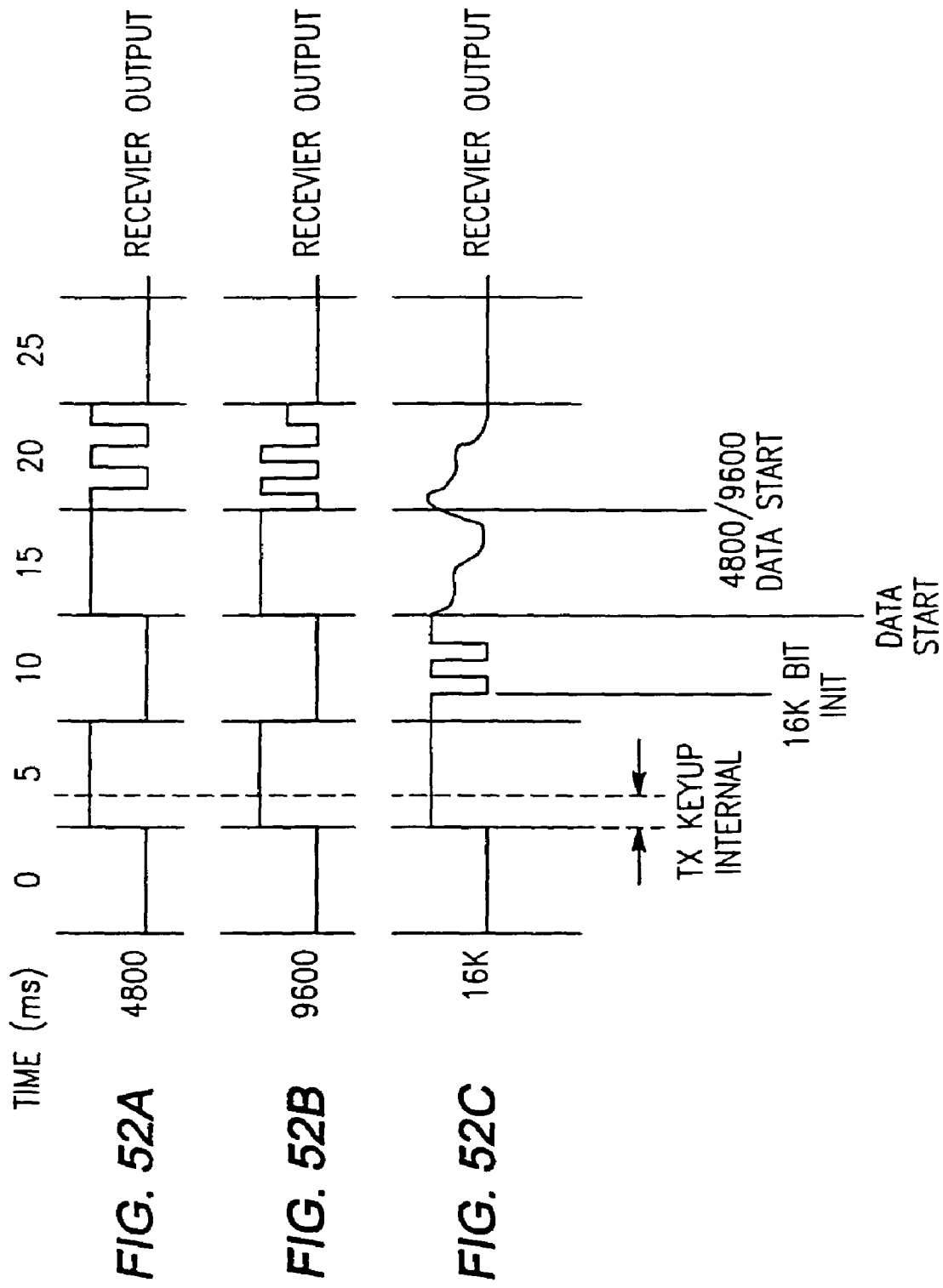

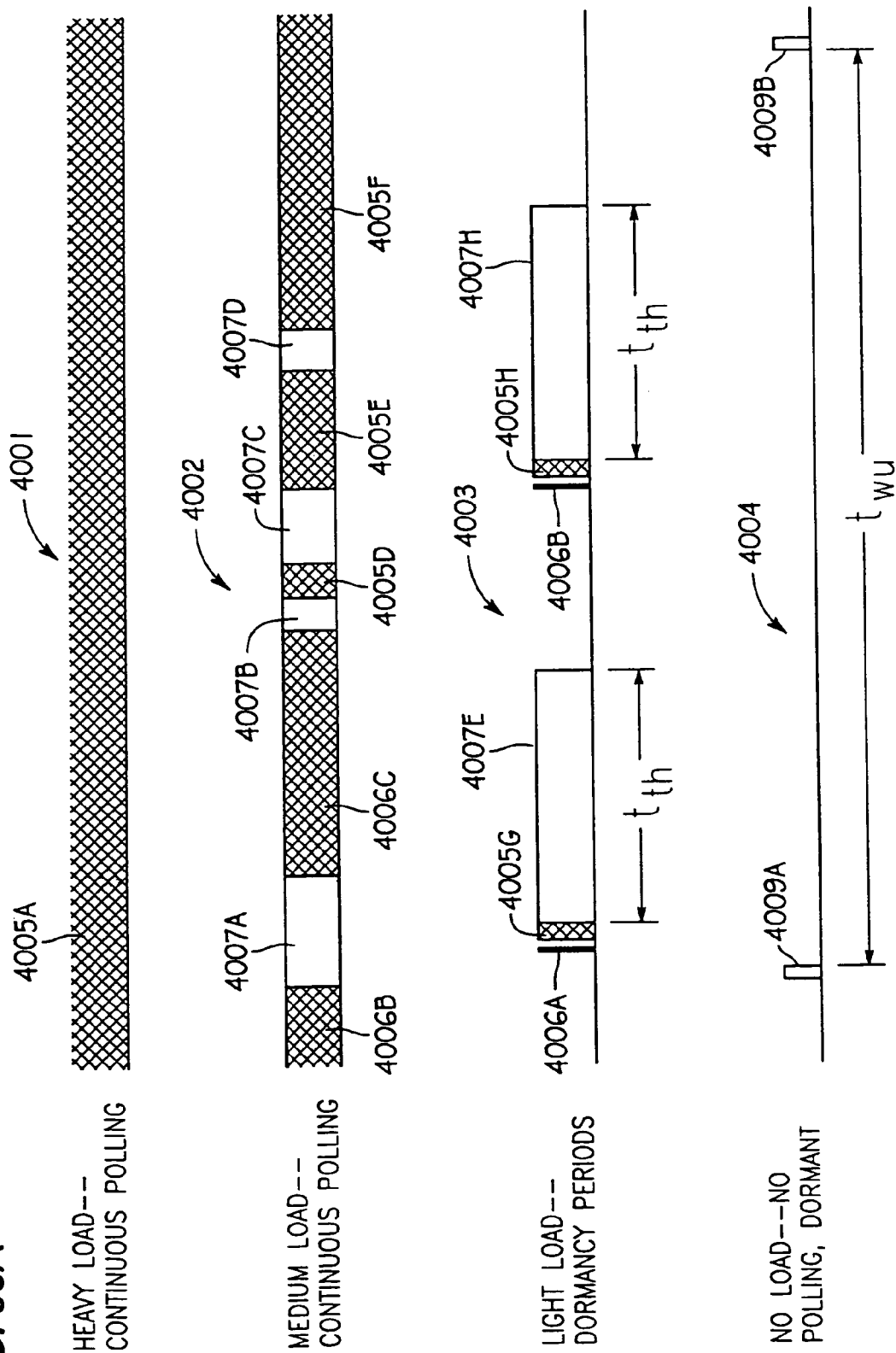

REMOTE RADIO DATA COMMUNICATION SYSTEM WITH DATA RATE SWITCHING

CROSS-REFERENCE TO RELATED APPLICATIONS

The present application is a continuation of U.S. patent application Ser. No. 10/057,816 filed Jan. 24, 2002, which is a consolidation of application Ser. Nos. 09/934,457 Aug. 21, 2001 and 09/799,340 Mar. 5, 2001. Said application Ser. No. 10/057,816 is a continuation-in-part of said application Ser. No. 09/934,457 filed Aug. 21, 2001 now abandoned and said application Ser. No. 10/057,816 Jan. 24, 2002 is a continuation-in-part of said application Ser. No. 09/799,340 filed Mar. 5, 2001 now abandoned. Said application Ser. No. 09/934,457 Aug. 21, 2001 is a continuation of application Ser. No. 08/551,442 filed Nov. 1, 1995, which is a continuation of application Ser. No. 07/910,865 filed Jul. 6, 1992, now abandoned; said application Ser. No. 07/910,865 is a continuation-in-part of application Ser. No. 07/864,300 filed Apr. 6, 1992, now abandoned; and a continuation-in-part of Application Ser. No. 07/980,947 filed May 26, 1992, now abandoned.

Said application Ser. No. 09/799,340 Mar. 5, 2001 is a continuation of application Ser. No. 09/123,876 filed Jul. 28, 1998, now abandoned, which is a continuation of application Ser. No. 08/476,550 filed Jun. 6, 1995, now U.S. Pat. No. 5,862,171 issued Jan. 19, 1999, which is a continuation of application Ser. No. 08/270,107 filed Jun. 30, 1994, now U.S. Pat. 5,425,051 issued Jun. 13, 1995, which is a continuation of application Ser. No. 07/973,237 filed Nov. 9, 1992, now abandoned.

The entire disclosure of the following of the foregoing applications including the drawings and appendices are hereby incorporated herein by reference: Ser. Nos. 07/864,300; 07/980,847; 07/883,854; 07/857,603; 07/700,704; 07/980,947; 07/826,990; 07/800,997; 07/707,954; 09/799,340 filed Mar. 5, 2001, which was published as patent Application Publication No. 20010050943 under date of Dec. 13, 2001, and application Ser. No. 10/057,816 filed Jan. 24, 2002, which was published as patent Application Publication No. 20030078006 under date of Apr. 24, 2003.

Said application Ser. No. 09/799,340 as filed incorporated by reference the following patent applications in their entirety, these applications being also incorporated herein by reference in their entirety: applications Ser. Nos. 07/857,603; 07/968,990; 07/485,313; 07/305,302; 07/389,727 (now U.S. Pat. No. 5,070,536); Ser. No. 07/292,810 (now U.S. Pat. No. 4,924,462); and European Published patent Application EPO 353759 published Feb. 7, 1990.

AUTHORIZATION PURSUANT TO 37 C.F.R. 1.71 (d) AND (e)

A portion of this disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

STATEMENT REGARDING FEDERALLY SPONSORED RESEARCH OR DEVELOPMENT

N/A

BACKGROUND OF THE INVENTION

The present invention in a preferred implementation relates to improvements in radio data communication systems wherein a number of mobile transceiver units are to transmit data to a number of base stations under a wide range of operating conditions. The invention is preferably to be applicable as an upgrade of an existing data capture system wherein a number of hand-held transceiver units of an earlier design are already in the field representing a substantial economic investment in comparison to the cost of base stations, accessories and components. In installations spread over an extensive area, a large number of mobile portable transceiver units may be employed to gather data in various places and multiple base stations may be required. IN a variety of such installations such as warehouse facilities, distribution centers, and retail establishments, it may be advantageous to utilize not only multiple bases capable of communication with a single host, but with multiple hosts as well.

An early RF data collection system is shown in Marvin L. Sojka, U.S. Pat. No. 4,924,462 assigned to the assignee of the present application. This patent illustrates (in the sixth figure) a NORAND® RC2250 Network Controller which supports one base transceiver for communication with multiple mobile portable transceivers. The exemplary prior art device is capable of communicating with a host computer through an RS232C interface at up to 19,200 baud in asynchronous mode. In order for an optional RS422 interface to be substituted for an RS232C interface, the unit must be opened and substitute circuitry components installed within it.

In the design of low-cost narrowband FM receivers, super-heterodyne configurations using one or more fixed intermediate frequencies (IF) are generally employed. Receiver selectivity is provided using crystal or ceramic filters at these IF's. The passband characteristics of these filters must be wide enough to accommodate the bandwidth occupied by the intended received signal, plus any expected center frequency error due to frequency offsets in the transmitted signal or receiver local oscillators which may arise from changes in ambient temperature or misalignment. The stopband performance of the IF filters is chosen to provide the maximum out-of-band attenuation that is compatible with target design specifications, passband requirements, and equipment cost goals.

The technical requirements for narrowband FM equipment were originally devised for analog transmission of voice messages. Because the frequency spectrum of voice was easily quantifiable, it was possible to bandlimit the voice signal at baseband with no loss of information content, and utilize an optimal transmission bandwidth for acceptable signal quality at the receiver. Channel spacings were then derived based upon this optimal bandwidth, and the stability of the transmitter and receiver oscillator frequencies that could economically be achieved in portable and mobile equipment.

In UHF land-mobile equipment meeting the required transmit and receiver oscillator stabilities, the worst case frequency error is often comparable to the bandwidth of a transmitted voice signal. In order to accommodate some fraction of the worst case frequency error, it has been a common practice to substantially broaden the IF filter passbandwidths.

The transmission of binary data through modified narrowband, FM voice quality equipment requires special considerations. Unlike voice transmission, bandlimiting the signal limits the information transmission capabilities of the system. In order to obtain maximum information throughput, it is desirable to utilize the available bandwidth as fully as possible. However, for equipment to operate over a wide temperature range, transmitted bandwidth, and therefore data rate, must be constrained to keep the received signal within the IF filter bandwidth(s) when large frequency offsets due to oscillator temperature instabilities are present.

Unfortunately, when equipment is designed to tolerate large frequency offsets, a lower data rate must be selected than that allowed by the IF filter bandwidths under less stringent conditions where oscillator frequencies are near their ideal values.

Another consideration in data rate selection is system range. This is most problematic in data communications systems employing mobile or portable remote devices. These devices may operate at close range, where received signals are strong, or in fringe areas where received signals are extremely weak. Selecting a relatively high data rate will result in higher data throughput under strong signal conditions, while under fringe conditions, operation at lower data rates, with optimized baseband filtering, can be substantially more reliable.

The present invention also relates to improvements in radio data communication systems which utilize a polling protocol, originating from a base station, to schedule and maintain communication with a number of remote transceiver units. More particularly, the present invention relates to a dormant polling protocol which schedules all communication on a heavily loaded communication channel, while permitting unscheduled communication whenever the communication channel is lightly loaded.

To establish communication, polling protocols require a base station to repeatedly poll each of the remote transceiver units being serviced. Even during periods when no communication is taking place, the base stations must still continue to poll, awaiting a response. This unproductive polling not only wastes the base station's energy (important when the base station is battery powered), but also unnecessarily dominates a communication channel so as to interfere with other communication on or near that channel.

In addition, polling protocols are most effective under conditions of heavy channel communication—where effectiveness is a measure of response time. During periods of light channel communication, a CSMA (carrier-sense multiple-access) type protocol which is initiated by the remote transceivers prove more effective than a polling protocol. However, neither of these types of communication protocols prove most effective under both heavy and light communication loading.

SUMMARY OF THE INVENTION

The present invention provides improved data throughput in low-cost FM or FSK data communications equipment used on existing narrowband channels, while still maintaining reliable performance in fringe reception areas, and under extreme conditions of temperature. This object is achieved by providing such low cost data communications equipment with the capability of automatically switching between two or more data rates, and by the provision of control means for adaptively selecting the best data rate dynamically according to changing operating conditions. In a preferred embodiment, this is accomplished using only baseband signal processing techniques. For communications systems which use some form of handshaking to establish a communications link between a base station and one of several remote portable or mobile units, a test signal may be incorporated into the handshaking protocol to evaluate relevant operating conditions. For example, a polling signal sent from a base station may itself constitute a test signal which is evaluated by one or more remote units having messages to transmit. A remote unit responding to the polling signal, may transmit as its response a selection signal specifying the data rate which has been determined to be optimum as a result of test signal evaluation.

As stated above, high system clock rates are required in rf terminals to provide for the decoding of barcode scans at a rate that is acceptable to a user of the system. However, the high clock rates used for decoding also may cause the generation of an excessive amount of digital noise in and around the rf terminals. This noise can get into the rf terminal and interfere with communication, resulting in a reduction in the effective communication range. This problem is solved by using a dual clock rate. The terminal is operated normally at a slow system clock rate to minimize the generation of digital noise, and is switched to a fast clock rate during barcode scanning to allow the data obtained from the barcode scan to be processed at a higher rate. This lets the rf data link co-exist with the need for and the hardware support for barcode scan decoding.

Another object of the invention to provide a radio data communication system capable of increased throughput while retaining basic compatibility with an existing installed product family of mobile transceiver units.

In a preferred example, an existing system utilizing hand held RF terminals of fixed data rate is upgraded by means of system components capable of adaptively switching to a higher data rate. For example, in an existing system where a sequential polling of the hand held RF units is employed, the base station may insert a test pattern of substantially higher data rate into the polling process, such that upgraded transceiver units can determine the feasibility of use of such higher data rate, while earlier versions continue to operate at the fixed data rate. In a more advanced system, where RF terminals respond in random time slots to a general polling transmission, a test pattern at a substantially higher data rate may be appended to such general poll. Again, a prior RF terminal model of fixed data rate may operate as usual, while upgraded RF terminals may selectively respond with higher data rate messages. Further, the upgraded terminals are preferably of sufficiently low cost that they could be employed with existing base stations operating at a fixed data rate until such time as it became economically feasible to replace the base station.

In a system which is to be marketed commercially, the base station may issue high data rate general polling signals interspersed at variable selected times with lower data rate general polls. In this way the higher data rate polls may be used as test signals by mobile units capable of operation at the high data rate. The frequency of high data rate polls may be adapted to the proportion of high data rate capable mobile units and other factors. Relevant parameters may be measured by the base station and utilized to dynamically vary the frequency of high data rate polls e.g. during a daily operating period.

Accordingly, a specific object of the invention resides in the provision of a low cost hand held data capture RF terminal capable of utilization with base stations having fixed data rate and also with an upgraded base station capable of cooperating with such terminal to provide substantially increased throughput.

Another specific object of the invention is to provide an improved base station compatible with an installed product family of fixed data rate RF terminals but capable of cooperating with upgraded RF terminals to achieve an optimized data rate during successive polling operations.

Further objects reside in the provision of a radio data communication system which provides a reliable and efficient communications link under a wide range of operating conditions.

The present invention also provides an improved network controller to serve as a consolidation link between one or more host computers and one or more base transceiver units, each of which may be communicative with many mobile portable transceiver units being moved about a warehouse complex for the collection of data. The network controller invention provides a front panel display with three operator-available control keys for selections of function and up or down scrolling through choices provided on the front panel display.

The invention will allow incorporation with existing base transceivers as well as with high-speed spread spectrum and synthesized radio networks at the same time. The invention allows the creation of a radio communication system with multiple host devices using differing communication protocols. Higher speed host device interfaces may be used as a result of the inclusion of the invention in an existing radio communication system. The invention provides means for the coupling of large networks of serially interconnected base transceivers over a single twisted pair of wires.

The invention provides a plurality of communication ports for interconnection to one or more host computers and one or more base transceiver systems or units. The communication ports available for connection with the host computers may be configured to provide selective interfaces without any requirement for rewiring or other hardware modification. A first port of the controller may be selected to interface with a host computer by either RS232 or V.35 means. The selection of interface means may be performed by the end user with choices made on the front panel control keys of the device.

A second port of the invention may be selected to provide interface means by a choice of RS232, RS422, OR RS485 means or through a NORAND® Radio One Node Network proprietary interface. This second port may be communicative with a second host computer or with existing installed base units when RS232 means are selected, or with existing base units when RS422 means are selected. In addition, the second port may be configured to communicate with a network of a new generation base units, either by RS485 interface protocol, or by the NORAND® Radio One Node Network proprietary interface.

The third port of the invention, like the second port hereof, may be selectively configured to communicate by RS232, RS422, RS485 or NORAND® Radio One Node Network proprietary interface means. For both the second and third ports, as well as for the host port, configuration of the port is accomplished by selection of the port on the front panel of the invention controller with the select key and then selection of the desired interface configuration through appropriate use of the up and down keys to scroll to the correct means to be selected. Because the invention permits internal, software-controlled, selection of the desired interface means for each port, the end user may easily self configure the unit for a particular use, thereby providing a highly versatile device. In addition, the configuration choice means is simplified for the user, because the choices are conveniently displayed on the front panel display and a choice can be made from a scrollable list.

The introduction of the selectable RS485 interface in the present invention enables the controller to be interfaced to a network of new generation base station units which may comprise several base transceiver units configured on a single network circuit.

The inclusion of the selectable NORAND® Radio One Node Network proprietary interface means for the second and the third ports provides means for incorporation of new generation base transceiver units having particularized wiring and control requirements.

A diagnostic port configured for RS232 interface means is provided to provide selective communication, either remotely through modem means, or through direct coupling, with diagnostic and reprogramming apparatus.

The invention is provided with an application specific integrated circuit used in combination with a control processor unit capable of a speed of 16.667 mhz with direct memory access functionality available at is communication ports. Internal memory components to be coupled to the central processor unit and application specific integrated circuit will comprise nonvolatile electrically erasable programmable read only memory elements, dynamic random access memory elements, and nonvolatile FLASH memory elements which permit erasure by application of +12 VDC to prescribed pins.

Power supply means are supplied exteriorly to the invention in order to make the invention standardized for United States, European and other countries' local power company output characteristics.

It is therefore an object of the invention to provide a radio communication system which permits the interconnection of one or two host computer devices to a multiplicity of base transceiver units which may include both prior art existing installed units and new generation units capable of spread spectrum or synthesized radio transmission.

It is a further object of the invention to provide a radio communication system network controller which may allow interconnection of a multiplicity of devices which are operating with non-uniform electrical interface characteristics.

It is a further object of the invention to provide a radio communication system network controller which may be configured for varying interface requirements by operation of a limited number of front panel keys.

It is a further object of the invention to provide a radio communication system network controller which will allow utilization of single twisted pair networks of serially networked base transceiver units, each of which being communicative with a large number of individual mobile data collection transceiver units.

In addition, the present invention provides a method of operating a base station which communicates with a multiplicity of remote transceivers.

Specifically, this method comprises the first step of transmitting a polling sequence, servicing each responding remote transceiver, and determining whether the level of activity on the channel is greater than a low-activity threshold. If the level of activity is greater than the low-activity threshold, the base station repeats the first step.

If the level of activity is less than the low-activity threshold, the base station performs a second step of starting to time a period of low-activity.

In a third step, the base station transmits a polling sequence, services each responding remote transceiver, determines whether the level of activity on the channel is still less than the low-activity threshold. If the level of activity is greater than the low-activity threshold, the base station resets the timing of the period of low-activity and branches back to re-execute the first step. If the level of activity is less than the low-activity threshold and the period of low-activity has not reached a predetermined threshold period, the base station repeats the third step.

If, however, the level of activity is less than the low-activity threshold and the period of low-activity has reached a predetermined threshold period, the base station performs a fourth step.

In a fourth step, the base station enters a dormant state awaiting a communication request from one of the remote transceivers.

Additionally, in accordance with the present invention, another method is disclosed for use by a base station in a radio frequency data communication system to optimize communication on a communication channel with a plurality of remote transceivers.

More particularly, this method involves transmitting a polling sequence at a polling rate, servicing each responding remote transceiver, and repeating the transmitting and servicing until the average level of activity is determined to not be greater than the low-activity average threshold. Next, the base station makes a transition from an active state to a dormant state, waiting for and servicing the communication requests of received from the requesting remote transceivers. The base station remains in the dormant state, waiting and servicing until the average level of activity on the communication channel is determined to be greater than a low-activity average threshold. Thereafter, the base station re-executes the entire process.

Accordingly, an important object of the present invention is to provide a dormant polling protocol that effectively operates during periods of both heavily and lightly loaded communication.

A further object of the invention is to provide a radio data communication system utilizing a dormant polling protocol to effectively operate during periods of both heavily and lightly loaded communication.

Another object of the invention is to provide a radio data communication system utilizing a dormant polling protocol to efficiently conserve transmission energy.

A further object of the invention is to provide a radio data communication system having a dormant polling protocol that only utilizes a communication channel when necessary.

The present invention provides an improved data communication system which maintains RF communication links between one or more host computers and one or more base transceiver units, each of which may be communicative with many mobile portable transceiver units being moved about a warehouse complex for the collection of data. Specifically, the invention provides a data communication system for collecting and communicating data in the form of RF signals which has a plurality of RF transceivers that store and modify at least one variable operating parameter. From the stored parameter(s), each of transceivers control the operation of transmission and reception. The transceivers also evaluate the effect of the stored parameter based by analyzing each transmission received, and determine whether to make changes in the stored parameter. If changes are needed, the transceivers, modify and store the modified operating parameter and begin operation based thereon.

The operating parameters involve: 1) the size of data segments to be transmitted; 2) the length or frequency of the spreading code used for direct-sequence spread spectrum communication; 3) the hopping rate, coding, and interleaving for frequency-hopping spread spectrum communication; and 4) the type of RF source encoding used.

In addition, the RF transceivers used in the data communication network of the present invention use system-default values to reset the operating parameters if a series of failed communication exchanges occurs, so that communication can be re-established.

It is therefore an object of the invention to provide an adaptive radio communication system which permits the interconnection of one or two host computer devices to a multiplicity of base transceiver units which may include both prior art existing installed units and new generation units capable of spread spectrum radio transmission.

It is a further object of the invention to provide an adaptive RF data communication system which optimizes communication based on a set of operating parameters.

It is a further object of the invention to provide an adaptive RF data communication system which maintains communication based on a set of operating parameters for optimizing communication, wherein the operating parameters involve: 1) the size of data segments to be transmitted; 2) the length or frequency of the spreading code used for direct-sequence spread spectrum communication; 3) the hopping rate, coding, and interleaving for frequency-hopping spread spectrum communication; and 4) the type of RF source encoding to be used.

It is a further object of the invention to provide a radio communication system network controller which via a communication exchange optimizes a set of operating parameters, yet returns the parameters to their previous or system-default values upon failed communication.

Other objects, features and advantages of the present invention will be apparent from the following detailed description taken in connection with the accompanying drawings, and from the respective features of the appended claims taken individually and in cooperative combinations.

BRIEF DESCRIPTION OF THE DRAWINGS

FIG. 19 is a diagram illustrating the system timing for the prior art system of FIGS. 1 and 18.

FIG. 20 is a diagram similar to FIG. 19 and illustrating system timing for a prior art system having nearly twice the polling speed of the system of FIGS. 1, 18, and 19.

FIG. 21 is a diagram similar to FIG. 18 but illustrating a second protocol which is utilized in a recently introduced product family having a high performance type of mobile terminal unit representing the next generation in comparison to the system represented in FIG. 20.

FIGS. 23 and 24 illustrate an implementation of the embodiment of FIG. 22 where the receiver of each mobile unit may operate only at a standard data rate, FIGS. 23 and 24 being shown to the same time scale, and utilizing respective levels to represent transmission and reception at a standard rate compatible with the earlier versions of the system and at a higher data rate for increased system throughput, FIG. 23 representing successive switching modes at the base station, and FIG. 24 illustrating the corresponding switching modes of an exemplary mobile unit in radio communication with the base station.

FIGS. 25 and 26 illustrate a further implementation of FIG. 22 which uses the same graphical format as FIGS. 23 and 24 to illustrate successive switching modes, but wherein selection of data rate is made at the individual mobile unit.

FIGS. 27 and 28, and 29 and 30 are plots similar to that of FIG. 23, but illustrating an embodiment in accordance with FIG. 22 wherein the base station sends a test transmission (FIGS. 27 and 28) or transmits temperature information (FIGS. 29 and 30) to all of the mobile units simultaneously, FIGS. 27 and 29 relating to a sequential polling protocol, and FIGS. 28 and 30 illustrating an example with a contention type protocol;

FIGS. 31 and 32 show diagrams similar to those of FIGS. 23 and 24, for illustrating an embodiment in accordance with FIG. 22 wherein each mobile unit may transmit a high data rate test pattern to the base station.

FIG. 33 is a plot similar to that of FIG. 18, but illustrating operation of the system of FIG. 22 wherein the base station sends a high data rate test pattern to all of the mobile units simultaneously, for example in advance of a sequential polling cycle.

FIG. 34 is a plot similar to that of FIG. 21, but showing the base station of FIG. 22 transmitting a high data rate test pattern for example immediately following a standard data rate general poll for the example of a contention type polling protocol.

FIG. 37 showing the specific example of N equals four and M equals one; FIG. 38 showing alternating high data rate and low data rate communications frames where N and M may both vary (generally in opposite senses) in successive cycles; and FIG. 39 showing a case where plural communications frames of one type (e.g. 9600 baud) occur between a lesser number (e.g. one) of the other type of communications frame, this pattern being repeated, or varied as a function of loading at the respective data rates.

FIG. 41B being a continuation of FIG. 41A to the right; FIGS. 41C and 41D being further continuations of the circuit to the right; FIG. 41F showing continuations of FIG. 41B in a downward direction, and continuations of FIG. 41E to the right; FIG. 41G showing downward continuation of FIG. 41C and rightward continuation of FIG. 41F; and FIG. 41H showing downward continuation of FIG. 41D, and rightward continuation of FIG. 41G; FIG. 42B showing a rightward continuation of FIG. 42A, FIGS. 42C and 42D being further rightward continuations of the circuitry; and FIG. 42E being a downward continuation of FIGS. 42B, 42C and 42D.

FIGS. 43B, 43C and 43D being continuations of FIG. 43A to the right; FIG. 43E being a continuation of FIG. 43D in a downward direction; FIG. 43F being a downward continuation of FIG. 43A; FIG. 43G being a rightward continuation of FIG. 43F and a downward continuation of FIG. 43B; and FIG. 43H being a rightward continuation of FIG. 43G and a downward continuation of FIGS. 43C and 43E; FIGS. 44B, 44C and 44D being successive rightward continuations of FIG. 44A; FIG. 44F being a rightward continuation of FIG. 44E and a downward continuation of FIG. 44B; FIG. 44G being a rightward continuation of FIG. 44C; and FIG. 44H being a rightward continuation of FIG. 44G and a downward continuation of FIG. 44D.

FIGS. 51A-51G show various output waveforms for explaining the operation of FIGS. 49A-49B and 50.

FIGS. 52A-52C show waveforms for explaining autodifferentiation between 4800 bps and 9600 bps, and between 4800 bps and 16,000 bps signals.

FIG. 55A is an illustration of a dormant polling protocol of the present invention.

DETAILED DESCRIPTION OF THE INVENTION

List of Appendices

Appendix A. Brochure entitled "MBA3000 Multiple Base Adapter".

Appendix B. Brochure entitled "RB2212 Base Radio Transceiver".

Appendix C. Brochure entitled "RB3000 Base Radio Transceiver".

Appendix D1. Brochure entitled "RT2210XL Radio Data Terminal".

Appendix D2. Brochure entitled "RT3210 Radio Data Terminal".

Appendix D3. Brochure entitled "RT3310 & RT3410 Radio Data Terminals".

Appendix D4. Brochure entitled "RT1000 Radio Data Terminal".

Appendix D5. Brochure entitled "RT5910 Mobile Mount Radio Terminal".

Appendix E. Exemplary Program Listing Showing Control Instructions of a Network Controller.

Appendix F. Exemplary Program Listing Showing Control Instructions for a Protocol of a Mobile Transceiver Unit.

Appendix G. Brochure entitled "RM3216 Communication Multiplexer".

Appendix H. Exemplary Command Structure for a Mobile Transceiver Unit.

Figure 1:
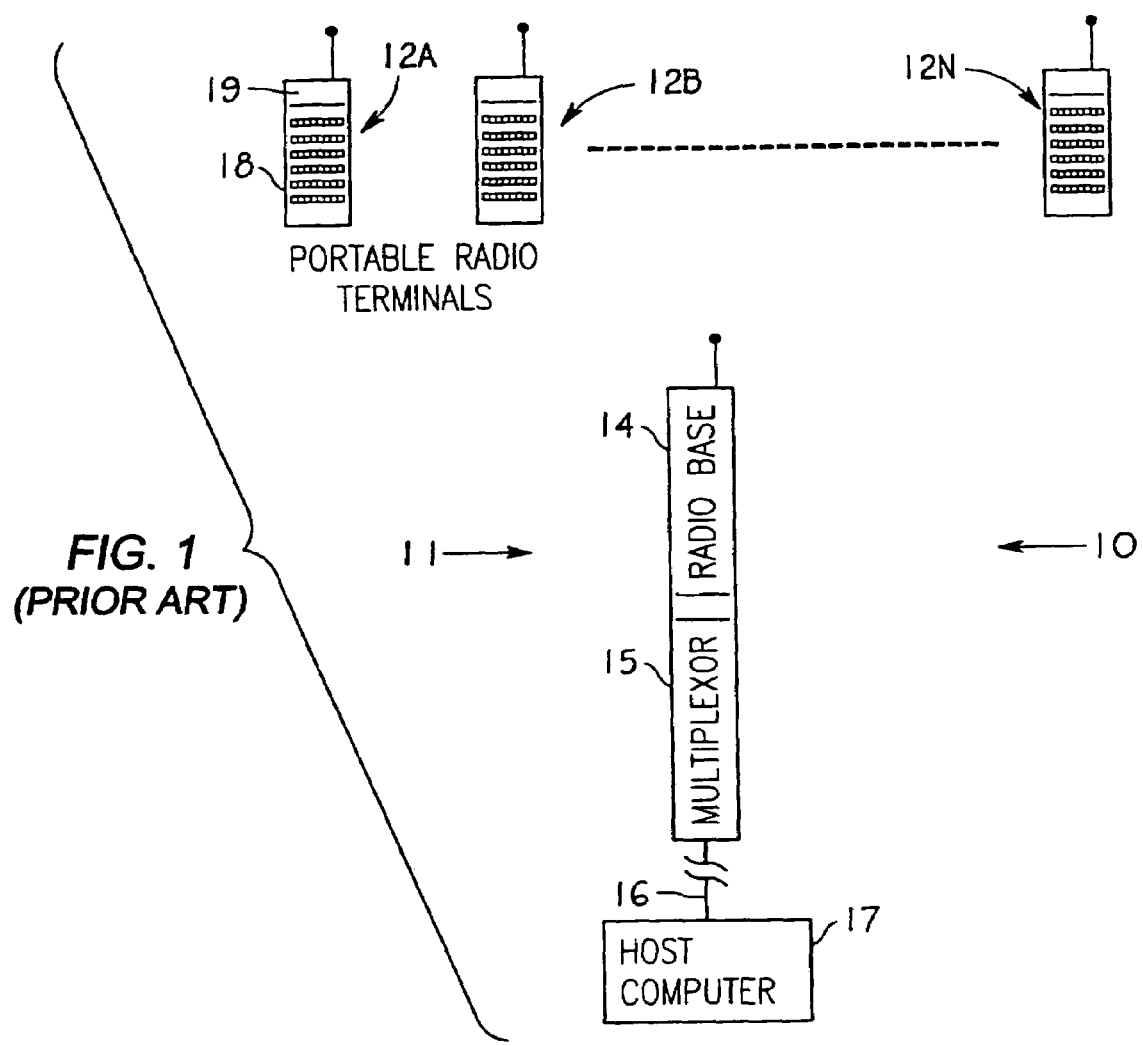
FIG. 1 is a block diagram of the prior art data communication system.

FIG. 1 shows an existing radio frequency data transmission system 10 wherein a base station transceiver means 11 has a number of mobile transceiver units such as 12A, 12B, . . . , 12N in radio communication therewith.

By way of example, the base station may be comprised of a radio base unit 14 such as the model RB3021 of Norand Corporation, Cedar Rapids, Iowa, which forms part of a product family known as the RT3210 system. In this case, the radio base 14 may receive data from the respective mobile RF terminals, e.g. of type RT3210 or RT1210, and transmit the received data via a multiplexor 15 and a communications link 16 (e.g. utilizing an RS-232 format) to a host computer 17.

The data capture terminals 12A, 12B, . . . , 12N may each be provided with a keyboard such as 18, a display as at 19, and a bar code scanning capability, e.g., via an instant bar code reader such as shown in U.S. Pat. No. 4,766,300 issued Aug. 23, 1988, and known commercially as the 20/20 High Performance Bar Code Reader of Norand Corporation.

Figure 2:
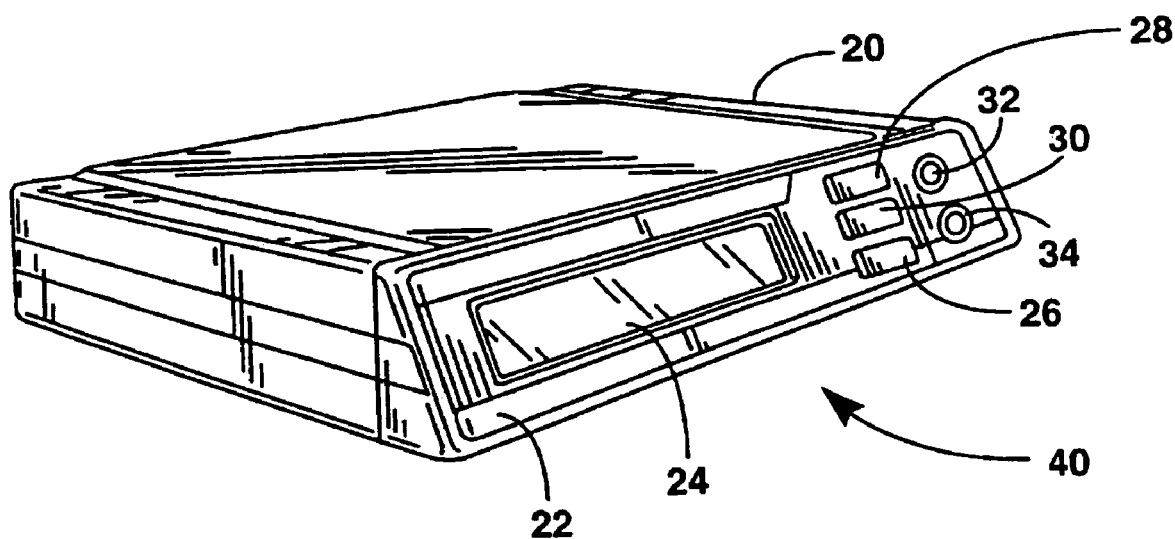
FIG. 2 is a perspective view of the invention.

FIG. 2 provides a perspective view of a network controller 40 of the present invention. A case 20 is attached to a front panel 22, having a display 24 and select key 26, up key 28 and down key 30. Power indicator 32 comprises a low power green light emitting diode which is energized when power is supplied to the invention 10. Error condition indicator 34 is a yellow LED which is software controlled to be energized if the invention 10 is in error condition.

Figure 3:
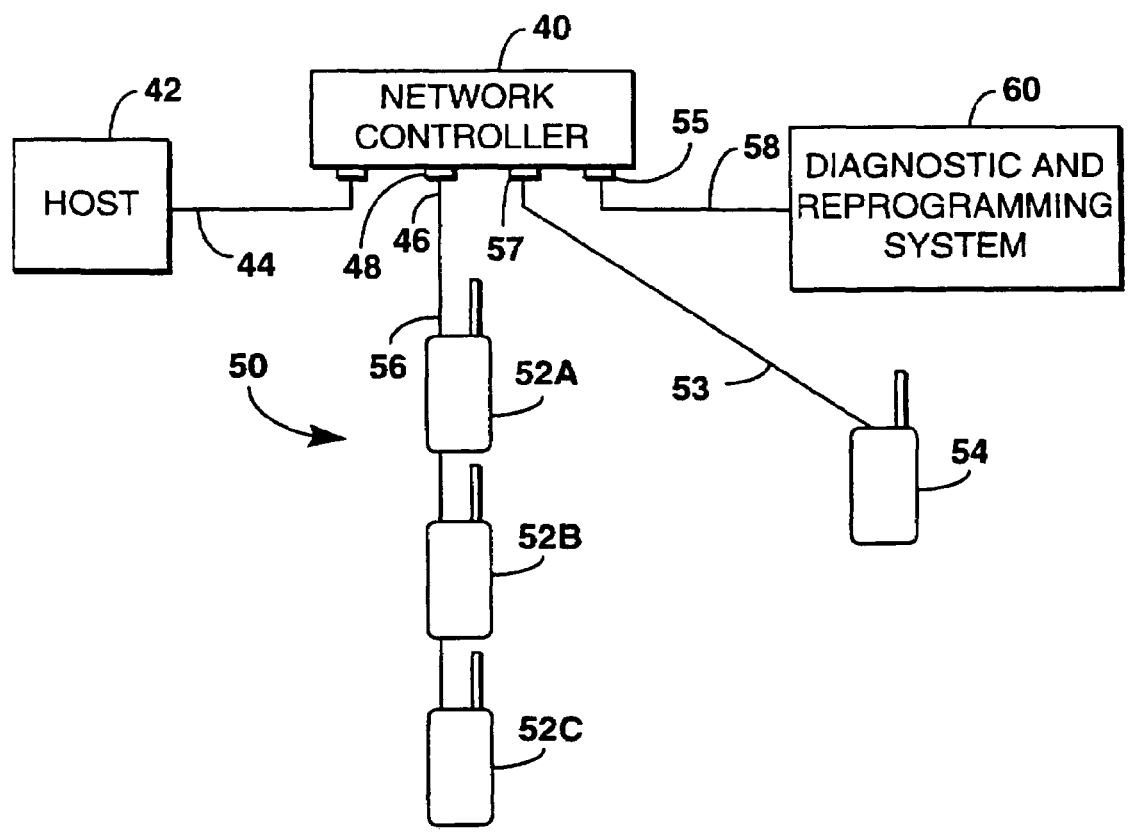
FIG. 3 is a schematic representation of an exemplary radio communication system utilizing the invention.

FIG. 3 discloses a diagrammatic illustration of a radio communication system in accordance with the present invention. Invention network controller 40 is coupled to host computer 42 such that data may be interchanged between the devices over host communications link 44, which may be either in an RS232C format or selectively in an RS422 format. The host communication link 44 couples to controller 40 at host port 46.

First communication port 48 of controller 40 provides means for coupling of network 50 to controller 40. Network 50 comprises a number of base RF transceiver units 52A, 52B and 53B, each of which may be selectively employed in the radio frequency communication of data from mobile transceiver units. It is to be understood that base transceiver units 52 are designed and equipped to be operable in the exchange of data with network controller 40 over network link 56 such that each base transceiver unit 52A, 52B, or 53C may independently exchange data with network controller 40 through first communication port 48. When first communication port 48 is intended for operation with a network such as network 50 of base transceiver units 52A, 52B and 53C, for example, network controller 40 is selectively operated to provide an RS485 interface at first communication port 48. First communication port 48 may be alternately selected to operate as an RS232C interface, as an RS422 interface, as a proprietary NORAND® Radio One Node Network interface or as a high speed V.35 interface. The selection of interface to be provided at first communication port 48 is front panel controlled, that is, the user may operate front panel keys 28, 30 and 26 (See FIG. 2) to direct the proper interface to be provided at first communication port 48.

Base transceiver units 52A, 52B, and 52C are coupled to network link 56 by serial means, rather than parallel means, and each may be caused to transmit or to receive independently from the others while additionally being communicative with network controller 40 in a randomly chosen fashion.

It is further to be understood that interface translation is provided within controller 40 such that data communicated at first communication port 48 may be directed to host 42 at port 46 via properly chosen interface means as is required by the host 42 with which communication is intended.

Like first communication port 48, second communication port 57 may be internally switched among interface choices of these types: RS232C, RS422, V.35, RS485 and proprietary NORAND® Radio One Node Network interface. In the illustrated arrangement of FIG. 3, for example, second communication port 57 is coupled over third link 53 to previously installed base transceiver 54, which heretofore had been used in a prior art system as is illustrated in FIG. 1. Because of limitations of base transceiver 54, it must communicate via RS232C interface format and therefore, second communication port 57 must be selected to operate in RS232C interface mode. However, when second communication port 57 is desired to communicate with a network via RS485 interface, front panel keys 26, 28 and 30 may be manipulated by the user to provide the RS485 interface availability at second communication port 57. Likewise, second communication port 57 may be selected to operate as an RS422 interface, as a V.25 interface, or as the proprietary NORAND® Radio One Node Network interface.

Diagnostic port 55 provides a fourth communication pathway for network controller 40, providing an asynchronous port operable at 300 to 19,200 baud as an RS232C interface. When desirable, diagnostic port 55 may be coupled by diagnostic link 58 to diagnostic device 60 for purposes of error diagnosis of-controller 40 by diagnostic device 60, or for reprogramming of memory devices within controller 40 when desired. It is contemplated that diagnostic device 60 comprises a 16-bit microprocessor commonly known as a personal computer or "PC". The mode of coupling between diagnostic device 60 and network controller 40 may be direct or through remote means by use of a modem.

Figure 4:
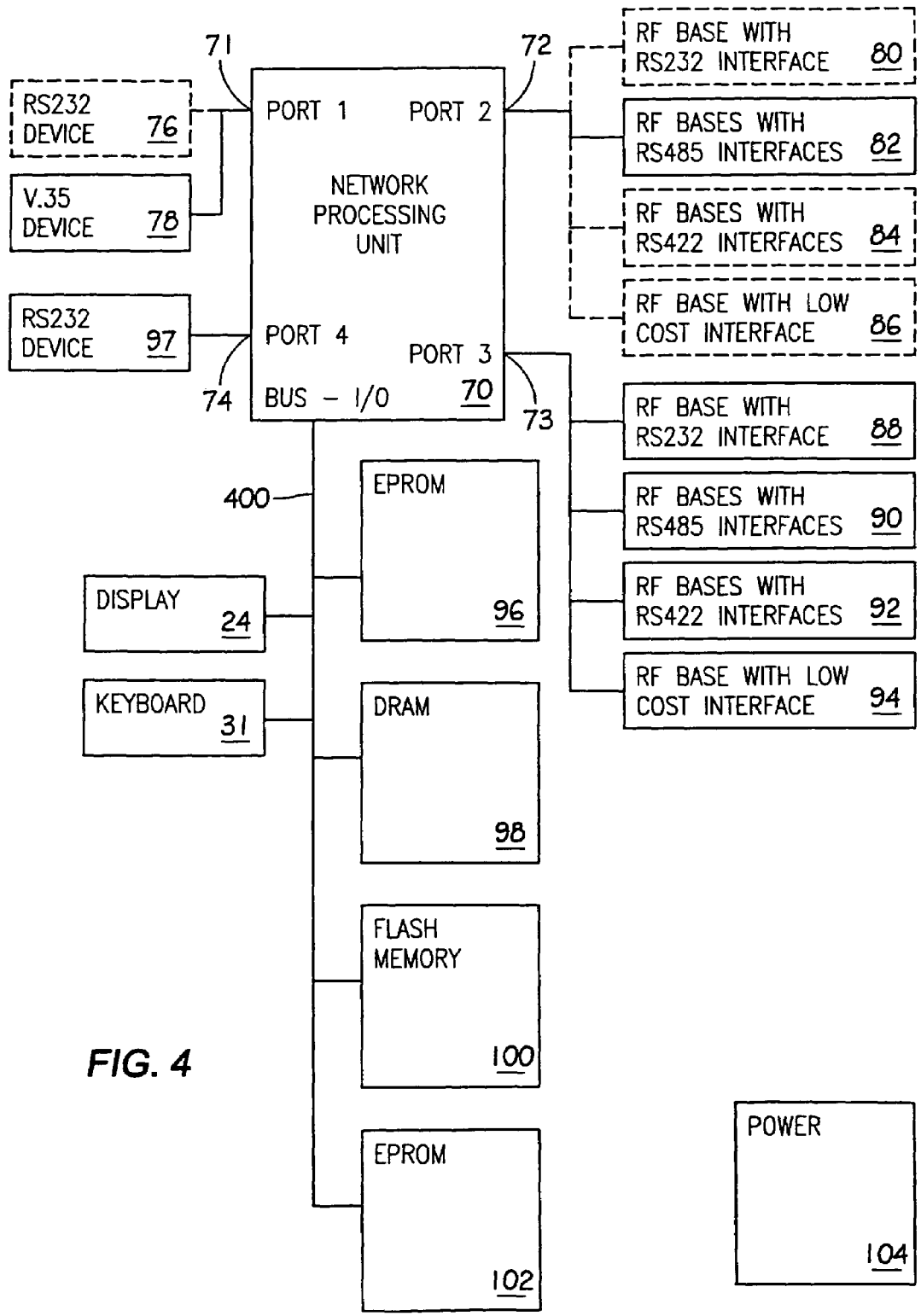
FIG. 4 is a diagrammatic illustration of the control circuitry elements of the invention.

Referring now to FIG. 4, a central processing unit 70 is provided with at least four data communication ports, illustrated at numerals 71, 72, 73, and 74. First data communication port 71 may be selectively coupled to RS232 interface member 76 or V.35 interface member 78. The choice of whether RS232 interface member 76 or V.35 interface member 78 is chosen is dependent upon the operating characteristics presented by the host computer, such as host computer 42 of FIG. 3, with which network controller 40 will communicate. The choice of whether first communication port 71 is coupled to interface member 76 or to interface member 78 depends on the front panel selection made by the user by keys 26, 28, and 30 shown in FIG. 2.

Second communication port 72 may be selectively coupled to RS232 member 80 or to RS485 interface member 82 or to RS422 interface member 84 or to NORAND® Radio One Node Network proprietary interface member 86. By use of front panel keys 26, 28, and 30 of FIG. 2, the user may select second communication port 72 to be coupled to any one of interface members 80, 82, 84, and 86.

Third communication port 73 is identical to second communication port 72 in functionality, being selectively couplable to RS232 interface member 88, to RS485 interface member 90, to RS422 interface member 92 or to NORAND® Radio One Node Network proprietary interface member 94.

In the preferred embodiment of the invention 40, central processing unit 70 of FIG. 4 comprises a Motorolaï 68302 integrated chip cooperative with an application specific integrated circuit. Central processing unit 70 employs novel features allowing the bidirectional use of a data communicative line of the Motorolaï 68302 chip and a single clock signal line to eliminate the need for coder-decoder members to be associated with the Motorolaï 68302 chip while allowing the use of only one pair of signal wires to be coupled to the RS485 interfaces 82 and 90 of FIG. 4.

Fourth communication port 74 of central processing unit is coupled to asynchronous RS232 interface member 97 to be available for interconnection of a diagnostic device therewith.

Also coupled to central processing unit 70 are display member 24 and keyboard member 31 with which keys 26, 28, and 30 of front panel 22 (FIG. 2) are interactive.

Memory elements including EPROM element 96, DRAM unit 98, FLASH memory unit 100 and EEPROM element 102 are intercoupled with each other and with central processing unit 70.

Power supply member 104 is selectively attachable to invention network controller 40. In order to avoid the necessity of different models of network controller 40 depending on the local electrical power utility's operating characteristics, power supply 104 is provided in optional models depending on the country in which it is to be used, power supply 104 being capable of providing satisfactory output power to network controller 40 regardless of the voltage or frequency of the input source provided to power supply 104.

Figure 6:
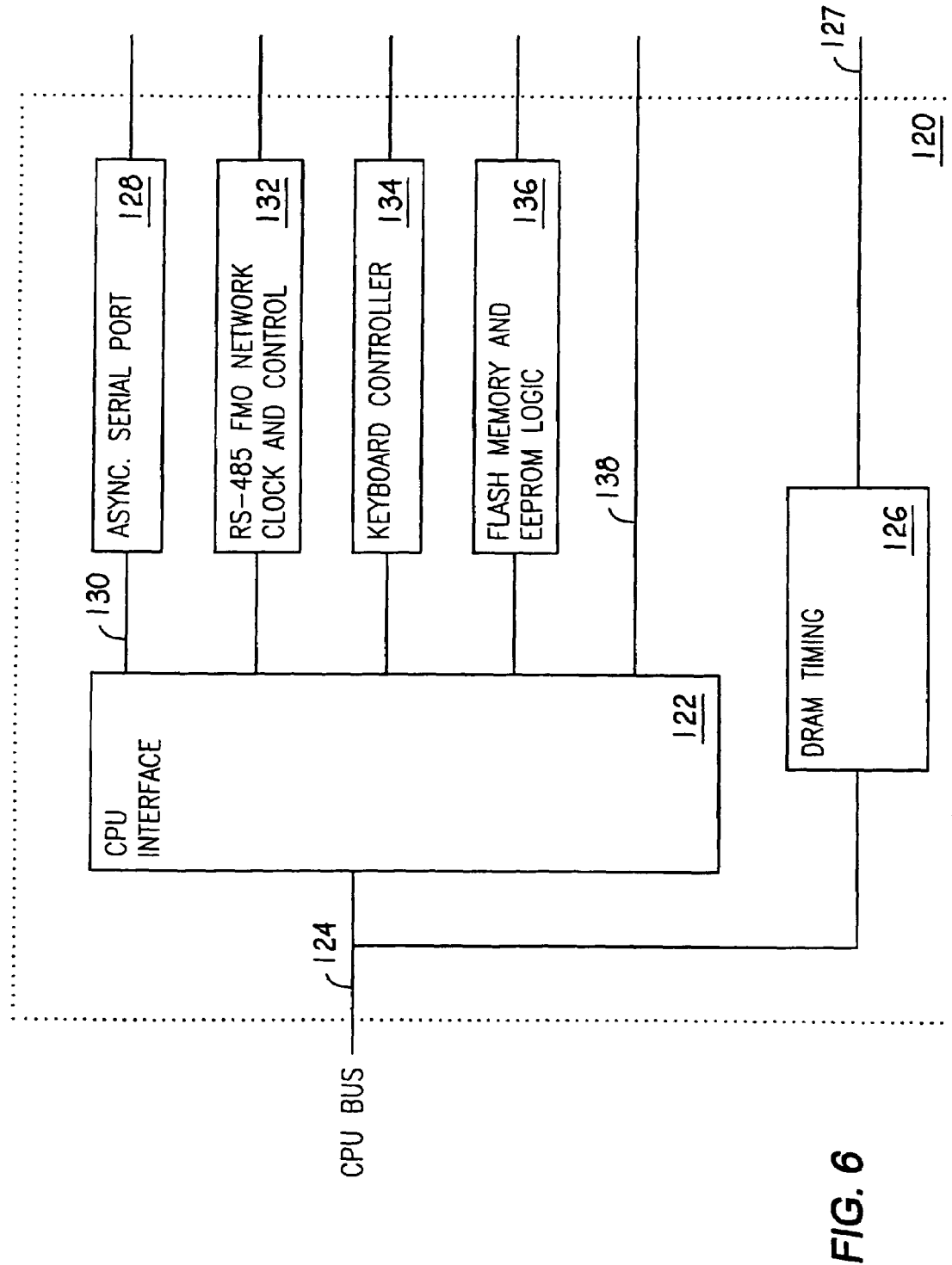
FIG. 6 is a diagrammatic illustration of the application specific integrated circuit of the invention.

The application specific integrated circuit (ASIC) used in the invention network controller 40 is disclosed in FIG. 6 and is identified by the numeral 120. ASIC 120 comprises a central processor unit interface 122 member which is coupled to the central processor unit bus by CPU bus link 124 which extends from ASIC 120. Also coupled to the CPU bus link 124 is dynamic random access memory (DRAM) timing element 126, which provides network controller 40 with timing signals for the DRAM member 98 illustrated in FIG. 4 when memory refresh of the DRAM 98 is indicated. DRAM timing element 126 is also coupled exteriorly to the ASIC 120 to DRAM member 98 by DRAM link 127.

Central processing unit interface 122 is coupled to asynchronous signal processing element 128 by signal path 130. Asynchronous signal processing element 128 comprises a baud rate generator cooperative with a universal asynchronous receiver-transmitter.

Also coupled to central processing unit interface 122 is network clock and control member 132 which comprises a programmable network clock generator which can be selectively programmed to generate an optional clock speed for a network to be coupled through RS485 interfaces 82 and 90 seen in FIG. 4. Network clock and control member 132 also provides detection means for detections of failure conditions on a linked network and provides control signals to system components in response thereto, including interrupt signals to programmable interrupt coordinator circuitry included in central processing interface 122. Network clock and controller member 132 provides data encoding by the FMO standard, then the encoded data may be operated upon by RS485 interfaces 82 and 84 and transmitted and received by single twisted pair means to multiple serially networked base transceiver units exemplified by base transceiver unit 52A, 52B, and 52C illustrated in FIG. 3.

Keyboard controller element 134 is coupled to central processing unit interface and provides a link exterior to ASIC 120 to keyboard 31 (See FIG. 3).

FLASH memory/EEPROM logic control member 136 is coupled to central processing unit interface 122 and comprises control functions for FLASH memory element 100 and EEPROM memory element 102 of FIG. 3.

Central processing unit interface 122 is also coupled by line 138 to latches exterior to ASIC 120.

It is to be understood that the base transceiver units 52A, 52B, and 52C illustrated in FIG. 3 are communicative with mobile transceiver units by electromagnetic radio means. The mobile transceiver units may be associated with bar code scanning devices such as the NORAND® 20/20 High Performance Bar Code Reader whereby the scanning devices scan an object having a bar code associated therewith and collect information stored in the bar code, which information is then transmitted through the mobile transceiver units to base transceiver units such as base transceiver units 52A, 52B, and 52C or base transceiver unit 54 of FIG. 3. The bar code data received by said base transceiver units is then transmitted in the example of FIG. 3, over network 50 by base transceiver units 52A, 52B, or 52C, or over link 53 by base transceiver unit 54, to network controller 40 which performs the routing and delivery of the data to the stationary data processor, or processors, such as shown for example, by host 42 of FIG. 3.

Description of FIGS. 7 through 11

Figure 7:
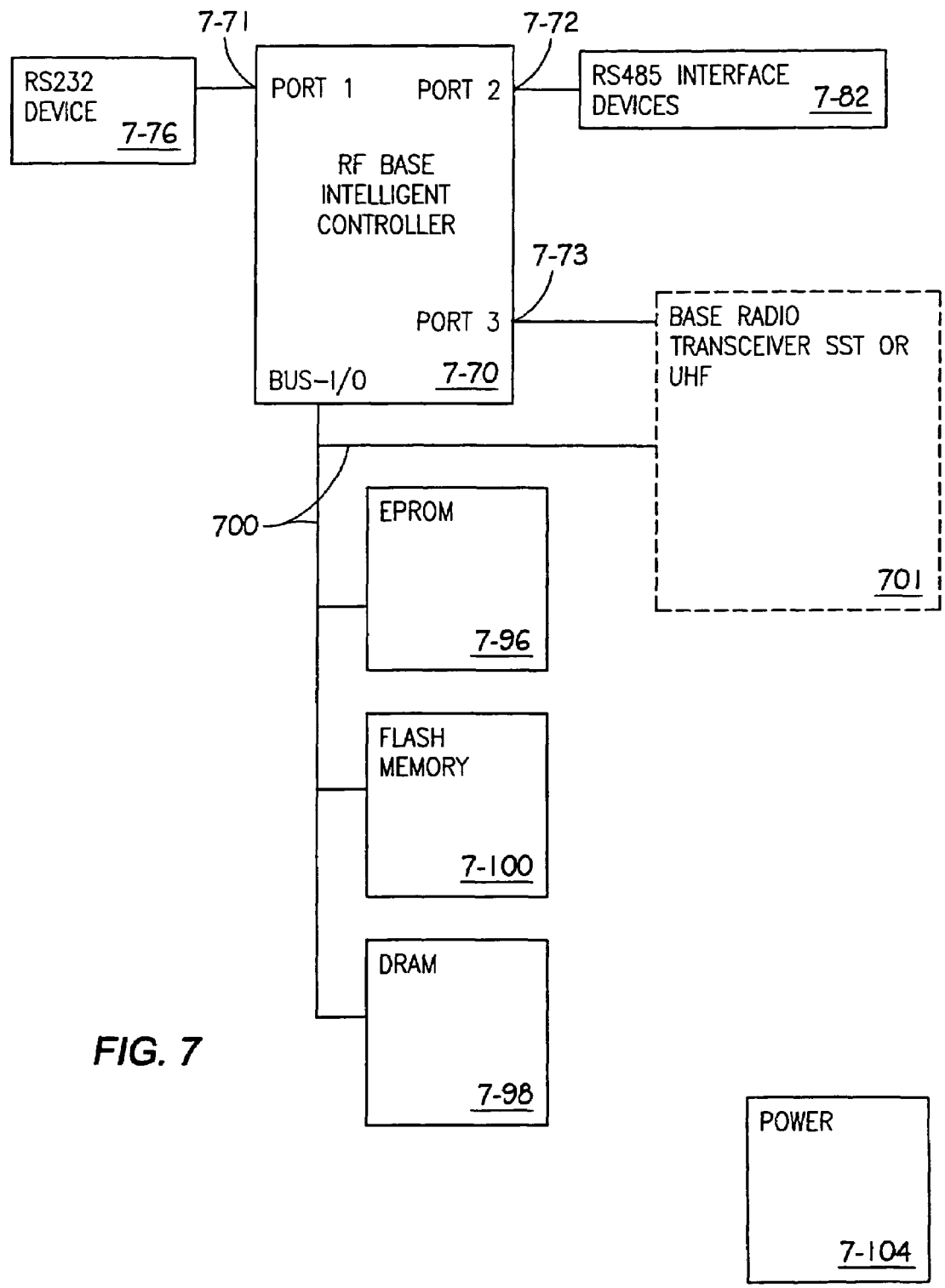
FIG. 7 is a block diagram showing an exemplary implementation of intelligent network and router transceiver units such as the network transceiver units of FIG. 3.

FIG. 7 shows a block diagram of a particularly preferred intelligent base transceiver unit known as the RB4000. It will be observed that the components correspond with components of the network controller of FIG. 4, and similar reference numerals (preceded by 7-) have been applied in FIG. 7. Thus, the significance of components 7-70 through 7-73, 7-76, 7-82, 7-96, 7-98, 7-100 and 7-104 will be apparent from the preceding description with respect to FIGS. 4 and 6, for example. I/O bus 700 may be coupled with a spread spectrum transmission (SST) or ultra high frequency (UHF) transceiver 701 which may correspond with any of the transceivers of units 52A, 52B, 52C or 54 previously referred to. The network controller 70 could have a similar RF transceiver coupled with its data port 72 or 73 and controlled via input/output bus 400, e.g. for direct RF coupling with router transceivers such as 901, 901, FIG. 9.

Figure 8:
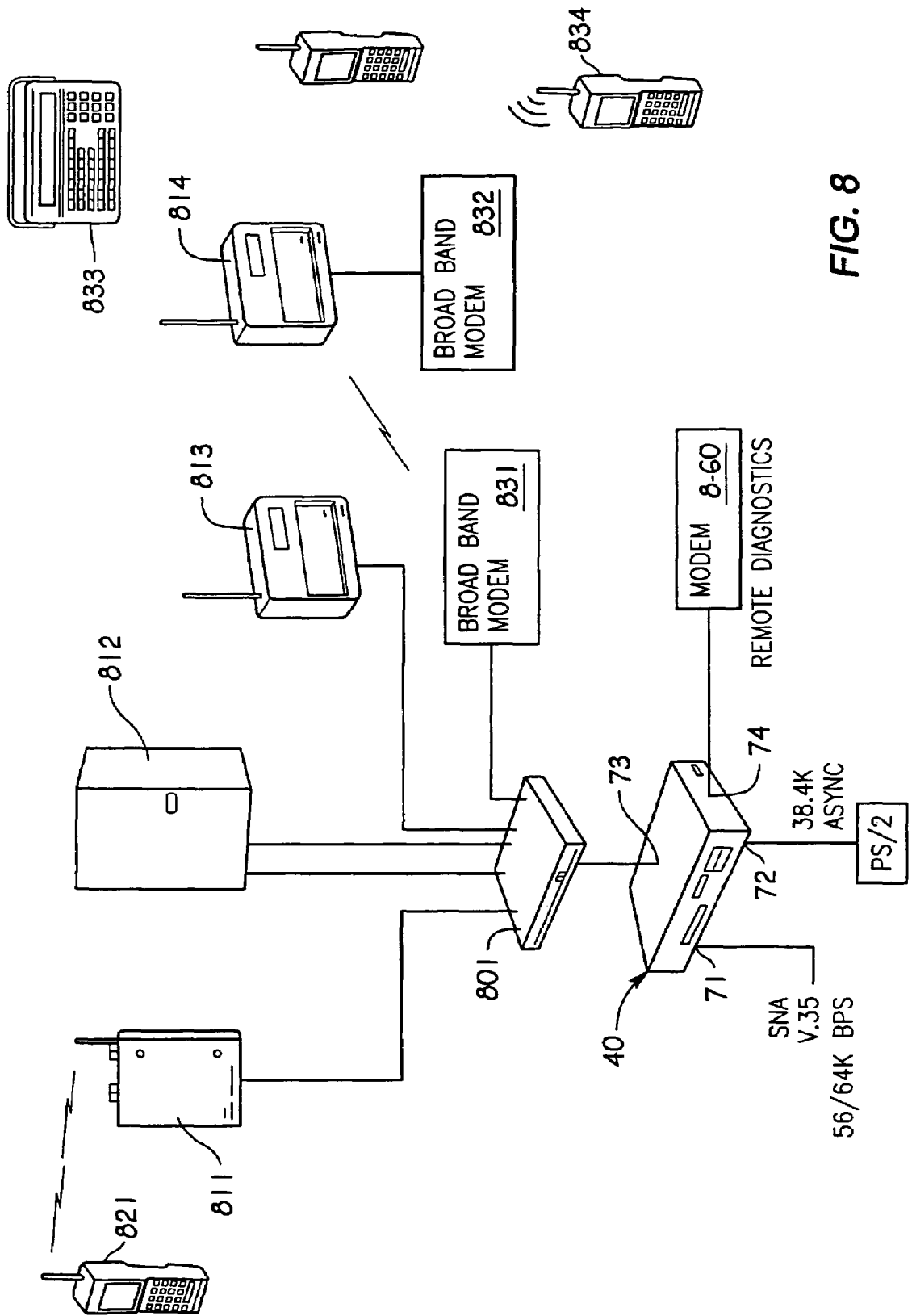
FIG. 8 is a diagram of an RF system utilizing a network controller according to FIGS. 2-6, with one of its network ports configured for communication with a second host, and another of its ports coupled with a multiplicity of RF transceivers via an adapter unit.

Referring to FIG. 8, a network controller 40 is shown with port 71 configured for interface with a host port type SNA V. 35 56K/64K bits per second. Port 72 is shown as configured for communication with a personal computer of the PS/2 type operating asynchronously at 38.4K bits per second. Port 74 is coupled with a modem 8-60 providing for remote diagnostics and reprogramming of the network controller 40.

Port 73 of network controller 40 is shown as being connected with an adapter component 801 known as the MBA3000. A specification for the MBA3000 if found in APPENDIX A following this detailed description. In the operating mode indicated in FIG. 8, the adapter 801 serves to couple controller 40 sequentially with four radio base transceiver units such as indicated at 811 through 814. Component 811 is a commercially available radio base known as the RB3021 which utilizes features of Sojka U.S. Pat. No. 4,924,462 and of Mahany U.S. Pat. No. 4,910,794 both assigned to the present assignee, and the disclosures of which are hereby incorporated herein by reference in their entirety. Base station 811 may communicate with a multiplicity of hand-held RF data terminals such as indicated at 821. Details concerning base transceiver units 812 and 813, 814 are found in the attached APPENDICES B and C, respectively. Base 814 is indicated as being coupled with the adaptor 801 via RF broadband modems 831 and 832. Base units 813 and 814 may communicate with a variety of mobile transceiver units such as those indicated at 833 and 834 which are particularly described in APPENDICES B and C.

Figure 9:
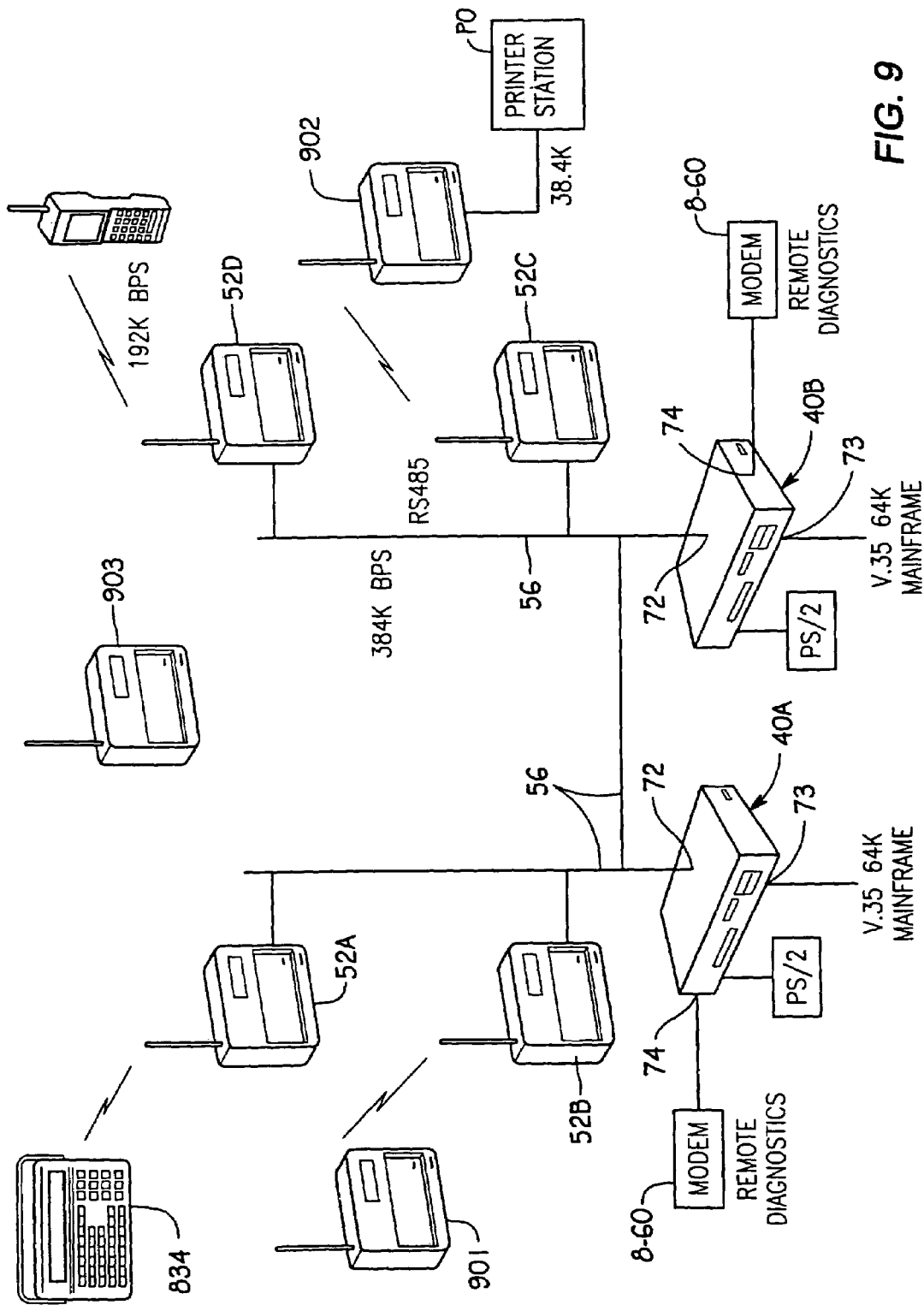
FIG. 9 is a diagram illustrating the use of two network controllers according to FIGS. 2-6, configured for dual host computers each, and having their relatively high data rate extended distance network ports coupled with a multiplicity of intelligent network and router transceiver units implemented according to FIG. 7.

FIG. 9 shows two network controllers 40A and 40B each with its host ports configured as with the controller 40 of FIG. 8. In this example, the second ports 72 of the controllers 40A and 40B are configured for communication a relatively high data rate relatively along a distance network channel 56 which may have the characteristics of the serial channel 56 of FIG. 3, for example, an RS485 channel operating at 384 kilobits per second (384K bps). Network base transceivers 52A, 52B and 52C may correspond with the correspondingly numbered transceiver units of FIG. 3, for example, and the network may have additional network transceivers such as 52D. Furthermore, the network transceivers may have RF coupling with router transceiver units such as indicated at 901, 902 and 903. Router transceiver unit 902 is illustrated as a RB4000 intelligent transceiver such as represented in FIG. 7 and having its input/output bus 700 coupled with a peripheral.

Figure 10:
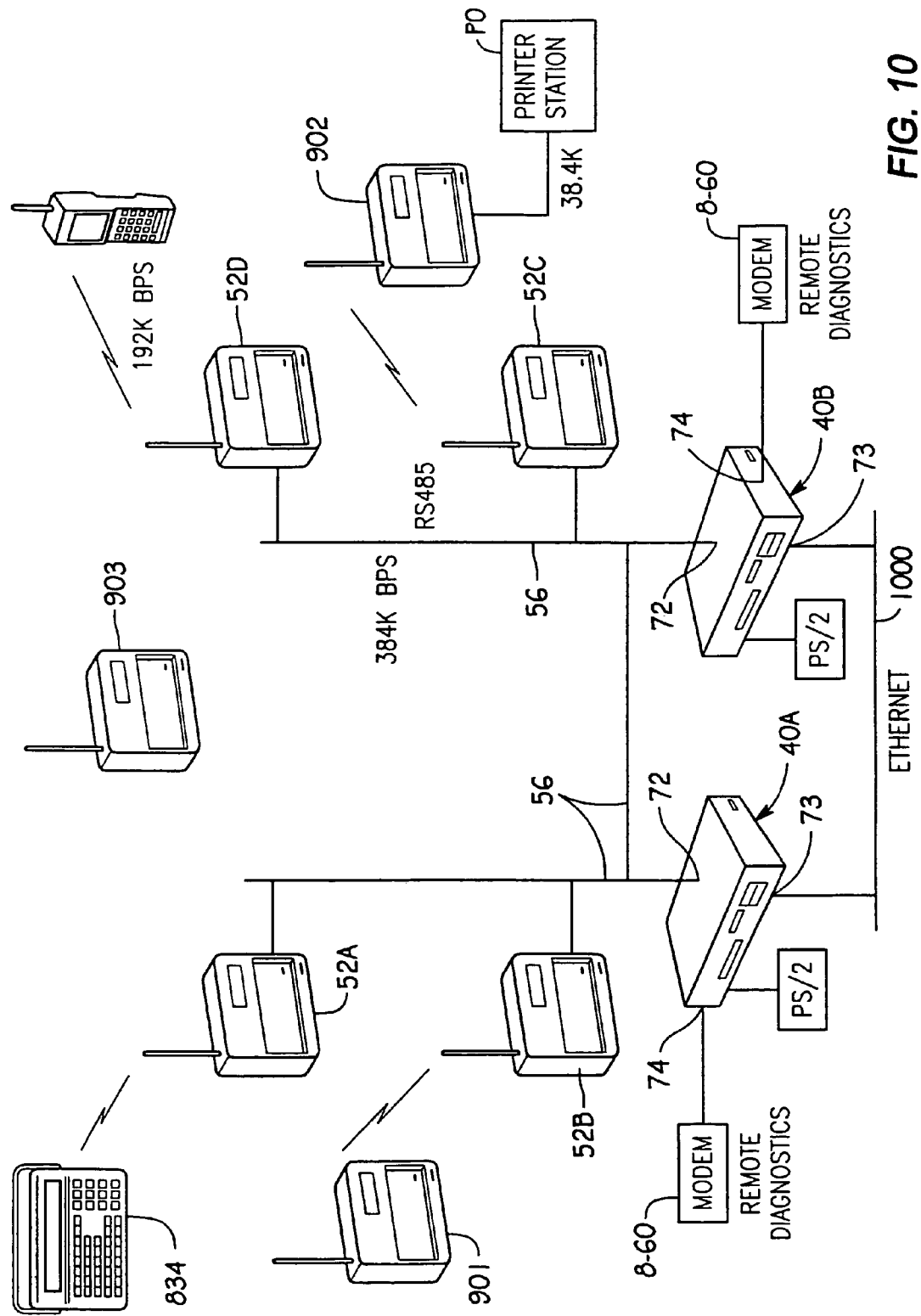
FIG. 10 is a diagram similar to FIG. 9 but showing the pari of coupled network controllers interfaced to a common relatively high data rate system having multiple hosts (e.g.) a local area network of the Ethernet type or equivalent e.g. fiber optic-type.

FIG. 10 is entirely similar to FIG. 9, for example, except that ports 72 of the controllers 40A and 40B are coupled with separate serial type high data rate network channels, and ports 73 of the respective network controllers are coupled to a very high speed network e.g. in the megabit per second range such as an Ethernet local area network 1000. Suitable interfaces are indicated at 1001 and 1002.

Figure 11:
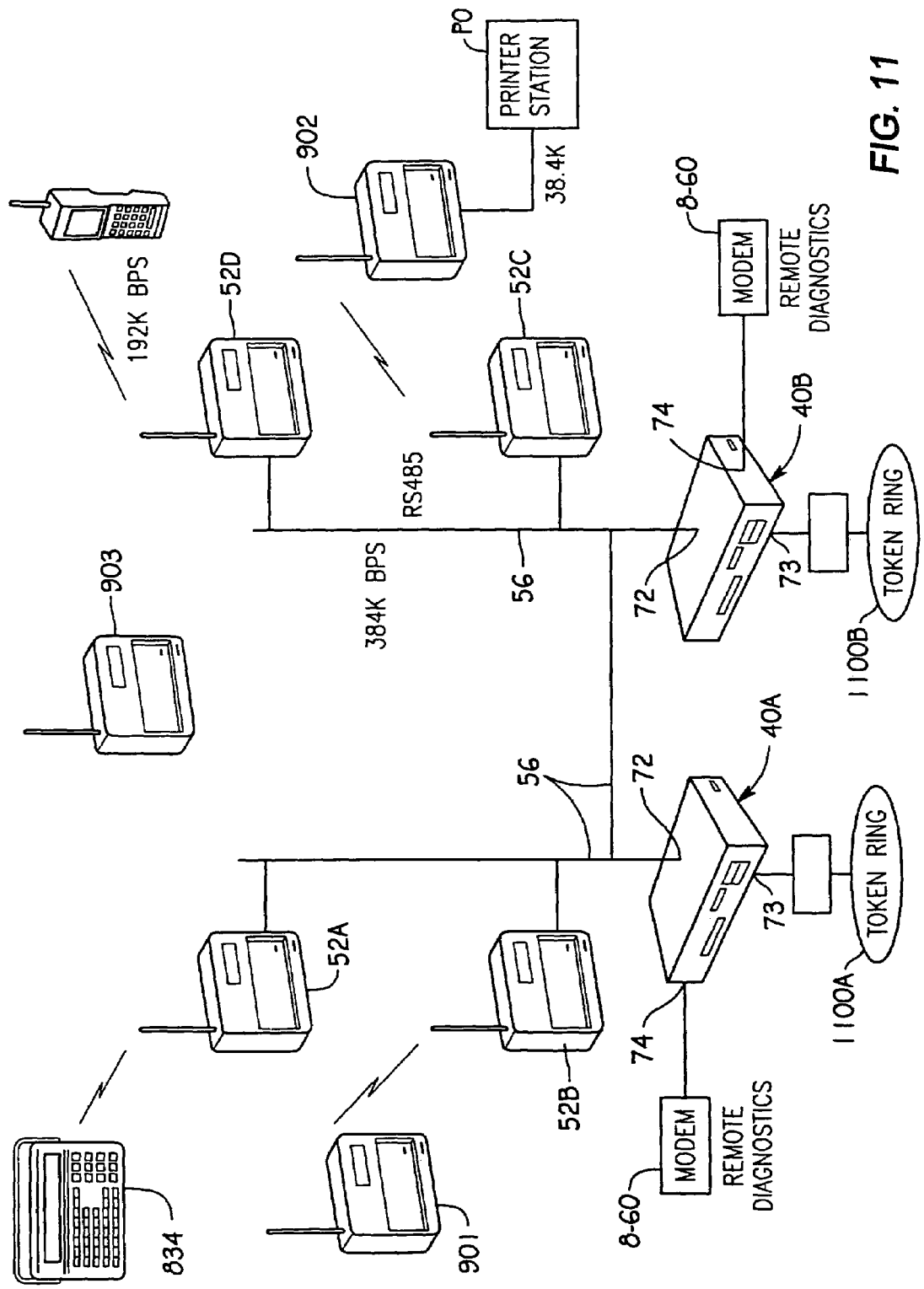
FIG. 11 is a diagram similar to FIG. 10 but indicating the network controllers being coupled to respective different high data rate multiple host systems (e.g., token ring type local area networks or other individual networks e.g., fiber optic loop networks of the collision-sense multiple-access type).

FIG. 11 is entirely similar to FIG. 9 except that the ports 73 of the network controllers 40A and 40B are coupled with respective local area ring type networks which may be separate from each other and each have two or more hosts such as represented in FIG. 9 associated with the respective ring networks such as token rings 1100A and 1100B. Suitable interface means are indicated at 1101 and 1102.

Figure 12:
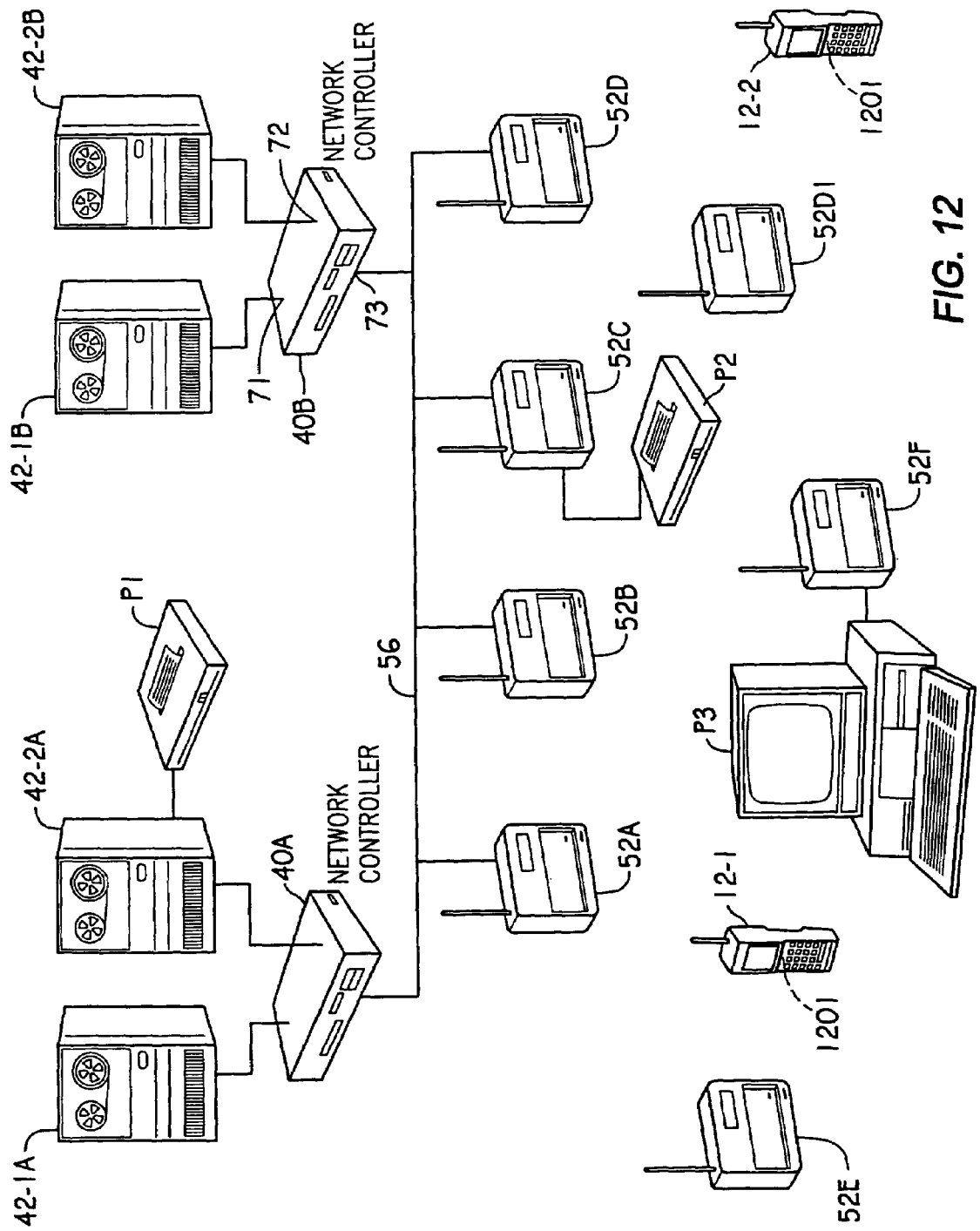
FIG. 12 is a view similar to FIG. 9 but intended to diagrammatically indicate a distribution of network and router transceivers and other elements of an on-line RF data collection system over an extensive area of a facility e.g. of one of the types previously mentioned.

Description of FIG. 12

FIG. 12 shows, for example, two network controllers 40A and 40B, each with two host computer units such as 41-1A. Host 41-2A is shown with a printer or other peripheral P1 which may generate bar codes, for example, for replacement of damaged bar codes or the like. Another printer P2 is shown associated with base 52C, again for example, for producing bar code labels where those are needed in the vicinity of a base station. In a large warehouse, relatively large distances may be involved for a worker to return to a printer such as P1 to obtain a new bar code label. Thus, it may be very advantageous to provide a printer P2 at the base station 52C which may be relatively close to a processing location which requires printed labels, e.g. a processing location in the vicinity of hand-held terminal 12-2 in FIG. 12. A base 52F may have a peripheral P3 associated therewith such as a large screen display, a printer or the like which may supplement the capabilities of a hand-held terminal, for example printing out new bar code labels at a convenient location, or providing a full screen display, rather than the more limited screen display area of the hand-held terminal 12-2.

If, for example, a base radio 52D which might be located at the ceiling level of a warehouse became inoperative at a time when qualified repair personnel were not immediately available, with the present system it would be feasible to provide a substitute base radio or base radios, for example, as indicated at 52D1 located at table level or the like.

With the present system, the base radio stations do not necessarily forward data communications received from a given terminal to a particular host. For example, hand-held terminal 12-2 may request a path to printer P2, and such a path may be created via base stations 52D1 and 52C. Station 52C upon receipt of the message form terminal 12-2 would not transmit the message to a host but would, for example, produce the desired bar code label by means of printer P2. Further, terminal 12-2 may have provision for digitizing a voice message which might, for example, be addressed to terminal 12-1. The system as illustrated would be operable to automatically establish a suitable path for example, via stations 52D1, 52C, 52B, 52E and 12-1 for the transmission of this voice message in digital form. Successive segments of such a voice message would be stored, for example, by the terminal 12-1, and when the complete message was assembled, the segments would be synthesized into a continuous voice message for the user of terminal 12-1 e.g. by means of a speaker 1201 also useful for sending tone signals indicating valid bar code read, etc.

In accordance with the present invention, a hardware system such as illustrated in FIG. 12 may be physically laid out and then upon suitable command to one of the network controllers such as 41-2B, the entire system would be progressively automatically self-configured for efficient operation. For example, controller 40B could successively try its communications options with its output ports such as 71-73, determining for example, that host processors were coupled with ports 71 and 72, one operating on a 38.4 kilobit per second asynchronous basis and the other presenting a SNA port for the V.35 protocol at 64 kilobits per second. For example, on host, 41-1B might be a main frame computer, while the other host 41-2B might be a PS/2 type computer system. The controller 40B having thus automatically configured itself so as to be compatible with the devices connected to ports 71 and 72, could proceed to transmit via port 73 a suitable inquiry message to the network channel 56. Each of the base stations could operate, for example, on a collision-sense multiple-access (CSMA) basis to respond to the inquiry message from the controller 40B, until each of the successive bases on the network had responded and identified itself. Each base, for example, would have a respective unique address identification which it could transmit in response to the inquiry message so as to establish its presence on the network.

The controller 40B could then transmit auto configure commands to the successive bases in turn, instructing the bases to determine what peripherals and router bases such as 52D1, 52E and 52F were within the range of such base, and to report back to the controller. For example, bases such as 52C and 52F could determine the nature of peripherals P2 and P3 associated therewith so as to be able to respond to an inquiry form a terminal such as 12-2 to advise the terminal that a bar code printer, for example, was within direct RF range.

In the case of a breakdown of a component of the system such as 52D, it would merely be necessary to place a router device such as 52D1 at a convenient location and activate the unit, whereupon the unit could send out its own broadcast inquiry which, for example, could be answered by the base stations 52C and 52F, station 52C in turn, advising a relevant host or hosts of the activation of a substitute router station. Thus, the system is conveniently re-self-configured without the necessity for a technician familiar with the particular configuration procedure. As another example, where the base stations are operating utilizing spread spectrum transmission, the introduction of barriers (such as a new stack of inventory goods) to such transmission between a given base such as 52A and various terminals, could result in the base 52A contacting router and 52E, for example, with a request to become active with respect to the blocked terminals.

Figure 13:
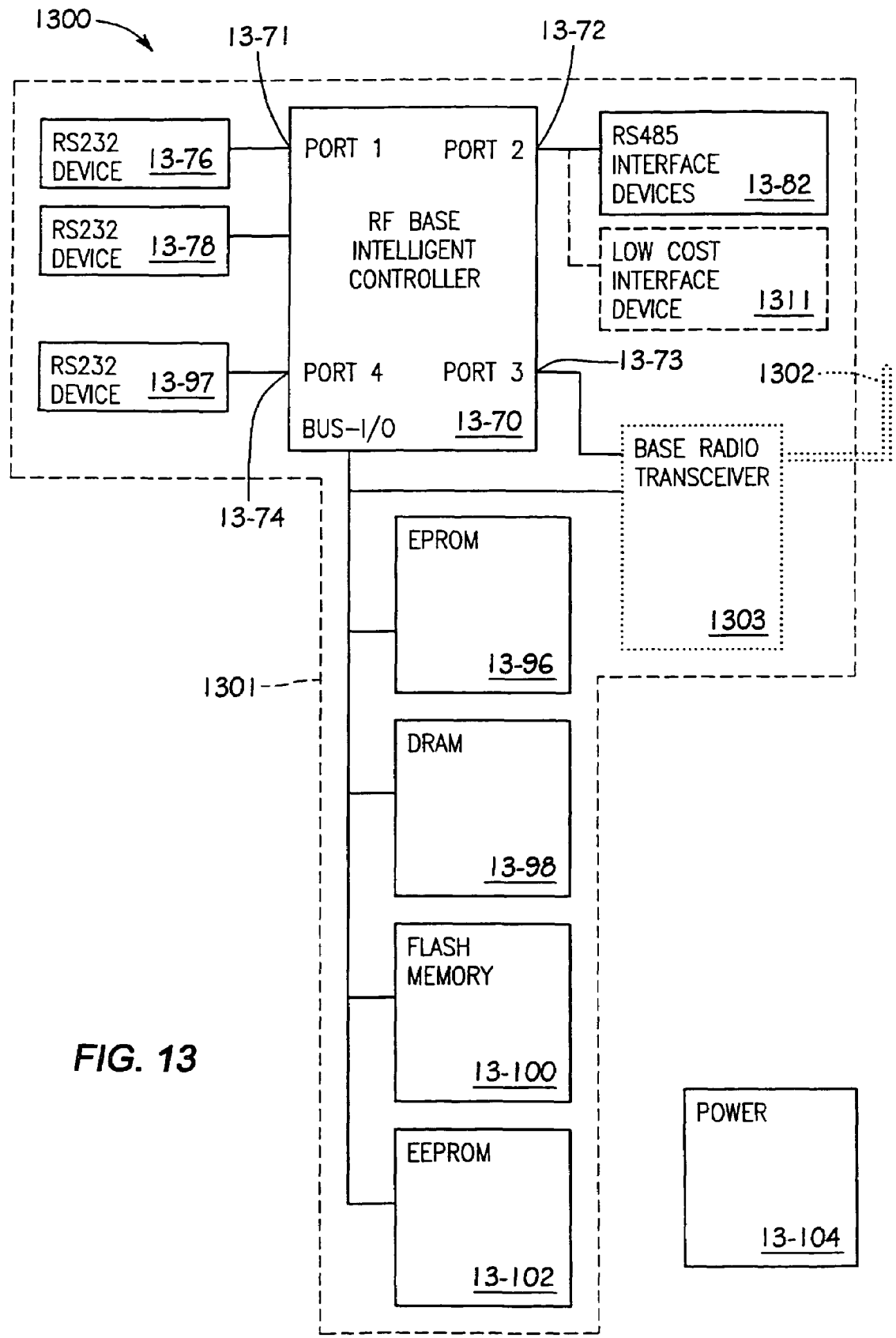
FIG. 13 shows an intelligent controller and radio base unit which unifies controller and radio components such as shown in FIG. 7 into a single housing of the size represented in FIGS. 2 and 5.

Description of FIG. 13

FIG. 13 shows and intelligent integrated controller and radio base unit 1300 which is integrated into a single housing or case 1301 corresponding to the case or housing 20 of FIG. 2. the housing 1301 may be provided with an external antenna as diagrammatically indicated at 1302 with suitable RF coupling to the radio circuitry indicated at 1303. Components 13-70 through 13-74, 13-76, 13-78, 13-96, 13-97, 13-98, 13-100, and 13-102 may correspond with the correspondingly numbered components described with reference to FIG. 4.

Supplementary Discussion

In accordance with the present disclosure, a network controller, or integrated network controller and radio unit is coupled to one or more host computers via a standard interface such as commonly encountered in practice (e.g. RS232, V.35, Ethernet, token ring, FDDI, and so on). In this way, no specialized interface or adapter is required for the host.

Since the preferred network controller can connect to two hosts, if one host is detected to have failed, or in the event of a system crash, loss of communication link, or the like, the network controller can automatically switch to the second host. The second host may be a truly redundant system, or may be a simpler computer of the PC type (a so-called personal computer) that can simply store transactions until the main host is restored. As another example, a single host may have a second port coupled to a second port of the controller especially if a communication link failure may be a problem. For example, two ports of the network controller may be coupled by separate modems with separate phone lines, leading to separate ports of a single mainframe computer, for example an IBM3090. In a fully redundant system, two ports of a network controller may be connected respectively to two mainframe computers such as the IBM3090.

The disclosed network controller can also connect one radio network to two hosts using RS232 or V.35 ports or to many hosts using a local area network such as Ethernet, token ring, or FDDI. A number of the disclosed network controllers (for example, up to thirty-two) can be connected together to interface many hosts to a single radio network. The hand-held portable terminals in such a network can then talk to any of the hosts they choose.

For example where one port of the disclosed network controller is coupled via its RS232 interface to a mainframe computer such as the IBM3090, another of its ports may be coupled via an FDDI network with a super computer e.g. the Cray X-MP. Then mobile and/or portable terminals can access either the main frame or the super computer, or in general, any of the hosts that are connected to the network controller.

As indicated in FIG. 9, four hosts can be on one network. Referring to FIGS. 10 and 11, a multiplicity of hosts may be coupled with each local area network so as to be in communication with one or more of the disclosed network controllers. Furthermore, a single disclosed network controller can control two radio networks such as the one indicated at 50 in FIG. 3. Where each network such as 50 is limited to thirty-two devices, the number of devices is doubled with the use of two radio networks. Two such radio networks may also be utilized for the sake of redundancy, with a provision for automatic switch-over from one radio network to the second if a problem develops on the first. Two radio networks may also facilitate the use of different radio technologies in one installation.

The various multi-drop local area networks referred to herein, for example at 7-82 in FIG. 7 and as represented at 56, 56A, 56B, FIGS. 9 through 12, and at 13-82 in FIG. 13 may comprise HDLC based local area networks operating at up to 2.5 megabits per second and using biphase space encoding (FMO) for clock recovery from data.

The components 86 and 94, FIG. 4, and component 13-11, FIG. 13, provides a low-cost base radio interface using three pairs of twisted conductors. One pair provides a bidirectional RS485 data line. Another pair is used for the clock and has an RS422 electrical configuration, and is one directional from the radio to the controller. The third twisted pair is also RS422 and is used to communicate from the controller to the radio transceiver to effect mode selection.

Since it is advantageous to operate the network and router RF transceiver units so as to be compatible with existing mobile data collection terminals such as shown in APPENDIX D1 et seq., a preferred mode of operation is based on the RTC protocol as disclosed in the aforementioned incorporated Mahany and Sojka patents and the following pending applications:

(1) U.S. Ser. No. 07/389,727 filed Aug. 4, 1989, now issued as U.S. Pat. No. 5.070,536 on Dec. 3, 1991.

(2) European Published Patent Application EPO 353759 published Feb. 7, 1990.

(3) U.S. Ser. No. 07/485,313 filed Feb. 26, 1990.

The disclosures of applications (1), (2) and (3) are hereby incorporated herein by reference in their entirety.

An aspect of the invention resides in the provision of a network controller having port means selectively configurable for coupling in first mode with network RF transceiver units at a relatively high data rate such as 100 kilobits per second or higher, and for coupling in a second mode with network transceiver units at a relatively low data rate such as about twenty kilobits per second. Preferably a single port means such as 2, 3, or 5, 6, FIG. 5, can be software configured to interface selectively in the first mode or in the second mode. It is presently less expensive to use connectors per port rather than a single 37-pin connector for example.

Where a network controller such as 40 operates two high data rate networks, for example, one network of RF base transceivers could operate with the RTC protocol, and the second network could operate according to a different protocol such as that disclosed in pending application Ser. No. 07/660,618 filed on or about Feb. 25, 1991, in its entirety. It will be apparent that many modifications and variations may be effected without departing from the scope of the teachings and concept of the present disclosure.

Figure 14:
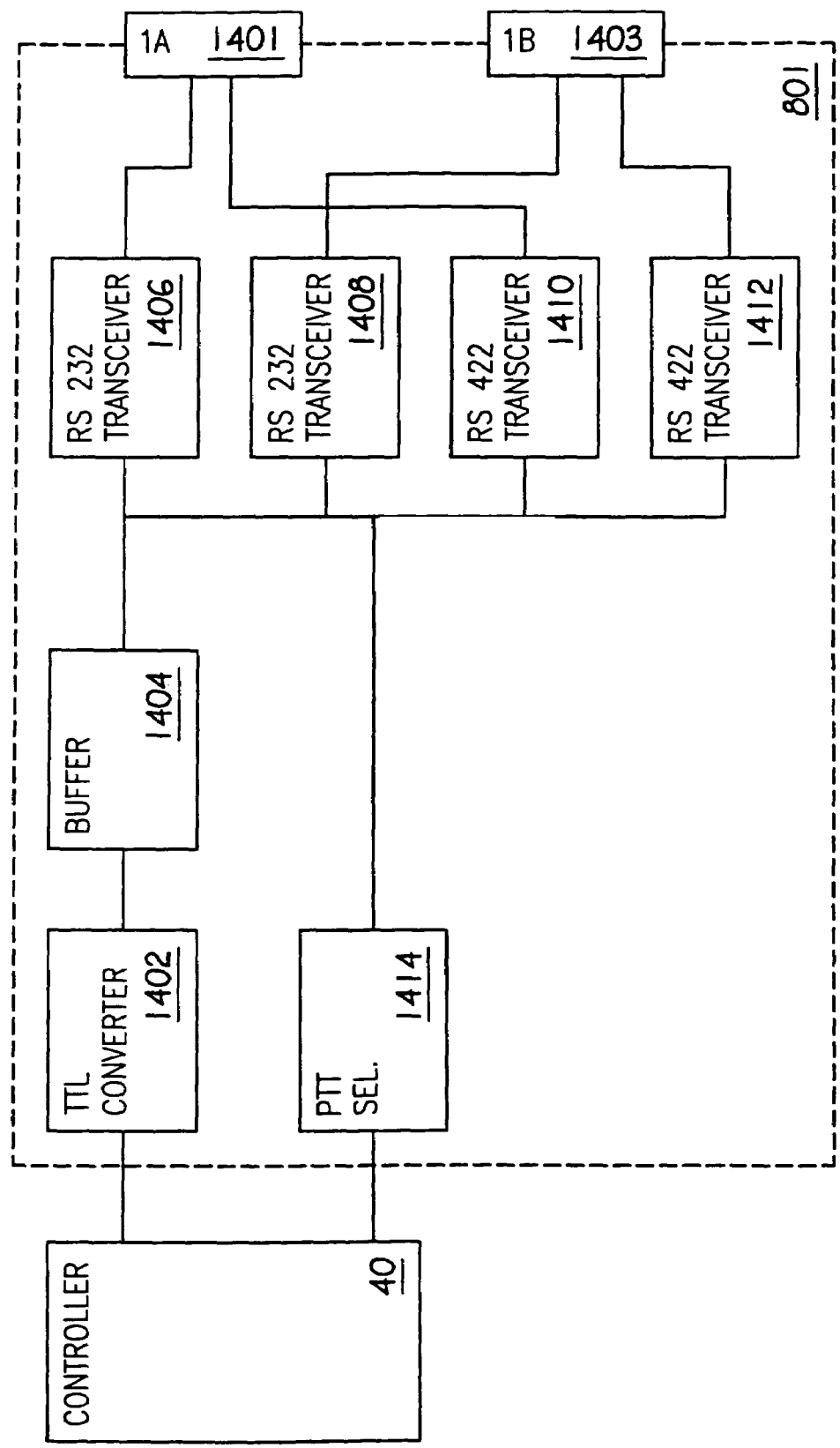
FIG. 14 shows a diagrammatic illustration of the signal processing for two of four paris of communication ports of the multiple base adapter of the RF data collection system illustrated in FIG. 8.
Figure 15:
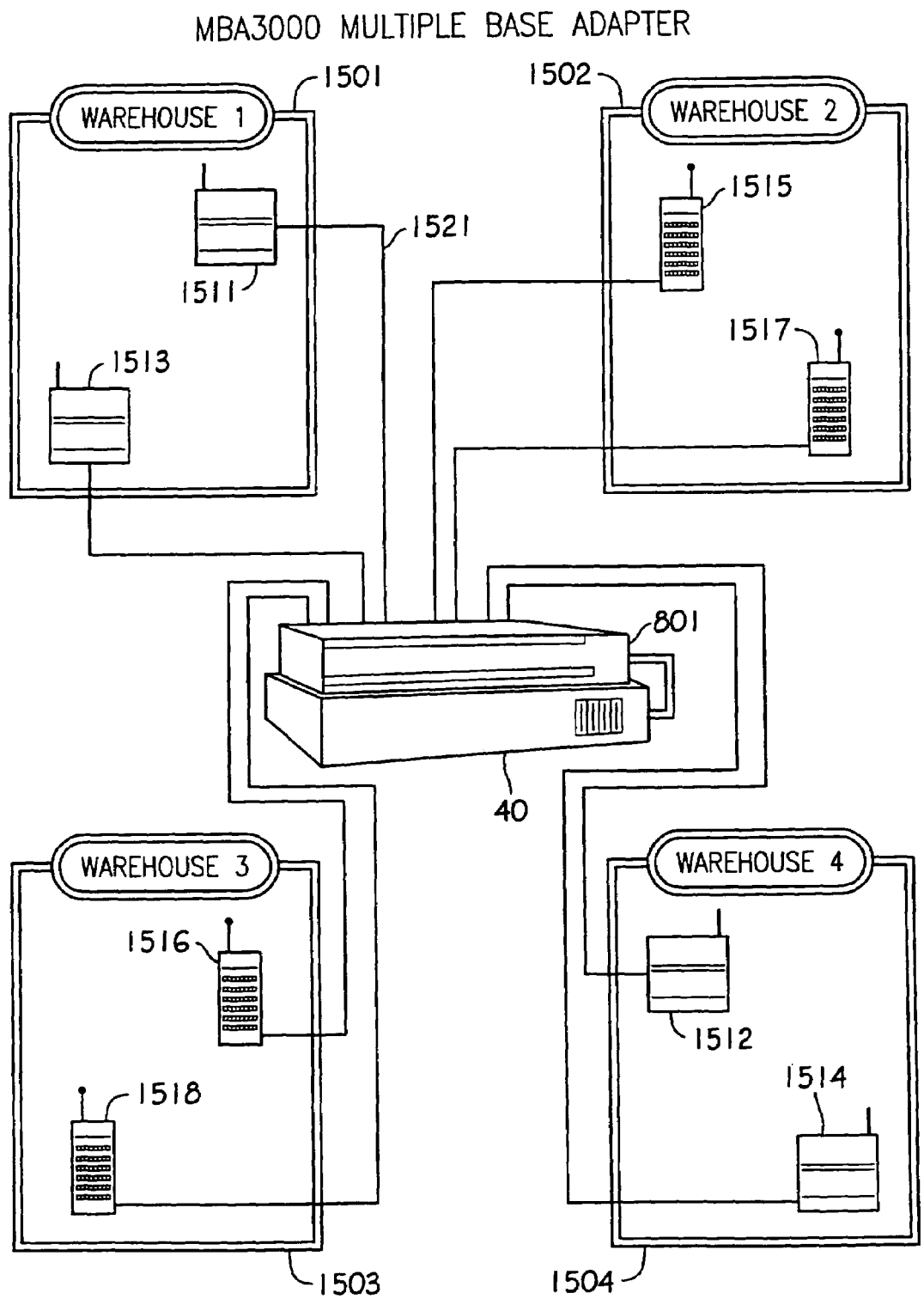
FIG. 15 is a diagram of parts of an RF data collection system utilizing a network controller according to FIGS. 2-6 and a multiple base adapter according to FIG. 14, with eight base transceiver units coupled to the multiple base adapter.

Description of FIGS. 14 and 15

FIG. 14 is a block diagram of the circuitry for one pair of communication ports 1401 and 1403 of adapter 801 (FIG. 8) for use in coupling to base transceiver units. Three additional pairs of communication parts for coupling to six additional base transceiver units are provided in the preferred embodiment of adapter 801 as exemplified by the MBA3000 Multiple Base Adapter further described in Appendix A. It is to be understood that the circuit components coupled to each additional pair of communication ports of adapter 801 is identical to that shown for first port pair 1A/1A, that is ports 1401 and 1403 of FIG. 14. The adapter 801 provides means for connecting the controller 40 (FIG. 8) at its port 73 to a multiplicity of radio base units illustrated in FIG. 8 as, for example, 811, 812, 813, 814, including in selected pairs. In the preferred embodiment of adapter 801, up to eight radio base units may be coupled through use of adapter 801 to a network controller 40, to be controlled by controller 40 in selected pairs thereof. The controller 40 may control the radio base units such as 811, 812, 813, 814, (FIG. 8) in simulcast mode, that is, with all base radios interrogating mobile transceiver units such as 821, 833, and 834 of FIG. 8 simultaneously, or with the base units being employed in pairs to interrogate the mobile transceiver units.

Referring again to FIG. 14, the network controller 40 provides transmit data and baud rate select signals to adapter 801. Within adapter 801, the controller outputs are converted to TTL levels by TTL converter 1402 and they are then provided to buffer 1404 which provides the signals to paired RS232 transceivers 1406 and 1408, and to paired RS422 transceivers 1410 and 1412 which deliver the converted signals to ports 1401 and 1403 respectively. By this means, the controller's output signals are provided to a pair of output ports 1401 and 1403 in both RS232 and RS422 interface at the same time. An additional three output-port-pairs are provided which may be denominated 2A/2B, 3A/3B and 4A/4B, which ports are controlled and operated identically to ports 1A/1B identified in FIG. 14 as ports 1401 and 1402. The RS232 transceivers 1406 and 1408 and RS422 transceivers 1410 and 1412 and ports 1401 and 1403 are illustrative of all circuitry coupled to port pairs of adapter 801.

Similarly, signals provided to adapter 801 by base radios coupled to the output port pairs, e.g. ports 1401 and 1403 of FIG. 14, are first converted to TTL levels by the RS232 transceivers 1406 and 1408 or by the RS422 transceivers 1410 and 1412, depending upon which interface is presented by a pair of base radios at port 1401 and 1403. the TTL signals the signals to RS 232 interface to be delivered to controller 40. A selection unit 1414 provides a push-to-talk selection signal to the RS232 transceivers 1406 and 1408 and to the RS422 transceivers 1410 and 1412 to provide PTT selection signals at ports 1401 and 1403 in both RS232 and RS422 format. It is to be understood that similar selection units are associated with remaining port pairs 2A/2B, 3A/3B, 4A/4B so that the ports may be independently operated.

The adapter 801 of FIG. 8 is exemplified by the MBA3000 multiple base adapter unit manufactured by the NORAND Corporation of Cedar Rapids, Iowa as shown in Appendix A. Because of the operation of the MBA3000 multiple base adapter by dual methods in either RS232 or RS422 signal environments, the MBA3000 may be incorporated into systems having existing installed base radios which present only and RS232 interface or it may be incorporated into systems having base radios some of which operate at RS422 and some at RS232.

FIG. 15 illustrates a preferred arrangement of controller 40 and adapter 801 when used in an environment with multiple base radios in multiple warehouse environments. Controller 40 is coupled to adapter 801 which is coupled to paired bases 1511, 1512; 1513, 1514; 1515, 1516; and 1517, 1518; which are located in warehouses 1501, 1502, 1503 and 1504. By geographical separation in warehouse 1501, for example, base radios 1511 and 1513 provide substantial coverage of warehouse 1501 such that a mobile transceiver being used within warehouse 1501 would be communicated with by either base radio 1511 or 1513. By the use of adapter 801, controller 40 may cause interrogation simultaneously by base radios 1511, 1512, 1513, 1514, 1515, 1516, 1517, 1718, or it may cause sequential interrogation by radio pairs 1511/1512, 1513/1514, 1515/1516, or 1517/1518 in succession. When a mobile transceiver responds by RF communication means with a base radio, e.g. base radio 1511, the response is transmitted by base radio 1511 through coupling 1521 to adapter 801 which automatically converts the incoming response to RS232 interface as necessary, to make it suitable for reception by controller 40.

Through a system as exemplified in FIG. 15, data collection from a number of roving mobile transceivers may be initiated by a network controller 40 through a four-warehouse environment. When base transceiver units 1511 and 1512 have been unsuccessful in establishing communication with the desired mobile transceiver unit, controller 40 will then cause bases 1513 and 1514 to attempt communication and if bases 1513 and 1514 are unsuccessful, controller 40 will proceed through the other base radio pairs, namely 1515/1516 and 1517/1518, as needed, to establish communication with the desired mobile transceiver unit. Details regarding base transceiver units 1511, 1512, 1513, and 1514 are found in Appendix B. Details regarding base transceiver units 1515, 1516, 1517, and 1518 are found in Appendix D.

The adapter 801 is provided to operate in either simulcast or sequential mode. In the normal or simulcast mode, adapter 801 allows the use of one to eight bases, where the bases are configured as four pairs of two bases. In this mode the adapter 801 simulcasts to a single base pair at a time and the four sets of base pairs are selected using a dynamic time-division multiplexing method. The user can configure the adapter 801 to use any of the eight base ports, using simulcasting or time-division multiplexing to best advantage.

There are two sets of base transceiver units, referred to as set A (identified as 1A, 2A, 3A, and 4A) and set B (identified as 1B, 2B, 3B, and 4B). Within a set, the base transceiver units are selected by time-division multiplexing.

It can be seen in FIG. 15, that there are four pairs of base transceiver units defined as pairs 1A/1B, 2A/2B, 3A/3B, 4A/4B. Each base transceiver unit of a base pair is simulcasted to at the same time.

The hardware of the adapter 801 allows the selection of the base pairs (pair 1A/1B through 4A/4B) using control lines from the controller 40. Adapter 801 transmits to both base transceiver units of a base pair at the same time and receives independently from each base simultaneously.

The use of adapter 801 allows an extension of the number of base transceiver units that can be used in a facility to allow for adequate coverage, it is important to understand how the base transceiver units operate when simulcasting is used, and when time-division multiplexing is used.

The adapter 801 distributes signals transmitted by controller 40 to base transceiver pairs at the same time, so if there is an overlap in the coverage for the two base transceiver units, there may be some interference. The amount of interference depends on the relative signal strengths; if the strength is similar in one spot the chance of interference is larger that if the signal strengths are different. This type of interference could be avoided in some configurations by splitting coverage areas of pairs of base transceiver units. Another method of covering the overlap area is to place another base (not one of the base pairs) to cover the overlap area. The radio signals from the mobile transceiver unit may be picked up fully or partially by either or both base transceiver units of a given pair. However the adapter 801 first tries to receive from one base transceiver unit, for example base 1511, and if unsuccessful, it then switches to try to receive from a second base transceiver unit, for example base transceiver unit 1513. If the information is successfully received from the first base transceiver unit, the information from the second base transceiver unit is ignored. Thus he controller assures data does not get sent to the host data processor in duplicate.

The user may couple from one to eight base transceiver units to the adapter 801 and can then configure those base transceiver units as required to meet the installation's needs. Any combination of ports of the adapter 801 can be used. Thus the user can take advantage of the ability to simulcast or sequentially (via time-division multiplexing) access the base transceiver units 1511, 1512, 1513, 1514, 1515, 1516, 1517, and 1518.

Multipath Fading and Data Packet Size Parameters.

In a preferred embodiment, the data (or messages) to be sent through the RF communication link is segmented into a plurality of DATA packets and is then transmitted. Upon receipt, the DATA packets are reassembled for use or storage. Data segmentation on the RF link provides better communication channel efficiency by reducing the amount of data loss in the network. For example, because collisions between transmissions on an RF link cannot be completely avoided, sending the data in small segments results in an overall decrease in data loss in the network, i.e., only the small segments which collide have to be re-sent.

Similarly, choosing smaller data packets for transmission also reduces the amount of data loss by reducing the inherent effects of perturbations and fluctuations found in RF communication links. In particular, RF signals are inherently subject to what is termed "multi-path fading". A signal received by a receiver is a composite of all signals that have reached that receiver by taking all available paths from the transmitter. The received signal is therefore often referred to as a "composite signal" which has a power envelope equal to the vector sum of the individual components of the multi-path signals received. If the signals making up the composite signal are of amplitudes that add "out of phase", the desired data signal decreases in amplitude. If the signal amplitudes are approximately equal, an effective null (no detectable signal at the receiver) results. This condition is termed "fading".

An data conmiunication system using segmentation can be found in a pending application of Steven B. Koenck, et al., U.S. Ser. No. 07/305,302 filed Jan. 31, 1989, which is incorporated herein by reference in its entirety. Specific reference is made to Appendix A thereof.

Normally changes in the propagation environment occur relatively slowly, i.e., over periods of time ranging from several tenths (1/10's) of seconds to several seconds. However, in a mobile RF environment, receivers (or the corresponding transmitters) often travel over some distance in the course of receiving a message. Because the signal energy at each receiver is determined by the paths that the signal components take to reach that receiver, the relative motion between the receiver and the transmitter causes the receiver to experience rapid fluctuations in signal energy. Such rapid fluctuations can result in the loss of data if the amplitude of the received signal falls below the sensitivity of the receiver.

Over small distances, the signal components that determine the composite signal are well correlated, i.e., there is a small probability that a significant change in the signal power envelope will occur over the distance. If a transmission of a data packet can be initiated and completed before the relative movement between the receiver and transmitter exceeds the "small distance", data loss to fading is unlikely to occur. The maximum "small distance" wherein a high degree of correlation exists is referred to hereafter as the "correlation distance".

As expressed in wavelengths of the carrier frequency, the correlation distance is one half (1/2) of the wavelength, while a more conservative value is one quarter (1/4) of the wavelength. Taking this correlation distance into consideration, the size of the data packet for segmentation purposes can be calculated. For example, at 915 MHz (a preferred RF transmission frequency), a quarter wavelength is about 8.2 centimeters. A mobile radio moving at ten (10) miles per hour, or 447 centimeters per second, travels the quarter wavelength in about 18.3 milliseconds. In such an environment, as long as the segment packet size remains well under 18.3 milliseconds, significant signal fluctuations during the duration of a packet transmission is unlikely. In such an preferred embodiment, five (5) millisecond data packet segments are chosen which provides a quasi-static multipath communication environment.

The faster the relative movement between a transmitter and a receiver the greater the effect of fading, and, therefore, the smaller the data segment should be. Similarly, if the relative movement is slower, the data segment can be larger.

Slower fading effects which might be experienced between stationary transceivers in an office building due to the movement of people, mail carts, and the like. In a typical application of the present invention, the RF transceiver of a mobile unit may be secured with a bar-code scanner such as a deflected laser beam bar-code scanner or an instant CCD bar-code scanner. In such an example, the bar code data could be transmitted to the base station as the RF transceiver and a scanner device were being jointly transported by a vehicle (e.g. a forklift truck) to another site, or the RF transceiver and a scanner, e.g. as a unitary hand-held device, could be carried by the operator to another site as the bar code data was being transmitted to the base station. In such situations, fading is more pronounced.

If fading does not pose a problem on a given network, the overhead associated with segmentation, hand-shaking and reconstruction may not be justifiable. However, where fading exists, such overhead may be required.

In many communication environments, the degree of fading effects varies dramatically both from time to time and from installation to installation. In the preferred embodiment, transmitters and receivers communicate using an optimal data segment size parameter by adapting the size to conform to the communication environment of the network at any given time. For example, if a receiver detects repeated faulty transmissions, the data segment size parameter might be incrementally reduced (under the assumption that fading caused the faults) until the data throughput reaches an optimal level. Similarly, the size of the data segment can be reduced based on a measured indication of the degree of fading in the network.

One example of a receiver making such a measurement of fading can be found in the abandoned patent application of Ronald L. Mahany, U.S. Ser. No. 07/485,313, filed Feb. 26, 1990, which is incorporated herein by reference. Specifically, in that reference, a received signal strength indicator (RSSI) circuit is found in the receiver. The RSSI circuit samples the signal strength of a transmission. If the signal strength samples are evaluated in sequence and the trend analyzed, the degree of fading can be measured. If the signal strength samples decrease in value, it is likely that fading is present in the network. However, just because fading exists does not require segmentation. Only if fading causes the signal strength to drop below the level of the receiver's sensitivity is segmentation required.

A fixed threshold value that is located a safe margin above the receiver's sensitivity is used to determine whether to change the data segment size. If a trend in signal strength shows values falling below the threshold, the data segment size is decreased. If the threshold level is never reached, the segment size might be increased. In addition, the trend associated with a group of signal strength samples can be used to predict the optimal data packet size—the intersection of the signal strength samples with the threshold defines a segment length that, with a safe margin, can be used effectively used with the current degree of fading.

After receiving a data segment, the receiver sends to the transmitter indications regarding: 1) whether the data segment was received without fault; and 2) what the new optimal segment size should be. The transmitter responds by adjusting the data segment size and then sending the next segment. As can be appreciated, the data segments are adapted based on the previous transmission. Instead of adjusting on the basis of the reception of a single data segment (the previous transmission), other techniques for adjustment are contemplated. For example, the transmitter may also utilize a threshold window (or weighted averaging), inside of which the segment size will not be changed. Only if the requested change by the receiver falls outside of the threshold window will the segment size change. Similarly, the receiver might also utilize such a window—only requesting a change when the newly forecasted, optimal segment size falls outside of the window.

Direct-Sequence Spread Spectrum Parameters.

As described above, the network controller provides an interface to both the older generation UHF radio transceivers and newer generation spread spectrum transceivers. A spread spectrum broadcasting system uses a sequential pseudo-noise signal to spread a signal that is in a relatively narrow band over a wider range of frequencies. It is the subject of standards issued by the Federal Communications Commission (FCC) that provide usable spectrum at low power levels for communication in limited areas such as warehouses, office buildings, and the like. The use of spread-spectrum techniques minimizes interference with others using the same channels in the spectrum.

A transmitter using direct-sequence spread spectrum transmission uses a spreading-code of a higher frequency than that of the data rate to encode the data to be sent. This higher frequency is achieved by increasing the chip clock rate (wherein each chip constitutes an element of the spreading-code). Using the same spreading code, the receiver decodes the received signal while ignoring minor faults which occurred in transmission, providing noise immunity and multipath signal rejection. The frequency and length of the spreading-code can be varied to offer more or less multipath signal rejection or noise immunity. Although it may result in improved communication, increasing the frequency or length of the spreading-code requires additional overhead which may not be justifiable unless necessary.

Frequency-Hopping Spread Spectrum Parameters.

Frequency-hopping is the switching of transmission frequencies according to a sequence that is fixed or pseudo-random and that is available to both the transmitter and receiver. Adaptation to the communication environment via an exchange in frequency-hopping operating parameters is possible, for example, via selective control of the hopping rate or through the use of coding or interleaving. The greater the degree of frequency selectivity of the fading envelope (i.e., when fading is significant only over a portion of the spectrum of hopping frequencies), the greater the benefit of such adaptation.

Particularly, a parameter indicating the hopping rate can be varied to minimize the probability that the channel characteristics will detrimentally change during the course of a communication exchange. To vary the hopping rate is to vary the length of a hopping frame. Although multiple data (or message) exchanges per hopping frame is contemplated, the preferred hopping frame consists of a single exchange of data. For example, in a polling environment, the hopping frame might consist of 1) a base station transmitting a polling packet to a roaming terminal; 2) the roaming terminal transmitting data in response; and 3) the base station responding in turn by transmitting an acknowledge packet. Each hopping frame exchange occurs at a different pseudo-randomly chosen frequency.

For optimization, the hop frame length is adjusted to be as long as possible, while remaining shorter than the coherence time of the channel by some safety margin. Although such adjustment does not eliminate the effects of fading, it increases the probability that the characteristics of the channel will remain consistent during each hopping frame. Thus, in the preferred embodiment, if the polling packet transmission is successfully received, the probability of successful receipt of the data (or message) and acknowledge is high.

Another parameter for changing frequency-hopping performance is that of coding. Coding on the channel for error correction purposes can be selectively used whenever the probability of data or message loss due to fading is high. In particular, coding methods which provide burst error correction, e.g., Reed-Solomon coding, can be applied if the hop length is likely to exceed the coherence time of the channel. Such coding methods allow some portion of the data to be lost and reconstructed at the expense of a 30-50% reduction in throughput. The operating parameter for coding indicates whether coding should be used and, if so, the type of coding to be used.

An operating parameter indicating whether interleaving should be used also helps to optimize the communication channel. Interleaving involves breaking down the data into segments which are redundantly transmitted in different hopping frames. For example, in a three segment exchange, the first and second segments are sequentially combined and sent during a first hopping frame. In a subsequent hopping frame, the second and third segments are combined and sent. Finally, the third and first segments are sequentially combined and transmitted in a third hopping frame. The receiving transceiver compares each segment received with the redundantly received segment to verify that the transmission was successful. If errors are detected, further transmissions must be made until verification is achieved. Once achieved, the transceiver reconstructs the data from the segments.

Other methods of interleaving are also contemplated. For example, a simpler form of interleaving would be to sequentially send the data twice without segmentation on two different frequencies (i.e., on two successive hops).

As can be appreciated, interleaving provides for a redundancy check but at the expense of data or message throughput. The interleaving parameter determines whether interleaving is to be used and, if so, the specific method of interleaving.

In addition, any combination of the above frequency-hopping parameters might interact to define an overall operating configuration, different from what might be expected from the sum of the individual operating parameters. For example, selecting interleaving and coding, through their respective parameters, might result in a more complex communication scheme which combines segmentation and error correction in some alternate fashion.

Source Encoding Parameters (For Narrowband Applications).

In the United States, data communication equipment operating in the ultra-high frequency (UHF) range under conditions of frequency modulation (FM) is subject to the following limitations.

(1) The occupied band width is sixteen kilohertz maximum with five kilohertz maximum frequency deviation.

(2) The channel spacing is 25 kilohertz. This requires the use of highly selected filtering in the receiver to reduce the potential for interference from nearby radio equipment operating on adjacent channels.

(3) The maximum output power is generally in the range of ten to three hundred watts. For localized operation in a fixed location, however, transmitter power output may be limited to two watts maximum, and limitations may be placed on antenna height as well. These restrictions are intended to limit system range so as to allow efficient re-use of frequencies.

For non-return to zero (NRZ) data modulation, the highest modulating frequency is equal to one half the data rate in baud. Maximum deviation of five kilohertz may be utilized for a highest modulation frequency which is less than three kilohertz, but lower deviations are generally required for higher modulation frequencies. Thus, at a data rate of ten thousand baud, and an occupied bandwidth of sixteen kilohertz, the peak FM deviation which can be utilized for NRZ data may be three kilohertz or less.

Considerations of cost versus performance tradeoffs are the major reason for the selection of the frequency modulation approach used in the system. The approach utilizes shaped non-return-to-zero (NRZ) data for bandwidth efficiency and non-coherent demodulation using a limiter-discriminator detector for reasonable performance at weak RF signal levels. However, the channel bandwidth constraints limit the maximum data "high" data rate that can be utilized for transmitting NRZ coded data. Significant improvements in system throughput potential can be realized within the allotted bandwidth by extending the concept of adaptively selecting data rate to include switching between source encoding methods. The preferred approach is to continue to use NRZ coding for the lower system data rate and substitute partial response (PR) encoding for the higher rate. The throughput improvements of a NRZ/PR scheme over an NRZ/NRZ implementation are obtained at the expense of additional complexity in the baseband processing circuitry. An example of a transceiver using such an approach can be found in the previously incorporated patent application of Ronald L. Mahany, U.S. Ser. No. 07/485,313, filed Feb. 26, 1990.

Partial response encoding methods are line coding techniques which allow a potential doubling of the data rate over NRZ encoding using the same baseband bandwidth. Examples of PR encoding methods include duobinary and modified duobinary encoding. Bandwidth efficiency is improved by converting binary data into three level, or pseudo-ternary signals. Because the receiver decision circuitry must distinguish between three instead of two levels, there is a signal to noise (range) penalty for using PR encoding. In an adaptive baud rate switching system, the effects of this degradation are eliminated by appropriate selection of the baud rate switching threshold.

Since PR encoding offers a doubling of the data rate of NRZ encoded data in the same bandwidth, one possible implementation of a NRZ/PR baud rate switching system would be a 4800/9600 bit/sec system in which the low-pass filter bandwidth is not switched. This might be desirable for example if complex low-pass filters constructed of discrete components had to be used. Use of a single filter could reduce circuit costs and printed circuit board area requirements. This approach might also be desirable if the channel bandwidth were reduced below what is currently available.

The preferred implementation with the bandwidth available is to use PR encoding to increase the high data rate well beyond the 9600 bit/sec implementation previously described. An approach using 4800 bit/sec NRZ encoded data for the low rate thereby providing high reliability and backward compatibility with existing products, and 16K bit/sec PR encoded transmission for the high rate may be utilized. The PR encoding technique is a hybrid form similar to duobinary and several of its variants which has been devised to aid decoding, minimize the increase in hardware complexity, and provide similar performance characteristics to that of the previously described 4800/9600 bit/sec implementation. While PR encoding could potentially provide a high data rate of up to 20K bit/sec in the available channel bandwidth, 16K bit/sec is preferable because of the practical constraints imposed by oscillator temperature stability and the distortion characteristics of IF bandpass filters.

Exchanging Parameters.

All of the above referenced parameters must be maintained in local memory at both the transmitter and the receiver so that successful communication can occur. To change the communication environment by changing an operating parameter requires both synchronization between the transceivers and a method for recovering in case synchronization fails.

In a preferred embodiment, if a transceiver receiving a transmission (hereinafter referred to as the "destination") determines that an operating parameter needs to be changed, it must transmit a request for change to the transceiver sending the transmission (hereinafter the "source"). If received, the source may send an first acknowledge to the destination based on the current operating parameter. Thereafter, the source modifies its currently stored operating parameter, stores the modification, and awaits a transmission from the destination based on the newly stored operating parameter. The source may also send a "no acknowledge" message, rejecting the requested modification.

If the first acknowledge message is received, the destination modifies its currently stored operating parameter, stores the modification, sends a verification message based on the newly stored operating parameter, and awaits a second acknowledge message from the source. If the destination does not receive the first acknowledge, the destination sends the request again. If after several attempts the first acknowledge is not received, the destination modifies the currently stored parameter, stores the modification as the new operating parameter, and, based on the new parameter, transmits a request for acknowledge. If the source has already made the operating parameter modification (i.e., the destination did not properly receive the first acknowledge message), the destination receives the request based on the new parameters and responds with a second acknowledge. After the second acknowledge is received, communication between the source and destination based on the newly stored operating parameter begins.

If the destination does not receive either the first or the second acknowledge messages from the source after repeated requests, the destination replaces the current operating parameter with a factory preset system-default (which is also loaded upon power-up). Thereafter, using the system-default, the destination transmits repeated requests for acknowledge until receiving a response from the source. The system-default parameters preferably define the most robust configuration for communication.

If after a time-out period the second request for acknowledge based on the newly stored operating parameters is not received, the source restores the previously modified operating parameters and listens for a request for acknowledge. If after a further time-out period a request for acknowledge is not received, the source replaces the current operating parameter with the factory preset system-default (which is the same as that stored in the destination, and which is also loaded upon power-up). Thereafter, using the common system-default, the source listens for an acknowledge request from the destination. Once received, communication is re-established.

Other synchronization and recovery methods are also contemplated. For example, instead of acknowledge requests originating solely from the destination, the source might also participate in such requests. Similarly, although polling is the preferred protocol for carrying out the communication exchanges described above, carrier-sense multiple-access (CSMA) or busy tone protocols might also be used.

In addition, Appendix F provides a list of the program modules which are found in Appendix G. These modules comprise another exemplary computer program listing of the source code ("Ct" programming language) used by the network controllers and intelligent base transceivers of the present invention. Note that the term "AMX" found in Appendices F and G refers to the operating system software used. "AMX" is a multitasking operating system from KADAK Products, Ltd., Vancouver, B.C., Canada.

As is evident from the description that is provided above, the implementation of the present invention can vary greatly depending upon the desired goal of the user. However, the scope of the present invention is intended to cover all variations and substitutions which are and which may become apparent from the illustrative embodiment of the present invention that is provided above, and the scope of the invention should be extended to the claimed invention and its equivalents. It is to be understood that many variations and modifications may be effected without departing from the scope of the present disclosure.

Figure 16:
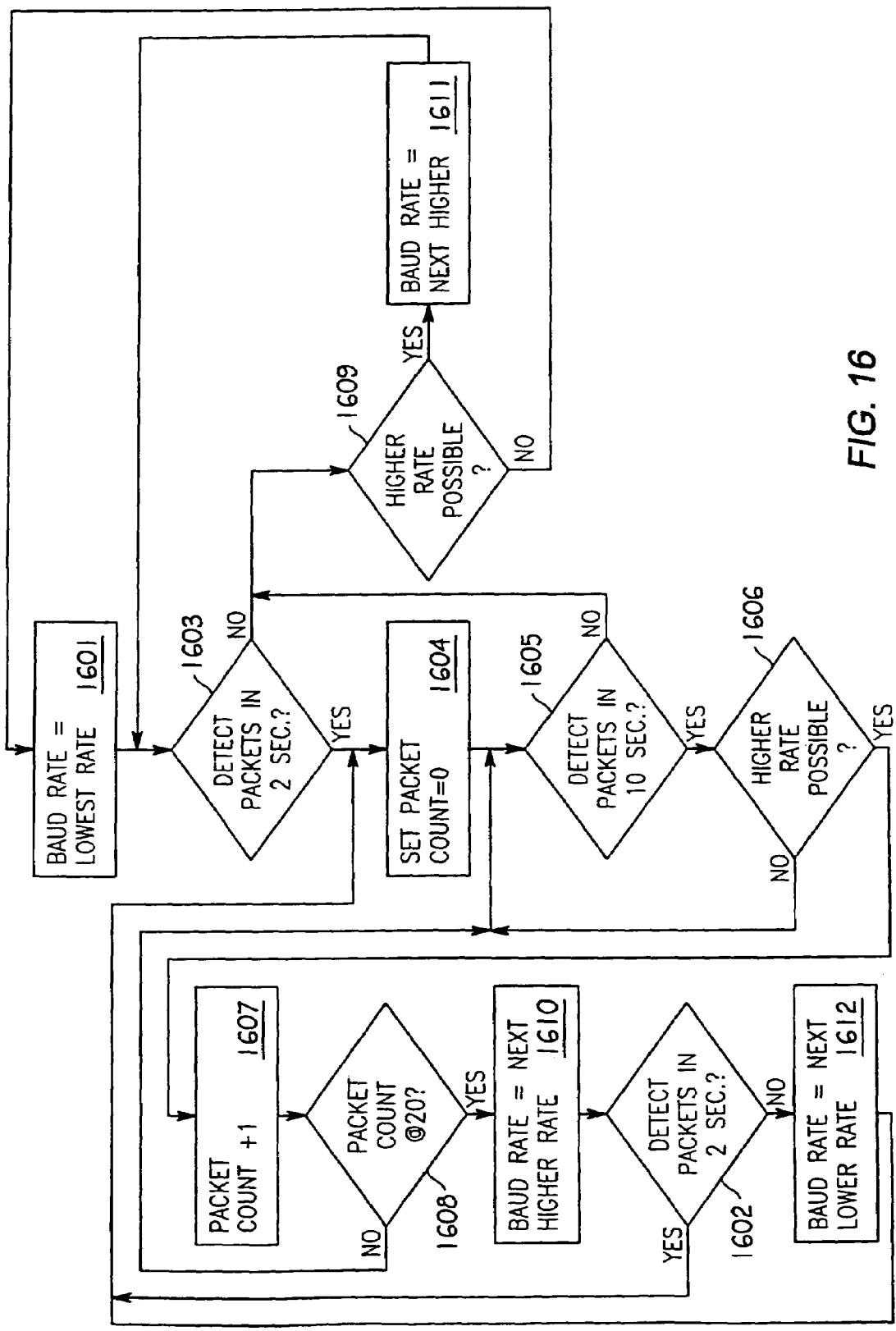
FIGS. 16 and 17 illustrate the baud rate switching procedure for the preferred embodiment of a mobile transceiver unit.
Figure 17:
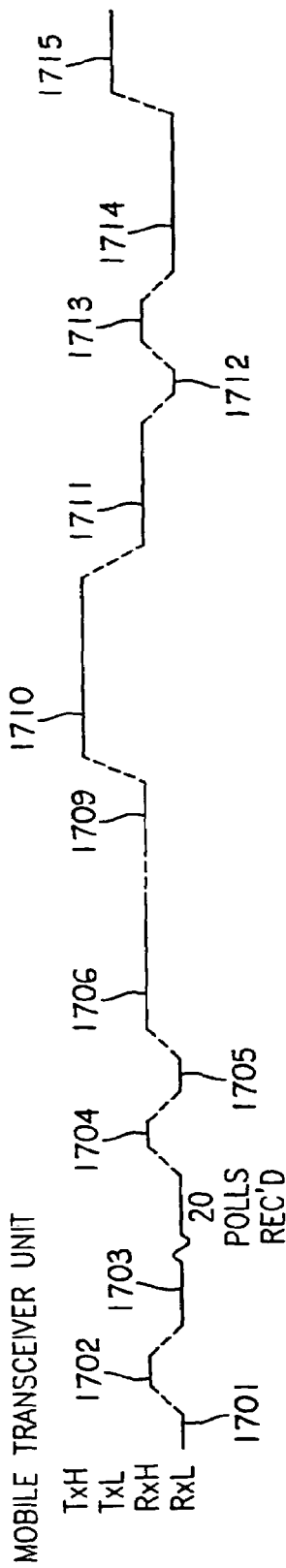

Description of FIGS. 16 and 17

FIGS. 16 and 17 disclose the baud rate switching procedure for the preferred embodiment of a mobile transceiver unit such as mobile transceiver units 833 and 834 as seen in FIG. 8 and in particular to the mobile transceiver unit denominated as the NORAND® RT5910 Mobile Mount Radio Terminal of Norand Corporation of Cedar Rapids, Iowa, assignee of the instant application, which mobile transceiver unit is more particularly described in Appendices D5 and G appended to this application.

Referring now to FIGS. 8, 16 and 17, in the preferred embodiment of a mobile terminal 833, the communication rate of the unit is initialized for reception at a relatively low communication rate, e.g., 4800 baud, as indicated at 1601. Transmissions from a host are communicated through port 71 of network controller 40, for example, which distributes the transmission via adapter component 801 to base transceiver units 811 through 814. Such transmissions are received by the mobile terminal, for example mobile transceiver 833, and packets of information are detected as being transmitted by a base, e.g., base 811 of FIG. 8. The host transmissions are examined by the mobile transceiver unit 833, as at 1603, to detect the receipt of packets of information from one of base transceivers 811 through 814. Transmissions made by other mobile transceiver units, for example, mobile transceivers 834 or 821, are identified as not coming from a base transceiver 811 through 814 and are ignored.

When a packet of information is detected as coming from a base transceiver such as 811 through 814, the packet counter of the mobile transceiver is set to 0, as indicated at 1604 of FIG. 16. The mobile transceiver continues to detect for valid packets and if additional valid packets are received within ten seconds, as at 1605, the mobile transceiver examines its current communication rate, at 1606, and if its highest rate is not currently in use, it increments the packet count by one for each valid packet received, as indicated at 1607. If no higher communication rate is available at step 1606, the mobile transceiver returns to 1605 to detect for valid packets and no increment of the packet counter occurs.

If at 1605 additional packets are not received within ten seconds, the mobile transceiver tests if a higher communication rate is available, as indicated at 1609. If the highest communication rate is in current use and because packets have not been detected at 1605, the mobile transceiver returns to its initial, lowest rate, as at 1601. If the highest rate of communication, i.e., highest baud rate, is not in effect, the mobile transceiver unit switches to its next higher communication rate, as at 1611, and returns to detecting for valid packets, as indicated at 1603.

When a higher rate of communication can be selected, the mobile transceiver unit continues to detect for valid packets within the ten second interval, as indicated at 1605, and continues to increment its packet counter at 1607 when valid packets are received. While fewer than twenty packets have been counted, the mobile transceiver unit continues to detect, as at 1605, but when twenty or more valid packets have been received, as at 1608, the mobile transceiver switches to its next higher baud rate, as at 1610 and commences to detect for valid packets at the higher rate. If valid packets are not received within the two-second interval evaluated at 1602, the mobile transceiver resets its communications rate to its next lower rate at 1612 and resets its packet counter to zero at 1604 and proceeds to evaluate base transmissions to any mobile transceiver for valid detected packets, at 1605.

If at the incrementally higher rate set at 1610, packets continue to be effectively received at 1602, the unit resets its packet counter to 0 at 1604 and proceeds to evaluate for additional valid packets at the new, higher rate.

If a transmission from a base transceiver to any terminal is received and packets are successively detected at the relatively higher data rate, then the mobile transceiver unit is kept in its higher communication rate, that is for example, at 9600 baud. If no transmissions are received or if transmissions are received but packets are not successfully detected on a consistent basis, or if insufficient packets are received during the time out interval, then the communication rate is set to the next lower rate, as at 1612.

If packets of communications from the base transceivers continue to be detected, the packet counter is incremented, as at 1607. When twenty or more packets are received before the elapse of the time out interval, as at 1608, then the mobile transceiver switches to a higher rate, as at 1610.

By operating in this manner, the mobile transceiver unit, such as 833 of FIG. 8, continuously monitors for the highest rate at which valid base transmission packets are received and retains that rate while packets continue to be received, with an occasional trial at a higher communication rate so that use of a higher rate can be effected if transmission conditions permit such communication.

In the invention disclosed in incorporated U.S. Pat. No. 5,070,536 a received signal strength indicator (RSSI) means is utilized to evaluate the feasibility of attempting transmission at the normal data rate or at a relatively higher data rate. In the RSSI scheme there is a need to establish a correlation between the analog to digital reading from the radio with a certain DB strength. This calibration must be performed by the manufacturing floor, or service department. Basing the rate on RSSI is a good method, but calibration can be avoided with the preferred embodiment. Because the mobile transceiver unit of the preferred embodiment is always active, a quick determination of suitable baud rate is not required. The method disclosed herein is more forgiving of potential changes to equipment (aging or detuning) in the field.

The mobile transceiver unit of the preferred embodiment switches baud rate based on experience, or received signal quality. When the mobile transceiver unit of the preferred embodiment is not receiving valid packets from the base transceiver, it switches between 4800 and 9600 baud attempting to locate a valid packet.

The switching rate is set at about every 1-2 seconds, the time out internal. Once a valid packet is received from the host, the rate is locked in. After lock-in, a lack of packets is required for about 5-10 seconds before the baud rate seek is started again. Valid host packets always cause lock-in, regardless of the destination terminal address.

Time delays are actually determined by the quantity of indeterminate characters being received, which happens continuously between packets. Characters which are part of a valid terminal packet are not counted as indeterminate characters or as valid host packets. In the enhanced adaptive poll protocol, not all packets can be identified as originating from the base transceiver unit. These packets are assumed to originate from another mobile transceiver unit and are not counted.

If the rate locked in is the slower 4800 baud, after every twenty valid packets, an opportunity is taken to "peek" at the higher 9600 baud rate for a valid packet. If a valid host packet is seen at this rate, lock-in at 9600 baud is performed.

The RSSI method requires the base receiver to be transmitting something before the signal strength can be determined. The valid packet method of the preferred embodiment requires a packet from the base transceiver to be received error-free. The RSSI method may provide invalid results if the mobile transceiver unit receives a packet from another mobile transceiver closer than the base receiver, unless a valid base receiver packet is tested for. The valid packet method will ignore a packet received from a closer mobile transceiver unit because it always watches for a valid host packet.

When the host is used with two bases and two baud rates and two protocols and light data traffic, the amount of time between valid packets at any baud rate can be substantial. This forces the mobile transceiver to start seeking a new rate. In some cases, all mobile transceiver units revert to 4800 baud because the number of indeterminate characters to be received before failure occurs in a time out period is twice as many at 4800 baud as when the rate is 9600 baud. Thus the mobile transceiver unit is more reluctant to leave 9600 baud. The preferred embodiment mobile transceiver unit is also capable of identifying real time control, enhanced adaptive poll, or other polling protocols. This is used to identify more packets from the base transceiver when the base transceiver is running dual protocol.

As diagrammatically illustrated in FIG. 17, the mobile transceiver unit is initialized in receive mode at the normal data rate, indicated as "R×L", at 1701. The mobile transceiver then begins to switch in receive mode between the normal data rate and the higher data rate, R×H, at 1702, while attempting to detect valid packets being transmitted by a base transceiver to another mobile transceiver unit. The mobile transceiver unit of the preferred embodiment also attempts to detect other transmissions from a base transceiver, including sequential or other protocol polling signals.

When receiving at the lower normal data rate, as at 1703, after twenty packets are received within a time out period and when no communication session has been commenced with a base transceiver, the mobile transceiver switches to the higher data rate to sample whether packets can be successfully received at the higher rate, as at 1704. If packets are not successfully detected, the mobile transceiver unit recommences cycling in receive mode between the normal data rate and the higher data rate, as at 1705 and 1706, while in the higher data rate setting, if packets are successfully received, as at 1706, the mobile transceiver unit stays locked in at the higher rate and may begin a communication session with a host/base transceiver as at 1709-1710-1711. After the communication session is complete, the mobile transceiver unit returns to the lower data rate in receive mode, as at 1712 and continues to reciprocate between the higher and lower data received rates as at 1712-1713 until packets are again successfully detected. A communication session with a host/base transceiver may be initiated at the lower data rates, as at 1714-1715, if a signal is directed to the unit at the lower data rate while packets are being received at the lower rate and before twenty packets are received or the time out period expires.

When valid packets or polling signals are detected at the higher data rate, the mobile transceiver unit remains in receive mode at the higher data rate while packets are being successfully received and before elapse of the time out period.

The following appendix F provides an exemplary computer program listing for preferred control instructions for the system disclosed herein.

The RT1200 system utilizes time division multiplexing on a single frequency channel (e.g. in the 450 megahertz band) to provide access to the respective terminals. The RT1200 communications protocol is based on a sequential polling method that transmits a query addressed to each portable terminal in succession, and allows a specified amount of time for the addressed terminal to respond in case a data message is ready for transmission.

Figure 18:
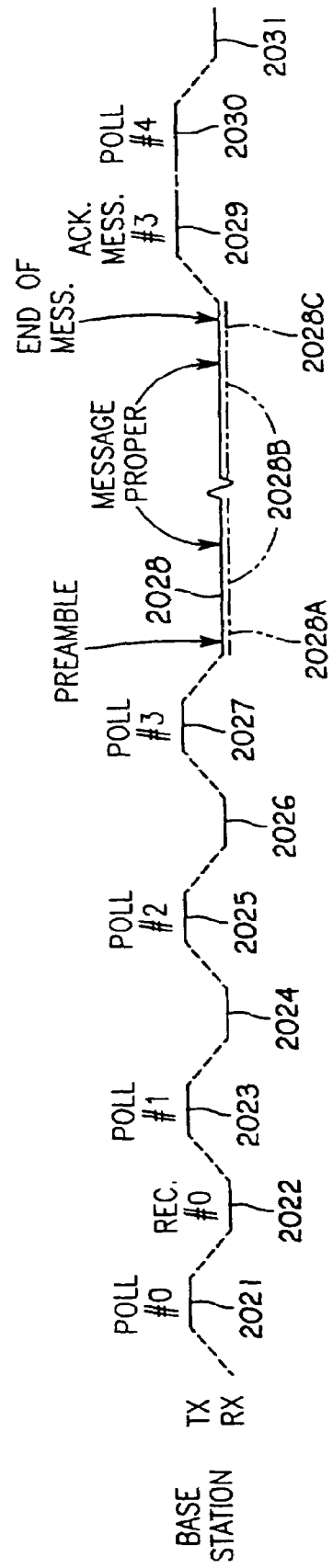
FIG. 18 is a diagrammatic illustration of the sequential polling procedure which is utilized with the prior art system of FIG. 1.

A transmitted message consists of an initialization sequence, unit address, message identifier and system information, message data and/or control commands, error control, and end of message indication. The basic sequential polling procedure of a base station such as the RB1212 is illustrated in FIG. 2 wherein level TX represents transmit mode of the base station, and level RX represents receive mode. In FIG. 18, solid line 2021 represents a transmit time interval wherein the base station transmits a polling signal for a mobile unit of a first address, e.g. #0, at a predetermined data rate e.g. 4800 baud. The base station then allows a specified amount of time represented as time interval 2022 for the addressed terminal to respond if communication activity is required. The intervals at 2023 and 2024 apply to a second terminal address, e.g. #1, the intervals 2025 and 2026 apply to a third terminal address, e.g. #2, the time intervals 2027 and 2028 represent the operation of a fourth terminal, e.g. #3, and so on.

The sequential polling process is timed by the multiplexor 15, FIG. 1, of the RT1200 system such that if a response is not received from the addressed mobile terminal within the allotted time such as indicated at 2022, a poll is issued to the next terminal in the sequence, e.g. as indicated at 2023. In the RT1200 system, if the designated mobile unit has some information to send to the host computer 17, that information is immediately transmitted to the host as the response, in which case the base station remains in reception mode. In effect, for the RT1200 system, any of the reception intervals 2022, 2024, 2026, etc. will be extended so as to receive complete messages from the respective addressed terminals where such messages are ready to be sent in response to the respective polling transmissions 2021, 2023, 2025, 2027, etc. In FIG. 2, it is assumed that mobile unit #3 is the first unit with a message to send. In this case, the base station while in receive mode as indicated at 2028, will actually receive a transmission from mobile unit #3 indicating that a message will follow. The base station in response to the transmission from mobile unit #3 (which is signified by a second line 2028A in FIG. 2) remains in receive mode for the duration of the message from unit #3. The message itself from unit #3 may occur over a time interval as represented by dot-dash line 2028B, and may be followed by an end of message transmission from unit #3 as indicated by a second line at 2028C. In response to the end of message signal at 2028C, the base station switches to transmit mode and transmits an acknowledgement message as indicated at 2029 for advising unit #3 that the message was properly received.

The base station then resumes polling, e.g. transmitting a polling signal at 2030 addressed to a mobile unit #4 and switching to receive mode for an interval 2031, and so on. In order to minimize channel capacity that is wasted polling inactive terminals, activity time-outs may be employed so that units that have not transmitted are dropped from the polling sequence and placed in a contention queue. The assumption would be that inactive units are either not being used at all or that the operator is busy at some other activity for significant amounts of time.

FIG. 19 illustrates standard system timing (in milliseconds) for the RT1200 system as represented in FIGS. 1 and 18. As indicated, a polling sequence such as indicated at 2021 and 2022 in FIG. 18 may occupy an overall time interval of 127 milliseconds, with a poll interval corresponding to interval 2021 in FIG. 18 requiring twenty-two milliseconds, a transmit/receive turnaround interval such as represented at 2033 in FIG. 18 requiring forty-five milliseconds, and a receive interval such as indicated at 2022 in FIG. 18 being allotted fifteen milliseconds.

FIG. 20 illustrates the corresponding standard system timing (in milliseconds) for a second product family known as the RT2200 system of Norand Corporation. In this case, a standard cycle corresponding to the intervals 2021, 2033, 2022 and 2034 in FIG. 19 requires a total of sixty-seven milliseconds, polling intervals such as 2035 and 2036 requiring twenty-two milliseconds, and intervals 2037, 2038 and 2039 each requiring fifteen milliseconds. The shorter transmit to receive and receive to transmit times offered by the RT2200 system result in nearly twice the polling speed in comparison to the RT1200 system. The modulation method and communication bit rates are identical in the two system families so that it is possible for the components of the RT1200 and RT2200 systems to be mixed subject to some limitations. For example, any mix of terminals or bases that includes an RT1211 multiplexor or an RT1212 base requires that the forty-five millisecond intervals such as 2033 and 2034 be included during communication involving these components. More particularly, if either the RT1212 base station or RT1211 multiplexor is used with a mixture of RT1210 and RT2210 terminals, all terminals must respond using the slower (45 ms) delay. If these units are replaced with both the RB2212 base, and RM2216 multiplexor, the system has the capability of adjusting the delay to match the particular terminals in use. For example, if units #1, #5, and #7 are RT2210's, and units #2, #3, #4, and #6 are RT1210's, the former three will be polled using the 15 ms delay, the latter four will be polled using the 45 ms delay.

Description of FIG. 21

In a more recent commercial development, a mobile terminal unit is to be utilized that includes a high performance 16-bit microprocessor and a memory capacity that allows large and complex application programs to reside and be executed within the terminal. With the introduction of this terminal, two new radio protocols have been developed. Both protocols use the slotted reservation approach for obtaining system access. The major difference between them is that one utilizes asynchronous data transmission which is backwards compatible with the hardware in the 2210, whereas the other utilizes synchronous data transmission, which is more efficient, but which requires specific hardware utilized only in the new terminal. The same slotted reservation access and data rate selection schemes are to be used with both protocols. Implementation of the new protocol in the RT2210 terminals requires a change of read only memory (ROM). Implementation in the new terminal consists of a downloaded program resident in nonvolatile random access memory (RAM).

As shown in FIG. 21 a general poll message such as indicated at 2040 is transmitted to all terminals in the system, and the terminals are allowed to respond in random "time slots" such as indicated at 2041-2044 to indicate to the controller that communication activity is desired by the terminal. The example in FIG. 21 provides four time slots 2041-2044 in which the terminals may respond to the poll. In practice, the number of time slots are varied depending on the traffic load and other conditions. Each terminal may respond to the poll 2040 in any of the desired time slots with its address and some positive acknowledgement. The particular time slot in which the terminal chooses to communicate is selected at random by the terminal. In the event that several terminals potentially more than the number of time slots available, desire communications, a good probability may remain that at least one of the terminals will transmit its response in a time slot which is free of other responses. Under light loading conditions, it is likely that more than one slot will contain an intelligible response message, which further improves the efficiency of the polling procedure. An additional efficiency improvement may be realized because of a "capture" phenomenon of radio frequency modulation that allows recovery of a relatively strong signal in the presence of a relatively weak interfering signal.

Referring to FIG. 21, it may be that a terminal unit with an address of #3 responded during the first time slot 2041, and that a terminal unit #0 responded in time slot 2043. Several terminal units may have simultaneously responded in time slot 2042 such that none was identified by the base station. In such a case, the base station after elapse of time intervals 2041-2044, may first transmit a polling signal 2051 addressed to terminal unit #3, and then receive a message from unit #3 as indicated at 2052. As in FIG. 18, the message received at 2052 may include a preamble indicated at 2052A, a message proper 2052B, and an end of message signal 2052C. The base station may then transmit an acknowledgement message as represented at 2053, and thereafter proceed during time interval 2054 to poll the next terminal unit, e.g. #0, which successfully responded to the general poll at 2040, The message from terminal unit #0 may include message components such as described for message 2052. After each successfully responding mobile terminal has been polled and its respective message received, the procedure may be repeated with a further general polling cycle as at 2040-2044.

Figure 22:
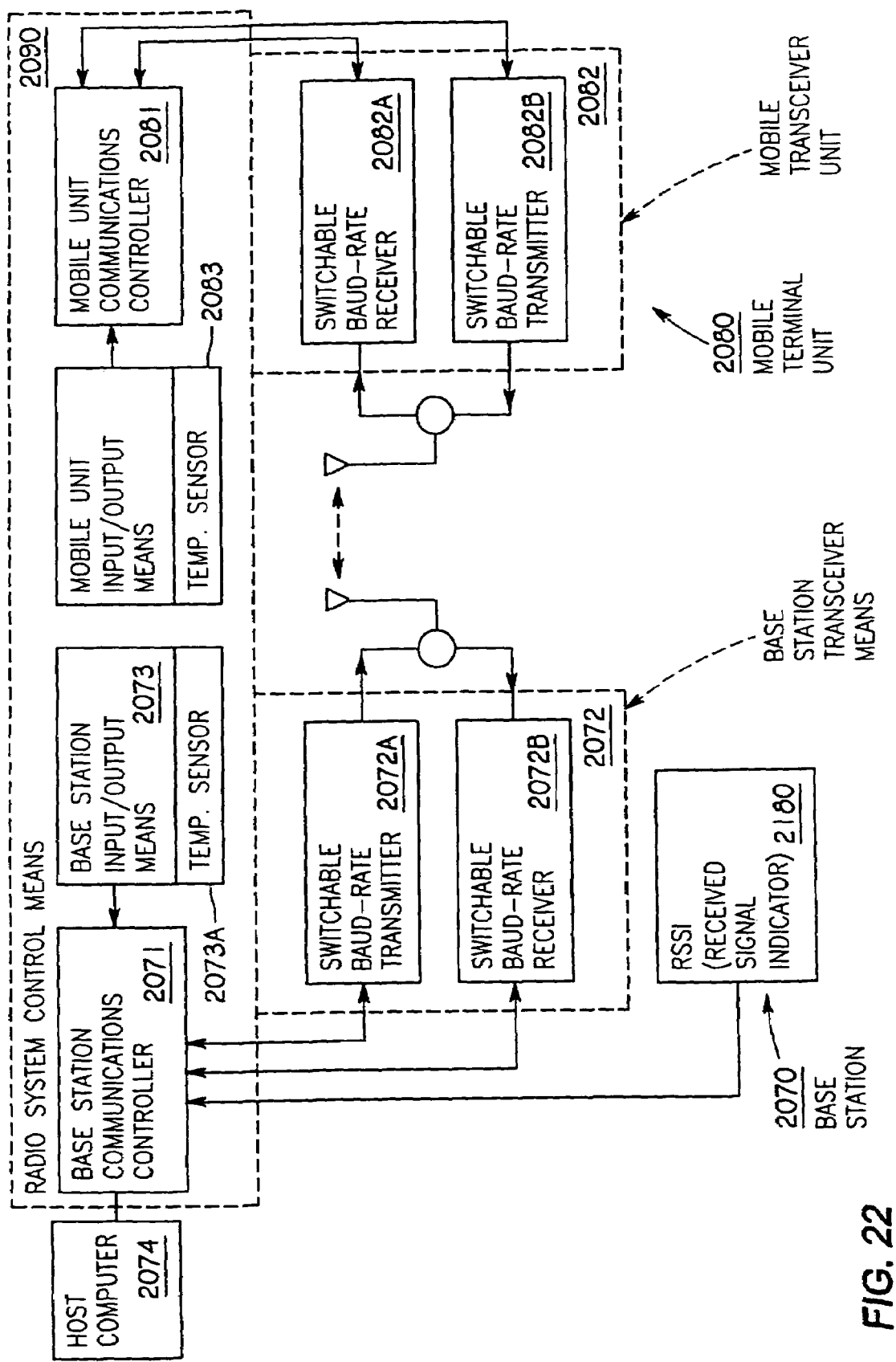
FIG. 22 is a diagrammatic illustration of a mobile radio system which may be compatible with elements of the previous systems of FIGS. 1 and 18 through 21, and may substantially enhance system throughput.

Description of FIG. 22

A radio data system utilizing the present invention is shown in FIG. 22. Such a system may be compatible with the product families as represented in FIGS. 1 and 18-21. Thus if the system of FIG. 22 utilizes a base station 2070 capable of operating at either 4800 bits per second or 9600 bits per second under the control of a communications controller 2071, such a base station can be installed in one of the prior systems e.g. in place of a RB2212 base transceiver, and may operate at a fixed data rate of 4800 bits per second. Subsequently, if upgraded mobile terminal units 2080 and terminal communications controller means 2081 are introduced into the system, operation at 9600 bits per second becomes available so as to achieve increased system performance. Communication at 9600 bits per second generally requires a stronger radio signal than communication at 4800 bits per second, so that the system of FIG. 22 may be designed to recognize when the signal strength is insufficient and to automatically switch to 4800 bits per second. Eventually, the system can be upgraded so as to utilize terminal units such as 80 exclusively. The 4800 bits per second data rate offers both the potential for direct compatibility with earlier products, and a "fall back" mode if signal strength does not allow communication at 9600 bits per second. A system such as indicated in FIG. 22 can be reached in stages with each upgrade step providing the user with increased performance and productivity that justifies the incremental cost. Since the largest investment is in the terminals, the upgrade strategy minimizes terminal obsolescence, offering the greatest possible useful life of the users' investment.

In a system such as indicated in FIG. 22, the transmitter and receiver components 2072A, 2072B and 2082A, 2082B may be switchable between data rates which are related by a factor of two, so that hardware complexity can be minimized. It would be possible to extend the concept to utilize a third data rate e.g. 1200 baud or, 2400 baud for further enhancement of fringe performance. In a preferred system each remote unit such as 2080 is identified by a unique address. Transmission between the base and the remote units may be initiated by the controller 2071 through the use of sequential polling as in FIG. 18 or by means of a contention protocol such as represented in FIG. 21.

In the system of FIG. 22, polling signals such as indicated at 2021, 2023, 2025, 2027, FIG. 18 and such as indicated at 2040, 2051 and 2054 in FIG. 21 may be at the standard data rate, e.g., 4800 baud, with terminals switching to transmit 9600 baud when a message transmission is required, and conditions permit, for example in the case of mobile unit #3 during the interval 2028 in FIG. 18. In FIG. 21, it may be assumed that mobile unit #3 was the sole respondent in interval 2041 and mobile unit #0 was the sole respondent in time slot 2043. In this case, the poll at interval 51 may be directed to mobile unit #3, and the response of mobile unit #3 during interval 2052 may be at the high data rate e.g. 9600 baud. Similarly, the individual poll at interval 2054 may be addressed to mobile unit #0, and mobile unit #0 may respond during the following interval at the high data rate e.g. 9600 baud. Polls are typically of short duration, so that the throughput penalty for using the lower data rate for polling is relatively slight. Polling at 4800 baud also maintains backward compatibility with older equipment, and ensures that units operating under fringe (weak signal) conditions can have access to the base station.

In FIG. 22, the radio base station 2070 may be described as comprising the base station controller means 2071 and a base station transceiver means 2072, and a base station input/output means 2073. Controller means 2071 may provide an interface with a host computer 2074 similarly to the known commercial system of FIG. 1, and may also control the mode of operation and data rate of the base station transceiver means 2072, and serve as an interface to the input/output means 2073. The mobile terminal unit 2080 may be described as comprising terminal controller means 2081, mobile transceiver means 2082 and terminal input/output means 2083. The controller means 2071 and 2081 together may be considered to form a radio system control means as represented by dash line/rectangle 2090, responsible for operating the system at a high data rate when feasible, and for automatically shifting to a lower data rate e.g. when a given mobile terminal unit moves beyond the range for reliable high data rate transmission.

The terminal controller means also includes means providing the interface to the terminal input/output means 2083 as in the earlier versions heretofore described. The controller means 2071 may operate the base transceiver 2072 so as to execute sequential polling as in FIG. 18 for terminals such as shown in FIG. 1 and such polling and responses thereto will take place at the standard data rate e.g. 4800 baud.

It is preferred to poll the improved terminal units such as 2080 utilizing a contention poll as in FIG. 21 where there are large numbers of such terminal units with low to moderate activity rates since this procedure does not waste time polling units which do not have data to transmit. Under conditions of heavy usage, the controller means 2090 may shift to the sequential polling procedure of FIG. 18 if an excessive number of collisions in the respective time slots prevents efficient communication in the FIG. 21 mode.

FIG. 22 illustrates that the base station or mobile terminals, or both may include a received signal strength indicator (RSSI) component 2092. For characterizing signal strength using RSSI, several samples of signal strength would be made during receipt of a message and a computation to determine average signal strength would be made. This is necessary because of the multipath conditions typically found within buildings, and in mobile operation. A fixed threshold would be used for making data rate selection based upon signal strength. If signal strength is above threshold, the high rate would be used. If signal strength is below threshold, the low rate would be used.

Description of FIGS. 23 and 24

FIG. 23 shows the case where base station 2070 polls a terminal unit 2080 at the standard data rate (represented by level "TX") during an interval 2121, and has its receiver 2072B in the high data rate (level "RXL" representing the standard data rate and level "RXH" representing the high data rate) for receiving a response during time interval 2122. FIG. 24 represents a polled mobile unit corresponding to unit 2080, FIG. 22, but which would not require a switchable data rate receiver. Thus the mobile unit of FIG. 24 would be in a fixed standard data rate receive mode (RX) during time interval 2131, and would switch to high data rate transmit mode. (TXH) for transmitting a response message during time interval 2132. As in FIGS. 18 and 21, if the base station properly received the message at the high data rate, the base could transmit an acknowledgement at the standard data rate (TX) during interval 2141, the mobile unit being in the standard data rate receive mode (RX) as represented at 2151.

Description of FIGS. 25 and 26

FIG. 25 shows a method of operation utilizing the system of FIG. 22, wherein base station 2070 polls a terminal unit 2080 at the standard data rate (represented by level "TX") during an interval 2121A, and has its receiver 2072B in the standard data rate level "RXL" for receiving a response during time interval 2122A. FIG. 26 represents a polled mobile unit corresponding to unit 2080, FIG. 22, but which would not require a switchable data rate receiver. Thus the mobile unit of FIG. 26 would be in a fixed standard data rate receive mode (RX) during time interval 2131A, and would switch to standard data rate transmit mode (TXL) for transmitting a response message during time interval 2132A and then switch to high data rate mode for interval 2132B. As in FIGS. 18 and 21, if the base station properly received a message at the high data rate during interval 2122B, the base could transmit an acknowledgement at the standard data rate (TX) during interval 2141A, the mobile unit being in the standard data rate receive mode (RX) as represented at 2151A.

Exemplary Operation for a System According to FIGS. 1, 18 and 19 or 20-21 and FIGS. 22-26

In the exemplary mode of operation of FIGS. 23 and 24, with sequential polling, polling would take place at the standard data rate, e.g. 4800 baud, in time intervals such as indicated at 2021, 2023, 2025, 2027 and 2030, FIG. 18, and at 2121, FIG. 23. The base station could be programmed with the data rate capacities of the respective terminal units, and always switch to receive at the standard data rate after polling of a fixed data rate terminal as in FIG. 18. If, for example, terminal units #0, #1 and #2 were of the fixed data rate type, then receiver 24 would be conditioned to receive response messages at the standard data rate during response time intervals 2022, 2024 and 2026.

If terminal unit #3 were of the type shown at 2080 in FIG. 22, the base station would be programmed to send the poll during time interval 2121, FIG. 23, at the standard data rate and then in a default mode (in the absence of a definite event indicating a lower data rate) would switch its receiver 2082A to receive at a higher data rate during the response time interval 2122. Each mobile unit such as 2080, FIG. 22, in default mode, could have its transmitter 2082B ready to transmit during an interval such as 2132 at a higher data rate than the standard data rate. Where the standard data rate is 4800 baud, it is preferred to utilize a higher data rate of twice the standard data rate, i.e. 9600 baud, for a communications system such as here described, since such a relationship makes the switchable baseband transmit and receive circuitry simpler. The receiver 2082A would not need to be switchable but could be fixed to receive at the standard data rate, e.g., 4800 baud, as at 2131. In this case, a mobile unit such as 2080 with address #3 would receive the poll during time interval 2131, and be ready to transmit its message at a higher data rate, e.g. 9600 baud. In correspondence with FIG. 20, the mobile terminal unit may switch from receive to transmit (R/T) mode in fifteen milliseconds during interval 2160.

The base station 2070 may receive the high data rate message and issue an acknowledgement at the standard data rate during interval 2141. If the message is received with an unacceptable number of errors, controller 2071 may be programmed to transmit a switchover signal to mobile unit #3, e.g., during interval 2141, commanding that the message be retransmitted at the standard data rate, and storing a corresponding switchover command in its polling control memory e.g. when the switchover command is acknowledged by unit #3 as at 2162. In the case of a mobile terminal of a passive type, mobile unit #3 could then have its transmitter 2082B operate in the standard data rate mode until a new startup of operation, e.g. on a subsequent working day, or until it received a special switchback signal from the base station.

During standard data rate mode, mobile unit #3 even with no message to transmit, would operate so as to receive any messages directed to it by the base station. Once the base station had registered a given mobile unit, e.g. #3, as having switched to transmission at the standard data rate, the base station could execute a program controlling a tentative resetting of such mobile unit to a higher data rate. In a simple case, the base station could instruct the mobile unit to attempt a high data rate transmission by sending a switchback polling message during an interval such as 2027, FIG. 18, or 2051, FIG. 21, after the expiration of a given number of polling cycles. If message traffic was heavy, each polling cycle would tend to be of longer duration, reducing the frequency of such high data rate trials.

In the exemplary mode of operation of FIGS. 25 and 26, with sequential polling, polling would take place at the standard data rate, e.g. 4800 baud, in time intervals such as indicated at 2021, 2023, 2025, 2027 and 2030, FIG. 18, and at 2121A, FIG. 25.

If terminal unit #3 were of the type shown at 2080 in FIG. 22, the base station would be programmed to send the poll during time interval 2121A, FIG. 25, at the standard data rate and then switch to receive at 2122A, also at the standard data rate. If the transmitted response during interval 2132A contains a command indicating operation at the higher data rate, the base would switch its receiver 2082A to receive at a higher data rate during the remainder of the response time interval 2122B. Each mobile unit such as 2080, FIG. 22 in default mode, could have its transmitter 2082B ready to transmit at the standard data rate during an interval such as 2132B rather than at a higher data rate than the standard data rate. Where the standard data rate is 4800 baud, it is preferred to utilize a higher data rate of twice the standard data rate, i.e., 9600 baud, for a communications system such as here described, since such a relationship makes the switchable baseband transmit and receive circuitry simpler. The receiver 2082A would not need to be switchable but could be fixed to receive at the standard data rate, e.g. 4800 baud, as at 2131A. In this case, a mobile unit such as 80 with address #3 would receive the poll during time interval 2131A, and be ready to transmit the baud rate switching command and during interval 2132A at the lower data rate, e.g., 4800 baud. In correspondence with FIG. 20, the mobile terminal unit may switch from receive to transmit (R/T) mode in fifteen milliseconds during interval 2160A.

The mobile unit may send its high data rate message during interval 2132B, the base station 2070 receiving the high data rate message as indicated at 2122B and issuing an acknowledgement at the standard data rate during interval 2141A. If the message is received with an unacceptable number of errors, controller 2071 may be programmed to transmit a not acknowledge (NACK) to mobile unit #3 during interval 2141A, and the mobile unit being in a state to receive the message as represented at 2151A. Controller 2081 of mobile unit #3 may be programmed either to attempt retransmission at the high data rate during the following polling cycle, or to retransmit at the low data rate, depending on whether recent previous attempts at the high rate of transmission had also failed.

Having switched to transmission at the standard data rate, controller 2081 of mobile unit #3 could execute a program controlling a tentative resetting of such mobile unit to a higher data rate. In a simple case, the controller could attempt a high data rate transmission by sending a switchback message during an interval such as 2041, 2042, 2043, or 2044, FIG. 21, or such as 2132A, FIG. 26, after the expiration of a given a number of polling cycles. If message traffic was heavy, each polling cycle would tend to be of longer duration, reducing the frequency of such high data rate trials.

Description of FIGS. 27, 28, 29 and 30

A mobile unit such as 80 may include a temperature sensor for sensing ambient temperature. Such a temperature sensor may be associated with the terminal input/output means as indicated at 83A, FIG. 22. Such a temperature sensor may be incorporated in the mobile terminal unit for use in connection with digitally controlled oscillator compensation, bias compensation of liquid crystal displays, or over/under temperature sense and shutdown, for example.

The temperature sensor 2083A is useful in determining data rate since temperature changes at the transmitter 2082B can cause a shifting of the frequency of the RF carrier.

The base station input/output means 2073 may also include a temperature sensor 2073A, and a digital measure of ambient temperature at the base is useful in controlling data rate since the local oscillator frequency of receiver 2072B is affected by temperature.

It is advantageous to communicate the temperature of the base unit 2071 to the mobile unit 80, so that the mobile unit can obtain a measure of any differential in ambient temperature between the mobile unit and the base. As the magnitude of the temperature differential begins to become large, the received high data rate signal becomes skewed (relative to the center of the IF filter passband). This results in distortion in the recovered data, which eventually with increasing magnitude of the frequency error makes data recovery impossible. Signals with higher frequency components are more vulnerable to this effect, so that operation may still be feasible at the standard data rate.

Knowing the temperature of the unit, and the approximate average frequency vs. temperature profile, there are alternative ways to aid data rate selection. A preferred way would be to break the operating temperature range into three regions where the frequency is likely to be either near its nominal value, high, or low. In the system of FIGS. 27 and 28, the nominal region(s) might encompass the temperature range where the frequency is likely to be within +/−1 KHz which is about +/−2 ppm at 450 MHz, or +/−0.8 ppm at 800 MHz. The high region(s) would be those where the frequency is likely to be above this value, the remainder would be classified as low regions. A simple high, nominal, or low indication would be communicated over the link for use in establishing data rate. Because of the statistical nature of the temperature profiles, the only time that temperature information would be heavily utilized to make a data rate decision would be when two units wishing to communicate were at opposite extremes, e.g. high and low, or low and high.

From a practical standpoint, it is more efficient for each portable unit to make the determination as to the magnitude of the temperature differential relative to the base, since in this case, the base can transmit its temperature information to all mobile units once each polling cycle, minimizing system overhead. If the portable unit determines that base and portable frequency error are at opposite extremes data rate will revert to the standard rate.

For the case of sequential polling, temperature information from the base station 2070, FIG. 22, can be transmitted during an interval such as indicated at 2171, FIG. 27, or 2171A, FIG. 29, prior to polling of a first mobile unit as at 2172, FIGS. 27 and 29. In a contention type polling procedure, temperature information from the base station 2070 can be transmitted as indicated at 2174, FIG. 28, or 2174A, FIG. 30, prior to a general poll at interval 2175.

In FIGS. 27 and 28, temperature information may be sent as part of a test transmission which will also include for example a transmission of a known sequence particularly sensitive to jitter or other disturbances. FIGS. 29 and 30 represent the case where only base temperature information is sent prior to a polling signal.

Each mobile unit having a message to transmit will evaluate the temperature condition at the base 2070 in relation to its ambient temperature as sensed at 2083A, FIG. 22, and determine the correct data rate for its message. For example, the first mobile unit may respond to its poll at 2172, FIG. 27 or FIG. 29, by transmitting a signal during interval 2176, FIG. 27 or FIG. 29, indicating whether its message will be sent at the standard data rate or at the higher data rate. The base station will then operate its receiver 2072B to receive the message during interval 2177.

Similarly for the case of FIG. 28, or FIG. 30, each mobile unit such as 80 having a message to transmit will evaluate the base temperature information in relation to its ambient temperature, and respond in a selected time slot such as 2178 with a message indicating its address and whether its message will be transmitted at the standard data rate or at the higher data rate. Then when such mobile unit is individually polled by the base as at 2179, it will proceed to send its message at the selected data rate.

In FIG. 30, the temperature information and general poll signal may be combined so as to be transmitted as a unitary signal burst e.g. during the general poll interval 2175A, so that the separate transmission interval 2174A may be omitted.

Description of FIGS. 31 and 32

For the case of sequential polling, FIG. 31 shows the polling at 2181 of a mobile unit such as 2080, FIG. 22, whose transmitter 2082B has been switched over to the low data rate mode, for example as described in reference to FIGS. 23 and 24. Where the mobile unit has a message to send, it may affirm this in interval 2182 by means of a test precursor signal at the low data rate during interval 2182. This signal at 2182 causes the base station to switch to high data rate reception at 2183, whereupon the mobile unit sends a test pattern at the high data rate during the corresponding interval 2193. Ideally a special test pattern would be sent during interval 2193 which was designed to be particularly sensitive to marginal transmission conditions. If the test pattern were sent prior to the message to be transmitted, then the mobile unit could pause as at 2194 to receive approval of its test pattern transmission from the base before proceeding to send its message, so that the message could be sent selectively at the high data rate or at the standard data rate depending on the decision signal from the base at 2195 in reference to the test pattern.

Thus, if the base sends a switchback signal at 2195, the mobile unit switches to the high data rate (TXH) and sends its message as indicated at 2198.

For the case of contention polling, the mobile unit would first respond as in FIG. 21, and at the interval such as 2052A, FIG. 21, send the test precursor signal as at 2182, FIG. 32. Again the data message would be sent at the high data rate (as at 2198, FIG. 32) if the high data rate test pattern (as at 2193) was approved by the base (as at 2195).

For either sequential or contention polling, the mobile unit could omit the high data rate test pattern and simply resume operation at the high data rate until otherwise instructed by the base.

The test precursor signal at 182, FIG. 32, could include temperature information as described for interval 2171, FIG. 27, or 2174, FIG. 28, so that FIGS. 31, 32 could include the features of FIGS. 27, 28 also.

As explained in reference to FIGS. 27 and 28, it is advantageous if the base can send a data rate decision relevant signal to all remote units simultaneously in the process of dynamic data rate selection. Thus in FIG. 27, the transmission at 2171 may include or consist of any of the test signals disclosed herein. For the case of FIG. 28, any such test signal may be transmitted at the low or standard data rate in interval 2174, or may be included in or comprise the general poll signal at 2175. Alternatively a high data rate test signal may be sent at an interval corresponding to interval 2171, FIG. 27, or interval 2174, FIG. 28.

Description of FIGS. 33 and 34

FIGS. 33 and 34 illustrate embodiments where a switchable baud rate transmitter is utilized as indicated at 2072A, FIG. 22, to send a special high data rate test pattern. Ideally a special test pattern designed to be particularly sensitive to marginal transmission conditions would be used.

For the case of sequential polling as represented in FIG. 33, the base station may send the high data rate test pattern as indicated at 2201, interlaced with its regular polling of respective mobile units as at 2202. If for example, mobile unit #0 received the test pattern properly, and had a message to transmit it could respond at interval 2203 with a switch to high data rate signal, and thereafter send its message at the high data rate, for reception during time interval 2204. If the test pattern had not been received properly, the mobile unit #0 would respond at the low data rate to be received as indicated at 2028 in FIG. 18. The switch over between transmission at high and low data rates as at 2206, FIG. 33, or as at 2207, FIG. 32, would have a duration so as to provide a suitable stabilization period. The required delay for data rate switchover is dependent on the hardware implementation in both the transmitting and receiving equipment.

For the case of contention polling as in FIG. 34, a high data rate test pattern may be sent during a time interval 2210 which precedes or follows the general poll at 2211. For example, as shown in FIG. 34, the high data test rate pattern may occur during an interval corresponding to the first response time slot such as 2041, FIG. 21, in which case all mobile units would be programmed to avoid selection of this slot for contention purposes.

Where the test pattern preceded the general poll as at 2040, FIG. 21, each mobile unit would switch to high data rate reception after receiving an acknowledgement as at 2053, FIG. 21, or for mobile units with no message to send, these units could remain in low data rate reception mode until data was ready to send, and then switch to high data rate reception to determine if high data rate transmission was feasible (i.e. by evaluating reception of the test pattern transmitted by the base).

Figure 35:
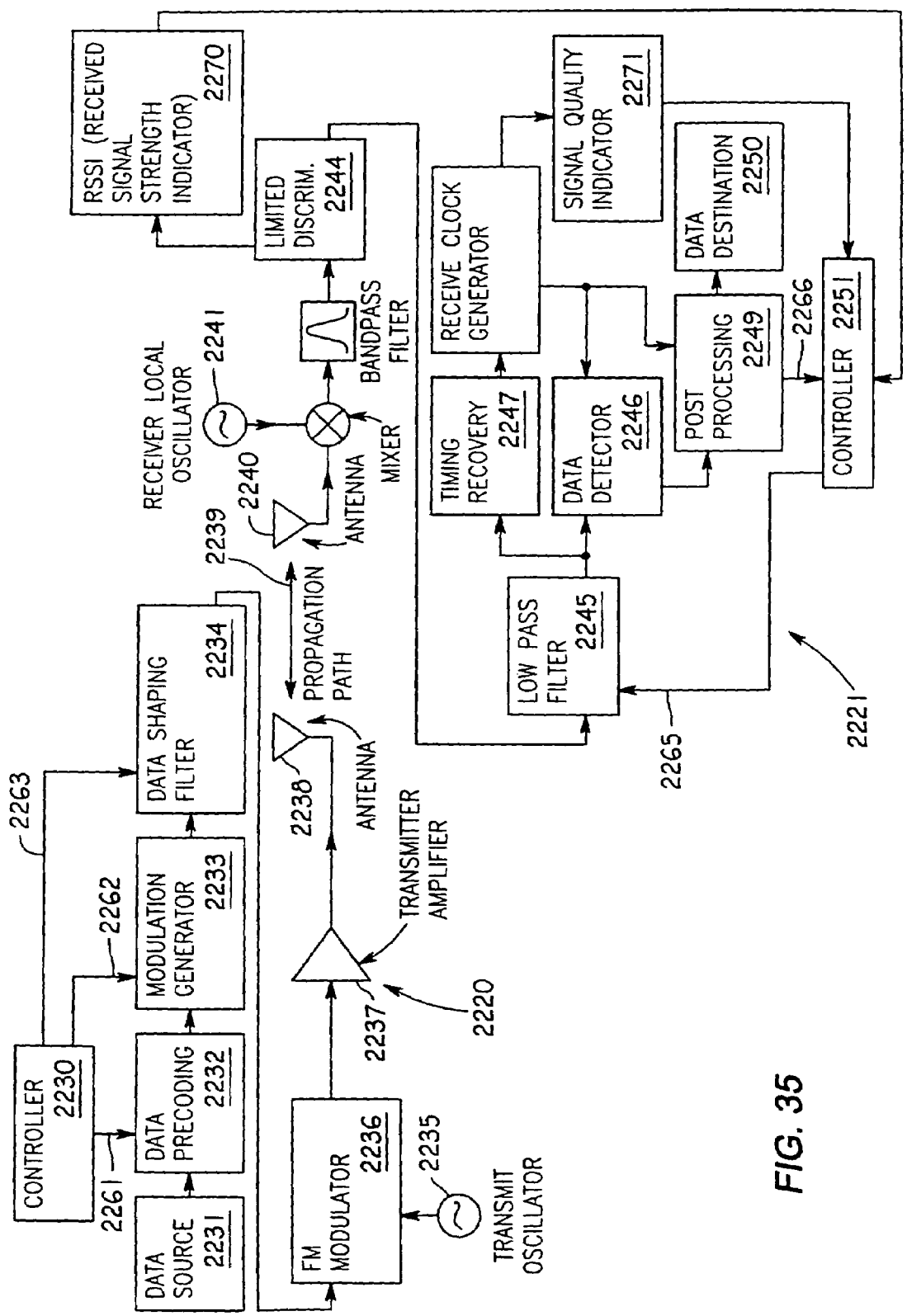
FIG. 35 is a schematic block diagram for illustrating an exemplary hardware implementation of the system of FIG. 22.

Description of FIG. 35

FIG. 35 shows exemplary relevant details for a transmitter 2220 which may correspond with transmitter 2072A or 2082B, FIG. 22, and for a receiver 2221 which may correspond with receiver 2072B or 2082A, FIG. 22. The reference numerals in FIG. 35 designate elements of the system as follows: 2230, communications controller; 2231, data source; 2232, preprocessing and encoding section; 2233, modulation generator; 2234, data shaping filter; 2235, transmitter oscillator; 2236, FM modulator; 2237, transmitter amplifier; 2238, antenna; 2239, propagation path; 2240, antenna; 2241, receiver local oscillator; 2242, down conversion mixer; 2243, intermediate frequency (IF) bandpass filter; 2244, limiter/discriminator demodulator; 2245, bandlimiting low pass filter; 2246, baseband data detector; 2247, timing recovery section; 2248, clock generator; 2249, data post processing section; 2250, data destination; 2251, communications controller. A description of an exemplary implementation of the baseband processing components is as follows:

(1) Digital Pre-Processing Section 232

This function is provided using a commercially available serial communications controller (SCC). This device is programmable under software control so data rate may be changed without the need for additional hardware. The SCC accepts raw data in parallel form, adds system overhead functions, such as framing, error detection, and control bits, and clocks out serial data at the proper baud rate. It also controls operation (on/off) of the transmitter.

(2) Modulation Generator 233

The NRZ formatted data supplied by the serial communications controller of section 2232 is a single ended logic level signal. Modulation generator 2233 includes a level translator which converts this input signal to a signal which is symmetrical around a d.c. reference voltage. This reference is used for the remainder of the baseband analog processing circuitry.

The signal from the level translator is supplied to a level adjust circuit which may comprise a simple resistive attenuator for scaling the signal to provide the proper FM deviation of the carrier. In the exemplary FM data transmission system, occupied bandwidth is sixteen kilohertz maximum, with five kilohertz maximum frequency deviation. This occupied bandwidth constraint restricts the allowed deviation at higher data rates. The need to adjust deviation for the different data rates is brought about by a combination of system considerations, (optimizing deviation to maximize link performance at the individual data rates) and regulatory restrictions on maximum occupied bandwidth.

In the exemplary system the circuit is designed to switch the attenuation to optimize the deviation for each data rate. In particular, the level adjust circuit is designed to switch in additional attenuation when 9600 baud operation is desired. Control line 2261, FIG. 35, may control the serial communications controller to effect the change of data rate between 4800 baud and 9600 baud, for example, and control line 2262 may correspondingly control the switching in of additional attenuation for 9600 baud operation.

(3) Transmit Data Shaping Filter 234

The data shaping filter may comprise a linear phase response low pass filter with a passband-width matched to the data rate. Its purpose is to minimize the occupied bandwidth of the transmitted signal. A switched capacitor filter implementation is used in the design which allows the bandwidth to be adjusted for 4800 baud or 9600 baud operation simply by changing an externally provided clock which may be provided from controller 2230 via line 2263, FIG. 35. The filtered signal is supplied to the radio transmitter FM modulator 236 for RF transmission.

(4) Receive Low Pass Filter Circuit 2245

An input circuit to the low pass filter proper may provide an amplitude adjustment so that the incoming signal from limiter-discriminator demodulator 2244 can be set to the proper level for the low pass filter and data recovery detector circuits to follow. The purpose of the receive filter is to minimize intersymbol interference at the receive data recovery circuitry. It also provides a d.c. offset to center the signal within the input range of the low pass filter and zero crossing detector. The low pass filter itself may be a switched capacitor linear phase filter similar to the filter used in component 2234 of the transmitter. Its purpose is to remove noise components which are outside of the data bandwidth. The bandwidth of this filter is determined by an external clock signal supplied via a line 2265, FIG. 35, from controller 2251.

(5) Receive Data Recovery Circuitry 2247

This circuitry may function as a zero crossing detector and may comprise a reference recovery circuit and a comparator with hysteresis. The d.c. bias voltage from the filter circuit 2245 varies in proportion to the total frequency error in the received signal and local oscillators (the same phenomenon that causes skewing in the IF filters 2243). The reference recovery circuit tracks the signal and extracts a reference signal which is applied to the comparator. The comparator compares the incoming signal against the reference to detect zero crossings in the data. Hysteresis is utilized to provide additional noise immunity under weak signal conditions.

A zero crossing detection approach is considered advantageous because it is relatively insensitive to the amplitude distortion that occurs in the receiver at the 9600 baud data rate. Such a circuit is selected because its operation is relatively data rate independent. It can be used at 4800 baud or 9600 baud without adjustment.

(6) Timing Recovery and Clock Generator

The function of the timing recovery circuit is to synchronize a locally generated data clock signal with the incoming NRZ data. Possible implementations include an early-late gate or phase locked loop. By continuously monitoring the degree of coincidence of received data transitions and the recovered clock signal, a signal quality indication can be derived for use in making data rate selection decisions. The recovered clock signal may be used to gate the data recovery circuit at the center of each received bit, which may provide improved performance at the expense of more complex hardware.

Timing recovery may be performed in parallel with data recovery as shown in FIG. 35, or serially, following data recovery.

(7) Digital Post-Processinq

As with component 2232 of the transmitter, this function may implemented in a serial communications controller. The primary functions of this device are to remove system overhead information that was added for transmission, perform error control analysis, and provide the raw data to the data destination. It may also be used to perform some or all of the timing recovery function, if the serial implementation is selected. Data rate is programmable under software control and may be controlled from controller 2251 as represented by control line 2266.

Data source 2231 and data destination 2250 may be implemented as a universal asynchronous receive/transmit circuit (UART) which supplies data to the component 2232 during transmitting operation and which receives data from post-processing component 2249 during reception operation. The controller such as 2230 or 2251 may be connected in parallel with such a UART component for inputting data thereto for transmission, and for receiving data therefrom, in parallel, during reception. Alternatively, data may be provided to the controller via direct memory access or DMA. In this approach the serial communications controller stores the received data in a designated memory location where it can be directly retrieved by the controller.

It will be understood by those skilled in the art that in practice, the timing recovery section 2247, clock generator 2248, and the controller components may all be implemented in a single microprocessor, as would a portion of the receiver post-processing section 2249.

The circuitry of FIG. 35 represents a narrow band frequency modulation (FM) radio data communications system.

FIG. 35 shows a received signal strength indicator (RSSI) 2270 associated with the limiter-discriminator section 2244, and a signal quality indicator 2271 associated with the clock generator 2248. Components 2270 and 2271 will now be discussed in separately headed sections.

(1) RSSI Component 2270

Several commercially available integrated circuit FM demodulators now incorporate the RSSI function. In operation, an output voltage or current is provided proportional to the degree of limiting in the limiter portion of the integrated circuitry. The RSSI output may be applied to an analog to digital converter and then to the microprocessor of a controller such as 2071 or 2081, FIG. 22 or 2251, FIG. 35. The programming of the microprocessor of the controller may then determine the presence and signal strength of the carrier, and make a decision as to whether it is desirable to revert to the lower data rate. The individual polling signals such as 2021, 2023, 2025, 2027 in FIG. 18 and such as 2051 and 2054 in FIG. 21 may take a special form for signaling the respective addressed terminal unit that messages are to transmitted at the lower data rate until further notice. Since other factors than signal strength influence the ability to use higher data rates, such as skewing of the received signal frequency and receiver local oscillators due to temperature. It is conceived that other criteria may be utilized along with received signal strength to determine when switching to the lower-data rate is advisable.

In evaluating multipath effects the RSSI output should be sampled several times during receipt of a message. Data rate selection should be based upon a weighted average value. The weighting function should give emphasis to the lower signal strengths measured since the average strength of a fading signal tends to approximate its peak value.

(2) Signal Quality Indicator 2271

A preferred method of evaluating whether to switch to a low data rate is to use a signal quality indicator derived from the receive clock generator 248. This indicator would produce a signal by comparing the regenerated receive clock which would contain some amount of jitter due to noise and distortion in the radio link, with the ideal clock. A test pattern as described with reference to FIGS. 31-34 would most likely still be advantageous so as to make the measurement more reliable and sensitive.

The receiving unit performs a qualitative analysis of the 9600 baud signal, e.g. a special test pattern, by sensing the jitter in the received signal. The majority of the signal quality indicator circuit 2271 can easily be implemented in any one of a number of commercially available programmable logic devices. The control portion may utilize the onboard microcomputer of the controller 2251. Alternatively, the entire jitter characterization function could be implemented in software given a sufficiently powerful microcomputer.

By way of example, the test pattern may consist of an initialization sequence used to establish timing, and a known bit pattern. The jitter characterization circuit 2271 is held in a standby mode until the initialization sequence is expected. The initialization sequence may consist of an alternating pattern of eight ones and zeros. A clock pattern can be used for synchronization because the time uncertainty of the beginning of the sequence is slight. If uncertainty were greater a seven bit Barker sequence could be used.

For timing synchronization, the circuit functions as a sliding correlator. A bit image of the ideal timing initialization sequence sampled at seven samples per bit (111111100000 00 . . . ) is loaded from the pattern memory into the compare register. The incoming data is sampled as shifted into the shift register at seven times the bit rate. After each shift operation, the shift register and compare register are exclusive or-ed, and the degree of correlation (number of errors) determined. This continues until the number of errors detected is less than a maximum error threshold (in this case thirteen errors). At that point, the shift operation continues as long as the number of errors continues to decrease. When an increase in the number of errors is noted, synchronization is assumed to have occurred on the previous clock sample. If the number of detected errors does not decrease to below the threshold within a timeout period, the remainder of the data characterization is not performed, and e.g. 4800 baud operation is used.

Once clock synchronization has been obtained, the circuit enters a block correlation mode. A fifty-six bit image of the first eight bits of the pseudorandom test pattern is loaded into the comparison register. Incoming data is clocked in for the next fifty-five clock cycles. (Fifty-five cycles are used for the first comparison because the bit synchronization is one clock cycle off. Thereafter, fifty-six cycles are used.) At the end of the clock period, the shift register and compare registers are exclusive or-ed, and the number of errors determined. The next fifty-six bit image is then loaded into the comparison register and the next fifty-six samples are shifted in. This process continues for the duration of the test pattern.

A running total of the number of detected errors, including those noted in the synchronization process, is maintained throughout the characterization process. At the conclusion of the process, the total number of errors is compared against a threshold value to make the data rate decision. The threshold for selecting e.g. 9600 baud operation is sixty errors out of two hundred eighty samples or twenty-one percent. If the error percentage is above this level, e.g. 4800 baud operation is used.

For embodiments such as shown is FIGS. 33 and 34, the data rate selection must be communicated to the base station controller means such as 2071 in the poll response. This response could also contain a test sequence to characterize the return link as in FIG. 32. If a reciprocal channel is present, characterization of one of the links only may generally be adequate to establish the data rate, and would result in lower system overhead.

The length of the pseudo-random test pattern used is somewhat arbitrary. An initial design uses a pattern of a length of forty bits, including eight bits for synchronization. The forty bit pattern length was selected because it represents a good compromise between signal characterization and low system overhead. It is more than adequate to characterize the degradation of the link due to poor signal strength and distortion in the channel.

If a signal quality indicator is available from the received clock generator, the use of a correlator is a redundant function. The test pattern could be used in either case.

General Discussion of FIG. 35

FIG. 35 particularly illustrates a system for upgrading the present commercial system as described in reference to FIGS. 1 and 18-21. Thus, the system of FIG. 35 may be operated so as to be compatible with the earlier mobile units of FIGS. 1, 18 and 19 which form part of the commercial RT1200 system, and may also utilize terminals as represented in FIG. 20 forming part of the RT2200 commercial system. To accommodate such mobile terminal units, the system of FIG. 35 may conduct its polling operations at the standard data rate of 4800 baud. Thus, the system of FIG. 35 is particularly adapted for use in inventory management and material control applications in retail stores, warehousing, and manufacturing, for example, allowing operators at remote locations to communicate interactively with a central computer system on a real-time basis.

The radio system of FIG. 35 may utilize a star network configuration. The base station may comprise receive and transmit sections as in FIG. 35 and may utilize a single communications controller for performing the functions of controllers 2230 and 2251, FIG. 35. Accordingly, the single communications controller of the base station may correspond with controller 2071, FIG. 22, and provide a data interface to a host computer such as represented at 2074, FIG. 22. Thus, data from the single controller is converted into a radio frequency signal, and signals received from remote units of the two commercial types and from remote units as represented in FIG. 35 are converted into logic level signals and provided to the single controller.

The remote units of the three different kinds are designed to be operated in a common system and each may be used either as a hand-held portable device or as a mobile unit on a forklift or other vehicle. Each remote unit has the capability of working with a variety of peripheral devices, the most common of which are various types of barcode scanners. The remote units may utilize an integral microcomputer for performing the functions of controllers such as 2230, 2251, FIG. 35, and such integral microcomputer then controls operation of the remote unit and provides local processing of user and peripheral device inputs.

The system of FIG. 35 particularly relates to data communications in the ultra-high frequency (UHF) frequency range. While several different modulation methods would be permitted, frequency modulation (FM) is illustrated in FIG. 35.

Equipment operating-under these conditions in the United States is subject to the following limitations:

(1) Occupied band width is sixteen kilohertz maximum, with five kilohertz maximum frequency deviation.

(2) Channel spacing is 25 kilohertz. This requires the use of highly selected filtering in the receiver to reduce the potential for interference from nearby radio equipment operating on adjacent channels.

(3) Maximum output power is generally in the range of ten to three hundred watts. For localized operation in a fixed location, however, transmitter power output may be limited to two watts maximum, and limitations may be placed on antenna height as well. These restrictions are intended to limit system range so as to allow efficient re-use of frequencies.

For non-return to zero (NRZ) data modulation, the highest modulating frequency is equal to one half the data rate in baud. Maximum deviation of five kilohertz may be utilized for a highest modulation frequency which is less than three kilohertz, but lower deviations are generally required for higher modulation frequencies. Thus, at a data rate of ten thousand baud, and an occupied bandwidth of sixteen kilohertz, the peak FM deviation which can be utilized for NRZ data may be three kilohertz or less.

Considerations of cost versus performance tradeoffs are the major reason for the selection of the frequency modulation approach used in the system. The approach utilizes shaped non-return-to-zero (NRZ) data for bandwidth efficiency and non-coherent demodulation using a limiter-discriminator detector for reasonable performance at weak RF signal levels.

The radio transceivers in the base and remote units have been derived from design configurations originally devised for voice equipment, thereby taking advantage of the existing components developed for that market. While the performance of these modules has been optimized specifically for data, cost considerations have dictated that performance goals be compromised in some areas, particularly transmitter and receiver local oscillator frequency stabilities and IF filter characteristics.

For example, in the illustrated embodiment, transmit oscillator 2235 and receiver local oscillator 2241 may have a frequency stability over a temperature range from minus thirty degrees celsius to plus sixty degrees celsius of five parts per million (0.0005 percent).

The IF filter 2243 is selected to pass the modulated signal with fidelity, and to provide the required adjacent channel selectivity. The filter pass band must be wide enough to accommodate center frequency errors due to the transmitter and receiver frequency tolerances noted above. Ideally, the filter should have linear pass band phase characteristics to avoid introducing delay distortion in the recovered data.

Cost considerations have dictated performance compromises in filter selection. The filters used exhibit both amplitude roll-off and nonlinear phase characteristics near the edges of the pass band, which results in detectable intersymbol interference (ISI) in the recovered baseband signal at higher data rates, particularly when frequency offset error is present.

The following is a summary of some of the factors which prevent reliable continuous operation of the system of FIG. 35 at the higher data rate such as 9600 baud under all operating conditions:

(1) There is a sensitivity penalty for operating at higher data rates. For a given bit error rate (BER) the combination of higher baseband low pass filter bandwidths and lower bit energies dictates a need for a stronger signal at the receiver input than that required for lower data rates. This is compounded by the fact the occupied bandwidth restrictions force the use of lower than optimum deviation when higher data rates are utilized. If transmitter power is fixed by constraints such as regulations, cost, or battery life, this decrease in sensitivity translates directly into a decrease in system range.

(2) The twenty-five kilohertz channel spacing requirement has resulted in the use of narrow band IF filters in the receiver. These filters tend to provide amplitude roll-off of high frequency components in the recovered data. Furthermore, cost considerations have not allowed the use of filters with linear passband phase characteristics, and this results in delay distortion (jitter) in the recovered data. These effects are most pronounced for data signals with frequency components above three kilohertz.

(3) Changes in ambient temperature cause changes in the transmitter and receiver local oscillator frequencies. This tends to be least detrimental when a base and remote unit are at about the same temperature, and to be most detrimental when they are at opposite temperature extremes. Also, repeated temperature cycling causes aging or long-term drift in the crystal frequency control elements over time. These two effects result in skewing of the received signal so that it is no longer centered in the IF filter, compounding the effects cited in the preceding paragraph (2).

(4) Because the system under discussion here is intended for use within single buildings or complexes of buildings, propagation anomalies such as shadow fading and Rayleigh fading are troublesome. These effects are generally worse for higher data rates both because of the shorter bit intervals involved (shorter integration time in the data recovery process) and because of the sensitivity degradation noted in the preceding paragraph (1).

Because of the difficulties just noted, it is not possible to provide adequate system performance under all conditions in the intended applications at a relatively high data rate such as ten thousand baud. The use of a lower data rate such as 4800 baud provides improvements in system range and reliability even in comparison to a data rate of seven thousand baud. Field experience has proved that 4800 bits per second data rate is an excellent compromise for systems that employ limited numbers of remote units, and can tolerate the lower throughput rate. Switching the data rate between 4800 baud and 9600 baud instead of between 4800 baud and 10,000 baud, for example, is preferred because of lower cost.

Since some transceiver module designs that may be utilized in FIG. 35 do not have RSSI capabilities, it may be preferred to use the RSSI measurement as an optional or secondary indicator, the system still being effective in the absence of component 2270, FIG. 35, but with slightly lower throughput efficiency. Where the RSSI measurement is utilized, it is considered desirable to sample the output of component 2270 three to five times during a poll interval to gain an accurate indication of signal strength, e.g. to take account of signal fading effects. For initial message transmission, the default data rate to be used may be 9600 baud, unless the RSSI measurement indicates weak signal conditions. Thereafter, 9600 baud will continue to be used until low signal strength is detected, or a communication failure occurs. On failure, the system will revert to 4800 baud message transmission until a retry algorithm initiates another 9600 baud attempt.

The decision to retry the high data rate may be based on a number of factors in the embodiment of FIG. 35. If poor signal strength indication at component 2270 dictates 4800 baud operation, then 9600 baud operation can be attempted as soon as signal strength improvement is noted. If 4800 baud was utilized because of 9600 baud communication failure, several factors can be considered in determining when to attempt 9600 baud operation again. These factors include:

(1) Elapsed time since the last 9600 baud attempt. Since remote units are generally hand held or mobile, factors which force the lower data rate are subject to change as the remote nits are moved to different locations.

(2) Monitoring of 9600 baud transmissions from the base to other remote units. These transmissions can be used as test patterns to determine if 9600 baud transmissions can be received without errors.

(3) System traffic. If the system is lightly loaded, more frequent attempts at re-establishing 9600 baud communications can be made without introducing unacceptable degradations in system response time. In the sequential polled protocol loading can be determined by measuring the elapsed time between successive polls of a particular address. In the contention protocol, loading can be ascertained by monitoring the number of empty time slots (i.e. time slots in which no response message occurs).

(4) Number of message transmissions since the last 9600 baud attempt. That is, the algorithm may cause a retry of 9600 baud operation every fifth, or tenth or twentieth transmission.

(5) Internal temperature of the base and/or remote unit.

Since many of the skewing effects of the IF filters are temperature related, continued temperature extremes (high temperature differential between base and mobile unit) could indicate less frequent retries at 9600 baud should be attempted. Temperature information is available in the remote units for use in other circuits, and can be utilized without introducing additional cost for the unit.

It is known in the art to utilize FM data equipment wherein one of several data rates may be selected by the system user at the time of system installation based upon propagation conditions of the particular installation. A significant disadvantage of the user-switchable approach results from the fact that in many mobile installations propagation conditions are not static, but are subject to dramatic change in the course of short periods of time. This is the case normally in systems utilizing mobile or portable devices. The key characteristics of the approach of the present disclosure, on the other hand, are:

(1) Dynamic adaptive data rate selection takes place automatically to increase data transmission efficiency and reliability where communication may be required under relatively strong and relatively weak signal conditions, and where propagation conditions may change rapidly.

(2) Handshaking between devices may be used to initiate a communications session and to establish the data rate for that session.

(3) Signal quality measurements for determining automatic switching may be based both on direct measurements of signal quality as represented at 2271 in FIG. 35, and also on indirect measurements such as represented by the received signal strength indicator component 2270, FIG. 35. Additional parameters may be readily introduced by programming.

(4) As shown in FIG. 35, performance characteristics of the baseband signal processing apparatus may be adapted to optimize the devices for communication using the respective different data rates.

(5) As shown in FIG. 35, a preferred approach may involve pre-modulation and post-demodulation signal processing operations only so that it is particularly cost effective to implement.

Discussion of the Use of a Test Pattern to Evaluate Susceptibility to Jitter

The signal quality indicator 2271, FIG. 35, may detect jitter in, the recovered data by multiple sampling of the recovered digital data stream e.g. from a test pattern at a rate of ten or more samples per bit to determine the extent to which the intervals between bit transitions differ from the nominal intervals for 9600 baud transmission. A disadvantage of this approach is that it is beyond the capabilities of the serial communications controller which is preferably utilized in post-processing section 2249 and in the associated digital pre-processing component 2232 of each transceiver. It can be implemented by providing the recovered data directly to the microcomputer of controller 2251. For a presently available low cost microcomputer, this prevents the microcomputer from handling other tasks during the evaluation of the received test pattern. In this implementation, the test pattern can be relatively short, for example thirty-two bits.

A jitter characterization approach as already described with reference to component 2271, FIG. 35, transmits a "worst case" data sequence which is specially selected to have a high susceptibility to noise and distortion. If the serial communications controller (SCC) is able to decode the sequence, 9600 baud transmission is automatically selected. If it fails to decode the sequence, 4800 baud transmission is automatically used. The advantage of this jitter characterization approach is that it does not require the use of the microcomputer of the communications controller component. Using this approach requires a longer test pattern, perhaps several hundred bits.

Explanation of the General Concept of Handshaking and its Application to Data Rate Selection According to the Present Invention The following generalized example explains how data rate selection may take place as between units which utilize a hand-shaking mode of communication. This example illustrates the application of the teachings of the foregoing embodiments without reference to the particular protocols of FIGS. 18 and 21.

GENERALIZED EXAMPLE

Protocol Independent

Consider a radio system that consists of several unit, each with a unique address.

1) In the simplest case, the system may consist of two units, #1 and #2, one or both of which are mobile.

2) In a standby mode of operation both units program their receivers to receive at the low data rate.

3) When a unit has information to communicate, it switches to transmit at the standard rate, and sends a query to the other (target) unit. Following this transmission, the unit switches to once again receive at the standard rate.

4) If the target unit for some reason (e.g. out of range) does not correctly receive the query it makes no response. After a time out period, the initiating unit may periodically attempt to re-establish the link.

5) If the target unit correctly receives the transmission it performs an analysis to determine the quality of the radio link (propagation path and radio hardware). This may involve combinations of signal strength measurement, jitter in the received data, or use of information communicated in the transmission. A transmission which is to be evaluated as an aid to deciding on a dynamic basis whether a high data rate is feasible is herein termed a "test signal" or "test transmission." Based upon the results of the analysis, the unit determines whether to utilize the standard data rate or a higher rate for a subsequent communications session between the two units.

6) The target unit completes the handshake by switching to transmit at the standard rate and communicates its data rate selection to the initiating unit. It then switches to receive at either the standard or higher data rate depending on which it has selected.

7) The initiating unit, upon receipt of the return handshake, switches to transmit its message at the selected data rate.

8) Upon receipt of an end of message indication from the initiating unit, the target unit, switches to transmit at the selected rate, and sends a response or acknowledgement to the initiating unit.

9) If the high rate has been selected, and for some reason signal propagation conditions change during the communications session such that communication at the high rate becomes impossible, the units would after a timeout period attempt to re-establish the session at the standard data rate.

It will be apparent that many further modifications and variations may be effected without departing from the scope of the teachings and concepts of the present invention.

Description of FIGS. 36-39

In the protocol of FIG. 21, the base station and mobile terminals were only capable of single data rate operation at a limited normal data rate. Such a limited normal data rate was selected so that reliable communication could take place over the entire geographical operating range of the mobile transceiver units. Such a normal data rate is selected taking account that the mobile transceiver units may operate not only at close range where receive signals are strong, but also in fringe areas where received signals are extremely weak. Furthermore, the mobile units may operate under extreme conditions of temperature in comparison with the temperature of the base transceiver station.

FIGS. 36 to 39 illustrate enhanced protocol systems suitable for upgrading a system such as illustrated in FIG. 21 for increased data throughput without requiring the upgrading of firmware in the large population of terminals designed for single data rate operation at the normal data rate. The approach of FIGS. 36 to 39 achieves an advantageous simplicity in operation of the data collection system in spite of the presence of such single data rate mobile terminal units.

In the embodiments of FIGS. 36 to 39, the base/controller station dynamically adjusts the number of slots associated with a low data rate poll based upon channel traffic at the low data rate, and dynamically adjusts the number of slots associated with a higher data rate poll based on channel traffic at the higher data rate. A terminal capable of high data rate operation for which the base station has an (outbound) message may be initially identified as part of a multi-terminal poll (MTP) having the high data rate if such high rate was currently being used by such terminal. However, because of the possible rapid variation in operating conditions for each terminal during its movement at varying distances from the base transceiver station, if the base does not receive a response from such a terminal at the high data rate, the base may send the address of such a station as part of further multi-terminal polls at the normal data rate as well as at the high data rate. A terminal having multiple data rate capabilities, with a need to transmit an inbound message, will monitor the higher data rate poll and if such higher data rate poll is successfully received, the received signal will be evaluated e.g. taking account of received signal strength and potential rapid signal fading effects, so as to determine whether transmission should be attempted at the high data rate.

As explained in relation to FIG. 35, the contention polling signal at the higher, data rate may have its received signal strength measured at 2270, FIG. 35, the RSSI output being sampled several times during receipt, and evaluated according to a weighted average value, the weighting function giving emphasis to the lower signal strengths measured, since the average strength of a fading signal tends to approximate its peak value. The indicator 2271 may be utilized to measure jitter due to noise and distortion in the radio link as described with reference to FIG. 35. Further, temperature measurements at the base transceiver unit and at the mobile terminal unit may be compared utilizing temperature sensors such as 2073A and 2083A as described in reference to FIG. 22.

Figure 36:
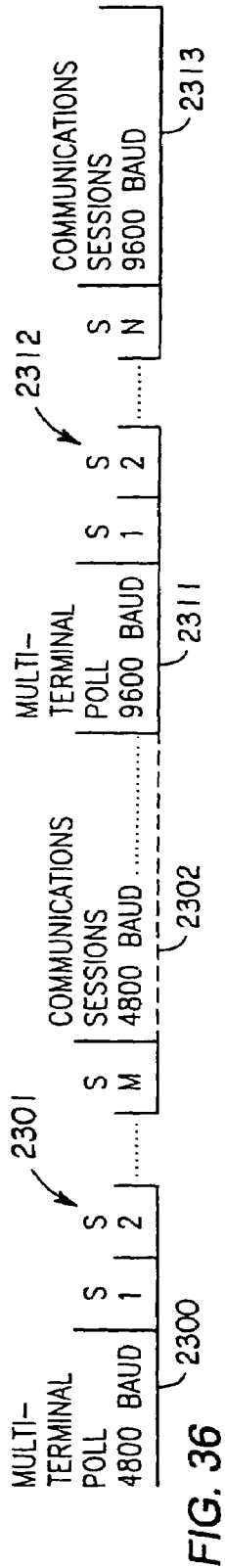
FIGS. 36-39 are diagrams illustrating preferred modes of operating a system utilizing both a limited normal data rate (e.g. 4800 baud) and a higher data rate (e.g. 9600 baud), FIG. 36 showing a general case of M low data rate response slots and of N high data rate response slots, N and M being independently controlled for optimum throughput.

At the conclusion of contention polling at the low date rate, the base station establishes communications sessions with those mobile units that were successfully identified within the allocated number of response slots associated with such low data rate poll. Such communications sessions are established by polling the respective terminal by means of its unique address, receiving the terminal response, and the base transmitting an acknowledgement for each respective terminal. The combination of the multi-terminal contention poll and resulting communication sessions comprises one variable length low data rate communications frame. Such a variable length communications frame is represented in FIG. 36 as comprising a low data rate (e.g. 4800 baud) multi-terminal poll during interval 2300, followed by a selected number of response slots S1, S2, . . . , SM. The response time interval 2301 represented by the total duration of the M slots is then indicated as being followed by a low data rate (e.g. 4800 baud) communications session during an interval 2302.

In FIG. 36, the variable length low data rate communications frame 2300-2302, is followed by a high data rate variable length communications frame including a high data rate (e.g. 9600 baud) multi-terminal poll at 2311, a selected number of response slots S1, S2, . . . , SN (where N would generally be a different number than M), covering a response time interval 2312, and followed by a high data rate communications session with successfully responding mobile terminal units as indicated at 2313.

Figure 37:
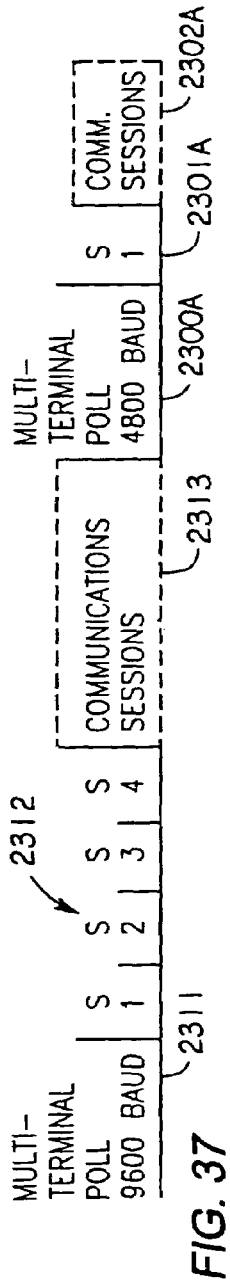

FIG. 37 illustrates a specific example in accordance with FIG. 36 where the low data rate and high data rate communications frames alternate, FIG. 37 showing four response slots following a high data rate multi-terminal poll interval 2311 (N equals four), and one response slot following the low data rate multi-terminal poll at interval 2300.

In the embodiments of FIGS. 36 and 37, the base/controller station transmits multi-terminal polls alternately at the low and high data rates, and the individual mobile terminal units will selectively respond to the contention poll which provides the optimum data rate for the channel characteristics in their respective current locations. Such response will establish the data rate for the subsequent communication session between the base and a successfully responding mobile terminal unit.

The data rate determination can conceivably be made using any or all of the means described with reference to FIGS. 22 through 35. A simple approach is to (a) require the mobile terminal units to successfully decode the high data rate poll and (b) require the RSSI output to indicate a received signal level providing sufficient fade margin (e.g. twenty decibels higher than the high data rate sensitivity threshold of the terminal base) in order to use the high rate. The high data rate sensitivity threshold is taken with reference to the maximum acceptable bit error rate (BER) for the given application (e.g. a nominal 10–6, i.e. ten to the minus six power, or one in one million, BER sensitivity at the high data rate), the RSSI threshold being selected so as to result in some small number of re-transmissions due to fading effects and other channel disturbances. As previously explained, the RSSI measurement is to be weighted so as to take account of the rapid fading effects which can be expected when the mobile transceiver units are in continuous or frequent motion at various distances from the base transceiver station. Such rapid fading effects are to be contrasted with slow fading effects which might be experienced between stationary transceivers in an office building due to the movement of people, mail carts, and the like. In a typical application of the present invention, the RF transceiver of a mobile unit may be secured with a bar code scanner such as a deflected laser beam bar code scanner or an instant type CCD bar code scanner. In such an example, the bar code data could be transmitted to the base station as the RF transceiver and a scanner device were being jointly transported by a vehicle (e.g. a forklift truck) to another site, or the RF transceiver and a scanner e.g. as a unitary hand-held device, could be carried by the operator to another site as the bar code data was being transmitted to the base station. Because of the possible continuous or frequent movement of the mobile transceiver units within a factory or warehouse environment or in outdoor environments, the successful reception of a high data rate polling signal alone generally should not be relied upon in evaluating whether communication should be carried out at the high data rate. The probable feasibility of communication at the high data rate, (with the goal of higher data throughput in the system), must also take account of the possible motion of the mobile transceiver unit and the consequent possibility of fast fading (rapid fluctuations in signal level due to multi-path effects) during the course of a message transmission (e.g. of collected bar code data). Thus, the purpose of using a signal quality indication, for example the RSSI measurement of component 2270, FIG. 35, or the jitter characterization as represented at 2271, FIG. 35, is to ascertain whether there is likely to be sufficient margin against fading (or other channel disturbance such as impulsive noise due to electrical machinery) during the course of the transmission.

By way of example, empirical data shows that twenty decibels of signal margin relative to the nominal 10–6 (ten to the minus six power, or one in one million) BER sensitivity threshold at the high data rate, provides protection against about ninety percent of the fades encountered in fringe areas in a typical industrial environment, while fifteen decibels of signal margin provides protection against seventy percent of such fades. Thus, for example, the RSSI threshold for determining whether to transmit at the high or low rate is established at some level above the minimum level at which reliable communication is usually possible at the higher data rate. If the threshold is set too high, a significant number of transmissions which could have been made at the high rate will be made at the low rate, reducing throughput. If the threshold is set too low, fading will result in a significant number of re-transmissions, which will also reduce throughput. An optimum RSSI threshold at twenty decibels above the nominal 10–6 BER sensitivity at the high data rate will result in some small number of re-transmissions due to channel disturbances, but generally will provide an optimum data throughput for the overall system.

In the generalized case, the unit completing the handshake transmission (e.g. the unit making the response to a multi-terminal contention poll) makes the rate switching decision. In the embodiment of FIGS. 36 and 37, the rate switching decision is to be made by the mobile terminal unit. A decision in both the base station and the mobile transceiver unit might be desirable if the channel were not symmetric, for example if the base station had significantly higher power output than the mobile unit. The approach of having the mobile transceiver units equipped with sufficient intelligence to distribute to them the data rate switching rate decision, results in fewer transmissions required to dynamically adapt data rate in a rapidly changing propagation environment. The system as represented in FIGS. 36 and 37 in this respect is particularly adapted to the data collection environment wherein the mobile transceiver units may be in continuous or frequent motion with consequent rapid variations in signal strength, frequent operation in fringe conditions, and environmental extremes (e.g. of temperature as between a mobile unit and base station) degrading hardware performance.

In the simple example where data rate determination is based on the successful decoding of the high data rate poll and an adequate RSSI output evaluated to take account of rapid signal fading effects, the poll at 2311 itself actually functions as a test pattern, and the occurrence of any bit errors in the decoding of the high data poll indicates the use of the low rate. The system of FIGS. 36 and 37 may make use of jitter characterization, e.g. based on the stability of recovered data clock during the received polling signal itself. As a fail-safe measure, excessive failures at accessing the base station through response to the multi-terminal poll, or errant message transmission attempts at the high data rate will result in the mobile terminals selecting the low data rate, with periodic retries at the higher rate, e.g. based on the various criteria described with respect FIGS. 22 through 35.

Internal temperature information can be used in conjunction with a stored table containing typical oscillator frequency offsets as a function of temperature. The combination use of the fail-safe mode (good signal strength, but poor communications), and operation at a temperature where large oscillator frequent offsets can typically be expected, will dictate less frequent retry attempts until temperature measurements indicate that the frequency offset is most likely reduced.

The ability of the base station according to FIGS. 36 and 37 to independently adjust the number of slots for the low data rate frames and for the high data rate frames according to the recent traffic at the respective data rate, preserves the throughput advantage of dual or multiple data rate operation by minimizing system overhead.

The example of FIG. 37 where four slots are allocated to high data rate communications (e.g. 9600 baud), and one slot is allocated to low data rate communications (e.g. 4800 baud) may result where the majority of traffic had been occurring at the higher data rate, with perhaps only occasional transmissions at the lower rate.

Figure 38:
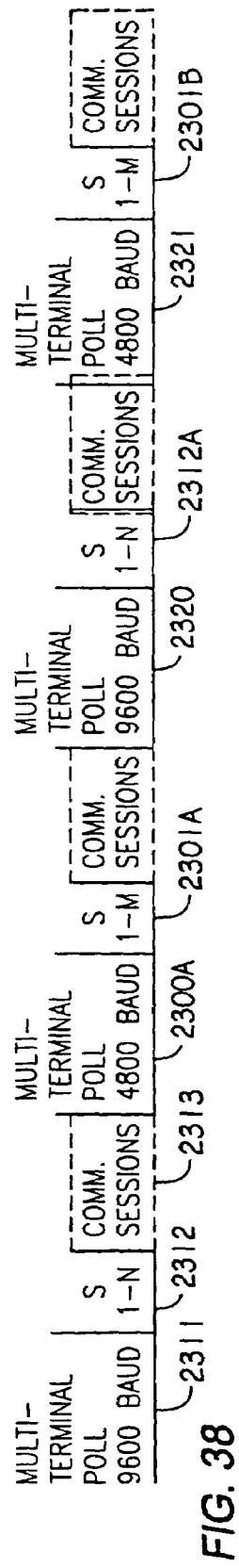

FIG. 38 shows switching alternately between the high and low data rate frames, with the values of N and M varying in accordance with the numbers of responses to the respective high data rate and low data rate polls. For example, if a number of full slots and collisions between responding mobile stations occurs with a value of N of four as in FIG. 37, a succeeding high data rate frame such as indicated at 2320 in FIG. 38 may take place with an increased number of slots, e.g. five slots (N equals five) or more at 2312-A, FIG. 38. Similarly if collisions occurred at the single slot at interval 2301A in response to the low data rate poll, then the number of slots at a subsequent communications frame 2321 might be increased to two (M equals two) or more during the response intervals 2301B, FIG. 38.

Figure 39:
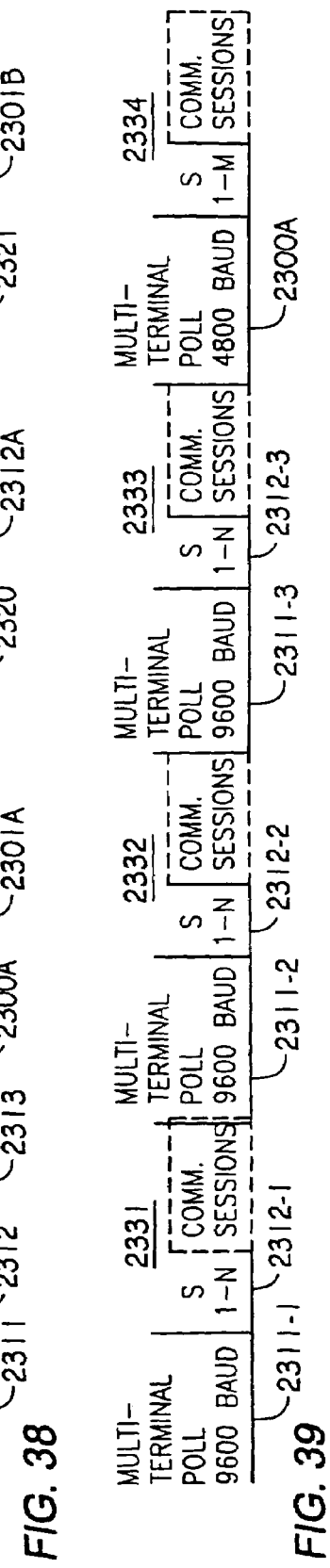

FIG. 39 shows a different switching implementation which more heavily favors one rate (in this case a high data rate of 9600 baud) or the other. This could be the case when no active terminals are communicating at one of the two rates, and only periodic transmissions at the unused rate are necessary to provide access for terminals which might have been out of range of the base or powered off. Thus in FIG. 39, three successive high data rate communications frames 2331, 2332, 2333, alternate with a single low data rate communication frame 2334. As before, the successive multi-terminal contention polls may be at a data rate of 9600 baud as indicated at 2311-1, 2311-2 and 2311-3, and the number of response slots at 2312-1, 2312-2 and 2312-3 may be varied in successive frames and in successive cycles of high data rate and low data frames to dynamically adapt the system to the instantaneous loading conditions at the respective data rates.

Figure 40:
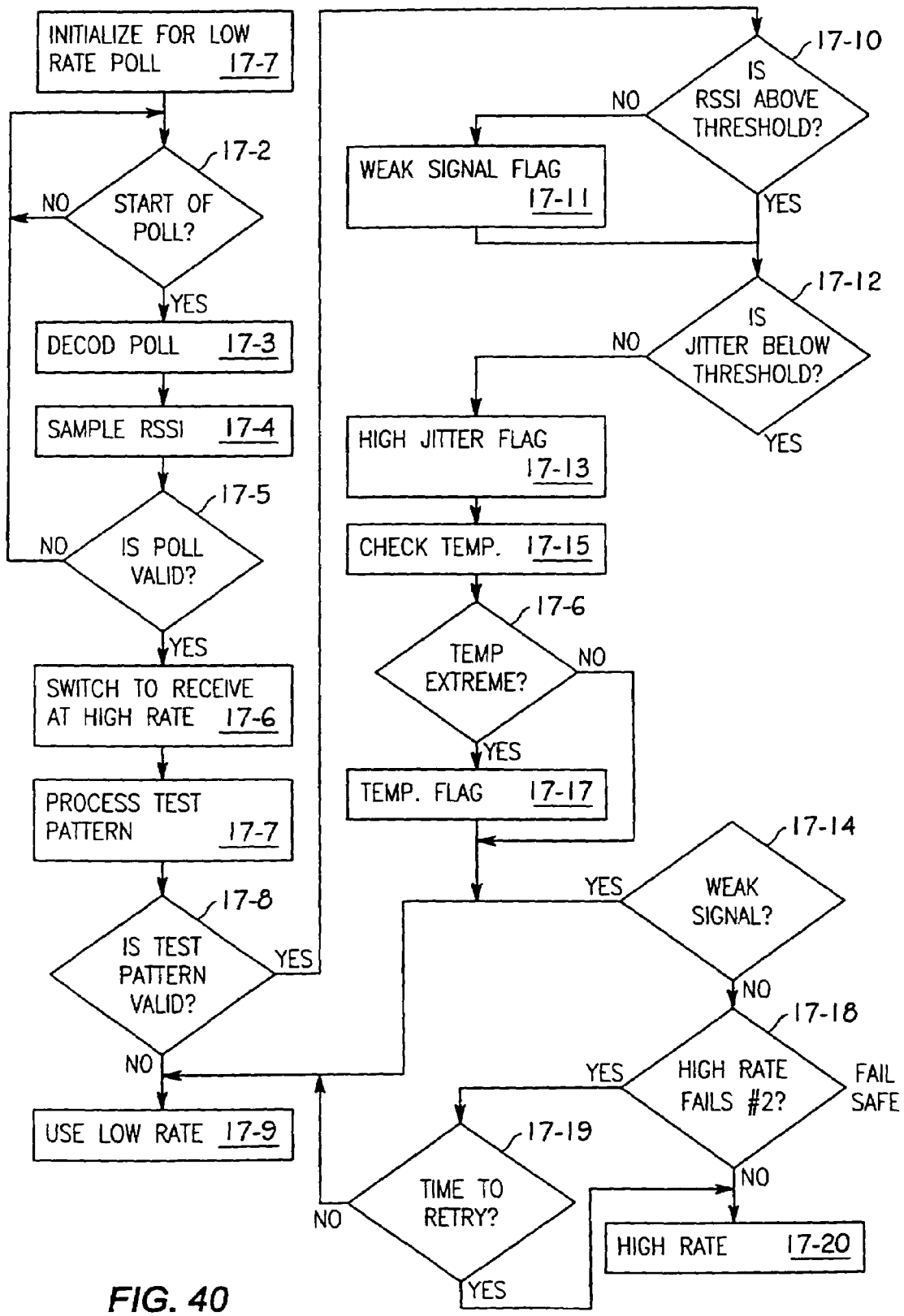
FIG. 40 is a flow diagram giving exemplary steps which are particularly applicable to the embodiment of FIG. 34, but which are also generally applicable with modifications to various of the other embodiments.

Description of FIG. 40

For each of the preceding embodiments, operation may be carried out at the mobile transceiver units generally as represented in FIG. 40. In this sequence of operation, the base station issues a poll at the lower data rate which is followed by a test pattern at the higher data rate. For FIGS. 36-39, the high data rate contention poll at 3311 or 3311-1 constitute the test signal.

The mobile transceiver units initialize for reception of the low data rate poll as indicated at 17-1 and wait for the start of the poll as indicated at 17-2. When the poll is received, it is decoded as indicated at 17-3 and the RSSI reading is sampled as indicated in 17-4. If the evaluation of the poll as indicated at 17-5 is favorable, the mobile unit switches to receive a test pattern at the high data rate as indicated at 17-6 and processes the high data rate test pattern as indicated at 17-7.

Referring to the embodiment of FIGS. 36-39, each time the multiple rate mobile units are reset by the base, the mobile transceivers may be placed in low date rate receiving condition, whereupon the base station sends a low data rate poll e.g. at 2300, FIG. 36. When a valid low data rate poll with characteristics (e.g. sampled and properly weighted signal strength) favorable to the use of the high data rate for the transmission of collected data, has been received by a given multiple rate mobile unit, the transceiver of such mobile unit is switched to receive a high rate contention poll signal as at 311, FIGS. 36-38, or as at 2311-1, FIG. 39. The steps following step 17-7 in FIG. 40 would then involve evaluation of such high data rate contention poll for validity and evaluation of the characteristics of the received high data rate contention poll (e.g. with respect to received signal strength and/or jitter as described with reference to FIGS. 36-38).

If the decision concerning the test pattern (e.g. as represented at 2210, FIG. 34) or concerning the high data rate contention poll of FIGS. 36-39, as represented by block 17-8 in FIG. 40, is negative, then the mobile transceiver unit may respond selecting the low data rate for transmission of its data (as with mobile unit #0 in FIG. 34) or the mobile transceiver unit may await a low data rate poll (as at 2300A, FIGS. 37-39).

Where a mobile unit selects a low date rate and successfully responds, a specific poll addressed to the mobile unit will then be at the low data rate as represented by "poll #0" in FIG. 34, and the data then transmitted to the base will be sent at the low data rate as shown in FIG. 34, and as represented by block 17-9, FIG. 40.

If the decision at 17-8 favors the high data rate, then the weighted evaluation of the RSSI samples may take place as indicated at 17-10, a flag being set as indicated at 17-11 where the evaluation indicates marginal transmission conditions.

At 17-12, jitter is evaluated and for the case of excessive jitter, a high jitter flag is set as indicated at 17-13. Where jitter is acceptable, but the weak signal flag is set, the decision at 17-14 leads to use of the low data rate as indicated at 17-9.

For the case of high jitter at 17-13, the temperature values are checked as indicated at 17-15 and a temperature decision is made at 17-16. For example, if the mobile unit is at an extreme temperature this may result in a setting of a temperature flag as indicated at 17-17. On the other hand, the base station may transmit its temperature condition to the mobile units so that the mobile units can determine the actual temperature differential between the respective mobile unit and the base station and set the flag at 17-17 accordingly. In any event, the high jitter condition results in a return to the low data rate as indicated at 17-9.

Where jitter is below a threshold and signal strength is adequate, the mobile unit may evaluate whether there has been a high rate of failures, and for example if there have been a given number of such failures (e.g. two or e.g. two out of three attempts), then control may pass to a decision block 17-19 which may normally determine for the low rate unless under the present circumstances of temperature or elapsed time or the like it is determined that it is time to retry at the high rate. The decision block 17-18 together with the block 17-19 then safe guards against a circumstance where the mobile unit might otherwise continue to try the high data rate in spite of repeated failures. The retry criteria may be as previously described with respect to FIGS. 6 through 12. If the decision is to attempt response at the high rate as indicated at 17-20, the mobile unit may respond in a randomly selected time slot with a response (e.g. at the low data rate) signifying that further communication is to take place during individual polling of the identified mobile unit at the high data rate for example as represented with respect to mobile unit number two in FIG. 34.

For the embodiments of FIGS. 36-39, where the high data rate contention poll (e.g. at 2311) is treated as a high data rate test signal for processing as at 17-7 in FIG. 40, the decision process at 17-8 et seq. in FIG. 40 may proceed concurrently with the random selection of a response slot and switching to high data rate transmit mode, so that if the mobile unit is to respond to the high data rate contention poll, such response can take place at any of slots S1, S2, S3, or S4, for example, during interval 2312, FIG. 37. Of course, for the case where the switching to the high data transmit mode is only made at 17-20, the interval between the contention poll and the first response slot will provide for maximum processing time and the required switching time.

With respect to decision block 17-19, as a simple example, in the fail-safe condition, the mobile unit might continue to respond at the lower rate for some number of polls (such as five) before attempting to try the high rate response procedure at 17-20.

The flags for different failure mechanisms are only included in the example of FIG. 40 so that some history can be maintained for use in making retry decisions (if a more complex retry algorithm is desired). The flags can be omitted in which case the "No" output of the RSSI threshold decision 17-10 can go directly to the low rate block 17-9 and the decision block 17-14 and the temperature processing blocks 17-15, 17-16 and 17-17 can be omitted since they are superfluous if jitter is acceptable. The "No" output of block 17-12 would lead to low data rate block 17-9 where the flags are omitted.

Many modification and variations will be apparent from the foregoing disclosure. For example, the base station could have provision for parallel baseband processing of received and demodulated signals, e.g. the demodulated signal being supplied in parallel to a 4800 baud analog processor and to a 9600 baud analog processor. The baseband digital processing section would include a 4800 baud receive buffer and a 9600 baud receive buffer so that the base station could receive either a 4800 baud or a 9600 baud signal whenever the base station was in receive mode. Then for the embodiment of FIGS. 34 and 40, for example, the various mobile units with data messages to send could all send the same type of response signal (i.e. their respective addresses but without specifying a data rate selection) in randomly selected time slots pursuant to an affirmative decision at 17-5. The further steps of FIG. 40 would then determine whether to respond to a specific poll addressed to the respective mobile unit, using a high data rate or a low data rate for the transmission e.g. of collected scanner data. Such specifically addressed polls of individual mobile units could all be sent by the base station at the low data rate. If a given mobile unit sent its data message at the high data rate, the base. high date rate receive buffer would automatically receive the data and transfer it for processing. The base station would not need to be informed in advance of the date rate decision made by the mobile unit e.g. pursuant to FIG. 40.

Many other and further modifications and variations may be made without departing from the broader teachings and concepts of the present invention.

Supplemental Discussion

For a protocol such as shown in FIG. 21, a contention polling message is transmitted having a fifteen millisecond header, a start of message block, a code identifying the message as a multi-terminal poll, a block specifying the number of time slots which may be selected for response, a block identifying the addresses of mobile units for which the base station has a message, a cyclic redundancy check character, and an end of message character. The same format may be used for a high data rate contention poll, the header then containing seventy-five bits at a data rate of 9600 baud (instead of 37.5 bits at 4800 baud).

In a base initiated reset, the base station would transmit a low data rate reset message and would allocate a large number of response slots to allow responses by all mobile units. The base station could send a low data rate contention poll with a large number of response slots several times in succession, and the mobile units could randomly determine which contention poll to respond to, as well as randomly determining which of the large number of time slots to respond in. If for example, after a base initiated reset, a multiple data rate mobile unit had scanner data to transmit, such mobile unit could await a test signal, e.g. as at 2311, FIGS. 36, 37, or 38, or 2311-1, FIG. 39. If a determination was made that high data rate transmission of the collected data should be attempted, the mobile unit could proceed as herein described for the respective embodiments of FIGS. 36-39. Once having selected high data rate operation, a mobile unit could continue to monitor high data rate contention polls for the examples of FIGS. 36-39. Thus if the base station dynamically varied the proportion of high data rate and low data rate polls as in the embodiment of FIG. 39, it would not be necessary to advise the mobile units of the changes in the pattern. The mobile units could be programmed to switch to low data rate operation whenever a failure of communication occurred at the high date rate, but otherwise to remain in high data rate mode e.g. for a suitable time e.g. five seconds. By switching to low data rate mode after five seconds, the mobile unit would be assured of being notified of a pending message from the base station even if the base station was supplying high data rate contention polls very infrequently or not at all because of very light high data rate traffic. A mobile unit could be programmed to send its data message at the low data rate, e.g. if it waited for a specified time such as five seconds, and failed to receive a high data rate contention poll within such specified time interval.

Example of Dynamic Selection of Number of Response Slots

For the case of contention polling as in the various embodiments including FIG. 21 herein, the base station may dynamically vary the number of response time slots (such as 2041-2044, FIG. 21) according to traffic at a fixed data rate, or may dynamically vary the respective numbers of slots associated with respective different data rate contention polls (e.g. as in FIGS. 36-39).

For each data rate, a number of response slots for each contention poll may be set in order to force the ratio between the number of empty response slots (wherein no mobile unit responses are received) and all other slots (ones with successful responses or collisions) to tend toward eighty percent (80%).

If the ratio computed for twenty successive slots is between sixty percent (60%) and seventy percent (70%), then the base controller would add one additional slot (e.g. a fifth slot in FIG. 21) for the next transmission of the contention poll.

Figure 5:
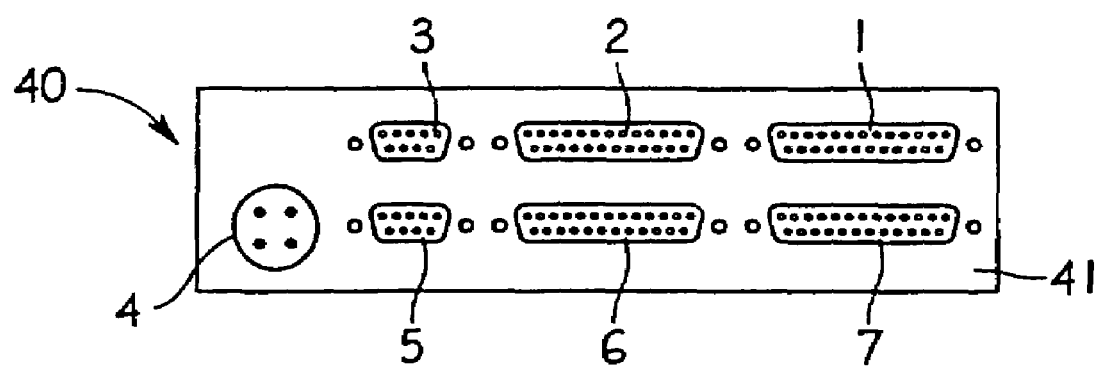
FIG. 5 is a rear elevation view of the invention.

If the ratio computed for ten successive slots is less than sixty percent (60%), then the controller would add two additional slots (e.g. fifth and sixth slots in FIG. 21) so that the next contention poll from the base would specify the previous number of slots increased by two (e.g. six slots in FIG. 5).

If the ratio computed for thirty successive slots was over ninety percent (90%), the base controller would reduce the number of slots by one (e.g. to three in FIG. 21).

Finally, if no empty slots were observed over seven successive slots (ratio equals zero), the base controller would switch to a serial poll protocol where each mobile unit is polled in sequence, or for the example of FIG. 39, if feasible, change the proportion of low data rate and high date rate polling communications frames.

The foregoing example demonstrates several advantages of dynamic adaptive control of number of response slots, or more generally of response time intervals following a contention poll. First, when little traffic is present, few response slots are allocated. This reduces to a minimum the amount of system overhead required and therefore the response time is kept to a minimum for mobile terminals needing the channel.

Second, the rate at which slots are added and removed can be tailored to handle burst traffic loading without causing the system to overload. Third, the protocol can be changed, if required, to support high system loading.

Description of FIGS. 41A-41H and 42A-42E

FIGS. 41A-41H and 42A-42E show exemplary circuitry for an analog interface board for a mobile transceiver unit such as indicated at 2082, FIG. 22, or at 2220, 2221, FIG. 35.

Figure 41A:
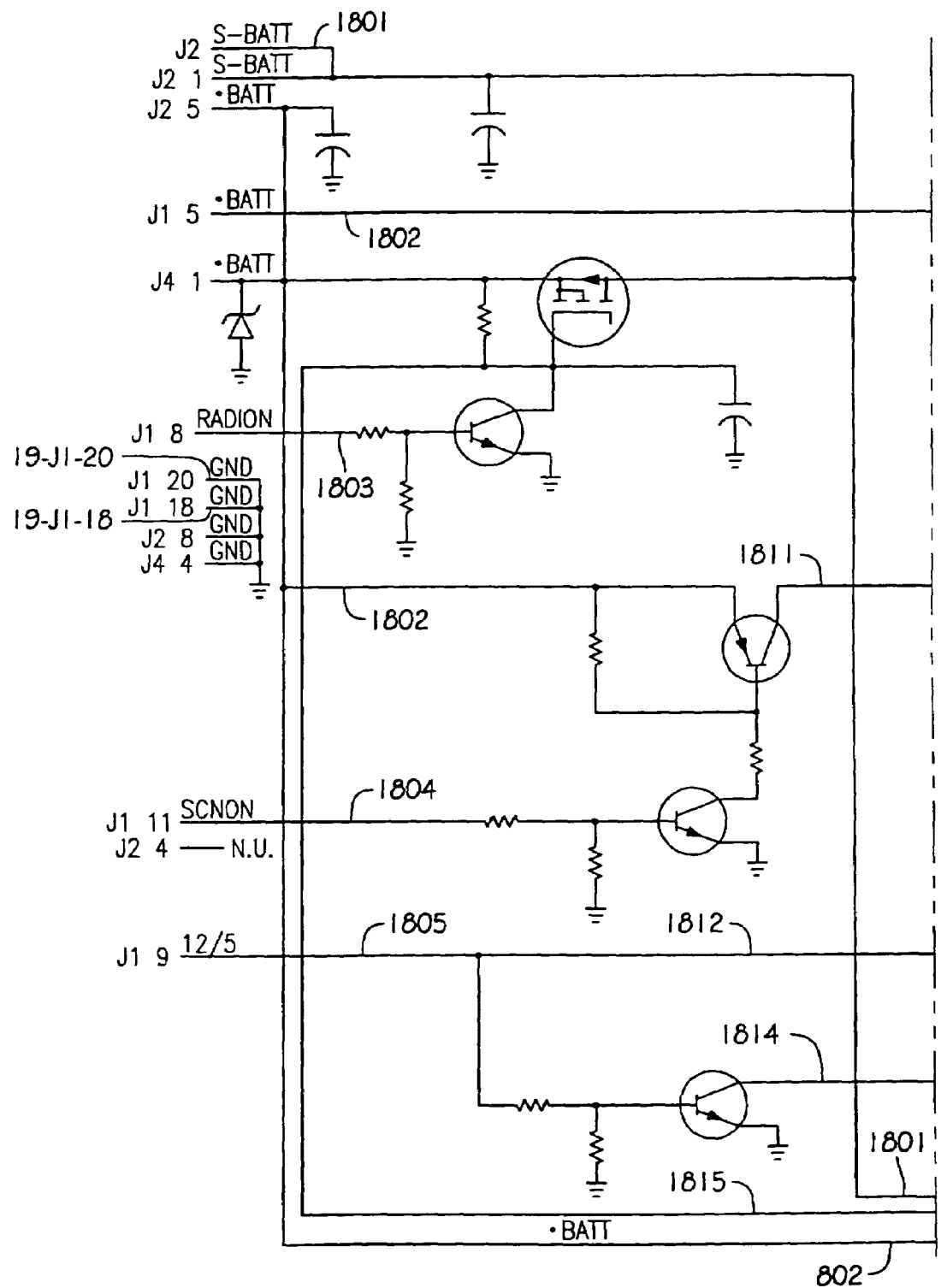
FIG. 41A-41H and 42A-42E show an exemplary analog interface circuit for use with the RT3210 mobile terminal unit shown in APPENDIX D2.
Figure 41B:
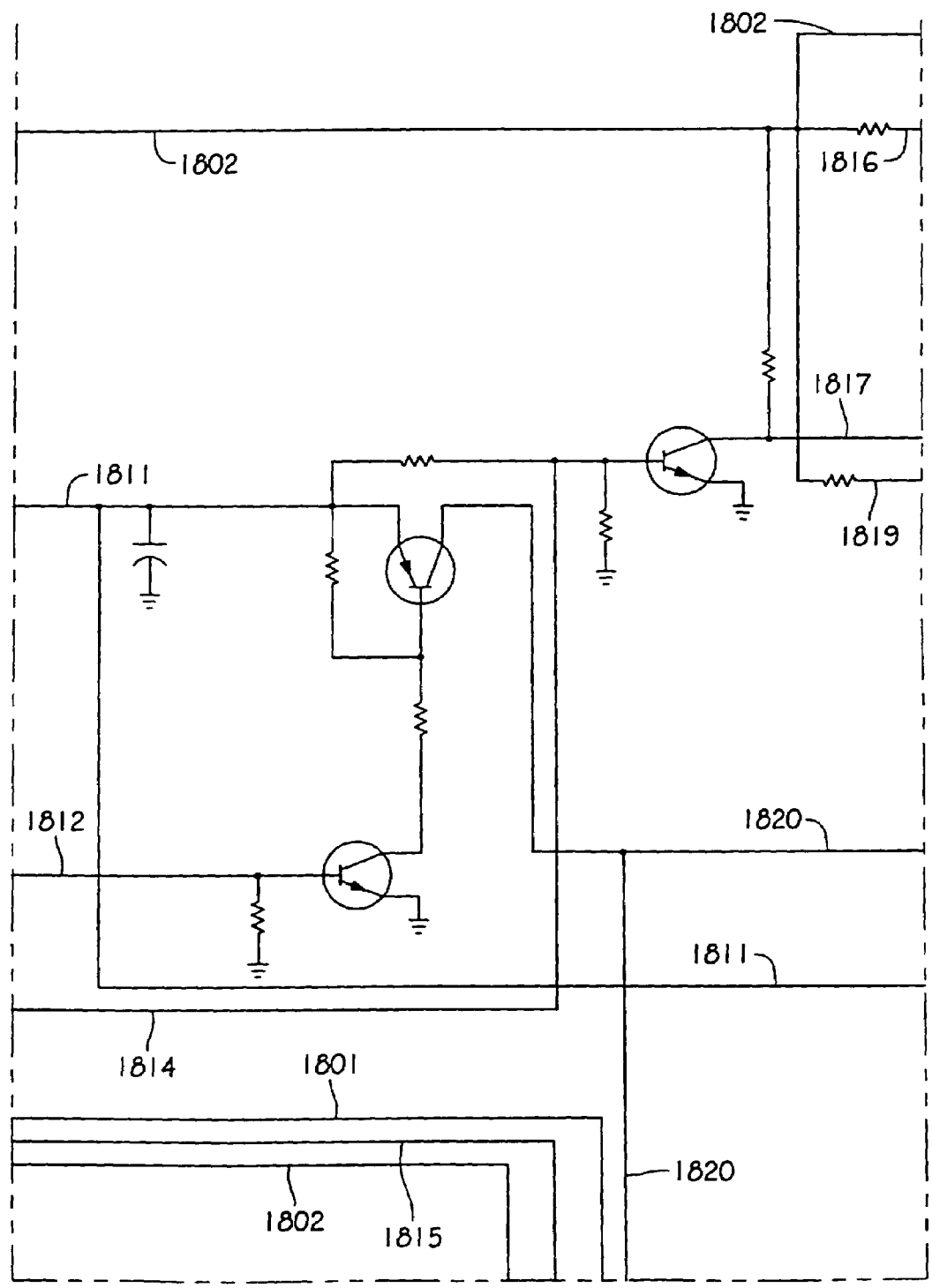
Figure 41C:
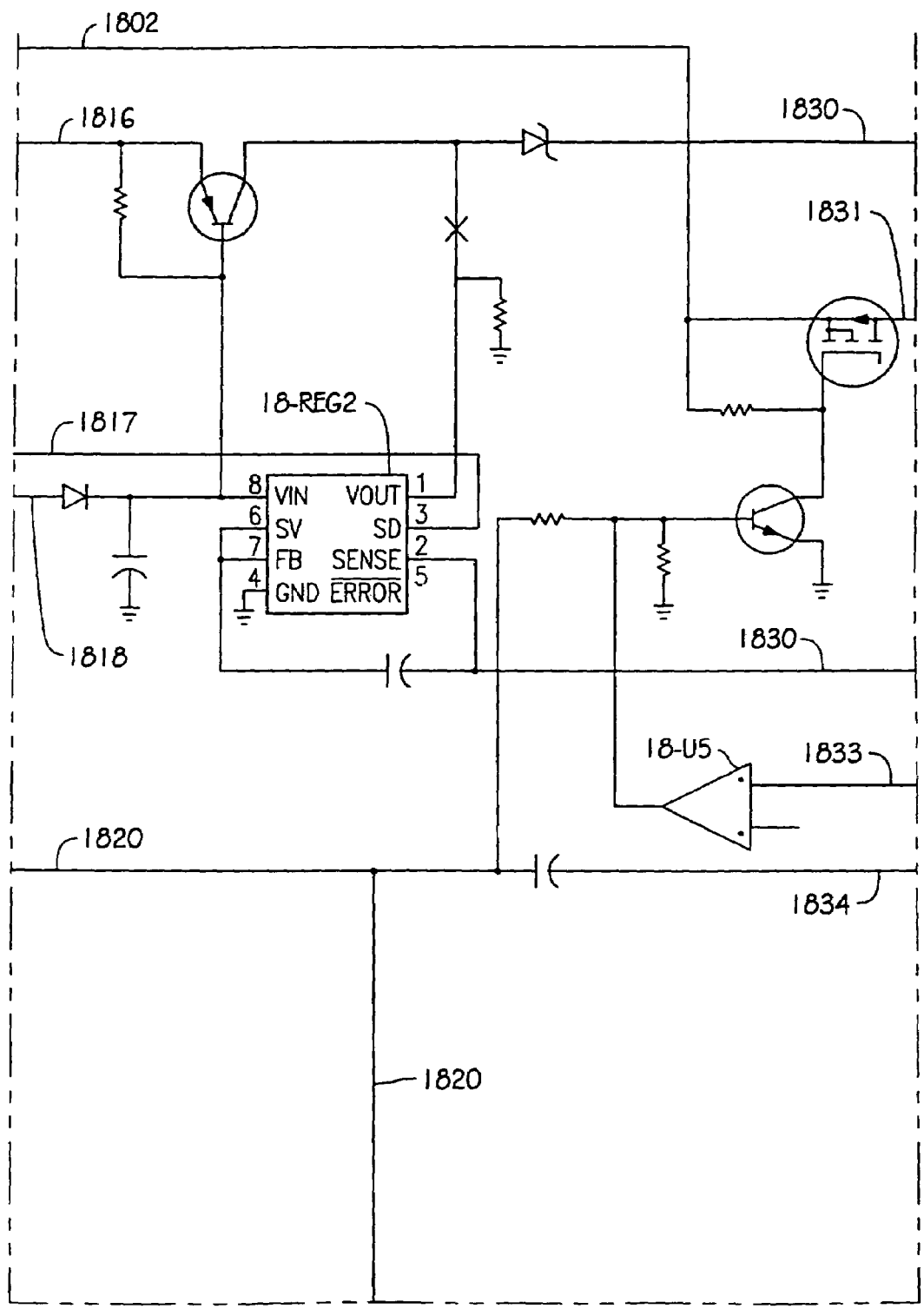
Figure 41D:
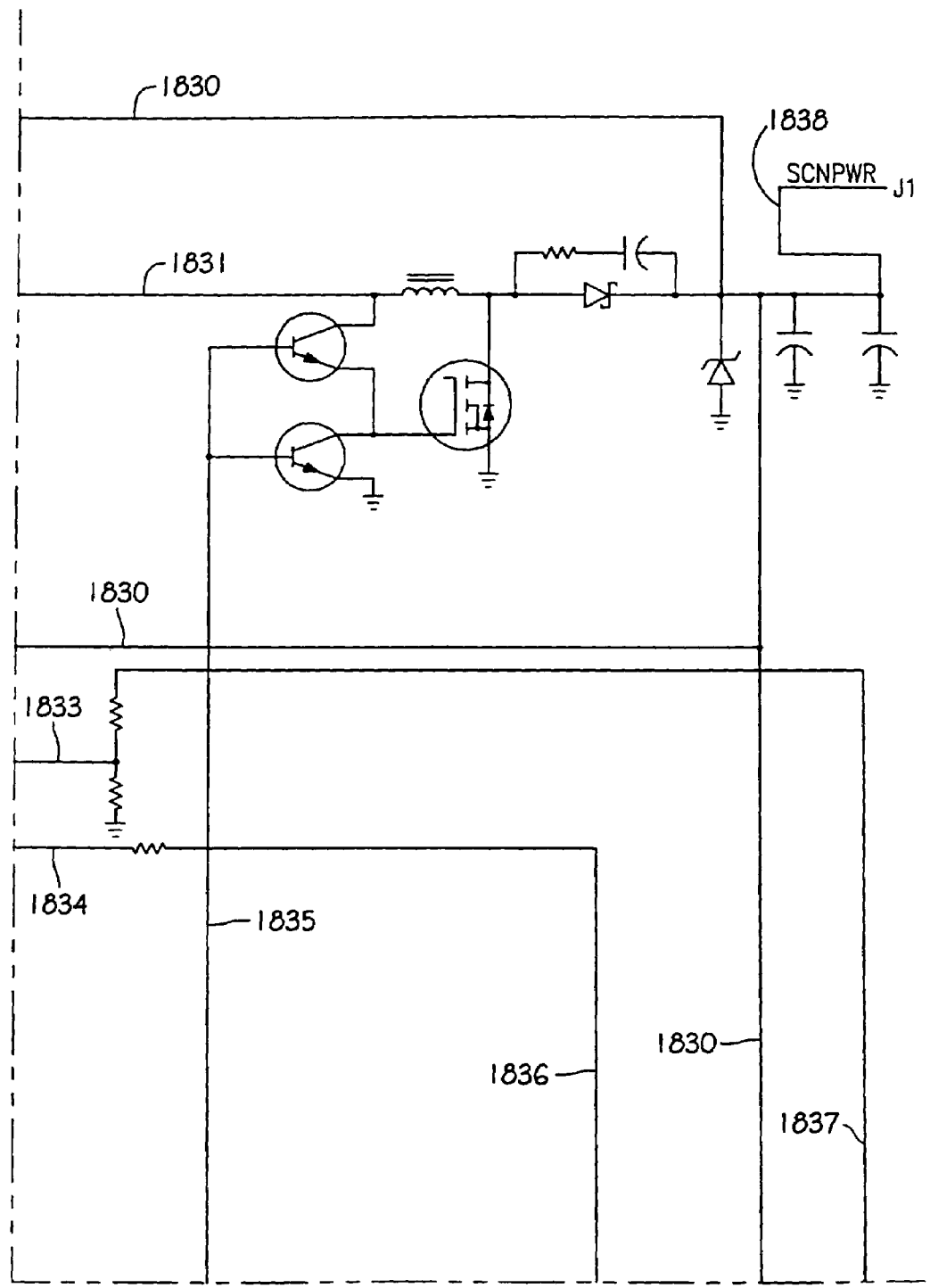
Figure 41E:
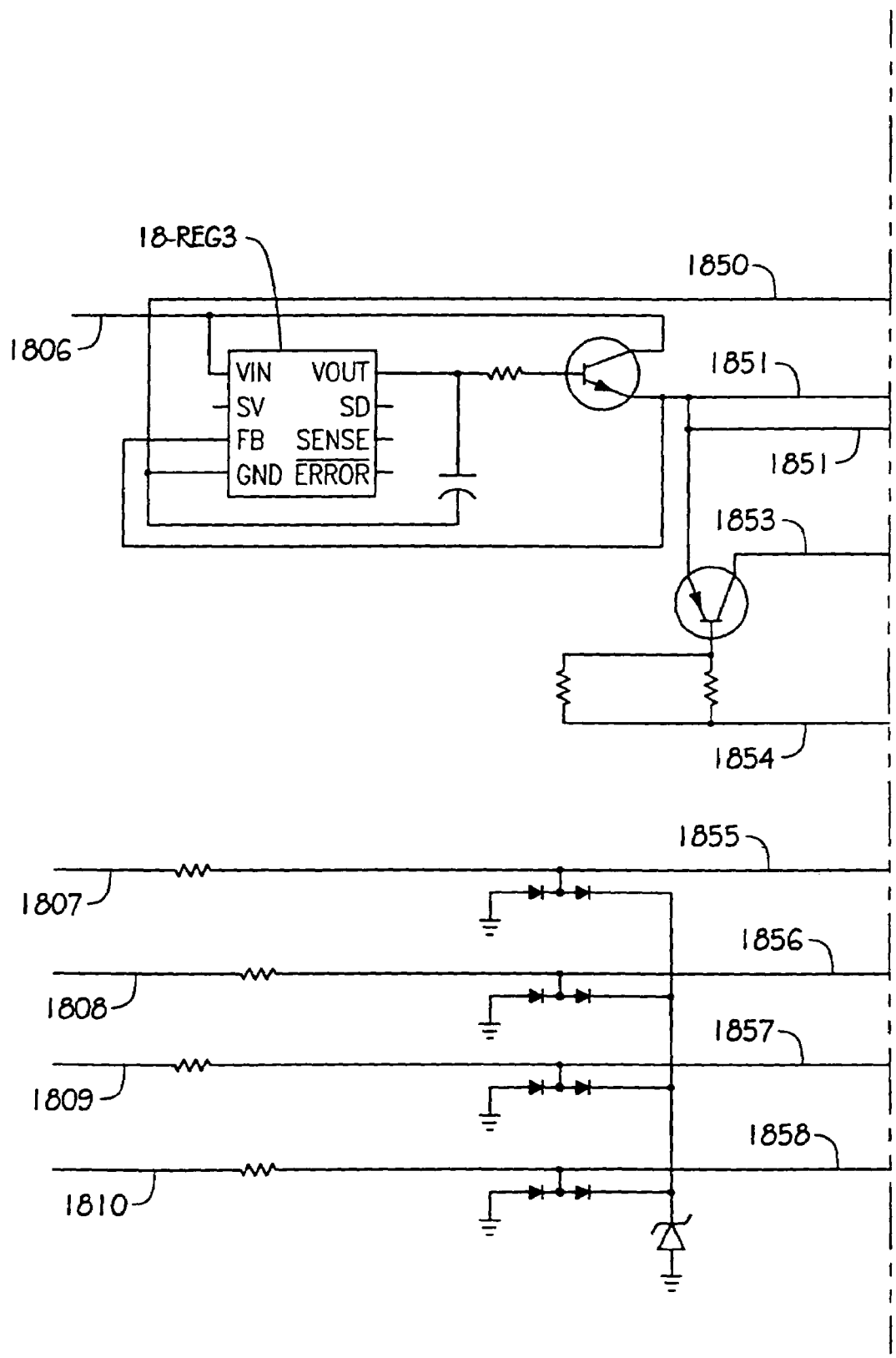
Figure 41F:
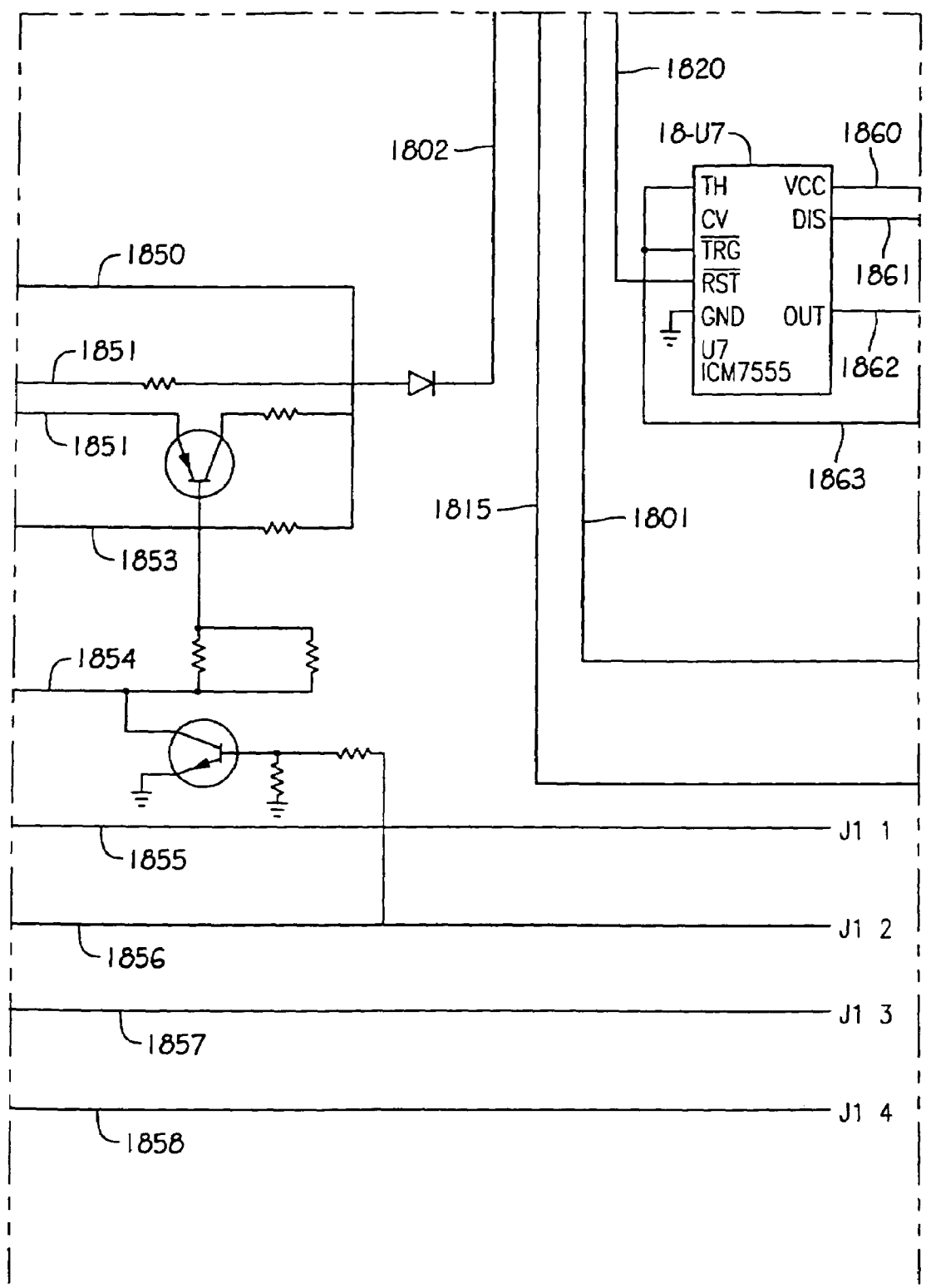
Figure 41G:
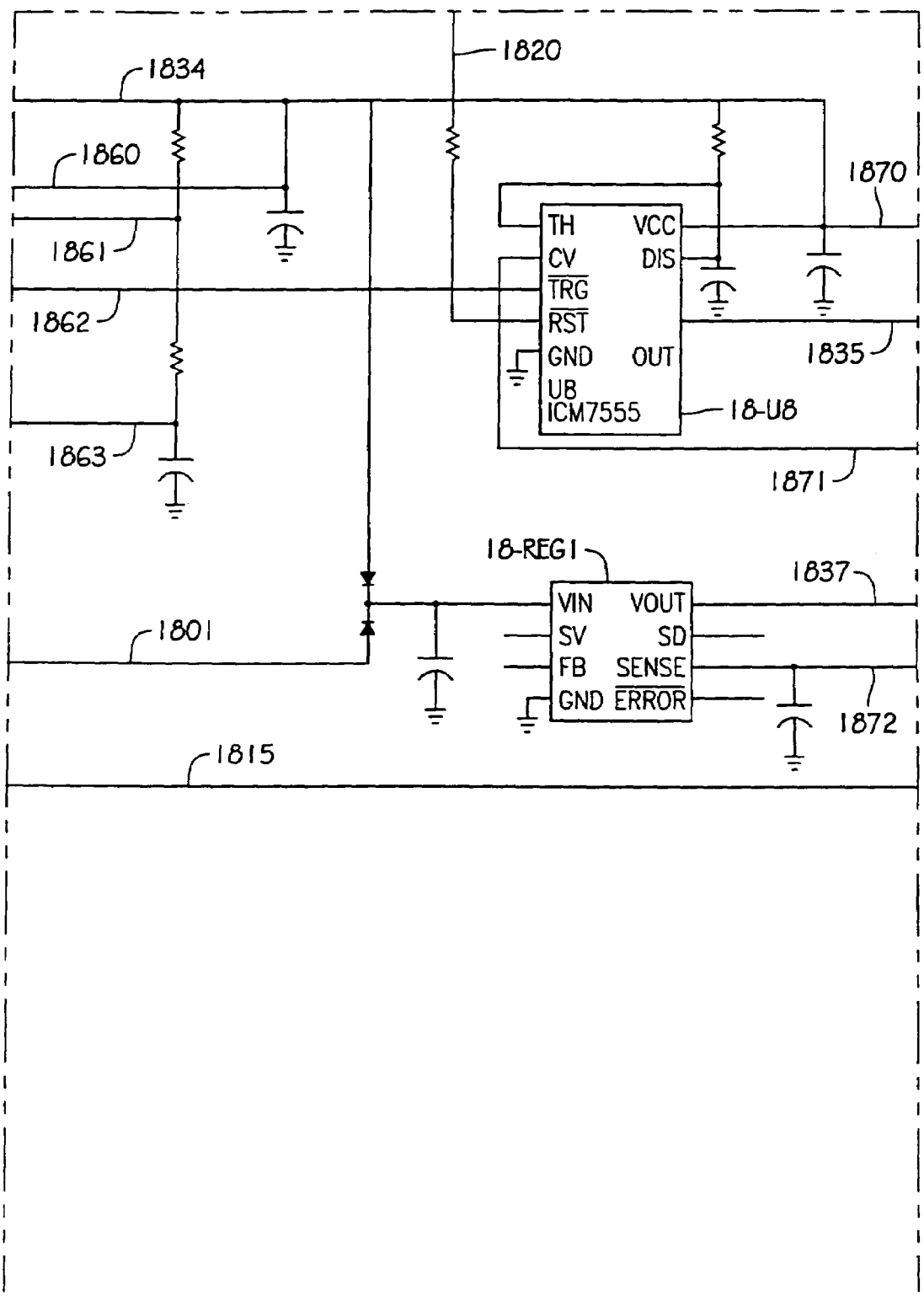
Figure 41H:
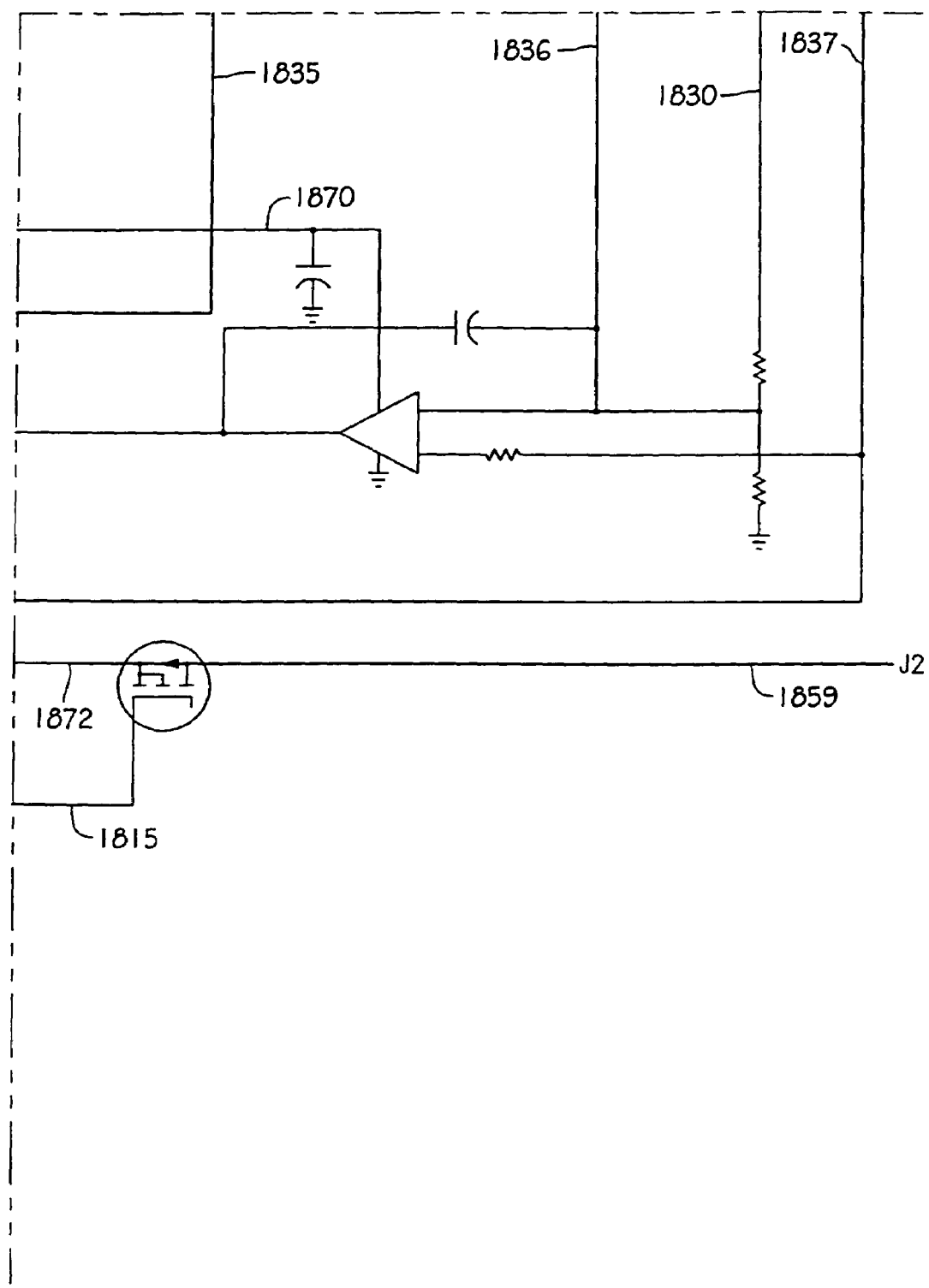
Figure 42A:
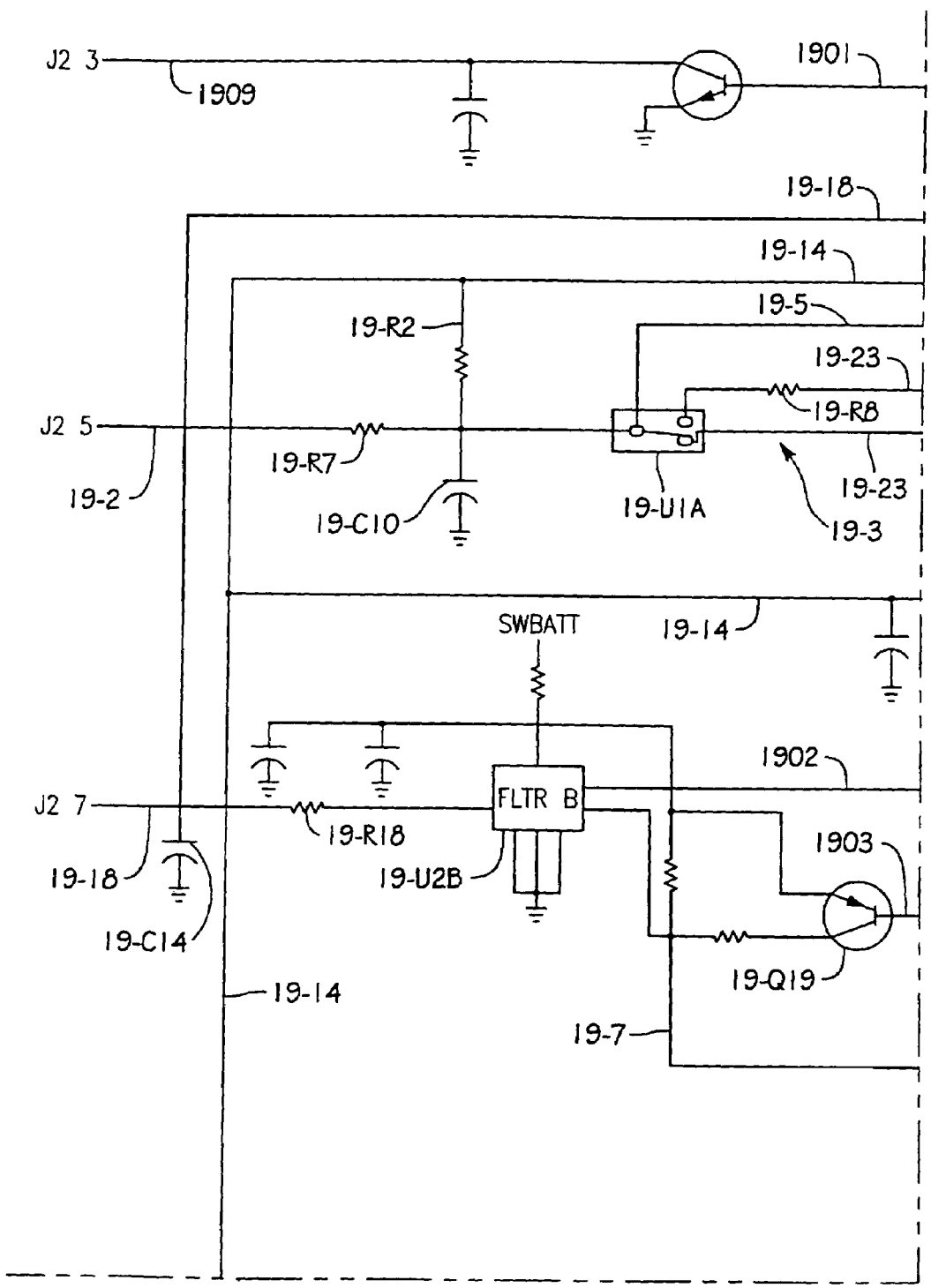
Figure 42B:
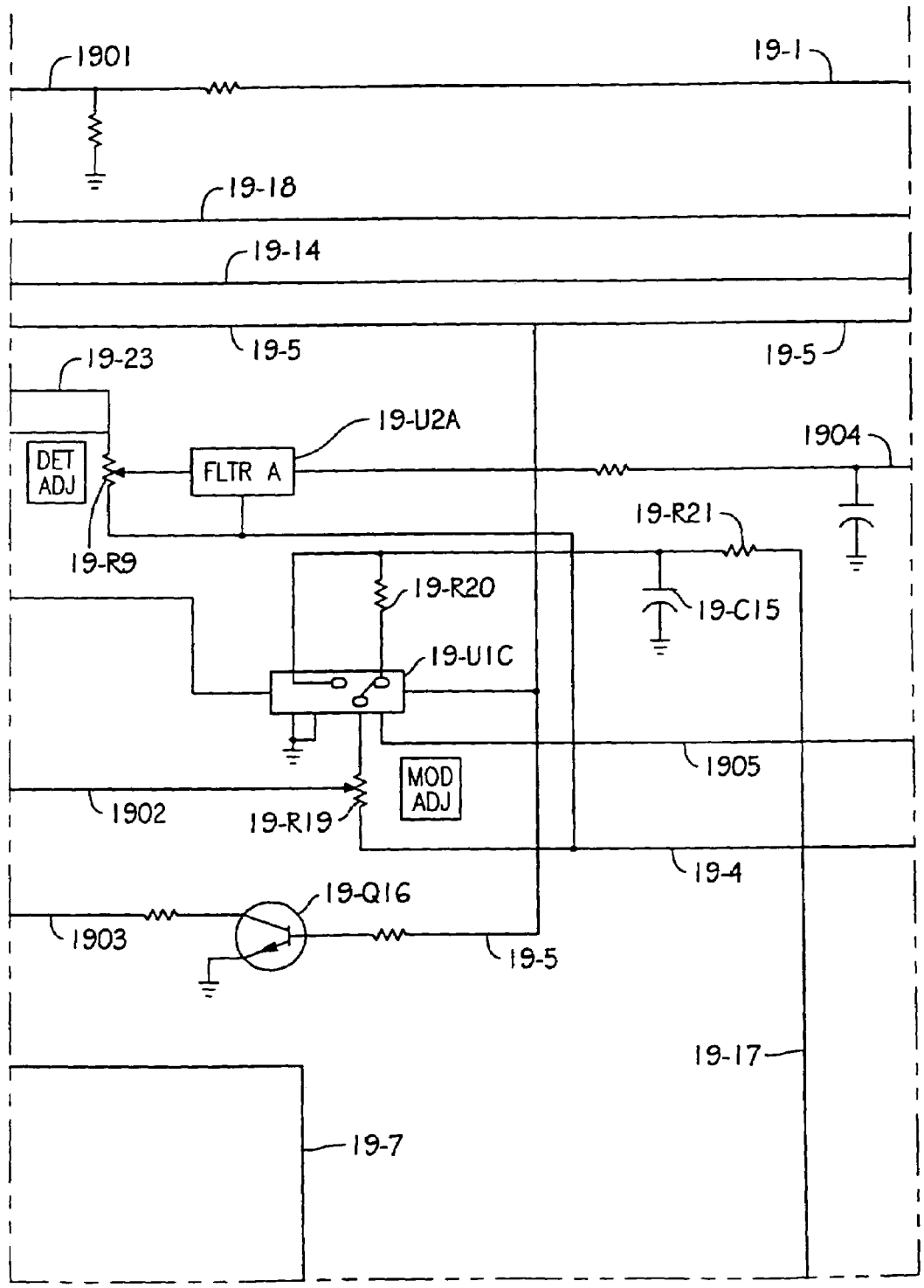
Figure 42C:
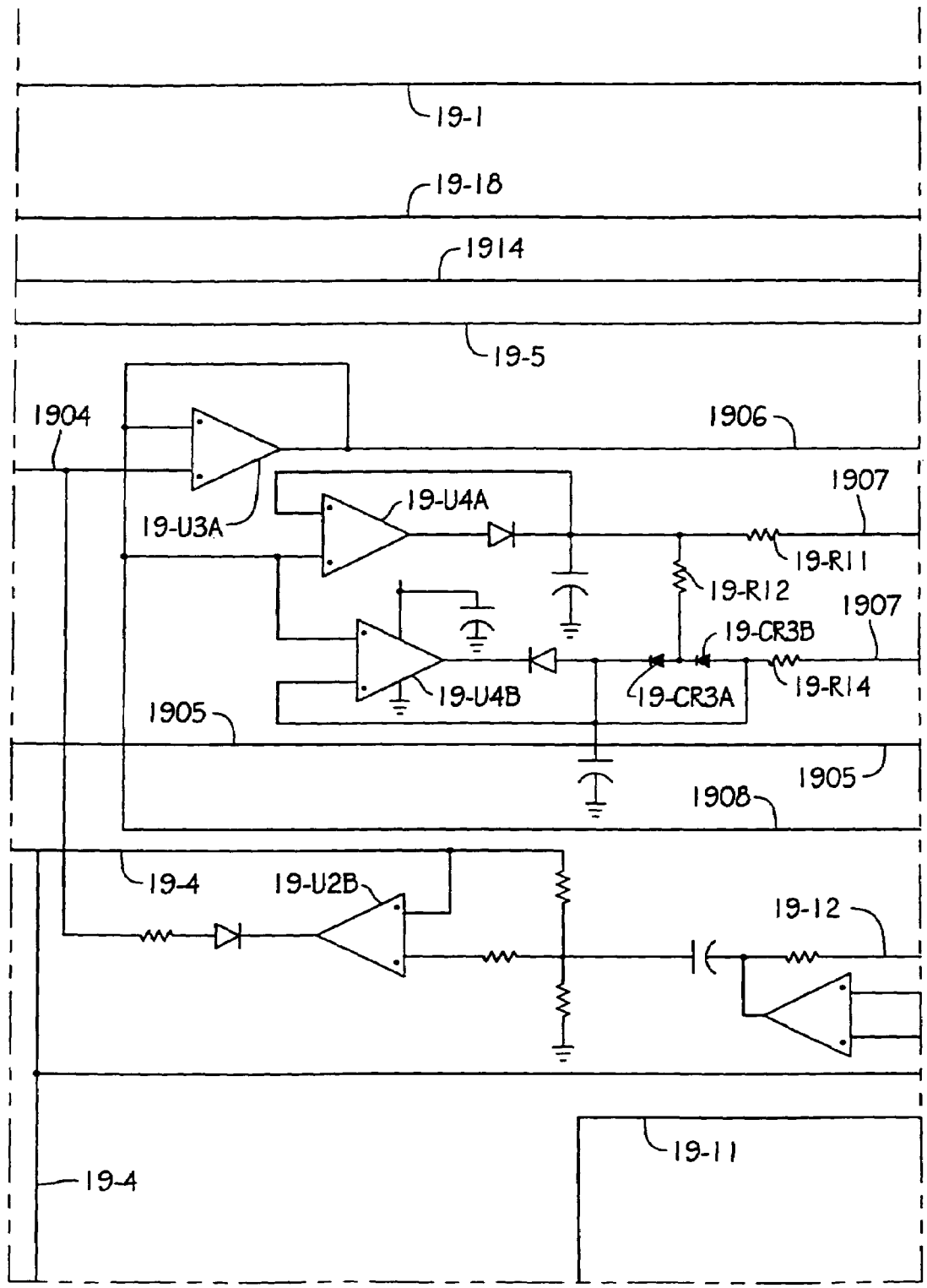
Figure 42D:
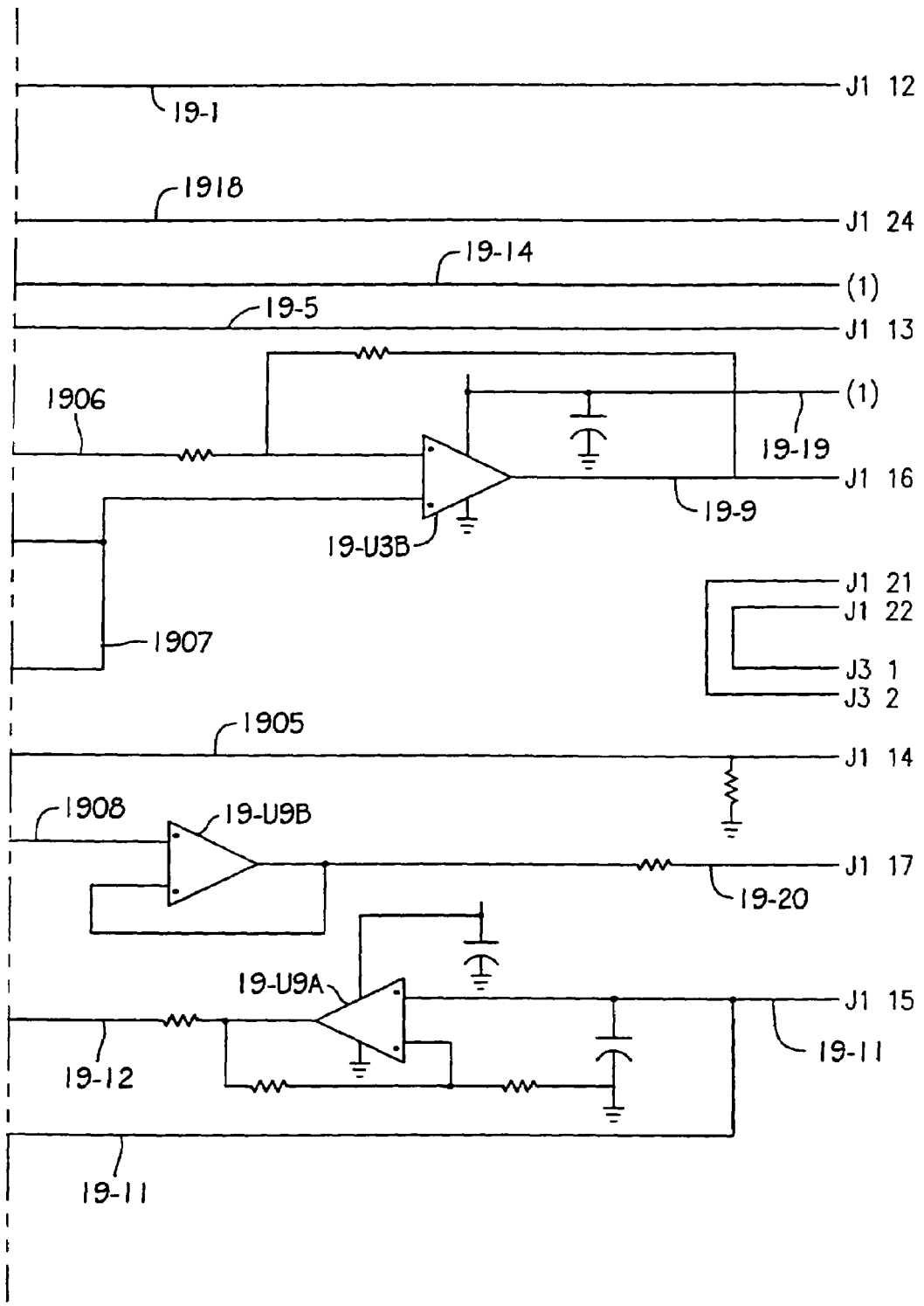
Figure 42E:
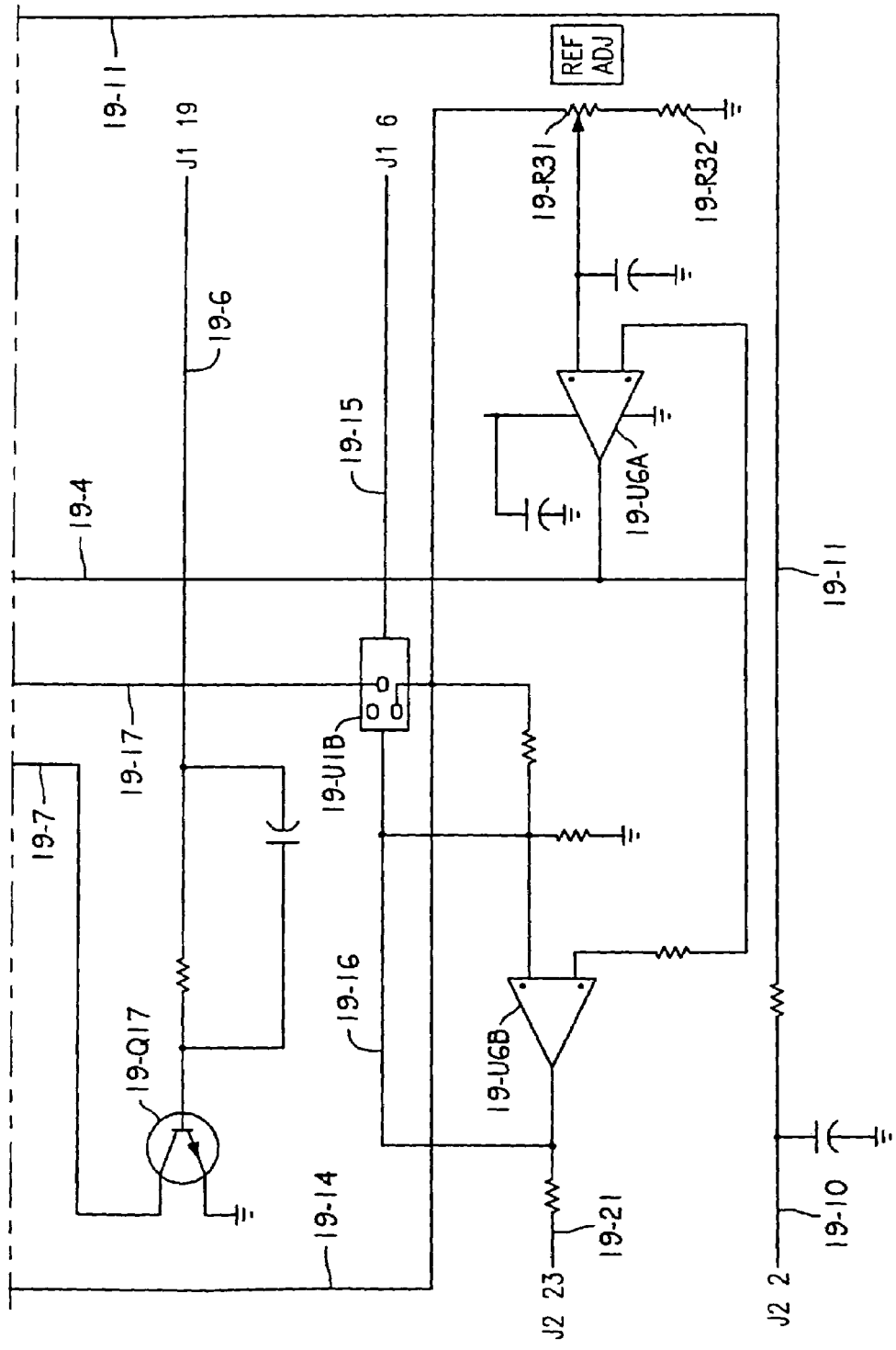

Major components and exemplary inputs and outputs in FIGS. 41A-41H and 42A-42E are tabulated as follows:

| Principal Components in FIGS. 41A-41H and FIGS. 42A-42E | |
|---|---|
| Component | Description/Type |
| 18-REG1, FIG. 41G; | Voltage Regulator |
| 18-REG2, FIG. 41C; | LP2951 ACM |
| 18-REG3, FIG. 41E. | (Plus Five Volt) |
| 18-U7, FIG. 41F; | CMOS Timer |
| 18-U8, FIG. 41G. | 7555 |
| 18-U5A, FIG. 41C | Comparator |
| | LM2924M |
| 18-U5B, FIG. 41H | Operational Amplifier |
| | LM2924M |
| 19-U1A, FIG. 42A; | Analog Switcher |
| 19-U1B, FIG. 42E; | 74HC4053 |
| 19-U1C, FIG. 42B. | |
| 19-U2A, FIG. 42B; | Dual Filters |
| 19-U2B, FIG. 42A. | 145415 |
| 19-U3A, FIG. 42C; | Operational |
| 19-U3B, FIG. 42D. | Amplifier |
| | LM2924M |

-continued

Principal Components in FIGS. 41A-41H and FIGS. 42A-42E

| Component | Description/Type |
|---|---|
| 19-U4A, FIG. 42C; | Operational |
| 19-U4B, FIG. 42C; | Amplifier |
| 19-U6A, FIG. 42E; | MC 33172D |
| 19-U6B, FIG. 42E; | |
| 19-U9A, FIG. 42D; | |
| 19-U9B, FIG. 42D. | |

| Reference No. | Designation | General Description |
|---|---|---|
| Exemplary Inputs and Outputs FIG. 41A-41H | | |
| FIGS. 41A, D | | |
| 1801 | SWBATT | Switched Battery Voltage Output |
| 1802 | +BATT | Battery Input and Outputs |
| 1803 | RADION | Logical Input for Turning on the Radio Circuits |
| 1804 | SCNON | Logical Input for Turning on Scanner |
| 1805 | 12/5 | Logical Input Selecting for Twelve Volt or Five Volt Scanner |
| 1838 | SCNPW | Power Output for Scanner |
| FIGS. 41E, F, H | | |
| 1806 | CHRPR | Charging Power Input |
| 1807 | TEMP | Analog Voltage Input Representing Battery Temperature |
| 1808 | CHGCNTL | Logical Control Signal Controlling Battery Charging |
| 1809; | LAN+ | Signal Lines |
| 1810; | LAN- | for Local Area |
| 1857; | | Network |
| 1858. | | |
| 1855 | TEMP | Analog Voltage Output Representing Battery Temperature |
| 1856 | CHGCNTL | Logical Control Signal Controlling Battery Charging |
| 1859 | 5 V REF SW | Switched Five Volts Reference Output |
| Exemplary Inputs and Outputs, FIGS. 42A-42E | | |
| FIG. 42A | | |
| 1909 | PTT | Logical Receive/Transmit Output Control Signal |
| 19-2 | RXDR | Baseband Audio Frequency Receive Input Signal |
| 19-18 | TXDR | Transmit Output Signal |
| FIG. 42D | | |
| 19-1 | XMIT | Logical Receive/Transmit Input Control Signal |
| 19-18 | TXDR | Transmit Output Signal |
| 19-14 | 5 V REF SW | Input Switched Five Volt Reference Potential |
| 19-5 | 96/48 | Input Logical Baud Rate Selection Signal |
| 19-19 | SWBATT | Switched Battery Potential Input |
| 19-9 | RFRXD | Output Processed Receive Signal |
| 19-05 | TXFO | |
| 19-20 | RX AUDIO | Output Audio Frequency Receive Signal |
| 19-11 | RSSI | Output Received Signal Strength Indication |
| 19-6 | FLTCLK | Input Clock Rate Signal |
| 19-15 | RFTXD | Input Logical Control Signal |
| 19-21 | 2VREF | Two Volt Reference Potential Output |
| 19-10 | RSSI | Input Received Signal Strength Indication |

Further information on a local area network which may removably receive the hand-held transceiver terminal units, e.g. for recharging the batteries thereof, may be found in the following incorporated patent application:

Miller, Koenck, Kubler, Cargin and Hanson U.S. Ser. No. 07/305,302 filed Jan. 31, 1989

The interconnecting lines between the respective figures have been designated as follows: FIGS. 18A and 18B—1802, 1811, 1812, 1814, 1801, 1815, 1802; FIGS. 18B and 18C—1802, 1816, 1817, 1818, 1820; FIGS. 18C and 18D—1830, 1831, 1830, 1833, 1834; FIGS. 18B and 18F—1802, 1815, 1801, 1820; FIGS. 18C and 18G—1820; FIGS. 18D and 18H—1835, 1836, 1830, 1837; FIGS. 18E and 18F—1850, 1851, 1851, 1853, 1854, 1855, 1856, 1857, 1858. FIGS. 19A-19E show exemplary analog receive/transmit circuitry for mobile transceiver units such as represented at 82, FIG. 6 and at 220, 221, FIG. 12. FIGS. 19A and 19B—1901, 19-18, 19-14, 19-5, 19-23, 19-23, 19-14, 1902, 1903, 19-7; FIGS. 19B and 19C—19-1, 19-18, 19-14, 19-5, 1904, 1905, 19-4; FIGS. 19C and 19D—19-1, 19-18, 19-14, 19-5, 1906, 1907, 1907, 1905, 1908, 19-12, 19-11; FIGS. 19A and 19E—19-14; FIGS. 19B and 19E—19-7, 19-17, 19-4, 19-11.

Description of FIGS. 43A-43H and 44A-44H

FIGS. 43A-43H show exemplary circuitry used in a digital processor board for a commercial product of Norand Corporation known as the RT3210, which is a mobile transceiver unit which may operate in accordance with the teachings of the present disclosure, e.g. as represented in FIGS. 36-40.

The components represented by rectangles in these figures are identified as follows:

Identification of Components in FIGS. 43-43H, 44A-44H

Figure 43A:
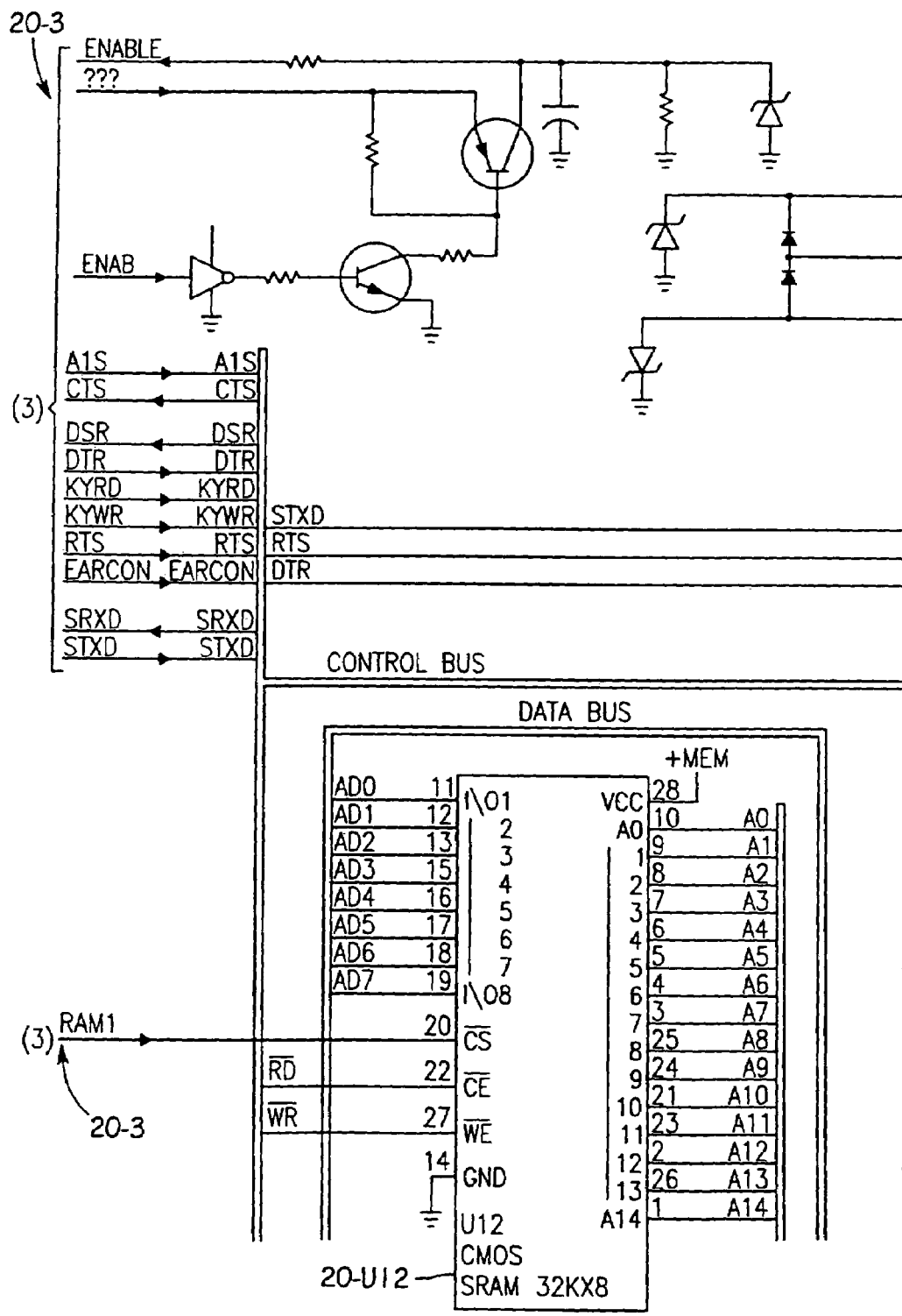
FIGS. 43A-43H and 44A-44H show exemplary digital processor circuitry for coupling with the RT3210 mobile terminal unit via the analog interface circuit of FIGS. 41A-41H and 42A-42E.
Figure 43B:
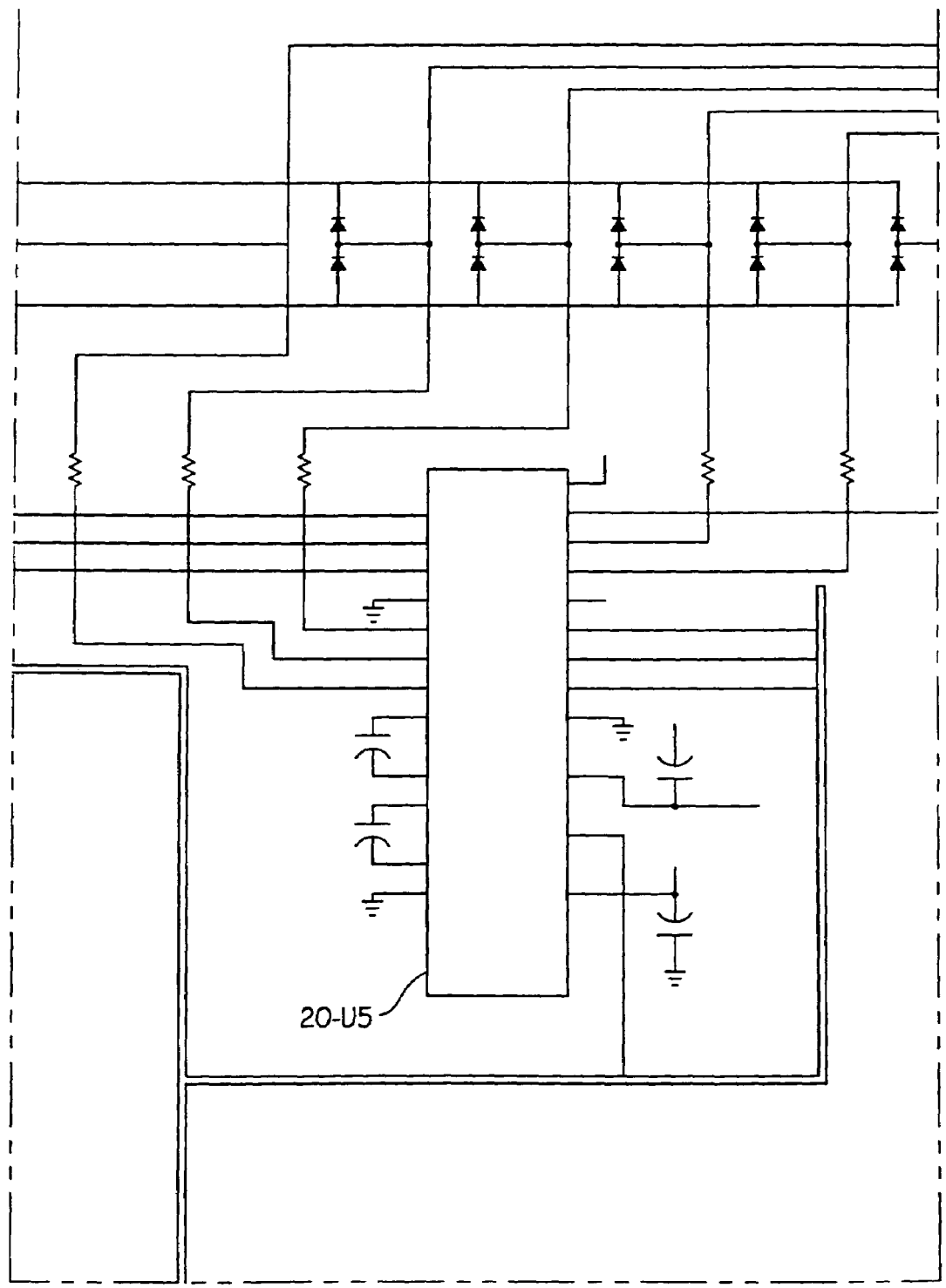
Figure 43C:
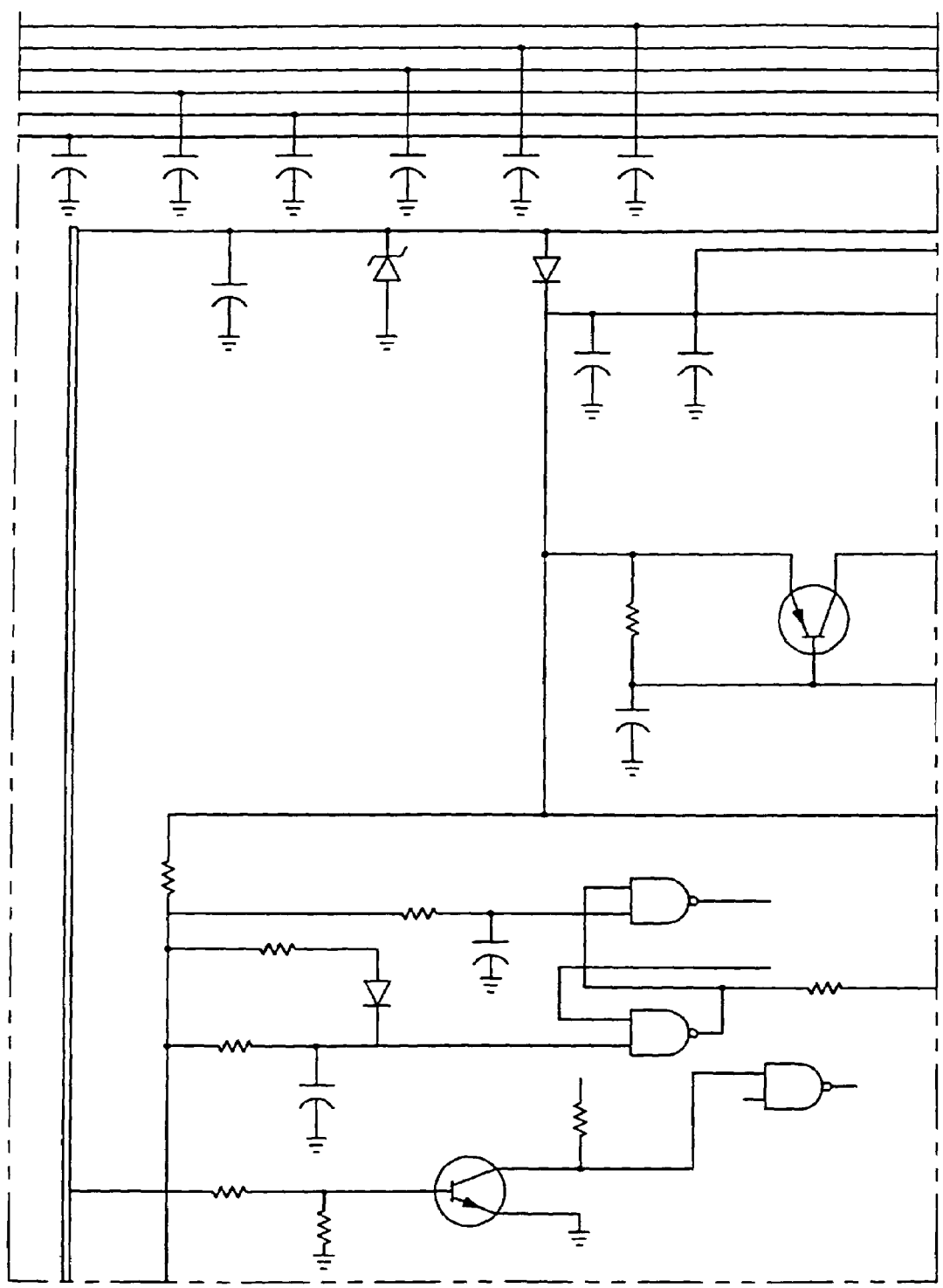
Figure 43D:
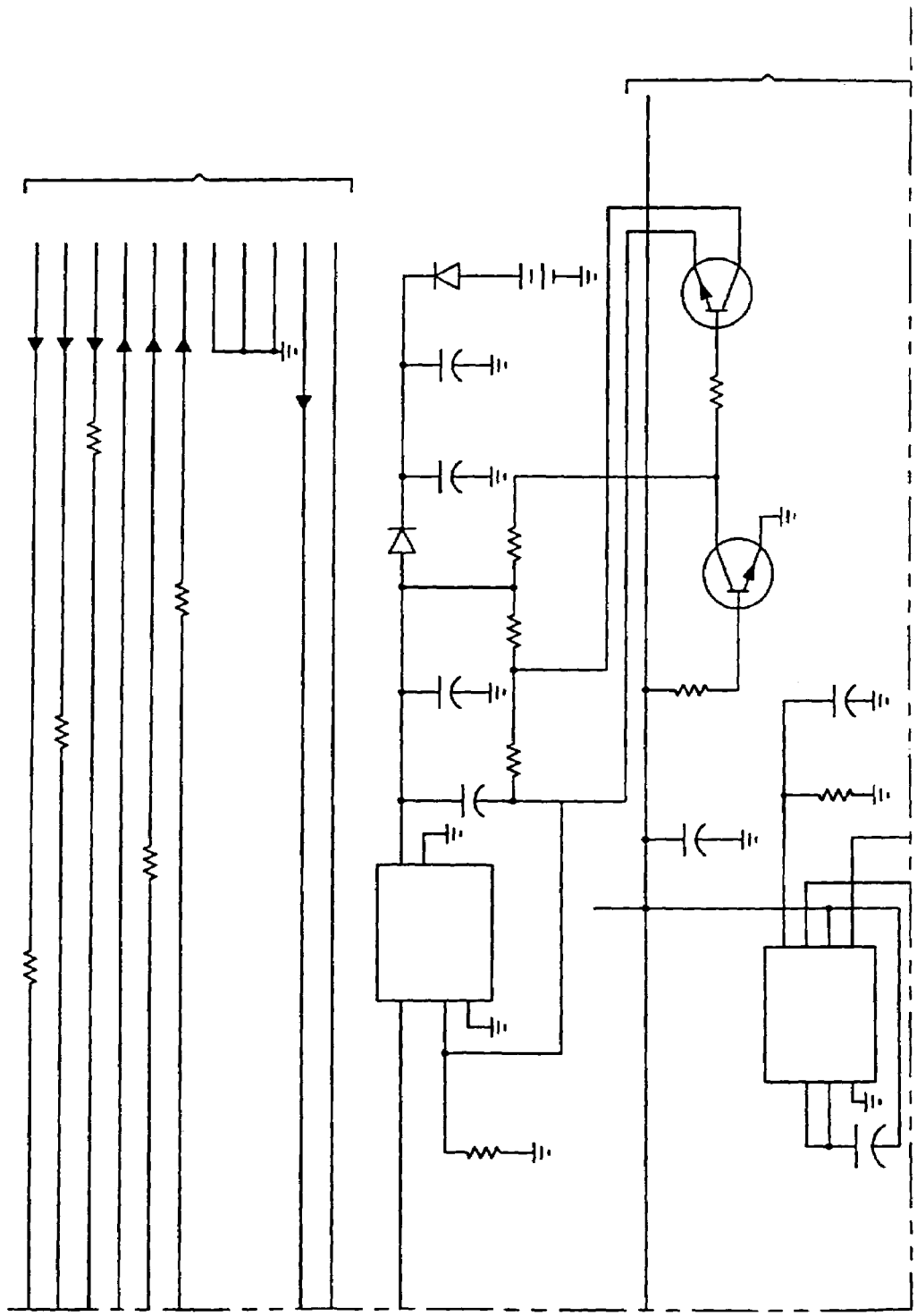
Figure 43E:
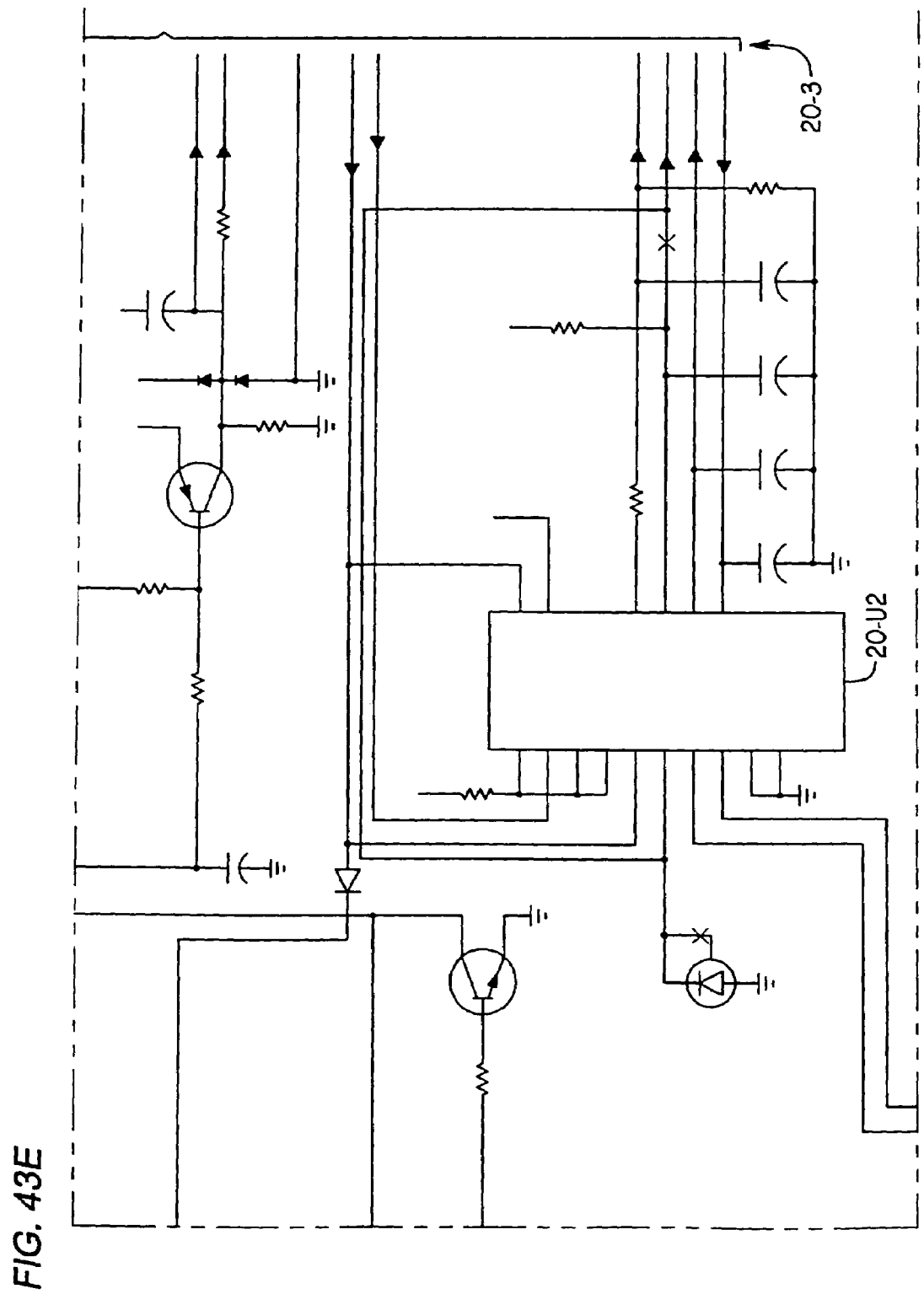
Figure 43F:
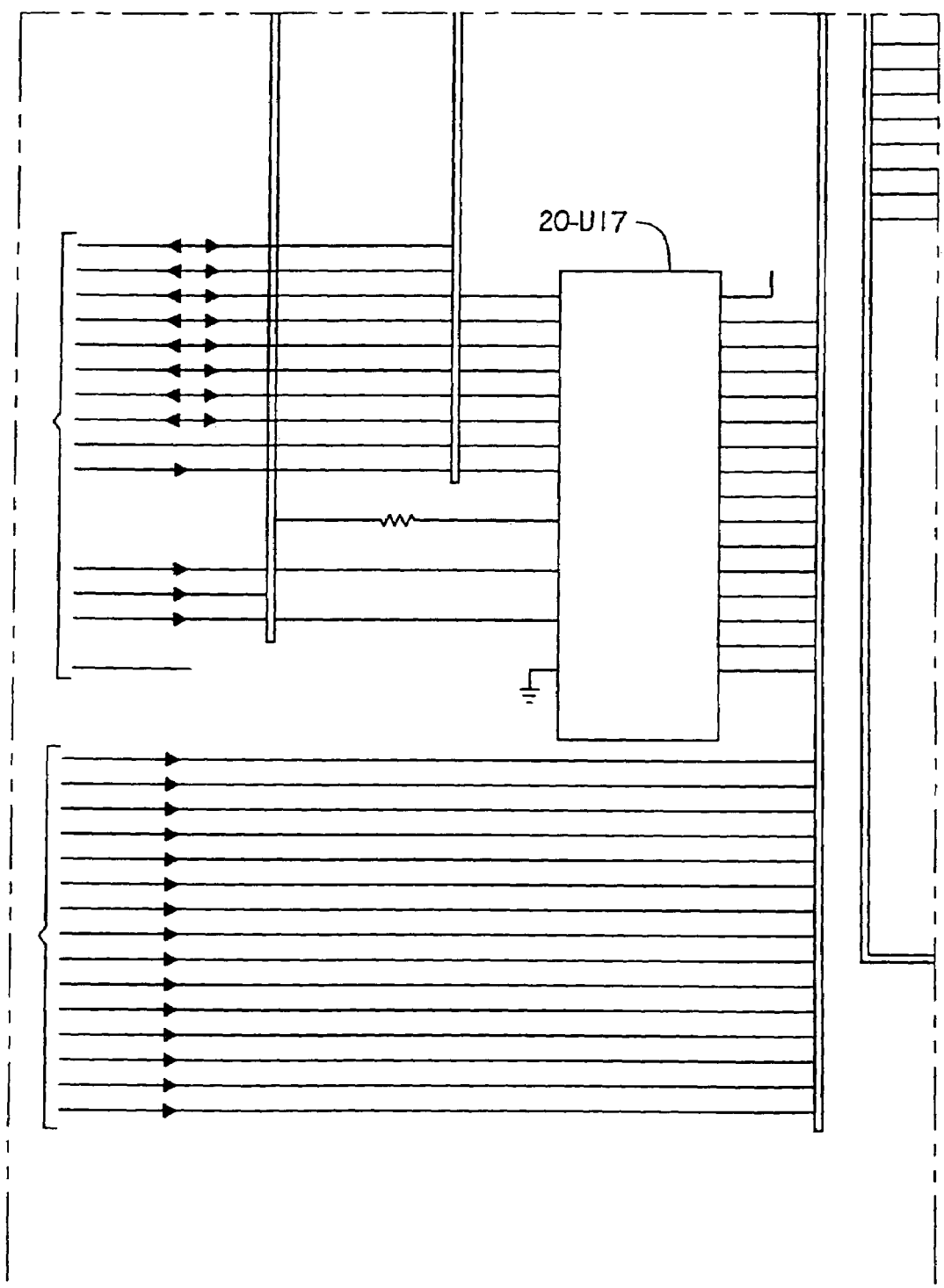

| Component | Description/Type |
|---|---|
| 20-U12, FIG. 43A; | Static Random |
| 20-U17, FIG. 43F. | Access Memory CMOS-32K x 8 LP |

-continued

Figure 43G:
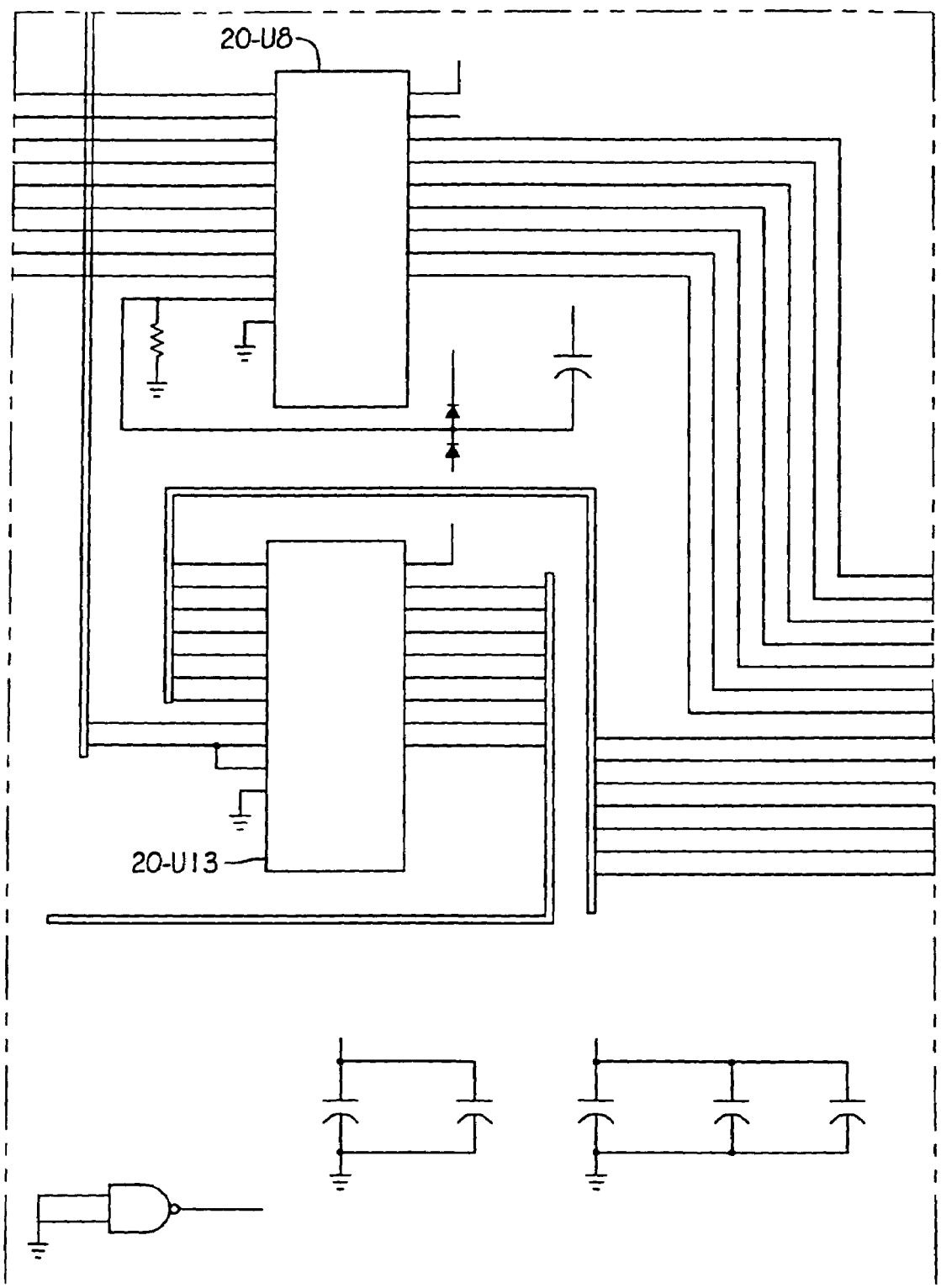
Figure 43H:
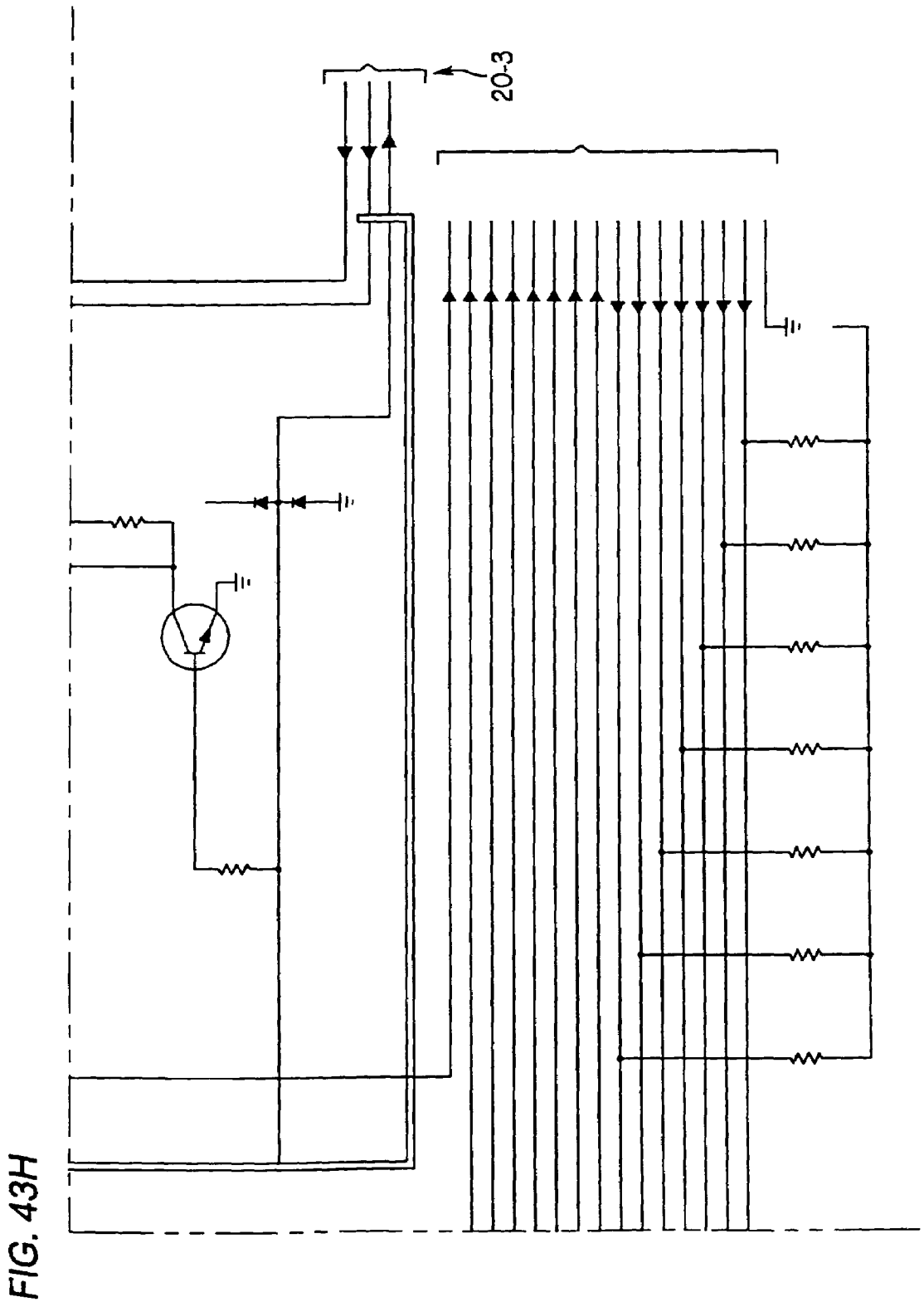
Figure 44A:
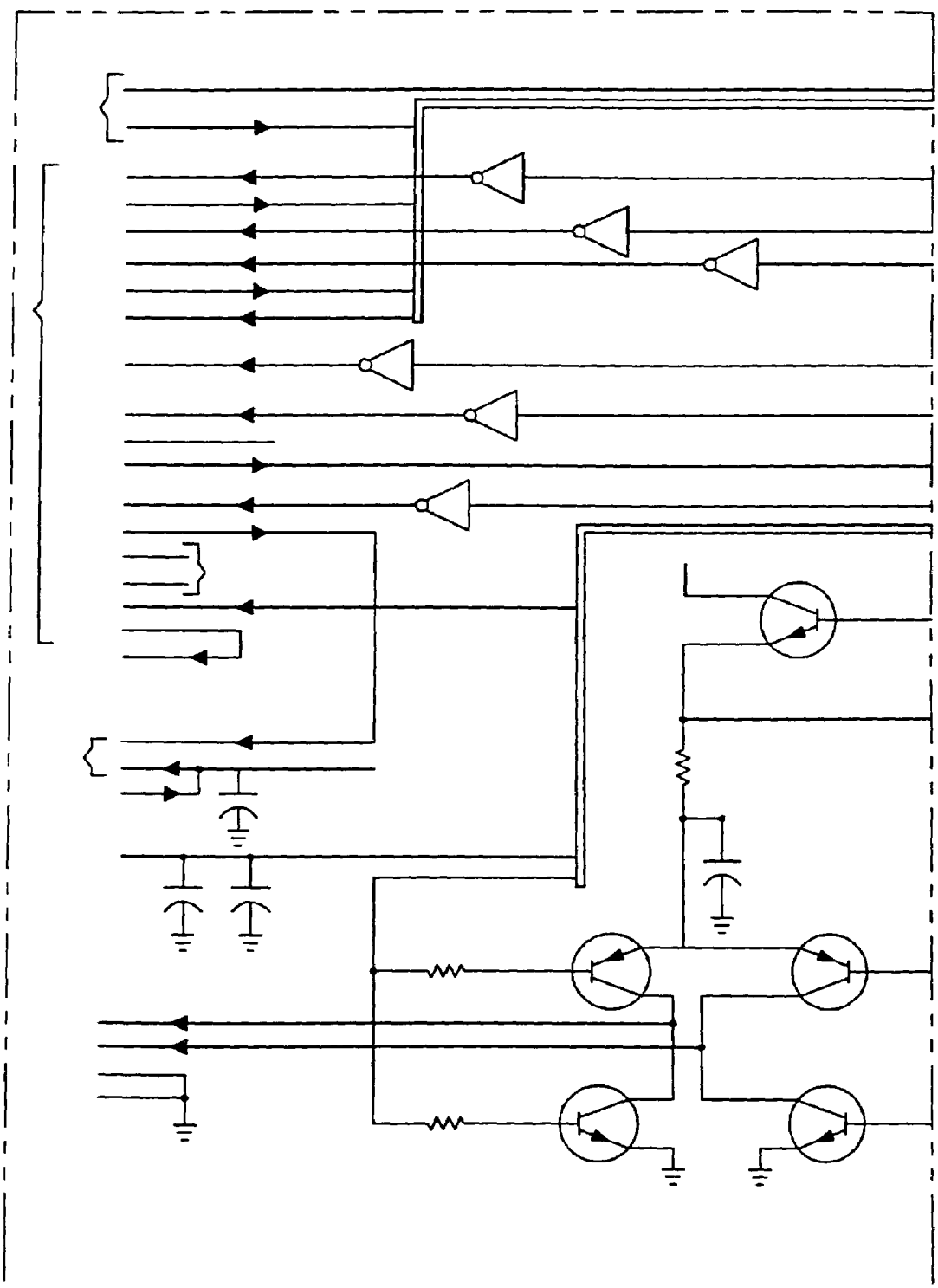
Figure 44B:
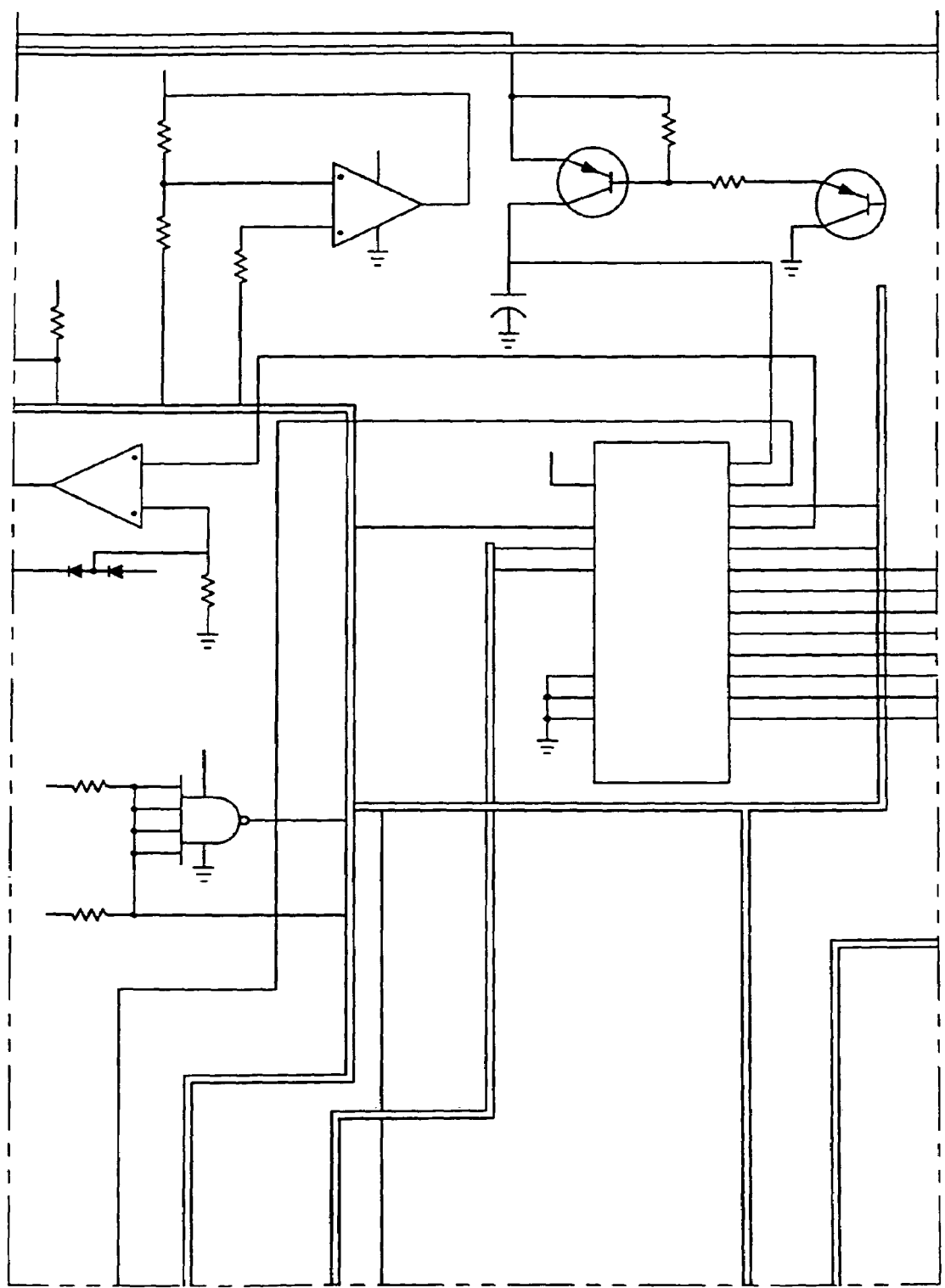
Figure 44C:
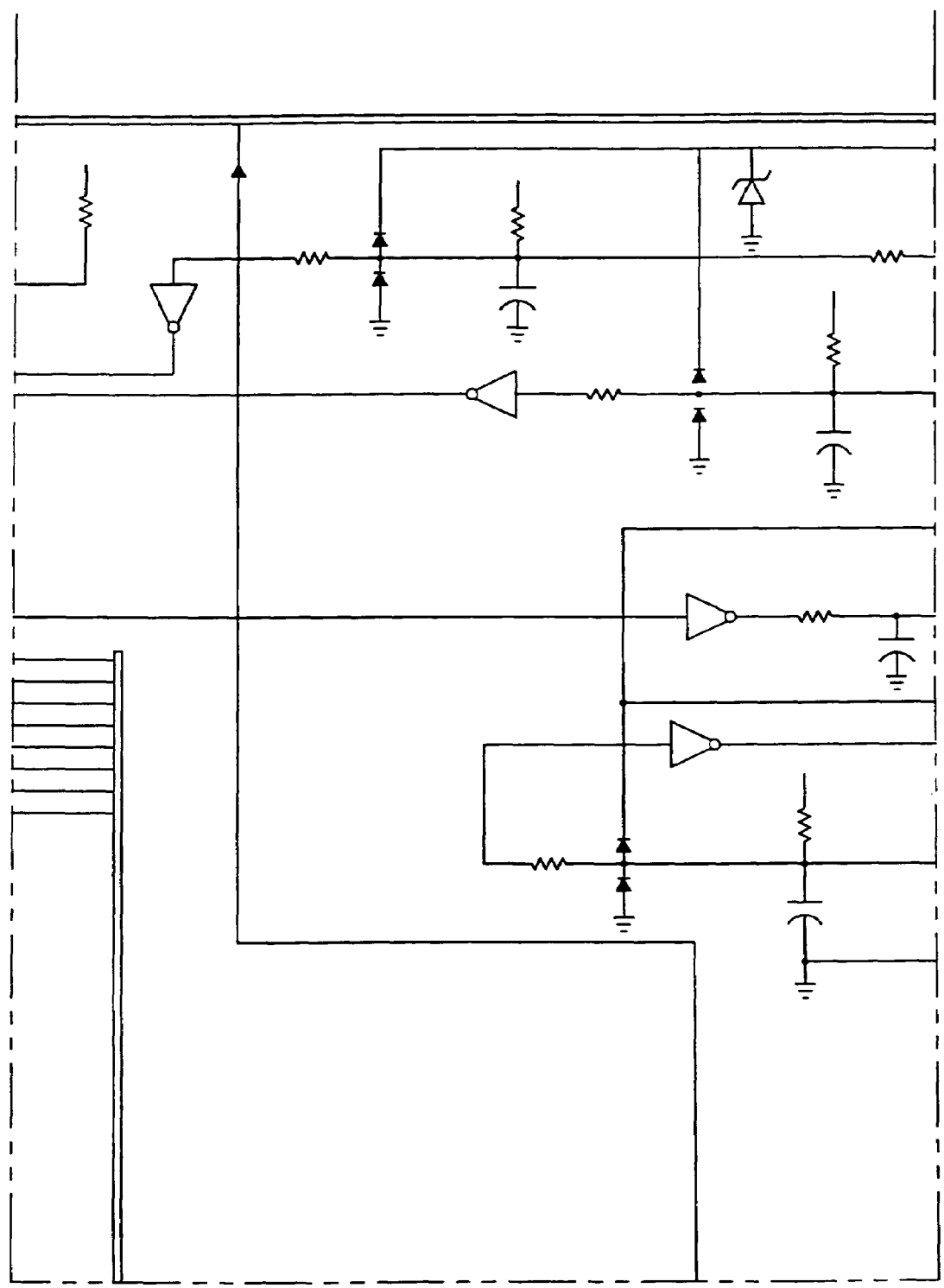
Figure 44D:
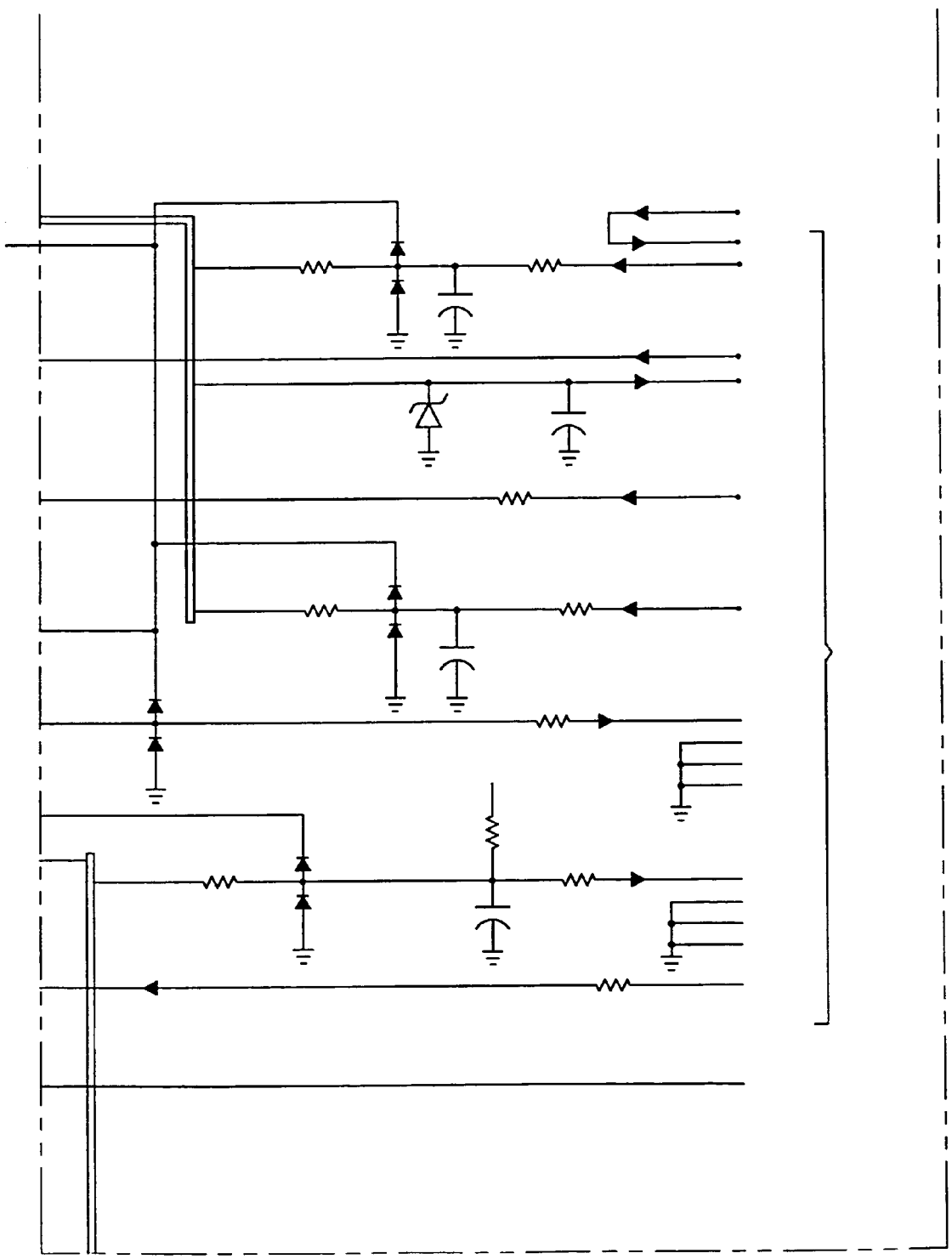
Figure 44E:
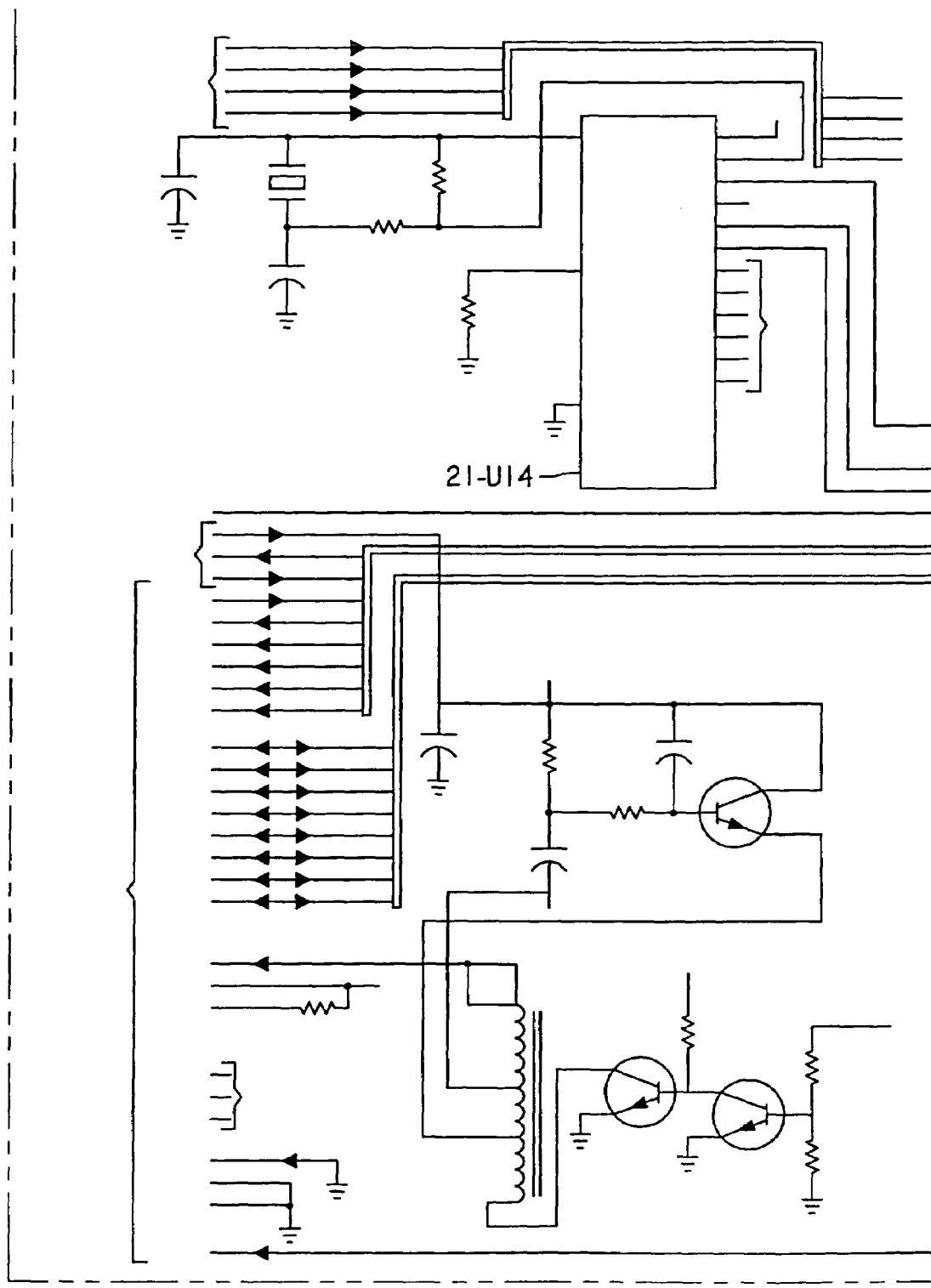
Figure 44F:
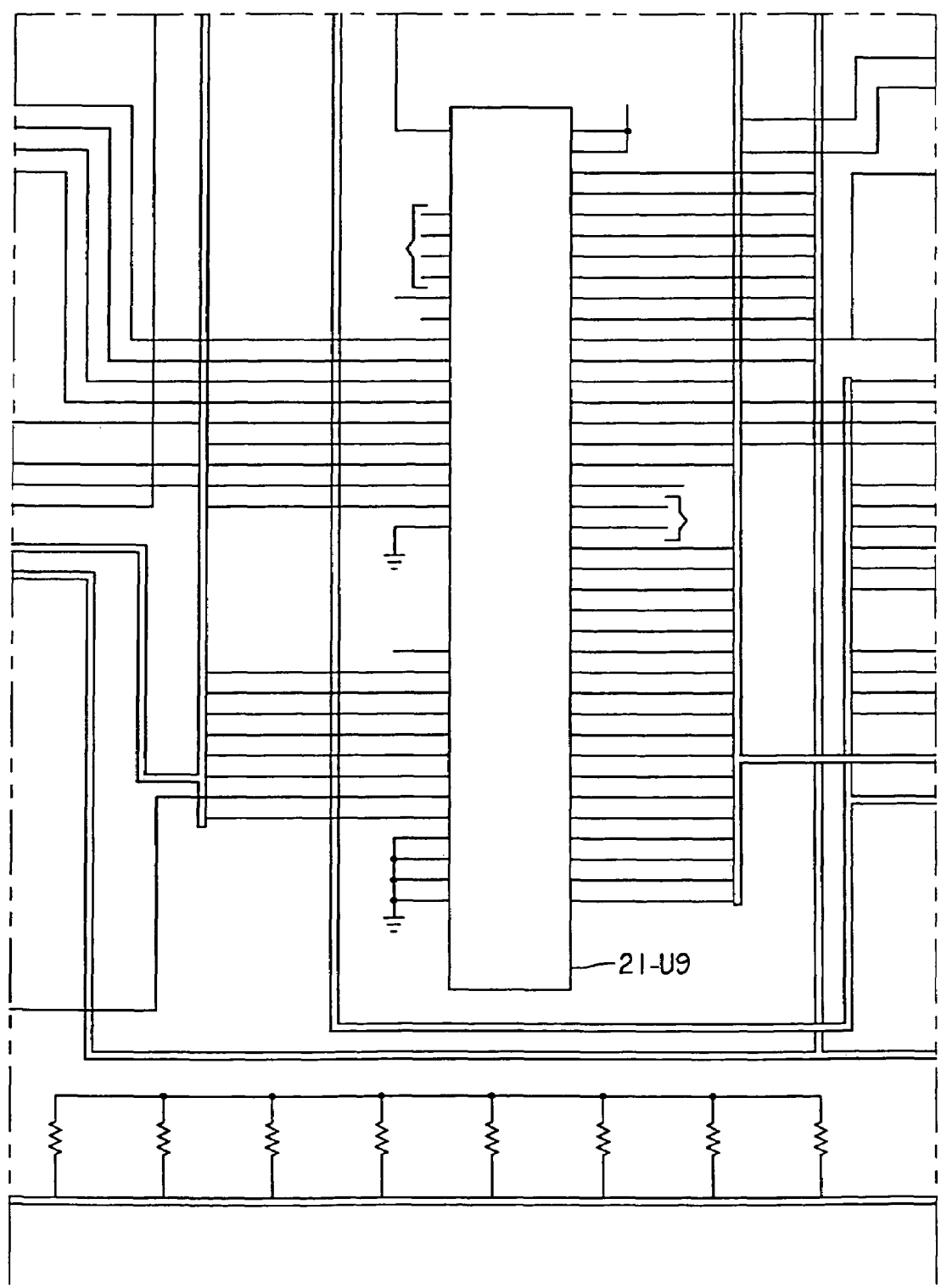
Figure 44G:
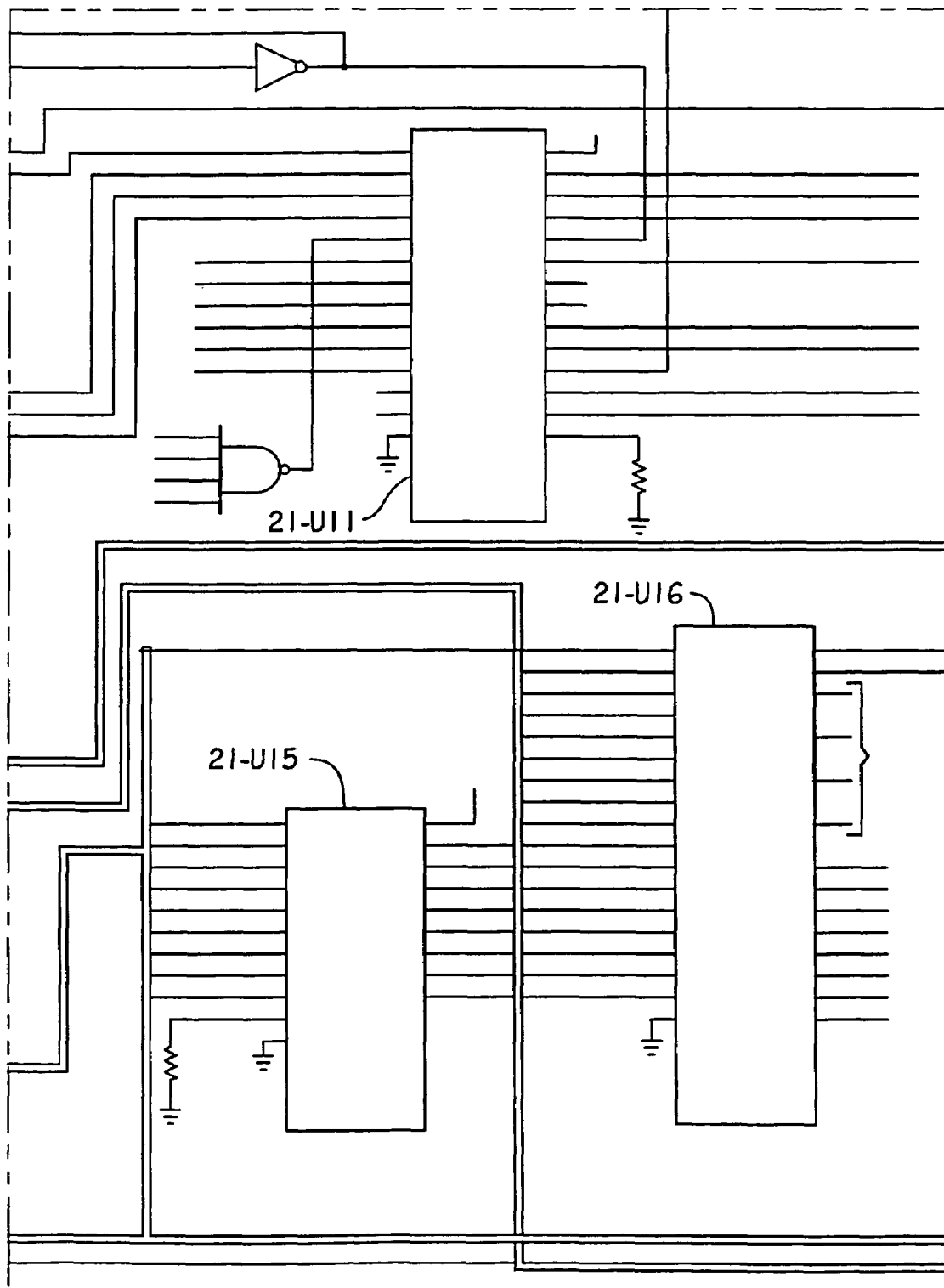
Figure 44H:
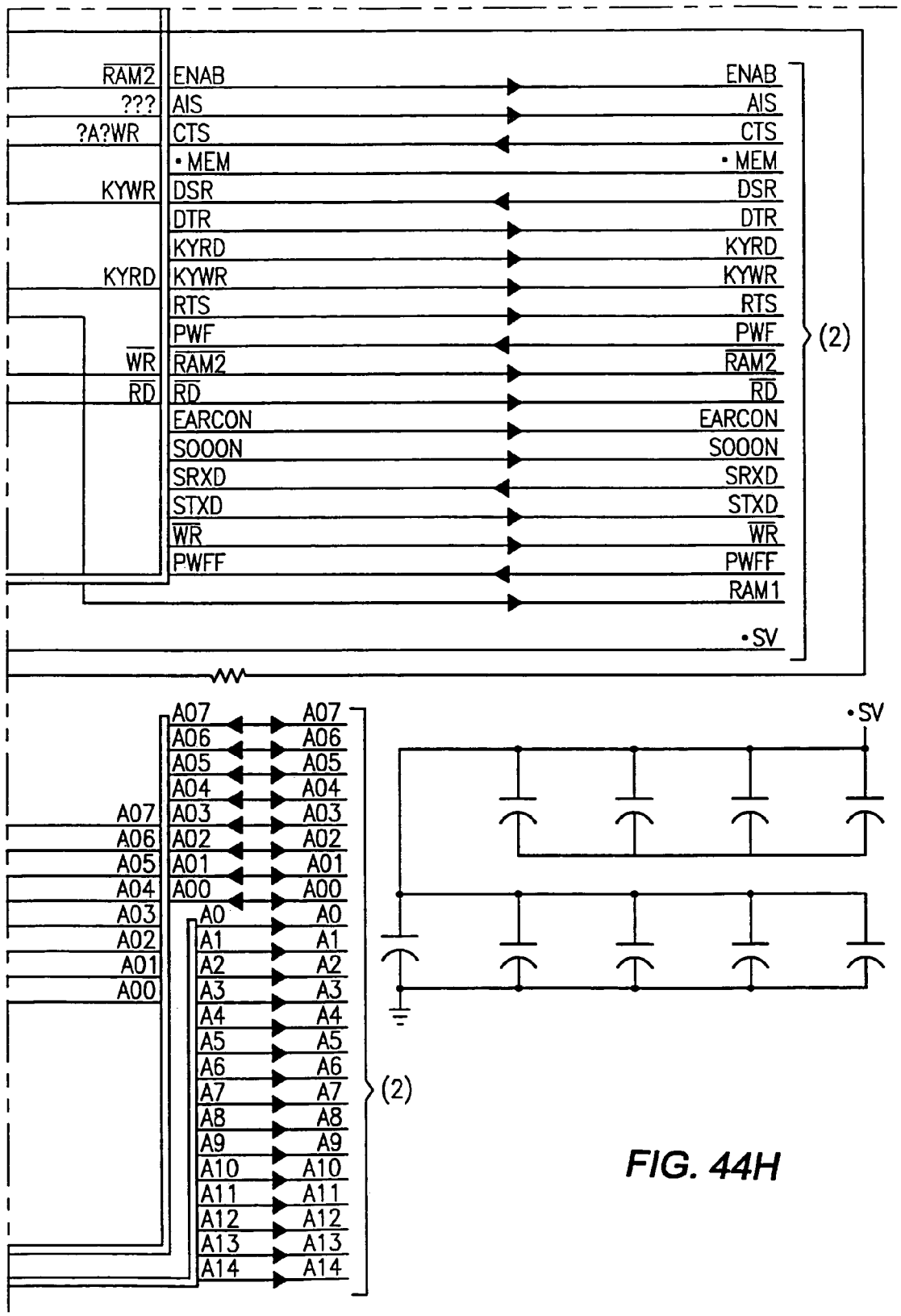

| Identification of Components in FIGS. 43-43H, 44A-44H | |
|---|---|
| Component | Description/Type |
| 20-U5, FIG. 43B | RS232 Driver/Receiver MAX 236 |
| 20-REG1, FIG. 43D; 20-REG2, FIG. 43D. | Voltage Regulator LP 2951AC |
| 20-U2, FIG. 43E | Quad Switch DG 445 DY |
| 20-U8, FIG. 43G | Octal Flip-Flop 74 HC 573 |
| 20-U13, FIG. 43G; 20-U15, FIG. 44G. | Latch 74 HC 573 |
| 21-U6, FIG. 44B | Converter AD 7226 KCWP |
| 21-U14, FIG. 44E | Counter 74 HC 4060 |
| 21-U9, FIG. 44F | Microcontroller S80C552 |
| 21-U16, FIG. 44G | EPROM 64K x 8 27C512 |

The following table shows exemplary connections between FIG. 44A and FIGS. 41A, 41D, 41E, 42D, and 42E.

| Exemplary Connections Between FIG. 44A and FIGS. 41A-41F and 42A-42E | | |
|---|---|---|
| P/O Radio Position | Connector (J2) Designation | Associated Line Number/FIG. |
| 1 | TEMP | 1844, FIG. 41F |
| 2 | VCHRG | 1856, FIG. 41F |
| 3 | LAN+ | 1857, FIG. 41F |
| 4 | LAN− | 1858, FIG. 41F |
| 5 | +BATT | 1802, FIG. 41A |
| 6 | TXD | 19-15, FIG. 42E |
| 7 | CHRPR | 1806, FIG. 41E |
| 8 | RADIDON | 1803, FIG. 41A |
| 9 | 12/5 | 1805, FIG. 41A |
| 10 | SCNPWR | 1838, FIG. 41D |
| 11 | SCNON | 1804, FIG. 41A |
| 12 | XMIT | 19-1, FIG. 42D |
| 13 | 96/48 | 19-5, FIG. 42D |
| 14 | FOTEST | 1905, FIG. 42D |
| 15 | RSSI | 19-11, FIG. 42D |
| 16 | RXD | 19-9, FIG. 42D |
| 17 | RX AUDIO | 19-20, FIG. 42D |
| 18 | GND | GND, FIG. 41A |
| 19 | FLTCLK | 19-6, FIG. 42E |
| 20 | GND | GND, FIG. 18A |
| 21 | BUZ | 19-BUZ, FIG. 42D |
| 22 | KBUZ | 19-BUZ, FIG. 42D |
| 23 | 2VREF | 19-21, FIG. 42E |
| 24 | TXDR | 19-18, FIG. 42D |

Summary of Operation for FIGS. 42A-42E

Exemplary circuitry for effecting baud rate switching is indicated at 2072 and 2082, FIG. 22, at 2220, 2221, FIG. 35, in FIGS. 36-40, and in FIGS. 42A-42E. Operation of FIGS. 42A-42E may be summarized as follows:

Baud Rate Switching Circuit Description

Baseband Analog Processing

General: The baseband analog processing circuitry of FIGS. 41A-41H, 42A-42E is designed to be used in conjunction with a narrowband FM transceiver such as the Model RT3210 shown in Appendix A hereto. The transmitter input and receiver output of the radio assembly are intended to be DC coupled.

Receive Mode

The radio circuitry is placed in the receiver mode by applying a logic "0" to the XMIT control line designated 19-1 in FIG. 42D.

(a) Nominally, the receiver output DC component is 2.7 VDC +/−15% with the transmitter and receiver oscillators at nominal frequency. The peak to peak amplitude of the signal is determined by the FM deviation at the transmitting unit, and the voltage-frequency characteristic of the discriminator in the receiver. Typically, the amplitude 1B 600 mVpp for a FM deviation of +/−3 KHz.

(b) Baseband audio is passed to the receive analog processing circuitry through Pin J2-6, line 19-2, FIG. 42A. The voltage divider consisting of 19-R7 and 19-R2 provides attenuation of this signal and introduces a DC offset, shifting the nominally biased signal at 2.7 VDC to approximately 3.5 VDC, the analog reference voltage. The analog circuitry is designed to function correctly with the expected changes in the receiver based voltage due to temperatures, tuning, and aging induced variations in the oscillator frequencies.

Capacitor 19-C10 provides a first order lowpass filtering function, producing rolloff of frequencies above approximately 60 KHz. This prevents aliasing effects in the subsequent switched capacitor filter, 19U2A, FIG. 42B.

(c) From the junction of 19-R7 and 19-R2 the signal is passed through a programmable attenuator consisting of 19U1A and 19-R8 and a level adjustment consisting of a potentiometer 19-R9, FIG. 42B. The operation of the subsequent data detector is level sensitive, and the adjustment allows the receive processing circuit to be optimized for best performance. The level adjustment is referenced to the 3.5 VDC analog voltage reference via line 19-4, such reference potential originating at 19-U6A, FIG. 42E.

The switchable attenuator 19-U1A is controlled by the 4800/9600 line 19-S, FIG. 42A, from the digital processor, via connector 21-P/O (position 13). In the 9600 position of 19 U1A (shown) series resistor 19-R is switched out of the signal path, providing less attenuation of the received audiosignal in the 9600 baud mode where the FM deviation is reduced. In the 4800 baud mode the additional attenuation introduced by 19-R8 reduces the signal to the point where the amplitude at the input of the filter 19-U2A is the same as the amplitude at 9600 baud.

(d) Low Pass Filter 19-U2A is a switched capacitor filter with approximately a five pole 6 dB Gaussian Transitional frequency response characteristic. The filter provides a minimal DC gain of 18 dB referenced to the 3.5 BDC analog supply 19-4. The 3 dB cutoff frequency of the filter is established by a clock signal applied at 19-6, FIG. 42E, from the digital processor board, 21-P/O (position 19). The cutoff frequency is equal to the clock frequency divided by sixty-four. A frequency of approximately 350 KHz is applied in the 9600 baud mode, while approximately 175 KHz is applied in the 4800 baud mode. The output of the filter is passed through a single pole lowpass filter with a cutoff frequency of approximately 60 KHz to reduce the possibility of clock leakage from the filter affecting the subsequent detector circuitry.

The clock buffer drive/level adjustment circuit consisting of 19-Q16, FIG. 42B, 19-Q19, FIG. 42A, and associated resistors allows the 4800/9600 select line 19-5 to vary the collector resistance of the clock buffer/level translator 19-Q17, FIG. 42E, depending on which data rate is selected. At the high data rate the collector resistance is reduced to compensate for the effects of the stray capacitance in the circuit, allowing good clock symmetry at the filter input to be maintained without the use of a more complex push-pull driver circuit. At the low data rate, the lower clock frequency allows the collector resistance to be increased, reducing current drain in the circuit.

The filtered signal at 1904, FIGS. 42B and 42C, is passed through a buffer amplifier 19-u#A and via 1906, FIGS. 42C and 42D, to the comparator 19-U3B. The other input of the comparator 19-U3B is fed by the DC threshold circuit and associated circuitry. The threshold circuitry is comprised of positive and negative peak detectors with the time constant substantially longer than the expected maximum interval between the high and low amplitudes which correspond to binary mark and space conditions in the analog signal. The positive and negative peaks are averaged by a resistive voltage divider consisting of 19-R11 and 19-R14.

Normally the peak and peak amplitude at the input of the threshold restoration circuit is less than the forward voltage potential of diodes (19-CR3A, 19-CR3B, FIG. 42C). The diodes only conduct when power is applied to the analog circuitry or if large transients are present in the analog signal allowing the threshold to quickly adjust to track such conditions. Resistor 190-R12, FIG. 42C provides current lifting, reducing ripple in the threshold should the analog level approach the diode conduction voltage in normal operation.

The output of the comparator 19-U38, FIG. 42D, is provided to the digital board through connector 21-P/O (position 16), FIG. 44A, for timing recovery and further processing.

(f) The RSSI output of the receiver is applied to the analog board via line 19-10, FIG. 42E and is passed via line 19-11, FIGS. 42E, 42C, 42D, directly to an A/D convertor on the digital board through connector 21-P/O (position 15), FIG. 44A. The RSSI output is also applied to an edge detector consisting of op-amp 19-U9A, FIG. 42D and is comparators 19-U2A, 19-U2B, FIG. 42C which are part of the filter (U2) including 19-U2A, 19U2B, FIG. 42A. This circuit causes a momentary negative going pulse approximately the peak to peak amplitude of the received audio to be applied to the data detector circuitry, allowing the detector to initialize to both positive and negative peaks in the data even if the data at the detector consists of a marking (high) condition only, the normal standby state for the UART.

Transmit Mode

The radio transceiver is placed in transit mode by applying a "1" logic level signal to the XMIT line, 19-1, FIG. 42D.

(a) The transmitter modulator input is DC coupled, and requires a nominal DC bias of 3.5 volts in order to operate on the intended center frequency. The 3.5 reference supply is generated from a 5V regulated power supply by the circuit consisting of 19-R31, 19-R32, FIG. 42E, and op-amp 19 U6A. A second power supply at approximately 2V is generated with 19-U6B, FIG. 42E, in an inverting configuration with the 5V (line 19-14, FIGS. 42D, 19E) and 3.5V supplies as inputs. Circuit values for the 5V and 2V supplies being symmetrical with respect to the 3.5V supply, or the circuit may be modified to offset the 2V supply slightly to compensate for asymmetry in the modulation characteristics of the transmitter.

(b) Transmit data from the digital board is applied to the analog board through line 19-15, FIG. 42E, and then routed to DPST analog switch 19-U1B with functions as a level translator. The output of the switch is connected to either the 5V or 2V supply voltages depending on the state of the transmit data. The resulting transmit waveform is applied via 19-17 to a single pole 60 KHz filter comprised of 19-R21 and 19-C15 and analog switch 19-U1C, FIG. 42B.

(c) Integrated circuit 19-U1C, 19-R19 and 19-R20 function as a programmable attenuator controlled by the 4800/9600 line 19-5, FIGS. 42B, 42C, 42D. In the 9600 baud mode, 19-R20 is switched into the circuit reducing the amplitude of the modulating signal. In the 4800 baud mode, 19-R20 is removed from the circuit. Resistor 19-R19 serves as a level adjustment which establishes the FM deviation of the transmitter. The 3.5V analog supply voltage at 19-4, FIG. 42B, is used as a divider reference. In the 4800 baud mode the level is adjusted to produce an FM deviation of +/3.5 KHz. In the 9600 baud mode, the addition of 19-R20 reduces the amplitude to set the deviation to +/−2.4 KHz.

(d) The level adjusted signal is then applied. via line 1902 to switched capacitor filter 190-U2B. The characteristics of this filter are identical to the receiver filter 19-U2A, except that the transmit filter provides unity gain. Clock frequencies and level translator collector resistance are selected as previously described for the receiver. The output of the filter is passed through a single pole clock elimination filter consisting of 19-R18 and 19-C14, FIG. 42A, and then applied to the transmitter modulator input through line 19-18.

Two considerations that are of importance in radio frequency data communication systems are coverage of service areas and throughput. To cover a service area with a minimum number of gaps or no gaps in coverage, it is desirable to have a plurality of base stations disposed geographically so that their coverage overlaps. Such a system may be like that of U.S. Pat. No. 4,924,462, assigned to the assignee of the present invention, which is incorporated here by reference as if set forth fully. The '462 patent teaches the RTC protocol, which is a protocol that uses a non-specific poll that is useful when there is a large number of remote stations, some of which may be dormant for relatively long periods.

In that system or ones similar to it, one or more of the base stations is selected to transmit the RTC heartbeat, which is the system synchronizing signal. Responses from terminals in the service area are monitored by all of the base stations that receive signals from the terminals. In most cases, terminals will be at different distances from each of the plurality of base stations, and the resulting differences in received signal strengths at the receiving terminals will eliminate the effects of signal collision by FM capture. Bases can be networked to allow the coordination of polling of terminals that have identified themselves to the base stations during their response intervals. The use of information about the strength of signals received at the base stations allows the network to adjust broadcast signal strengths so as to poll receiving terminals simultaneously with a minimum risk of collision. This provides a number of advantages. First, a smaller number of collisions will reduce the number of delays in response due to collisions. This means that the number of slots can be reduced, thus reducing overhead. The system also allows for simultaneous communication on a single frequency when two or more terminals are so located with respect to their base stations that the same-frequency communications will not interfere with each other. Finally, the system allows a UHF spread-spectrum system to share the same local-area network.

Incorporation by Reference

The following pending patent applications contain exemplary details relating to a mobile radio data terminal generally corresponding with that of APPENDIX D2, and to cooperative environments therefor.

| U.S. Ser. No. | Filing Date | Inventor(s) |
|---|---|---|
| 07/265,842 | Nov. 1, 1988 | M. L. Sojka |
| 07/292,810 | Jan. 3, 1989 | M. L. Sojka |
| 07/305,302 | Jan. 31, 1989 | R. Miller, et al. |
| 07/347,602 | May 3, 1989 | R. Miller, et al. |
| 07/389,727 | Aug. 4, 1989 | R. Mahany, et al. |
| 07/467,096 | Jan. 18, 1990 | R. Mahany, et al. |
| 07/478,180 | Feb. 9, 1990 | S. Koenck, et al. |
| 07/478,591 (Express Mail Label No. OB 039 373 730 | Feb. 9, 1990 | G. Chadima, Jr. D. Schultz J. Krunnfusz W. Gibbs |

The disclosure of each of these patent applications is incorporated herein by reference in its entirety including Appendices and drawings.

Figure 45A:
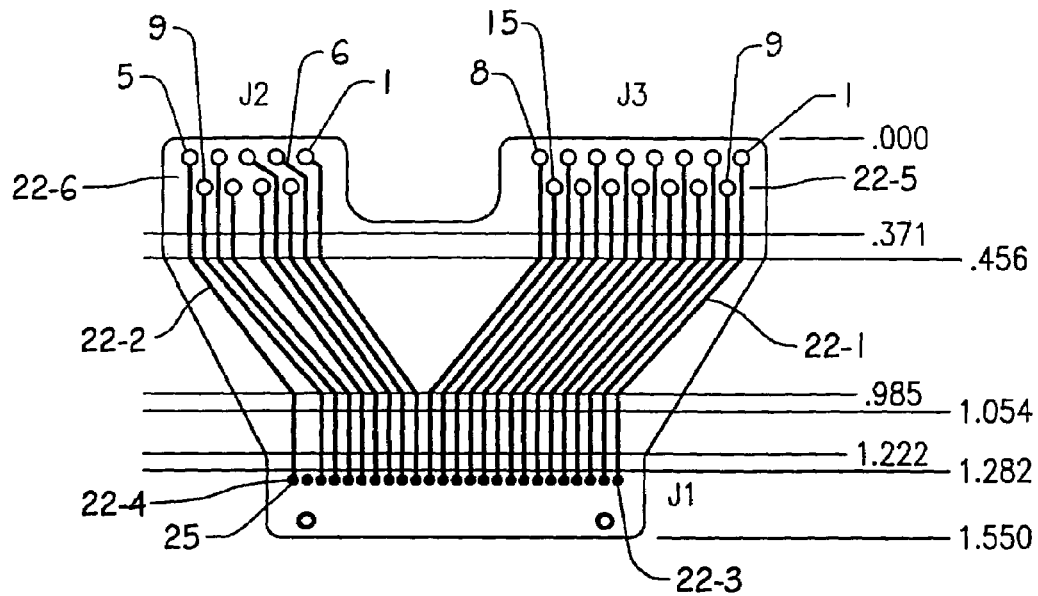
FIG. 45A shows an end cap flex circuit which may couple various terminals of the circuitry of FIGS. 43A-43H and 44A-44H with the industry standard 9-pin scanner connector and the 15-pin printer port connector which are located side by side at the base of the RT3210 mobile terminal unit shown in APPENDIX D2 hereto.
Figure 45B:
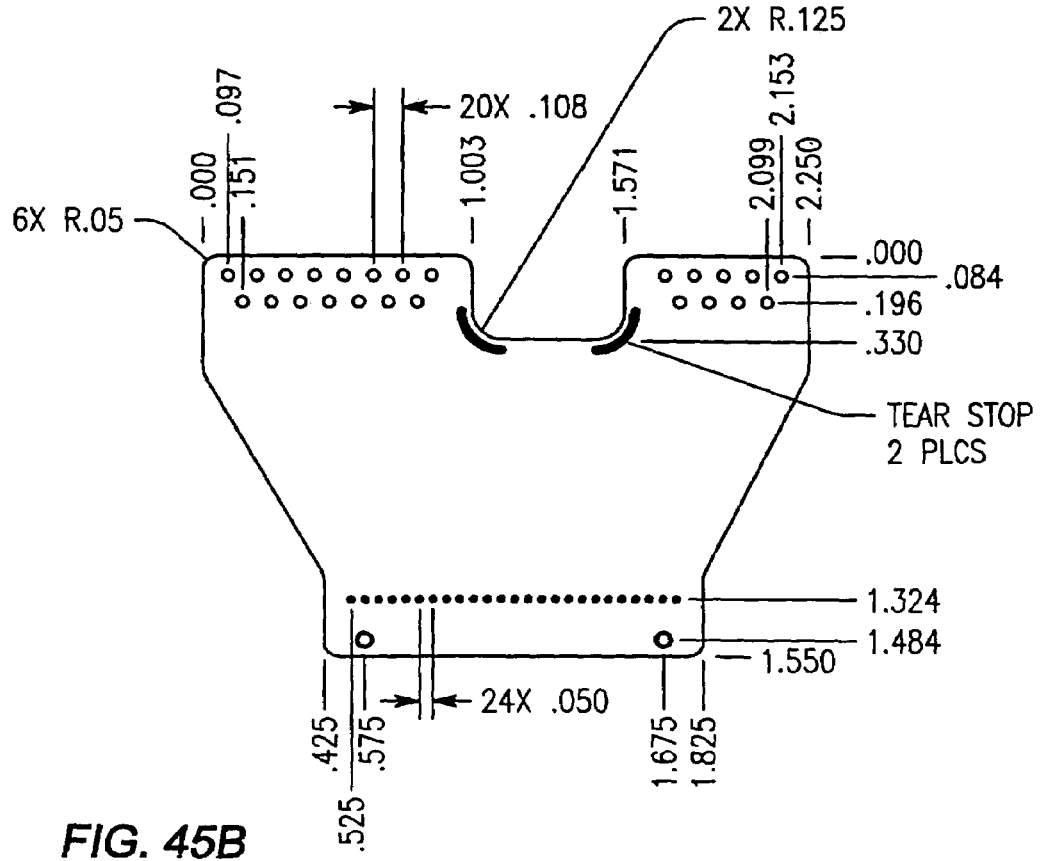
FIG. 45B is a bottom plan view of the flex connector of FIG. 45A.
Figure 46:
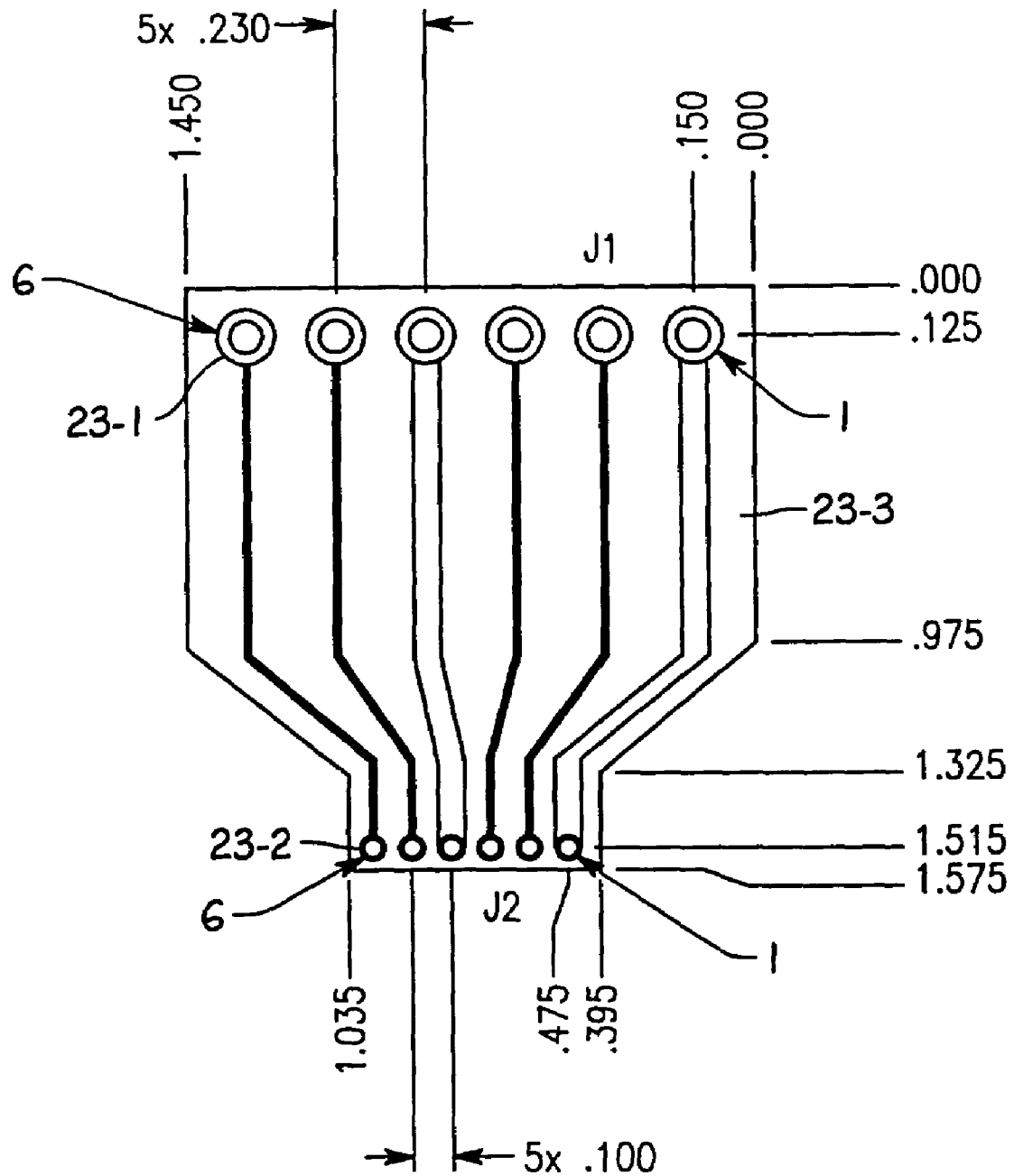
FIG. 46 shows a power flex circuit for coupling external contacts of the battery drawer of the RT3210 to the various terminals of the circuitry of FIGS. 41A (+BATT) and 41F.

Description of FIGS. 45A, 45B and 46

FIGS. 22A shows and end cap flex circuit 22-1 with conductive traces such as 22-2 between twenty-four of twenty-five solder pads such as 22-3 and respective terminal positions of a fifteen position array 22-5 and a nine position array 22-6. A printer port 15-pin D-Sub connector is associated with the positions of array 22-5 and a scanner interface 9-pin D Sub connector connects with the position of array 22-6. These D-Sub connectors are mounted in the bottom end wall of the RT 3210 terminal as shown in the eighteenth figure of the incorporated patent application filed Feb. 9, 1990 in the names of George E. Chadima, Jr. et al. The trace width of the paths such as 22-2 are either 0.020 inch or 0.080 inch, respectively. The twenty-four positions such as 22-3 connect with respective lines indicated at 20-3 in FIGS. 43A, 43B and 43E.

The six pads at 23-1 are associated with rivet-pins projecting into the battery compartment of the RT3210 as described in reference to the twenty-second figure of the incorporated Chadima, Jr. et al. patent application filed Feb. 9, 1990. The effective circuit in the battery pack is illustrated in the twenty-fourth figure of the incorporated Chadima, Jr. et al. patent application. The positions 23-2 at the opposite end of power flex connector 23-3 are associated with respective lines such as 1802, FIG. 41A and 1855-1858, FIG. 41F.

Description of FIGS. 47-50, 51A-51G and 52A-52C

In the previous example of adaptive data rate switching, the channel bandwidth constraints limited the maximum data "high" data rate that could be utilized for transmitting NRZ coded data. Significant improvements in system throughput potential can be realized within the allotted bandwidth by extending the concept of adaptively selecting data rate to include switching between source encoding methods. The preferred approach is to continue to use NRZ coding for the lower system data rate and substitute partial response (PR) encoding for the higher rate. The throughput improvements of a NRZ/PR scheme over the previously described NRZ/NRZ implementation are obtained at the expense of additional complexity in the baseband processing circuitry.

Partial response encoding methods are line coding techniques which allow a potential doubling of the data rate over NRZ encoding using the same baseband bandwidth. Examples of PR encoding methods include duobinary and modified duobinary encoding. Bandwidth efficiency is improved by converting binary data into three level, or pseudo-ternary signals. Because the receiver decision circuitry just distinguish between three instead of two levels, there is a signal to noise (range) penalty for using PR encoding. In an adaptive baud rate switching system the effects of this degradation are eliminated by appropriate selection of the baud rate switching threshold.

Since PR encoding offers a doubling of the data rate of NRZ encoded data in the same bandwidth, one possible implementation of a NRZ/PR baud rate switching system would be a 4800/9600 bit/sec system in which the lowpass filter bandwidth was not switched. This might be desirable for example if complex lowpass filters constructed of discrete components had to be used. Use of a single filter could reduce circuit costs and printed circuit board area requirements. This approach might also be desirable if the channel bandwidth were reduced below what is currently available.

The preferred implementation with the bandwidth available is to use PR encoding to increase the high data rate well beyond the 9600 bit/sec implementation previously described. An approach using 4800 bit/sec NRZ encoded data for the low rate thereby providing high reliability and backward compatibility with enlisting products, and 16K bit/sec PR encoded transmission for the high rate is utilized. The PR encoding technique is a hybrid form similar to duobinary and several of its variants which has been devised to aid decoding, minimize the increase in hardware complexity, and provide similar performance characteristics to that of the previously described 4800/9600 bit/sec implementation.

While PR encoding could potentially provide a high data rate of up to 20K bit/sec in the available channel bandwidth, 16K bit/sec was selected because of the practical constraints imposed by oscillator temperature stability and the distortion characteristics of the IF bandpass filters.

Figure 47:
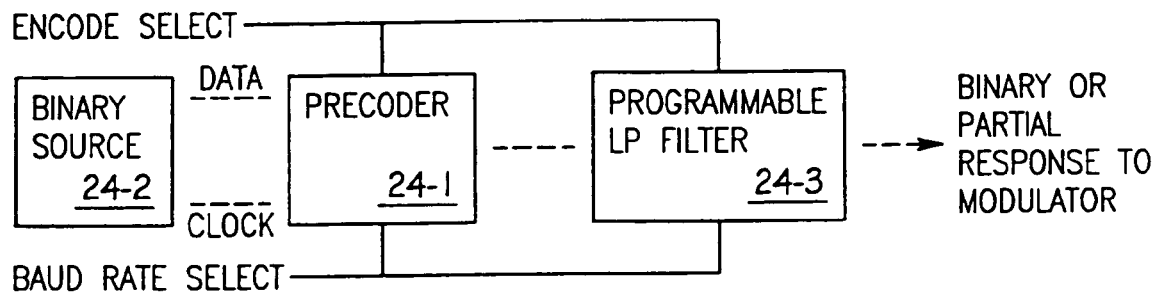
FIG. 47 is a basic block diagram showing a combined binary and partial response encoder system.
Figure 48:
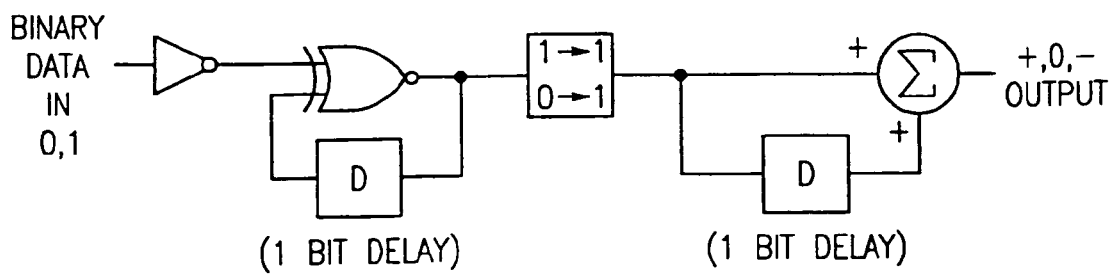
FIG. 48 is a logic diagram for illustrating the logical operation of a standard partial response duobinary encoder.

A simple block diagram of the combined 4800 bit/sec binary, 16K bit/sec partial response encoder is shown in FIG. 47. A description, of its basic operation follows.

4800 Baud Binary

The precoder 24-1 is set-up to pass binary data from binary source 24-2 directly through. The lowpass filter cutoff of programmable lowpass filter 24-3 is adjusted to pass frequencies below 2400 Hz.

16K Baud Partial Response

The precoder 24-1 is programmed to convert binary data to three level output according to the encode algorithm The lowpass filter bandwidth is programmed to provide a 4 KHz cutoff frequency.

Encode Algorithm

The encoder 24-1 is intended to accept binary NRZ encoded data in either a framed asynchronous start bit, 7 or 8 data bits, parity bit, stop bit), or a bit-synchronous SDLC format. Its output is a pseudo-ternary data stream. The encode algorithm is a hybrid scheme similar to PR duobinary encoding (duobinary with precoding). Unlike PR duobinary encoding, it is designed to address data pattern difficulties that may arise because of the characteristics of the binary source data.

(1) Run Length Limiting in the Mark State

Both framed asynchronous and SDLC encoding provide run-length lifting in the mark state, which is to say that the number of consecutive marks in the source data is constrained to some maximum number after which a space is guaranteed to be encountered. In binary transmission the key concern is having a sufficient quantity of transitions between the two possible output states to assure reliable timing recovery in the receiver. In dc coupled systems, periodic transitions may also be required to establish and maintain the decision threshold.

In a partial response implementation, the transitions provided in the binary source data may not be sufficient to provide efficient data recovery in the receiver. For example, the standard PR duobinary encoder (FIG. 1) is generally implemented so that of the 3 possible output states denoted here as +, 0, and –, the two outside states, + and –, correspond to a binary mark input, while the center or 0 state corresponds to a binary space input. For an arbitrary input sequence of some number of marks, followed by some number of spaces, followed by another series of marks, the encoder output may move between all three of the possible states, or only two of three states depending on whether the number of spaces is even or odd. For certain repetitive data patterns the output may not visit all three output states for an indefinite period of time as shown in the following examples:

a) BINARY 1001001001001001001001001001001001 . . .
   PR DUOBINARY
   +00+00+00+00+00+00+00+00+00+00+00+. . .
b) BINARY 101001001001001001001001001001010010 . . .
   PR DUOBINARY
   +0–00–00–00–00–00–00–00–00–00–00–0 . . .

In the hybrid encoding scheme used for this system, the precoding algorithm has been defined so that the presence of any number of spaces in the input data stream always causes the next mark encountered to assume the opposite output state of the previous mark. Using this "Alternating Mark Rule" the two examples above are coded as follows:

a) BINARY 1001001001001001001001001001001001
   HYBRID PR ENCODING
   +00–00+00–00+00–00+00–00+00–00+00–
b) BINARY 1010010010010010010010010010010010010010
   HYBRID PR ENCODING
   +0–00+00–00⁻00–00+00–00+00–00–00+00–0

2) Run Length Limiting in the Space State

Neither SDLC or framed asynchronous binary data are run length limited in the space state, although framed asynchronous data can be considered RLL if use of the ASCII null character is prohibited. The standard duobinary encoder produces an unconstrained sequence of the 0 output sequence state for a lengthy sequence of space inputs. The hybrid encoding scheme provides run length lifting in the space state by performing a block substitution of an alternative output pattern for sequences of eight consecutive space inputs. This substitution pattern is easily recognized in the receiver data recovery circuitry because it intentionally violates the Alternating Mark Rule described above.

An example Of block substitution is shown below.

BINARY:
1011000000000111000000000101000000000000000001011

PR DUOBINARY:
+––000000000+++00000000+0–0000000000000000–0++

HYBRID PR ENCODING:

+0––00––00++0–––00––00++ +0–00––00++00––00++ +0–– where ^^^^^^^^ denotes substitution of a 00++00–– or 00––00++ pattern depending on the value of the previous mark output.

Figure 50:
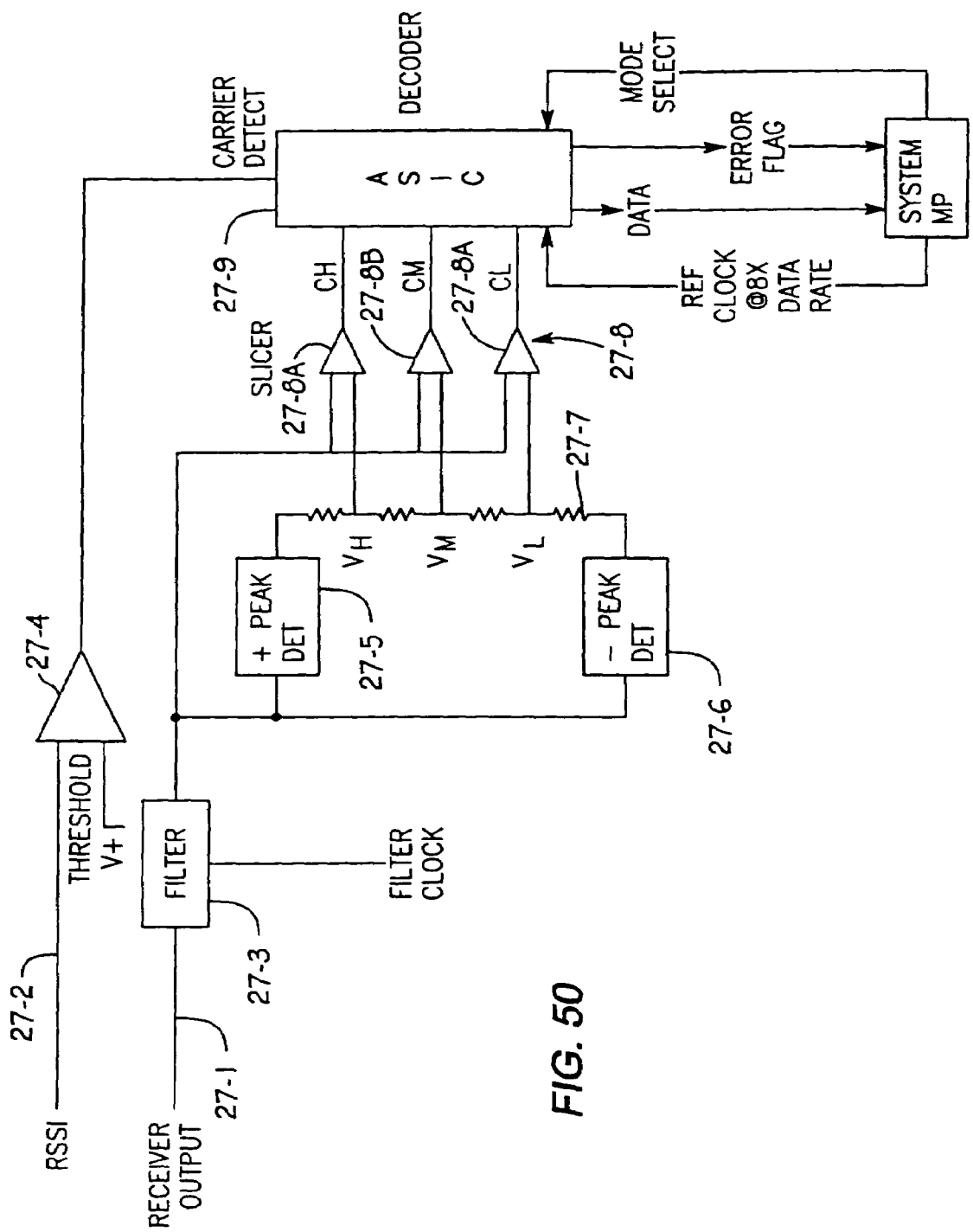
FIG. 50 shows a receiver system for decoding the hybrid partial response encoder signals generated according to FIG. 49A-49B.

The full transmit encoder is comprised of the precoder and the transmitter lowpass filter which provides bandlimiting. IN ACTUAL PRACTICE THE DATA PATTERNS ABOVE ARE ONLY CHARACTERISTIC OF THE WAVEFORM AT THE OUTPUT OF THE RECEIVER LOWPASS FILTER AT THE CENTER OF THE BIT INTERVAL. FIG. 26 shows a detailed block diagram of the preferred implementation of the transmitter baseband circuitry. FIG. 50 shows the companion receiver. FIGS. 51A-51G show a waveform diagram for a representative data sequence.

Figure 49A:
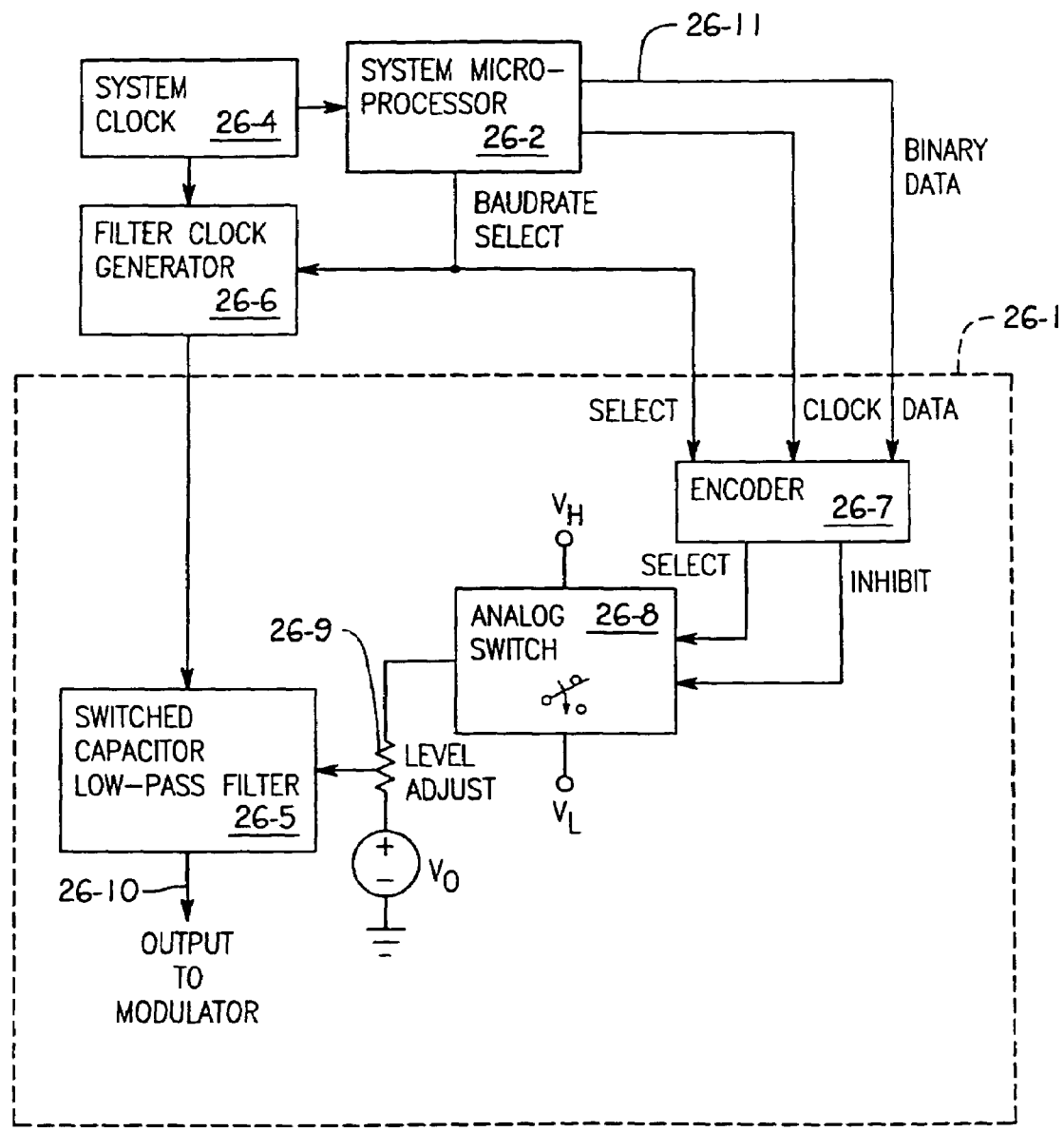
FIGS. 49A and 49B show respective detailed block diagrams for implementing a hybrid partial response encoder system according to FIG. 47.
Figure 49B:
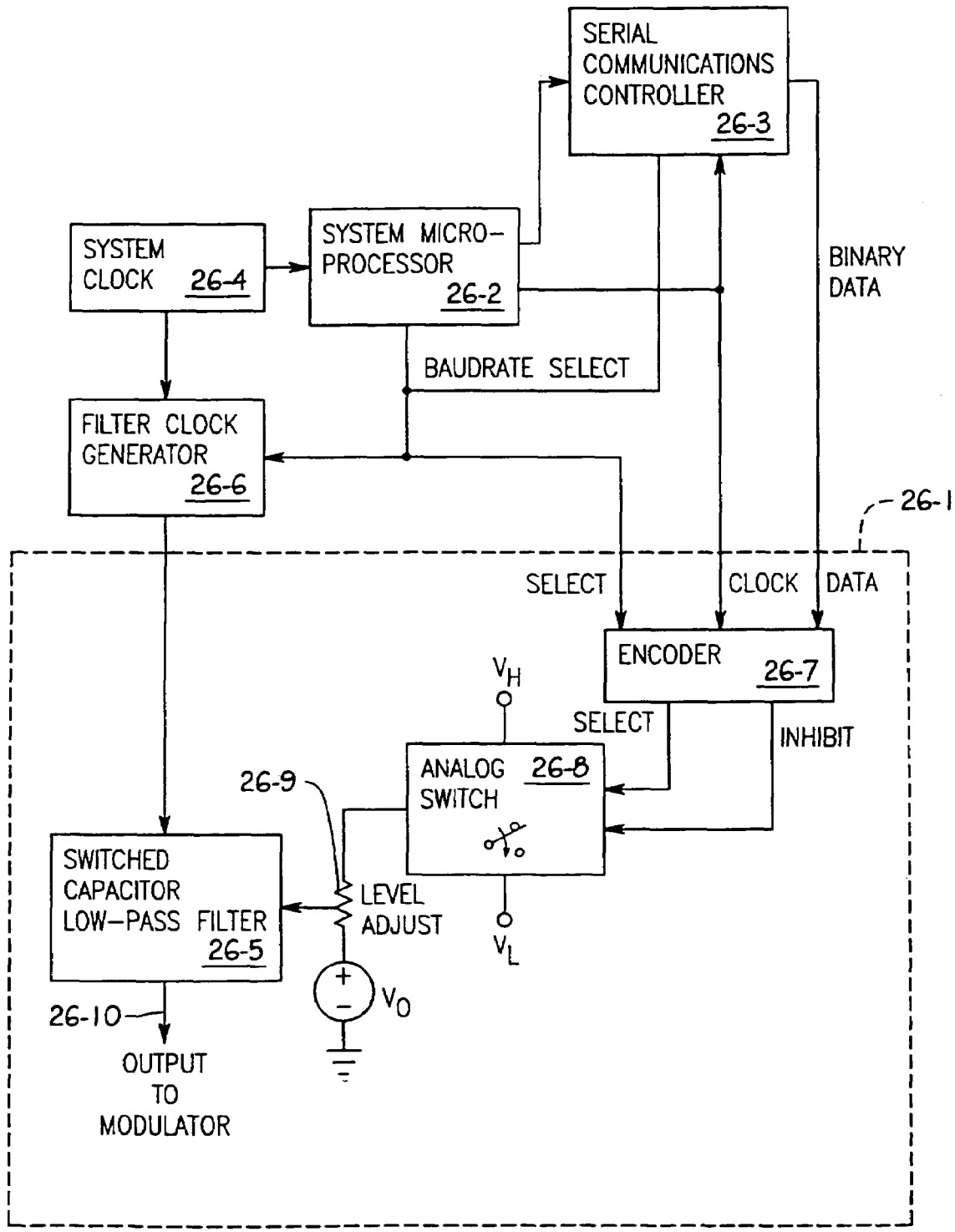

Description of FIGS. 49A and 49B The encoder is shown in the block 26-1 defined by the dotted line. The remaining blocks describe the system control and data source components. These functions are similar to those of the corresponding blocks in the previous 4800/9600 bit/sec approach. A system microprocessor 26-2 provides control functions, and may also be the data source to supply binary data as indicated at 26-11, FIG. 49A. Alternatively as indicated in FIG. 49B a serial communications controller 26-3 may be utilized to offload the communications function for the system microprocessor or provide enhanced communications capabilities. A system clock 26-4 provides a common timing source for all system components. This clock source is used to derive clock signals for the switched capacitor data filter 26-5. The filter clock generator 26-6 is a programmable counter device capable of generating the two clock frequencies necessary to provide 2400 z and 4800 Hz filter cutoff characteristics.

The encode algorithm is generated in an application specific integrated circuit 26-7 in combination with the low pass filter 26-5. The ASIC 26-7 perform a preceding function which provides two outputs to a double pole single throw analog switch 26-8. Alternatively, the precoding function could be implemented in discrete hardware, the system microprocessor, or a dedicated radio link microprocessor.

The first of the precoder outputs is a select line which causes the switch to connect its output to one of two possible input voltages, VH or VL. The selected output voltage is then divided against a reference voltage Vo through a level adjustment potentiometer 26-9 to produce a voltage of Vo+/–D. The second output of the precoder ASIC is an inhibit line which causes the output of the switch to attain a high impedance state. In this case the output of the level adjust potentiometer 26-9 is Vo.

The level adjust output is applied to the input of the low pass filter 26-5 which ideally exhibits unity gain for frequencies below its programmed cutoff frequency. The filtered output at 26-10 is applied to the FM modulator. In operation the filter provides integration of the discontinuous input waveform, providing a continuous phase signal to the modulator.

The relationships between the voltages at the output of the filter and the FM modulator output is as follows. When Vo is applied to the modulator the transmitter output frequency is the channel center frequency. Sustained application of Vo+/–D produces a positive or negative deviation in the carrier frequency proportional to the magnitude of D.

4800 Baud Operation

In 4800 bit/sec operation, the filter 26-S is switched to provide a 2400 Hz cutoff characteristic. The precoder 26-7 is enabled in a straight pass-through mode, and its inhibit output is not used. The output of the analog switch 26-8 produces a signal which toggles between VH and VL in accordance with the input data. The signal is then attenuated, filtered, and applied to the modulator.

16K Bit/Sec Operation

In the 16K bit/sec mode the filter cutoff characteristic is selected to be 4 KHz and both precoder outputs are enabled. Data is shifted into an internal shift register for look ahead processing using the provided data clock. This results in several bits time delay in message transmission which must be accounted for by the system processor 26-2. The precode algorithm characterized by the following simplified truth tables.

Standard Precode

The standard precode truth table generates $SELECT_i$ and $INHIBIT_i$ for any arbitrary $BIT_i$ out of an n bit message.

STANDARD PRECODE

| Inputs | | | | Outputs | | |
|---|---|---|---|---|---|---|
| $MARK_{i-1}$ | $BIT_{i-1}$ | $BIT_i$ | $BIT_{i+1}$ | $SEL._i$ | $INH._i$ | $MARK_i$ |
| 1 | 1 | 1 | x | 1 | 0 | 1 |
| 0 | 1 | 1 | x | 0 | 0 | 0 |
| 1 | 1 | 0 | 1 | 0 | 0 | 1 |
| 0 | 1 | 0 | 1 | 1 | 0 | 0 |
| 1 | 1 | 0 | 0 | 0 | 1* | 1 |
| 0 | 1 | 0 | 0 | 1 | 1* | 0 |
| 1 | 0 | 0 | x | x | 1 | 1 |
| 0 | 0 | 0 | x | x | 1 | 0 |
| 1 | 0 | 1 | x | 0 | 0 | 0 |
| 0 | 0 | 1 | x | 1 | 0 | 1 |

NOTES:
*denotes that this output is switched after fractional bit time delay.
MARK is stored internal to the decoder for use in calculating SELECT and INHIBIT.
Definitions
$BIT_i$ - CURRENT INPUT DATA BIT
$BIT_{i-1}$ PREVIOUS INPUT DATA $BIT_i$
SELECT - OUTPUT TO MODULATOR
INHIBIT = HIGH IMPEDANCE CONTROL
$MARK_i$ = PRESENT MARK VALUE
$MARK_{i-1}$ PREVIOUS MARK VALUE
x DENOTES an arbitrary or "don't care" condition.

For the initial bit in a message, $BIT_1$, $BIT_0$ and $MARK_0$ are both assigned the 1 value.

| BIT | FOR MARK = 1 $i-1$ | | FOR MARK = 0 $i-1$ | |
|---|---|---|---|---|
| TIME | SEL. | INH. | SEL. | INH. |
| i | 0 | 1* | 1 | 1* |
| i + 1 | 0 | 1 | 1 | 1 |
| i + 2 | 1 | 0 | 0 | 0 |
| i + 3 | 1 | 0 | 0 | 0 |
| i + 4 | 0 | 1* | 1 | 1* |
| i + 5 | 0 | 1 | 1 | 1 |
| i + 6 | 0 | 0 | 1 | 0 |
| i + 7 | 0 | 0 | 1 | 0 |

Look Ahead Encode

Look ahead encode is used whenever the present bit, and the next seven bits are all zero. In this case the entire eight bits is replaced with a substitution pattern which provides run length limiting.

RECOVERY TABLE

| Inputs | | | Outputs | | |
|---|---|---|---|---|---|
| $MARK_{i-1}$ | $BIT_{i+7}$ | $BIT_{i+8}$ | SEL. | INH. | MARK |
| 0 | 0 | 0 | 0 | 1* | 0 |
| 1 | 0 | 0 | 1 | 1* | 1 |
| 1 | 0 | 1 | 0 | 0 | 0 |
| 0 | 0 | 1 | 1 | 0 | 1 |

MARK is saved at its value prior to the substitution pattern insertion, PBIT is set to '0'.

If, at the conclusion of the substitution sequence another eight consecutive '0' string is detected, the substitution process is repeated. Otherwise, the outputs for the next bit are determined from the recovery table below. Thereafter the standard encode algorithm is used.

The use of the delayed activation of the INHIBIT line is necessary in order to minimize intersymbol interference in the receiver. The amount of delay used is dependent on the pattern of the input data stream. The delay is implemented by utilizing a internal clock rate of eight times the actual data rate and using a look ahead algorithm which activates the inhibit line after a five or six cycle delay.

Receiver Data Recovery

Description of FIG. 50.

The majority of the data recovery function is included in an ASIC or dedicated link microprocessor. Ideally the decode function is implemented in the same physical hardware as the encoder in order to control costs.

The data recovery circuitry accepts two input signals from the receiver. One is the receiver baseband audio output at 27-1, the other is the received signal strength indicator or RSSI. The baseband signal is applied to a lowpass filter 27-3 similar to that used in the transmitter, in order to bandlimit the recovered data prior to further processing. The RSSI is applied to a comparator with a fixed threshold in order to provide a carrier detect indication and initialize the data recovery process.

The filtered audio is applied to positive and negative peak detectors 27-5 and 27-6. The outputs of the are applied to a resistive ladder network 27-7 which provide three threshold voltages (VH, VM, and VL) at 75%, 50%, and 25% of the voltage differential between the two detected peaks.

These serve and reference voltages for the slicer 27-8 which follows.

The slicer is a bank of three comparators 27-8A, 27-8B, 27-8C to which the filtered audio signal is applied. The three outputs each produce a logical one output whenever the input signal exceeds the comparators respective thresholds, and logical zero outputs otherwise. The three outputs, labelled CH,CL,CM are applied to the decoder.

The decoder 27-9 provides both clock recovery and data decision functions. In the partial response mode, clock recovery is obtained by synchronizing an internal counter which is fed by the externally provided 8× clock at 27-10 with transitions that occur on the C8 and CL inputs. A digital phase lock loop is used for this purpose. Clock recovery in the NRZ mode is based upon transitions that occur on the CM input only, but is otherwise identical to that of the PR code. In either case, clock initialization is aided by a synchronization sequence which is provided at the beginning of each message.

Data recovery in both codes is based upon multiple sampling of the proper slicer outputs (CH, CM and CL for PR, CM for NRZ) on both the positive and negative going edges of the 8× clock during the expected bit interval. A weighted voting circuit which favors samples taken near the center of the bit period is applied to determine the probable state of each respective bit.

In the PR code the decoder 27-9 also identifies coding rules violations, in which case the error flag at 27-12 is activated and block replacement for consecutive zeros in the data, in which case the substitution pattern is replaced with the original string. This is accomplished using an internal shift register which delays the output by eight bits over the input. In a more complex implementation a maximum likelihood sequence detector could be utilized in the decoder to improve performance under low noise conditions.

Waveform Diagram

Description of FIGS. 51A-51G

FIG. 51A-51G shows various output waveforms for a short data pattern in which no block substitutions are required. As these waveforms are hand drawn, inaccuracies are prevalent, particularly in the two filtered signals, FIGS. 51E and 51F. Signals 28-1 and 28-2 of FIGS. 51A and 51B show a reference clock signal and the sample binary data pattern. Signals 28-3 and 28-4 at FIGS. 51C and 51D represent the SELECT and INHIBIT outputs of the precoder which are applied to the switch output. The switch output, which is applied to the transmitter filter is shown as signal 28-7 in FIG. 51G.

Signals 28-5 and 28-6 of FIGS. 51G and 51F represent the respective outputs of the transmitter and receiver filters. The clock transition points have been superposed on the analog waveforms. Linear phase filter configurations are used in both the transmitter and receiver. Normally these filters exhibit a significant tine delay. For clarity the delay has been normalized out. The "+", "−", and "0" been added to FIG. 51F to show the correlation between the analog waveform and the coding examples previously waveform and the coding examples previously provided. FIG. 51F illustrates the effect of high frequency attenuation caused by the imperfect amplitude characteristics of realizable filters. Note that whenever a signal "1" bit bracketed by "0" bits is encountered in the source data, the receive filter output does not reach full amplitude. If necessary to improve reliability compensation such as a preemphasis filter or a pattern dependent "boost" circuit can be added to the transmit circuitry to reduce this effect.

FIGS. 28E and 28F also illustrates the utilization of the integrating properties of the filters to bandlimit the transmitted signal and to eliminate intersymbol interference in the receiver. Of particular importance is the delayed application of the INHIBIT line when the data pattern consists of a "1" followed by two or more "0's". The delay allows the transmitter filter to overshoot the middle state slightly. The further integration provided by the receiver filter results in a smooth transition to the middle state with little or no overshoot. Without this delay the receiver filter output would not reach the middle-state prior to the sampling instant, resulting in reduced noise immunity.

Compatibility of 4800/9600 Baud and 4800/16K Equipment Operating on the Same System The binary NRZ portion of the data transmitter and receiver baseband processing circuitry described above is equally suited to 9600 bit/sec operation as it is to 4800 bit/sec operation, providing that proper clock frequencies are furnished to the switched capacitor filter and encoder/decoder, and that the switchable attenuators described in the 4800/9600 baud block diagram are included to compensate for the lower FM deviation allowed at 9600 baud. It is conceivable that a base station utilizing the above approach could be required to communicate with portable devices employing 4800/9600 switching in addition to those employing 4800/16K switching. In either case, the earlier philosophy that all system control functions will be implemented at the lower system data rate will be maintained.

In order to accommodate the two differing higher data rates, some indication of the type of equipment associated with each terminal address must be provided. This can easily be provided by including equipment identification with the system control data which is provided in each transmission. An alternative is shown in FIGS. 29A-29C in which auto discrimination is illustrated.

Both 4800 and 9600 bit/sec transmission utilize a 15 ms initialization period prior to data transmission. This time period is reserved to allow transmitter, receiver and detector hardware to stabilize, and to allow transmission of initialization patterns for data recovery circuitry. Auto discrimination between 9600 and 16K bit/sec transmissions can be accommodated by reducing the initialization period for the 16K bit/sec transmission. In FIGS. 52A-52C initialization for 16K bit/sec communications begins at 8 ms with actual data transmission beginning at 10 ms. The system processor can initialize the decoder for 16K bit/sec reception whenever high data rate operation is expected, and revert to 9600 bit/sec operation if a valid initialization sequence is not detected at the 10 ms interval.

To assure compatibility between 48/96 48/16K systems, use auto differentiation based upon timing as indicated in FIGS. 52A-52C. FIG. 52C shows that 16K bit starts about 8 ms; FIGS. 52A and 52B shows that 48 and 96 start about 15 ms. This allows 4800/9600 and 48/16K terminals to operate on the same system without undue complexity. A transmit key-up interval is indicated at 19-1A, 19-1B, 19-1C in FIGS. 52A-52C, respectively.

Figure 21A:
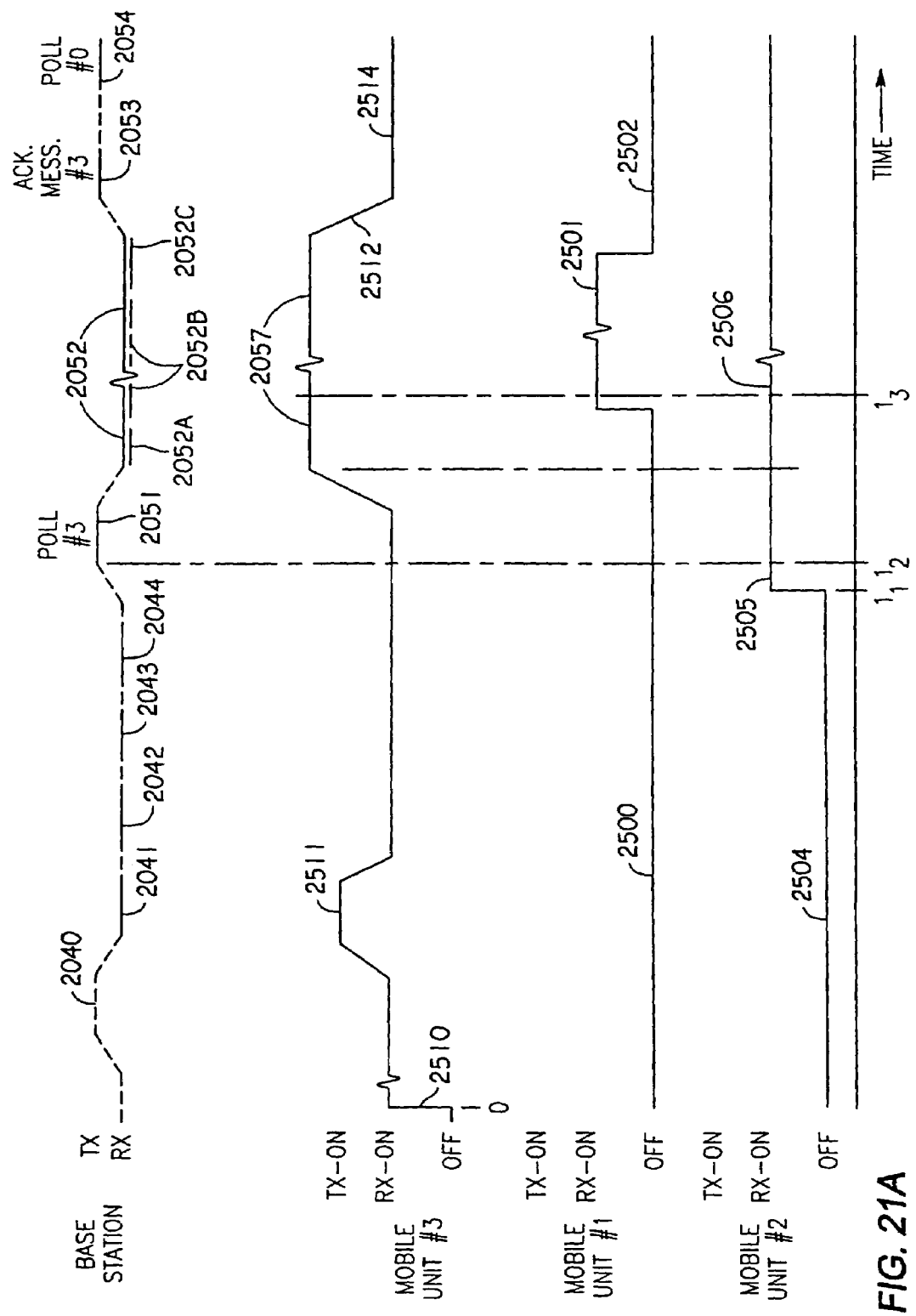
FIG. 21A is a modified version of FIG. 21.

Description of FIG. 21A

FIG. 21A illustrates an exemplary base transceiver polling and communication process which may be directed to the mobile transceiver units #1, #2, and #3 and the time dependent cycling from power conservation dormant status of the mobile transceiver units to active receiving status thereof.

In FIG. 21A, mobile unit #1 is illustrated in its dormant/active cycle where the unit remains off for a five second period as at 2500 and at 2501 unit #1 assumes receive mode for a 100 millisecond period whereupon, having received no signal addressed to it and having no data to send, it returns to "off" (dormant) state at 50% to begin a new dormant/active cycle. Mobile transceiver unit #2 is illustrated as being in off status at 2504 and as cycling to receive mode at 2505. In one embodiment the polling signal at 2051 (even though not addressed to unit #2) may trigger a ten second timing interval at 2506 at the end of which if no further RF signal has been received until #2 will move to off (dormant) state and resume its dormant/active cycling. (The signal at 2507 may not be of received strength at units #1 and #2 sufficient to cause an increase in the active cycles at 50-1 and 2506).

Mobile transceiver unit #3 turns on its receive at 2510 when it has determined that it has a message to send. Unit #3 would bid-for attention at 2511, e.g., in response to general poll 2040 of FIG. 21A, would send its message at 2507, and then switch to receive at 2512, and stay on for ten seconds as indicated at 2514 whereupon it would resume the power saving cycle of one second RX-ON, five seconds—radio OFF in the absence of a received RF signal.

When a mobile transceiver unit has no message to send, it will remain in receive enable state for a fixed time, e.g., ten seconds and if no message is directed to the mobile transceiver unit, and further, no input is otherwise made to the mobile transceiver unit, e.g., by the user, then the mobile transceiver unit will commence a cycle of alternating dormant and active states, e.g., five seconds off or dormant and one second on or active, that is, in receive mode, ready to receive a message from a base transceiver. The cycling will continue until the mobile transceiver unit receives a signal addressed to it whereupon the mobile transceiver unit will remain in active state, that is, in receive or transmit mode until completion of its communication with the base transceiver. Following completion of the communication with the base station, the mobile transceiver unit will remain in receive mode for a fixed time, e.g., ten seconds, and return to the alternating dormant and active cycling, thereby conserving power in the mobile transceiver the mobile transceiver unit. If a polling signal or a message of any type is received by a mobile transceiver unit during any active state portion of its active/dormant cycling, the mobile transceiver unit, e.g., unit #1 will remain enabled, that is, in active state and will receive messages and transmit in response thereto until the communication session has been completed. Further, when a mobile transceiver unit is powered up by a user, such as by manipulation of its keyboard or by other directly coupled input means, e.g., by scanner means, the mobile transceiver unit will remain in active, receive mode for the fixed time period, e.g., ten seconds, there following before returning to its alternating dormant/active cycle. However should any input signal be received by the mobile transceiver unit during the initial fixed time period before cycling begins, the mobile transceiver unit will remain in enabled, that is, receive mode until a fixed period elapses during which no signal or other stimulus is received.

The structure of the internally operated command sequencing within the processor of a mobile transceiver unit having the cyclic dormant/active power saving feature of the present disclosure is presented in Appendix D which occupies two pages following Appendices A, B, and C.

Figure 53A:
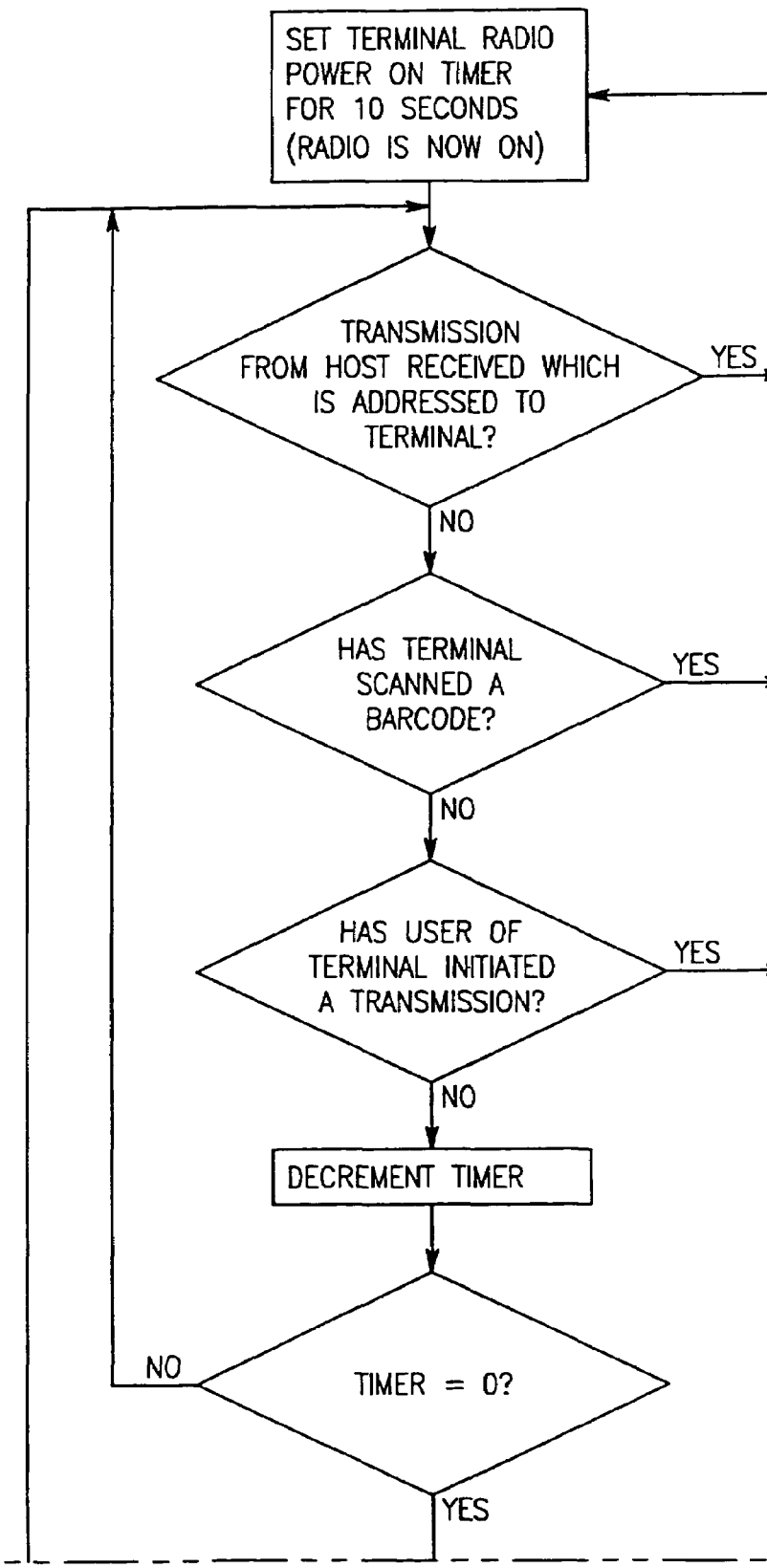
FIGS. 53A and 53B together comprise a flow chart showing a power saving standby or sleep mode feature of the mobile transceiver units.
Figure 53B:
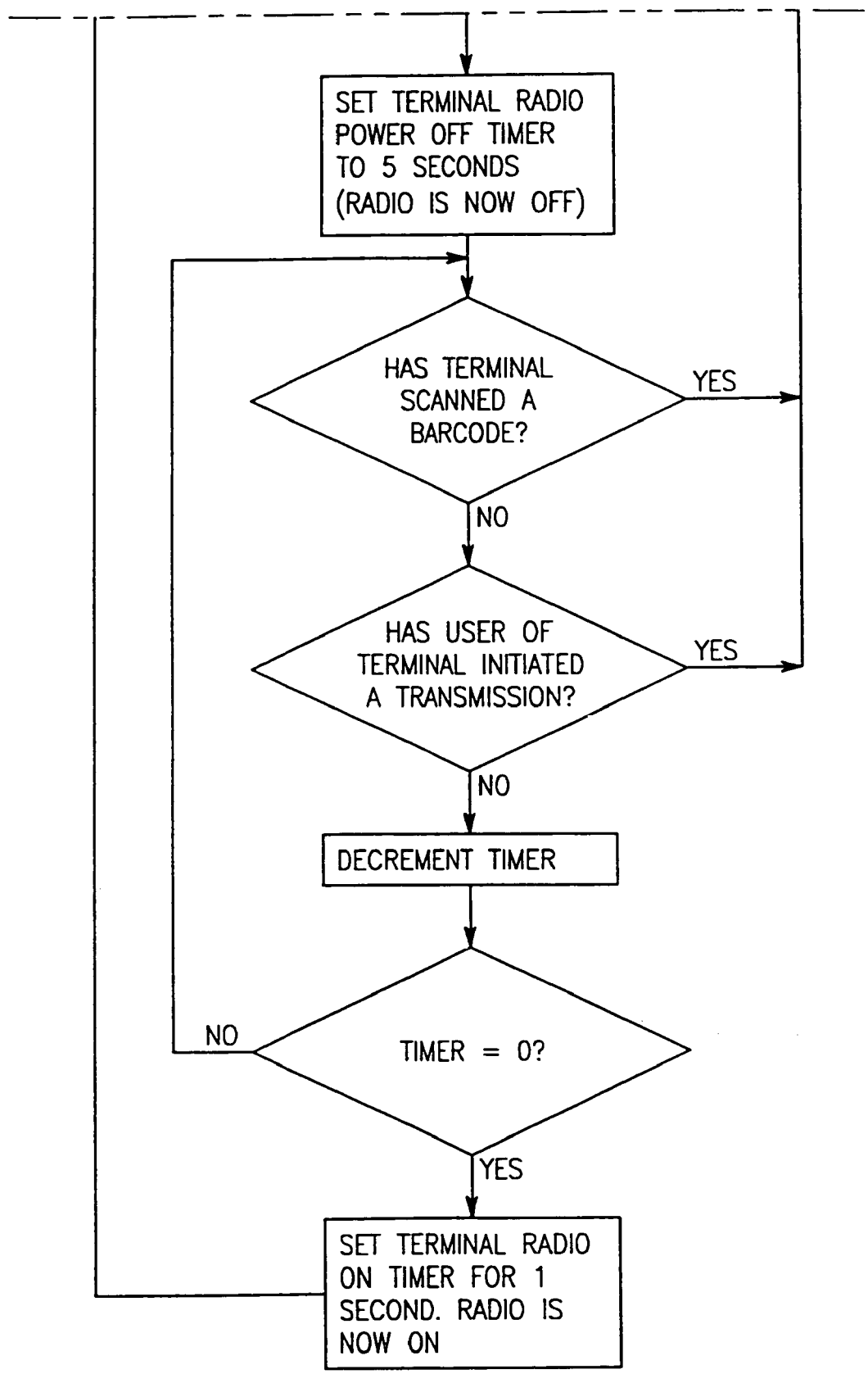

Description of FIGS. 53A and 53B

FIGS. 53A and 53B together comprise a flow chart with the operation of a mobile transceiver unit with the dormant/active power saving feature. When the terminal radio is on, the system tests for reception of a transmission from the base station, and turns the terminal radio on for ten seconds if it detects one. If it does not, it tests to see if the terminal has scanned the bar code. If so, it turns the radio on for ten seconds. If not, it tests to see if the user has initiated a transmission. If so, it turns the terminal on for ten seconds. If none of these events occur, the cycle repeats until a timer turns the radio off. The sequence tests to see if the terminal has scanned the bar code and, if not, if the user has initiated a transmission. If the answer is yes, the radio is switched on for ten seconds; otherwise, the cycle repeats until a timer times out the test, in which case the radio is turned on for one second to listen for a poll.

Other Embodiments

Instead of switching between higher and lower baud rates, other techniques in switching between a more conservative to a less conservative mode of communication might also be used. For example, with a communication system using direct-sequence spread spectrum transmissions, the length of the spreading code might be adjusted. Shorter-length spreading codes having less noise immunity might be used when the receiver is able to successfully receive transmissions. Because the spreading codes are shorter, data throughput will be at a maximum. However, when the receiver is unable to successfully receive transmissions, a longer-length spreading code could be used to provide enhanced noise rejection, even though data throughput is sacrificed.

Similarly, using frequency-hopping spread spectrum transmissions, the receiver might switch between slow-hopping and fast-hopping modes. For example, a slow-hopping mode (where there are typically several symbols per hop) might be used when communication attempts prove successful, i.e., the noise on the channel has not affected transmission. Where communication proves unsuccessful while using slow-hopping, a fast hopping mode (where there are typically several hops per symbol) might be used. Switching in this manner, optimizes the rate of data throughput on the channel.

Figure 54:
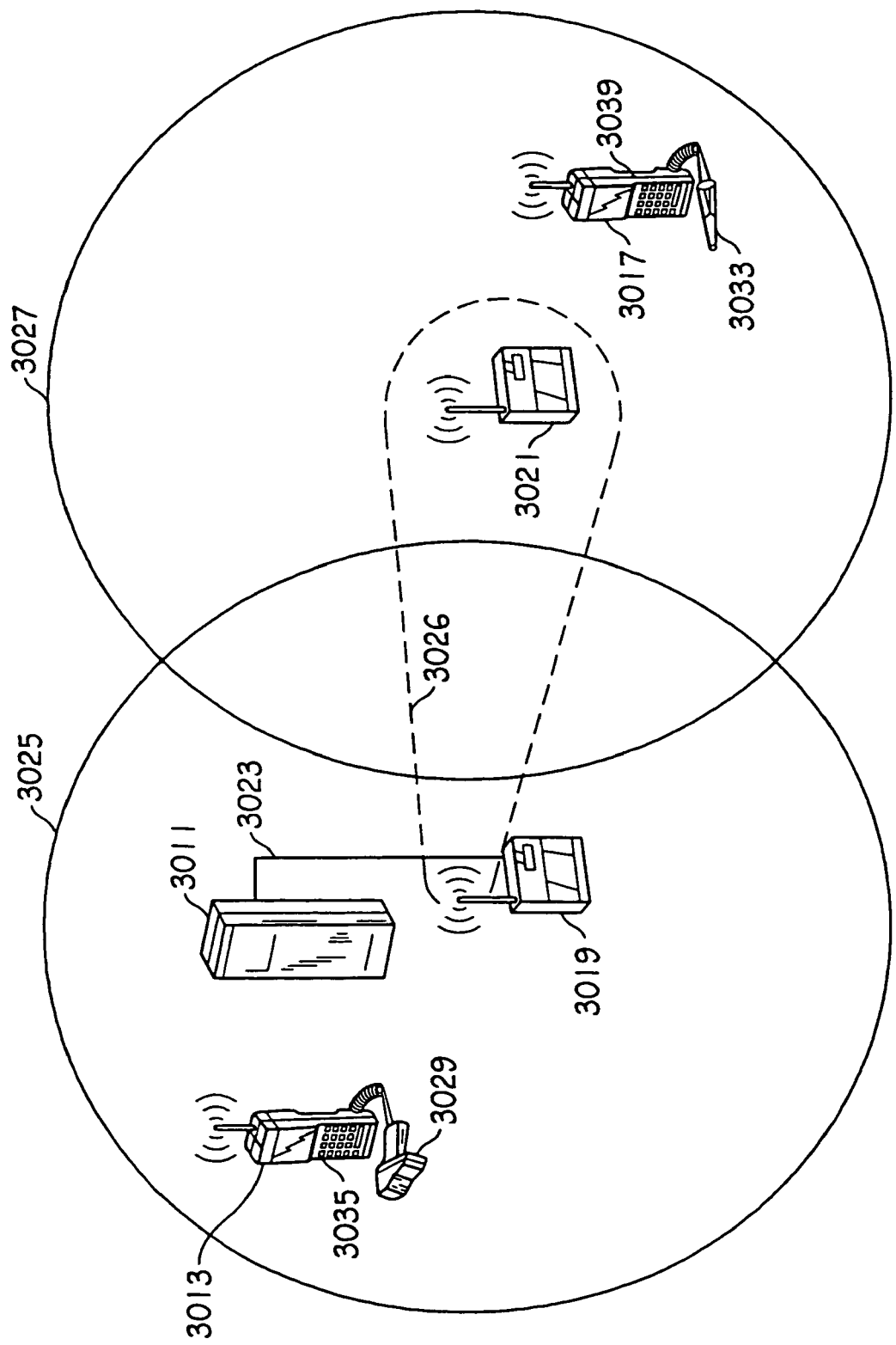
FIG. 54 illustrates the use of a programmable directional antenna system in the communication system having the basic communication pathways and spatial relationships between a host computer, base stations and mobile transceiver units of the present invention.

Description of FIG. 54

FIG. 54 illustrates the use of a programmable directional antenna system in the communication system having the basic communication pathways and spatial relationships between a host computer, base stations and mobile transceiver units of the present invention. In one preferred embodiment, host computer 3011 can be either an IBM AS400 or 3090 mainframe. Base stations 3019 and 3021 are NORAND RB4000 products and mobile transceiver units 3013 and 3017 are NORAND RT1100 products. Although only one host computer, two base stations and three mobile transceiver units are shown for simplicity, the use of additional host units, many more base stations and hundreds of mobile transceiver units are contemplated.

If the remote terminals 3013 and 3017 desire a communication exchange and are within the RF range of each other, they can use direct RF transmission to communicate. If they are not within RF range, an indirect communication link using the base stations 3019 and/or 3021 must be used. A communication exchange between the mobile transceiver units 3013 and 3017 and the host computer 3011 require the assistance of the base stations 3019 and 3021. The base stations 3019 and 3021 receive communications via one link medium and relay those communications along another. Particularly, a "hard-wired" connection such as an IEEE 802.3 (ethernet) interface provides a link 3023 to host computer 3011, while radio frequency (RF) transmission provides the link to the mobile transceiver units 3013 and 3017.

The RF range of the base stations 3019 and 3021 is illustrated in FIG. 54 by the respective circular boundaries 3025 and 3027. The boundaries 3025 and 3027 represent the maximum radial distance from the base stations 3019 and 3021 that RF communications can be maintained.

The communication link between the base stations 3019 and 3021 may consist of either an RF link (as shown) or a "hard-wired" connection. If, for example, the base station 3019 desires communication with the base station 3021, the base station 3019 could increase its transmission power so as to extend the boundary 3025 to encompass the base station 3021. This not only wastes energy (which is especially important where the base stations are battery powered) but also creates greater overlapping regions of the boundaries 3025 and 3027 with boundaries of other base stations (not shown). This results in a greater number collisions, slowing down the communication channel.

A better approach for solving this problem is found in the use of a programmable, directional antennas. Specifically, when the base station 3019 desires communication, instead of increasing transmission power on the non-directional antenna system, the base station 3019 transmits using a directional antenna system which is aimed at the base station 3021. The broadcast area and range using the directional antenna is illustrated by a boundary 3026. In fact, in this arrangement, the base station 3019 may be able to decrease the transmission power and still maintain communication. Because the overall transmission area (encompassed by the boundary 3026) is relatively small and located between the base stations 3019 and 3021, interference with other peripheral base stations (not shown) is minimized.

Additionally, the aiming of the antenna and the power level of the transmission is programmably adjusted by the base stations. In this way, each base station having the location and required transmission power information can aim and transmit to any other base station in the communication system with maximum communication channel usage. Moreover, the transmission power might also be adjusted during a transmission so as to the maintain the communication at the lowest energy level possible. Such an adjustment would operate in a feedback fashion. Aiming might also be adjusted by the transmitting base station in this same feed-back manner.

An alternative to storing location and signal strength information locally at each base station, such information may also be stored by the host computer for later access by the base stations. Such information may also be assembled into to map out the RF terrain. This information could provide both RF interference characteristics and resource coordinates.

In addition, mobile transceiver units 3013 and 3017 collect data, that must be communicated to the host computer 3011. This data is collected either via respective bar code readers 3029 and 3033 or keyboards 3035 and 3039. U.S. Pat. Nos. 4,910,794; 4,924,462; and 4,940,974 provide a further description of these readers and data collection.

For optimal performance during the process intensive steps of data collection such as bar code reading and decoding, the system clock rate should be made as high as possible. However, having a high system clock rate causes the generation of digital noise in and around the mobile transceiver unit. This noise can effect transmission and reception at the mobile unit causing a reduction in the effective communication range. This problem is solved by using a dual system clock rate. Specifically, each mobile transceiver unit normally operates at a slow system clock rate to minimize interference in transmission and reception. During data collection such as bar code scanning, the system clock is switched to a fast clock rate to allow the bar code scan to be processed at a higher rate. This allows the RF data link to coexist with both the need and hardware support for bar code scan decoding.

Reference is made pursuant to 35 USC 120 to the following pending patent applications: Marvin L. Sojka. application U.S. Ser. No. 07/265,842 filed Nov. 1, 1988, now U.S. Pat. No. 4,940,974 issued Jul. 10, 1990; and Marvin L. Sojka application U.S. Ser. No. 07/292,810 filed Jan. 3, 1989, now U.S. Pat. No. 4,924,462 issued May 8, 1990; and each of these pending patent applications is hereby incorporated herein by reference in its entirety including Appendices and drawings.

Figure 55B:
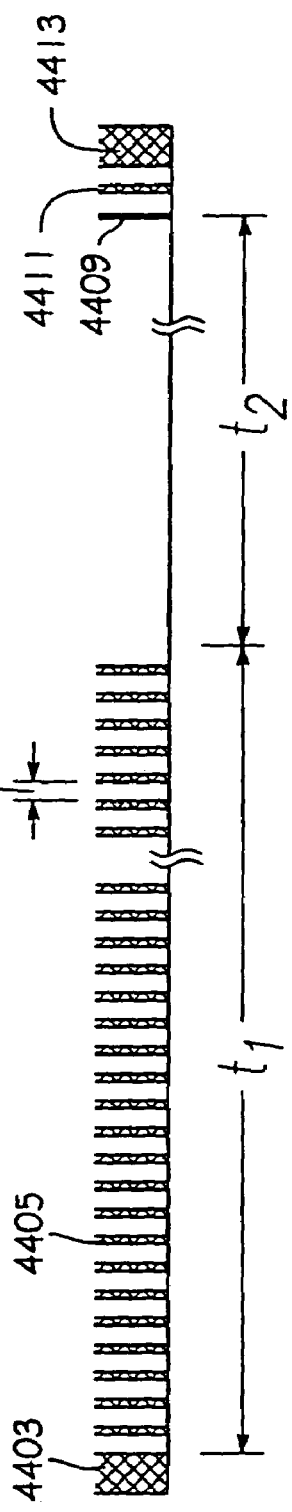
FIG. 55B is an illustration of a time-line representing a modified version of the dormant polling protocol described in relation to FIG. 55A.
Figure 55C:
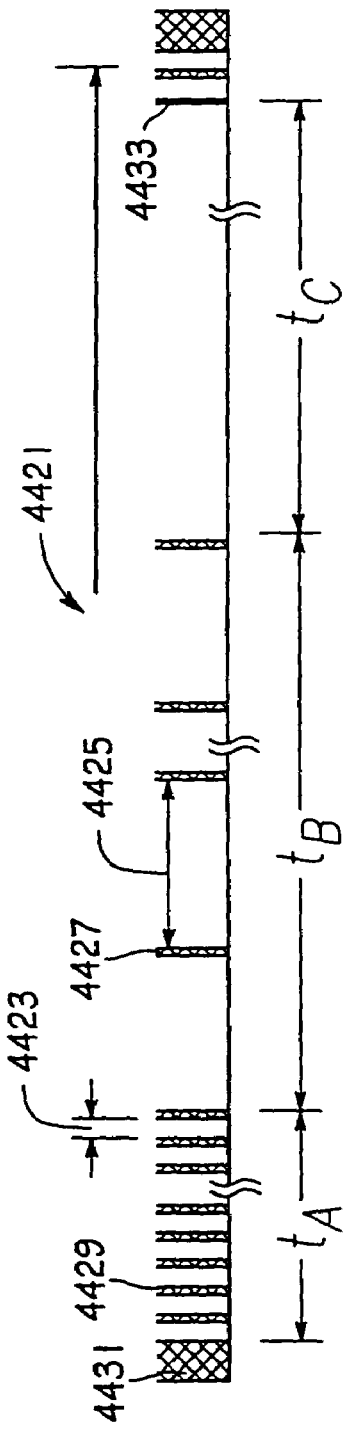
FIG. 55C is an illustration of a time-line representing a further modified version of the dormant polling protocol of the present invention described in FIGS. 55A and 55B.

FIGS. 55A-55C are various illustrations of the dormant polling protocol of the present invention. The dormant polling protocol may be used with any communication system, such as the system described in reference to FIG. 1, consisting of a plurality of remote transceivers which occasionally find it necessary to engage in a communication exchange with a base station.

Using the dormant polling protocol, the base station optimizes the communication channel depending on the channel loading. As used herein, the term "loading" refers to the density of communication exchanges occurring on the communication channel.

Specifically, during periods of heavy loading, the base station optimizes the communication channel by entering an active "polling" state, controlling and scheduling each communication exchange using any available polling protocol. The overhead associated with using a polling protocol during periods of heavy loading is far outweighed by the reduction in the number of collisions that would otherwise occur on an uncontrolled communication channel. However, during periods of light loading where transmission collisions have little effect, the overhead associated with a polling protocol cannot be justified. In this scenario, the base station optimizes the communication channel by going into a dormant "listening" state.

In the dormant state, the base station turns over the control of the channel to the remote transceivers which may initiate communication using a carrier-sense, multiple-access (CSMA) protocol. Other remote transceiver initiated protocols may also be used.

The base station makes the transition between the active and dormant states by monitoring the current level of channel loading. For example, when the current level of loading rises above a predetermined transition threshold, the base station enters the active "polling" state. When the current loading level falls below the transition threshold, the base station enters the dormant "listening" state. The transition threshold might also incorporate an averaging mechanism so as to be compared with an average channel load.

The base station may also transition between the active and dormant states using in a more gradual approach by entering various transition states therebetween. For example, the base station may transition from a continuous polling state to a series of successively slower periodic polling states before reaching the dormant state. FIGS. 55A-55C provide further detailed examples of such possible transitions.

Referring to FIG. 55A, time-lines 4001, 4002, 4003 and 4004 represent the activity of a communication channel under heavy, medium, light and no load conditions. In the time-lines 4001-4003, periods in which at least one of the remote terminals respond to each polling sequence broadcast by the base station are represented by communication exchange intervals 4005A, 4005B, 4005C, 4005D, 4005E, 4005F, 4005G and 4005H. Periods in which the base station receives no response to any transmitted polling sequence are represented by non-responsive polling intervals 4007A, 4007B, 4007C, 4007D, 4007E and 4007F.

During periods of heavy loading, as illustrated in the time-line 4001, the remote transceivers respond to each polling sequence broadcast by the base station as represented by the long duration of the communication exchange interval 4005A. Because of the density of the communication exchanges, the selection of a polling protocol yields optimal channel performance. Similarly, during periods of medium loading, intervals occasionally occur in which the remote transceivers do not respond to polling sequences from the base stations as illustrated by the non-responsive polling intervals 4007A, 4007B, 4007C and 4007D. Even so, polling during such loading periods still offers the optimal channel solution.

During periods of light loading as illustrated in the time-line 4003, the remote transceivers only occasionally find it necessary to communicate with the base station. Because of the unjustifiable overhead associated with a polling protocol during periods of light loading, the base station enters a dormant state, turning control of the channel over to the remote transceivers. The remote transceivers respond to the lack of polling by initiating communication using a CSMA type approach, providing better channel optimization. Thus, as the load on the communication channel fluctuates, the base station transitions between the active and dormant states as necessary to optimize the channel.

In addition, while in the dormant state, the base station immediately responds to a communication request 4006A by transitioning into the active state and servicing the requesting remote terminal in the communication exchange interval 4005G. Afterwards, the base station remains in the active state, polling for further communication. If no response to the polling is received before a predetermined threshold period $t_{th}$ expires, the base station will transition back into the dormant state. This transition after the period $t_{th}$ expires is represented by the non-responsive polling interval 4007E. At some time thereafter, when a communication request 4006B is received from one of the remote transceivers, the base station again transitions from the dormant state back to the active state to service the request in the communication exchange interval 4005H, and the transition cycle repeats.

Although set at one (1) minute, the predetermined threshold period $t_{th}$ may be set at any time period which optimizes the dormant polling protocol in the given communication environment. Optimization of the predetermined threshold period $t_{th}$ must take into consideration not only communication throughput factors but must also the independent value of having a dormant or quiet communication channel.

As illustrated in the time-line 4003, after servicing the requesting remote terminal in a communication exchange, the base station remains in the active state, polling for further communication. Instead of remaining in the active state, however, the base station may also immediately reenter the dormant listening state after servicing the requesting remote transceiver. If so, the base station might only make a full transition back to the active mode upon detecting a heavily loaded channel.

More specifically, the base station remains in the dormant state indefinitely until one of the remote transceivers initiates a communication request. The base station responds by immediately, without polling, directly servicing the requesting remote transceiver. Because the requesting remote transceiver does not have to wait for the scheduling associated with a polling sequence, the response time increases dramatically. Instead of responding immediately, the base station might also respond indirectly by servicing the requesting remote transceiver using a polling sequence, possibly sacrificing response time.

As illustrated in the time-line 4002, if a period of non-responsive polling fails to reaches the predetermined threshold period $t_{th}$, the base station will not enter the dormant state. Instead, the timing of the non-responsive polling period is reset. This process is illustrated in the time-line 4002 with reference to the non-responsive polling intervals 4007A-4007D which never reach the threshold period $t_{th}$.

Once in the dormant state, the base station remains in the dormant state until one of the remote transceivers initiates communication. Additional circumstances may also cause the base station to enter the active state. Particularly, the base station may exit the dormant state when either data needs to be communicated to the remote transceivers or after a predetermined wake-up period $t_{wu}$ lapses. For example, as illustrated in the time-line 4004, at the lapse of the period $t_{wu}$, a polling interval 4009A or 4009B might occur. The use of polling periods after the lapse of the predetermined wake-up period $t_{wu}$ may also provide each of the remote transceivers with an indication of those base stations, if more than one, which are in range or an indication that a message is waiting and communication is desired.

Periods of non-responsive polling, such as the interval 4007A, may consist of either continuous or periodic polling. Continuous polling is defined herein as a repeated broadcast of a complete polling sequence having no delays between each repeated sequence. Periodic polling is polling which repeatedly broadcasts the complete polling sequence with a delay period between broadcasts.

FIG. 55B is a more detailed illustration of the dormant polling protocol described in relation to FIG. 55A using periodic polling. Specifically, in a time-line 4401, a periodic polling interval $t_1$ begins after completing a communication exchange 4403 between the base station and one of the remote transceivers. Each polling sequence, such as a sequence 4405, which occurs during the polling interval $t_1$ is separated from the preceding and subsequent polling sequences by a predetermined delay period, such as a delay period 4407. The delay period 407 may be set to at about 250 milliseconds (ms) or whatever other value is optimal depending on the characteristics of the communication channel.

During the predetermined delay periods, the remote transceivers may believe that the base station has transitioned into the dormant state and may initiate communication. However, to avoid potential collisions, the remote transceivers may be required to wait a random period of time, such as about two (2) seconds, before transmitting. To prevent the remote transceivers from transmitting during delay periods, the remote transceivers might be forced to wait a fixed period of time which is equal to or greater than the predetermined delay period before initiating communications. Such a requirement would not prevent the initiation of communication during the dormant state.

As previously described, the predetermined threshold period $t_{th}$ defines the duration of the periodic polling interval $t_1$. If no remote transceivers respond for the predetermined threshold period $t_{th}$, the interval $t_1$ ends and the base station enters a dormant state as represented by a dormancy interval $t_2$. The base station remains in the dormant state until one of the remote transceivers sends a communication request 4409. The base station may indirectly respond to the request 4409 as illustrated by providing a full polling sequence 4411 for scheduling a communication exchange 4413. However, the base station may also directly respond without the polling sequence 4411 by immediately entering the communication exchange 4413. Finally, upon termination of the communication exchange 4413, the base station may either reenter the dormant state or reenter the periodic polling interval $t_1$.

The basis for transitioning between states as shown in FIG. 55B occurs when the duration of a non-responsive polling interval reaches the threshold period $t_{th}$. As an alternative however, the transitioning may be based on a duration of low-activity. Specifically, if the level of communication exchange activity during the interval $t_1$ falls and remains below a predetermined low-activity level for the threshold period $t_{th}$, the dormant state represented by the interval $t_2$ would be entered. After servicing the requesting remote transceiver in the communication exchange 413, the base station could either: 1) remain in the dormant state unless the average activity level of the channel rises above the low-activity level wherein the active state would be reentered; or 2) immediately reenter the active state.

FIG. 55C is an illustration of a modified version of the dormant polling protocol described in FIGS. 55A and 55B which illustrates the use of a variable delay period between polling sequences. As shown in FIG. 55B, the delay period between each polling sequence such as the delay period 4407 is set to a single, fixed duration. In FIG. 55C, however, the base station may transition from a faster active state to a slower active state before transitioning into the dormant state.

The faster active state has a faster polling rate than the slower active state. This rate is governed by the delay period between each polling sequence.

Particularly, during a time interval $t_A$, after servicing one of the remote transceivers as represented by a communication exchange 4431, the base station periodically polls at a fast polling rate based on a short delay period 4423 between polling sequences. The base station continues polling at the fast polling rate until a non-responsive polling interval occurs which reaches a fast threshold period $t_{Fth}$. The fast threshold period $t_{Fth}$ may be about thirty (30) seconds long.

After a non-responsive polling interval reaches the fast threshold period $t_{Fth}$, the base station begins to polls at a slower rate defined by a long delay period 4425. This slower polling rate may be at about once every second, or may be at any other rate optimal for the specific communication system at issue. During a time interval $t_B$, the base station continues to poll at this slower rate until either: 1) a non-responsive polling interval occurs which reaches a slow threshold period $t_{Sth}$, and the dormant state defined by a dormant period $t_c$ is entered; or 2) a response is received from a remote transceiver, and the faster active state is reentered. The slow threshold period $t_{Sth}$ may be about thirty (30) seconds. Finally, the base station remains in the dormant period $t_c$ until it receives a communication request 4433.

Although the remote transceivers may initiate a communication request between each polling sequences, the remote transceivers may also be forced to wait and then specifically respond to a polling sequence. If so forced, the necessary waiting time would be the maximum delay period between periodic polling sequences. In FIG. 55C, this would be the long delay period 4425.

Instead of basing the decision of transitioning between states upon a non-responsive polling interval, the decision might be based upon low channel activity. To accomplish this, the base station may maintain a history log of the recent activity of the channel. Based on an average or weighted average of the recent activity, the base station can determine when to transition between the fast active, slow active and dormant states.

In addition, although only two fixed polling rate transition states have been disclosed in FIG. 1C, a more gradual or continuous transition may also be employed. In this way, the polling rate would more closely track the activity level of the channel. Similarly, other protocol variances may also be utilized in transitioning between states. For example, a third type of protocol may be used as an intermediate transition state between the active "polling" state and the dormant "CSMA type" state.

The features of the dormant polling protocol described in relation to FIG. 55A-55C can be incorporated into any communication system which has at least one central "base station" and a multiplicity of "remote transceivers". Exemplary communication systems currently using various polling protocols which may incorporate the dormant polling features are set forth in detail above.

It will be apparent that many further modifications and variations may be effected without departing from the scope of the teachings and concepts of the present invention.

The invention claimed is:

1. A system for providing wireless spread spectrum communication, comprising:
    a base station transceiver capable of wireless spread spectrum communication with a plurality of mobile wireless transceivers via a wireless network, each of the plurality of wireless mobile transceivers employing one of a first data rate and a second data rate based upon an evaluation of radio frequency operating conditions of the wireless network, the first data rate being higher than the second data rate, the evaluation of the radio frequency operating conditions comprising an evaluation of a signal strength measurement, the evaluation of the signal strength measurement comprising a weighted signal strength measurement that emphasizes lower signal strength measurements of fading signals;
    the base station transceiver transmitting one or more messages usable by the plurality of mobile transceivers in performing the evaluation of radio frequency operating conditions of the wireless network; and
    a particular wireless mobile transceiver of the plurality of wireless mobile transceivers cycling between a power saving state and an active state over predetermined time intervals, the particular wireless mobile transceiver returning to the power saving state from the active state if the particular wireless transceiver receives no transmission directed to the particular wireless mobile transceiver while in the active state for a predetermined time interval.

2. The system of claim 1 wherein the wireless spread spectrum communication comprises direct sequence spread spectrum communication.

3. The system of claim 1 wherein the wireless spread spectrum communication comprises wireless communication using frequency hopping.

4. The system of claim 1 wherein evaluation of radio frequency operating conditions of the wireless network comprises evaluating an error rate.

5. The system of claim 4 wherein evaluating an error rate comprises evaluating at least one of a bit error rate (BER), a message error rate, a frame error rate, a rate of receipt of a negative acknowledgement, a rate of failure to receive a positive acknowledgement, a rate of failure to receive a response to a transmission, and a timeout of a communications protocol timer.

6. The system of claim 1 wherein the one or more messages comprise a polling message.

7. The system of claim 1 wherein the one or more messages comprise a test signal.

8. The system of claim 1 wherein at least a portion of the one or more messages is transmitted at the first data rate to evaluate whether operation at the first data rate is sustainable.

9. The system of claim 1 wherein at least a portion of the one or more messages is transmitted on a periodic basis.

10. The system of claim 1 wherein each of the one or more messages has an associated type, and wherein messages of a predetermined type are always transmitted by the base station transceiver at the second data rate.

11. The system of claim 1 wherein the base station transceiver employs one of the first data rate and the second data rate for transmission, based upon an evaluation of operation of the wireless network.

12. The system of claim 11 wherein evaluation of operation of the wireless network comprises evaluating an error rate.

13. The system of claim 12 wherein evaluating an error rate comprises evaluating at least one of a bit error rate (BER), a message error rate, a frame error rate, a rate of receipt of a negative acknowledgement, a rate of failure to receive a positive acknowledgement, a rate of failure to receive a response to a transmission, and a timeout of a communications protocol timer.

14. The system of claim 1 wherein at least one of the plurality of mobile wireless transceivers is capable of adjusting spreading code length for use in the wireless spread spectrum communications.

15. The system of claim 1 wherein at least one of the plurality of mobile wireless transceivers is capable of switching between a first frequency hopping rate and at a second frequency hopping rate for use in the wireless spread spectrum communications, the first frequency hopping rate being slower than the second frequency hopping rate.

16. A method for providing wireless spread spectrum communication, comprising:
receiving at least one data message via the wireless spread spectrum communication network;
evaluating wireless communication network operating conditions based upon the received at least one data message, the wireless communication network operating conditions evaluation comprising a signal strength measurement evaluation that comprises a weighted signal strength measurement evaluation in which emphasis is given to lower signal strength measurements of fading signals;
selecting one of a first data rate and a second data rate based upon the evaluation of wireless communication network operating conditions, the first data rate being lower than the second data rate;
transmitting at least one data message via the wireless communication network using the selected data rate; and
cycling between a power saving state and an active state over predetermined time intervals, wherein the cycling comprises returning to the power saving state from the active state if no transmissions directed to a particular destination are received while in the active state for a predetermined time interval.

17. The method of claim 16 wherein the wireless communication network uses frequency hopping.

18. The method of claim 16 wherein the wireless communication network uses direct sequence spread spectrum communication.

19. The method of claim 16 wherein evaluating wireless communication network operating conditions comprises evaluating an error rate.

20. The method of claim 19 wherein evaluating an error rate comprises evaluating at least one of a bit error rate (BER), a message error rate, a frame error rate, a rate of receipt of a negative acknowledgement, a rate of failure to receive a positive acknowledgement, a rate of failure to receive a response to a transmission, and a timeout of a communications protocol timer.

21. The method of claim 16 wherein the received at least one data message comprises a polling message.

22. The method of claim 16 wherein the received at least one data message comprises a test signal.

23. The method of claim 16 wherein at least a portion of the received at least one data message is transmitted at the second data rate to evaluate whether operation of the wireless communication network at the second data rate is sustainable.

24. The method of claim 16 wherein at least a portion of the received at least one data message is always received at the first data rate.

25. The method of claim 16 wherein the transmitted at least one data message comprises the selected data rate.

26. The method of claim 16 wherein the wireless communication network is a radio frequency communication network.

27. The method of claim 16 wherein the selecting of the first data rate and the second data rate is effected at least by selecting between a first spreading code length and a second spreading code length for use in the wireless spread spectrum communications, the first spreading code length being shorter than the second spreading code length.

28. The method of claim 16 wherein the selecting of the first data rate and the second data rate is effected at least by selecting between a first frequency hopping rate and at a second frequency hopping rate for use in the wireless spread spectrum communications, the first frequency hopping rate being slower than the second frequency hopping rate.

29. One or more circuits in a wireless spread spectrum communication device, comprising:
receiver circuitry capable of receiving digital information communicated via a radio frequency wireless spread spectrum communication network;
at least one processor that evaluates operating conditions of the radio frequency network, the at least one processor selecting one of a first data rate and a second data rate based upon the evaluation, the first data rate being lower than the second data rate, the evaluation of the operating conditions of the radio frequency network comprising evaluating a signal strength measurement, the signal strength measurement evaluation comprising computing a weighted signal strength measurement that emphasizes lower signal strength measurements of fading radio frequency signals; and
transmitter circuitry capable of transmitting digital information at the selected data rate, via the radio frequency network, the transmitter circuitry operatively coupled to the at least one processor,
wherein the wireless spread spectrum communication device cycles between a power saving state and an active state over predetermined time intervals, and wherein the wireless spread spectrum communication device returns to the power saving state from the active state if the wireless spread spectrum communication device receives no transmission directed to the wireless spread spectrum communication device while in the active state for a predetermined time interval.

30. The one or more circuits of claim 29 further comprising signal strength measurement circuitry operatively coupled to the receiver circuitry, the signal measurement circuitry producing an indication of signal strength of a received radio frequency signal, the indication of signal strength available for use by the at least one processor.

31. The one or more circuits of claim 29 wherein the radio frequency network uses direct sequence spread spectrum communication techniques.

32. The one or more circuits of claim 29 wherein the radio frequency network uses frequency hopping communication.

33. The one or more circuits of claim 29 wherein evaluating operating conditions of the radio frequency network comprises evaluating an error rate.

34. The one or more circuits of claim 33 wherein evaluating an error rate comprises evaluating at least one of a bit error rate (BER), a message error rate, a frame error rate, a rate of receipt of a negative acknowledgement, a rate of failure to receive a positive acknowledgement, a rate of failure to receive a response to a transmission, and a timeout of a communications protocol timer.

35. The one or more circuits of claim 29 wherein evaluating operating conditions of the radio frequency network is performed during reception of one or more messages.

36. The one or more circuits of claim 35 wherein at least a portion of the one or more messages is received on a substantially regular period.

37. The one or more circuits of claim 35 wherein at least a portion of the one or more messages comprise a test signal.

38. The one or more circuits of claim 35 wherein at least a portion of the one or more messages comprise a polling message.

39. The one or more circuits of claim 35 wherein at least a portion of the one or more messages is received at the second data rate to evaluate whether operation of the radio frequency network at the second data rate is sustainable.

40. The one or more circuits of claim 35 wherein each of the one or more messages has an associated type, and wherein messages of a predetermined type are always received at the first data rate.

41. The one or more circuits of claim 29 wherein a receiver and a transmitter operate on the same radio frequency.

42. The one or more circuits of claim 29 wherein the at least one processor is capable of selecting one of a first spreading code length and a second spreading code length for use in the wireless spread spectrum communications, the first spreading code length being shorter than the second spreading code length.

43. The one or more circuits of claim 29 wherein the at least one processor is capable of selecting one of a first frequency hopping rate and at a second frequency hopping rate for use in the wireless spread spectrum communications, the first frequency hopping rate being slower than the second frequency hopping rate.

44. A wireless spread spectrum mobile communication device, comprising:
a mobile wireless transceiver that, during operation, communicates with a base station transceiver via a wireless network that uses spread spectrum communication, the mobile wireless transceiver employing one of a first data rate and a second data rate for transmission, based upon an evaluation of radio frequency operating conditions of the wireless network, the first data rate being higher than the second data rate, the evaluation of the radio frequency operating conditions comprising an evaluation of a signal strength measurement, the evaluation of the signal strength measurement comprising a weighted signal strength measurement that emphasizes lower signal strength measurements of fading signals;
the mobile wireless transceiver receiving one or more messages usable in performing the evaluation of radio frequency operating conditions of the wireless network; and
the mobile wireless transceiver cycling between a power saving state and an active state over predetermined time intervals, the mobile wireless transceiver returning to the power saving state from the active state if the mobile wireless transceiver receives no transmission directed to the mobile wireless transceiver while in the active state for a predetermined time interval.

45. The device of claim 44 wherein the spread spectrum communication comprises frequency hopping communication.

46. The device of claim 44 wherein the spread spectrum communication comprises direct sequence spread spectrum communication.

47. The device of claim 44 wherein the evaluation of radio frequency operating conditions of the wireless network comprises evaluating an error rate.

48. The device of claim 47 wherein evaluating an error rate comprises evaluating at least one of a bit error rate (BER), a message error rate, a frame error rate, a rate of receipt of a negative acknowledgement, a rate of failure to receive a positive acknowledgement, a rate of failure to receive a response to a transmission, and a timeout of a communications protocol timer.

49. The device of claim 44 wherein the one or more messages comprise a polling message.

50. The device of claim 44 wherein the one or more messages comprise a test signal.

51. The device of claim 44 wherein at least a portion of the one or more messages is transmitted at the first data rate to evaluate whether operation at the first data rate is sustainable.

52. The device of claim 44 wherein at least a portion of the one or more messages is transmitted on a periodic basis.

53. The device of claim 44 wherein each of the one or more messages has an associated type, and wherein messages of a predetermined type are always received by the mobile wireless transceiver at the second data rate.

54. The device of claim 44 wherein the mobile transceiver selects one of a first data rate and a second data rate for transmission, based upon an evaluation of operation of the wireless network.

55. The device of claim 54 wherein evaluation of operation of the wireless network comprises evaluating an error rate.

56. The device of claim 55 wherein evaluating an error rate comprises evaluating at least one of a bit error rate (BER), a message error rate, a frame error rate, a rate of receipt of a negative acknowledgement, a rate of failure to receive a positive acknowledgement, a rate of failure to receive a response to a transmission, and a timeout of a communications protocol timer.

57. The device of claim 44 wherein the first data rate and the second data rate are effected at least by adjusting a length of a spreading code for use in the spread spectrum communication.

58. The device of claim 44 wherein the first data rate and the second data rate are effected at least by adjusting a frequency hopping rate for use in the spread spectrum communication.

59. A wireless spread spectrum communication system, comprising:
a mobile device that, during operation, communicates using spread spectrum communication with a base station via a wireless network, the mobile device employing one of a first data rate and a second data rate for transmission, based upon an evaluation of radio frequency operating conditions of the wireless network, the first data rate being higher than the second data rate; and
the mobile device receiving one or more messages usable in performing the evaluation of radio frequency operating conditions of the wireless network,
wherein the evaluation of radio frequency operating conditions of the wireless network comprises evaluating a signal strength measurement,
wherein the evaluation of the signal strength measurement comprises computing a weighted signal strength measurement, the weighting giving emphasis to lower signal strength measurements of fading signals,
wherein the mobile device cycles between a power saving state and an active state over predetermined time intervals, and
wherein the mobile device returns to the power saving state from the active state if the mobile device receives no transmission directed to the mobile device while in the active state for a predetermined time interval.

60. The system of claim 59 wherein the spread spectrum communication employs frequency hopping.

61. The system of claim 59 wherein the spread spectrum communication uses direct sequence codes.

62. The system of claim 59 wherein evaluation of radio frequency operating conditions of the wireless network comprises evaluating an error rate.

63. The system of claim 62 wherein evaluating an error rate comprises evaluating at least one of a bit error rate (BER), a message error rate, a frame error rate, a rate of receipt of a negative acknowledgement, a rate of failure to receive a positive acknowledgement, a rate of failure to receive a response to a transmission, and a timeout of a communications protocol timer.

64. The system of claim 59 wherein the one or more messages comprise a polling message.

65. The system of claim 59 wherein the one or more messages comprise a test signal.

66. The system of claim 59 wherein at least a portion of the one or more messages is transmitted at the first data rate to evaluate whether operation at the first data rate is sustainable.

67. The system of claim 59 wherein at least a portion of the one or more messages is transmitted on a periodic basis.

68. The system of claim 59 wherein each of the one or more messages has an associated type, and wherein messages of a predetermined type are always received by the mobile transceiver at the second data rate.

69. The system of claim 59 wherein the mobile device selects one of the first data rate and the second data rate for transmission, based upon an evaluation of operation of the wireless network.

70. The system of claim 69 wherein evaluation of operation of the wireless network comprises evaluating an error rate.

71. The system of claim 70 wherein evaluating an error rate comprises evaluating at least one of a bit error rate (BER), a message error rate, a frame error rate, a rate of receipt of a negative acknowledgement, a rate of failure to receive a positive acknowledgement, a rate of failure to receive a response to a transmission, and a timeout of a communications protocol timer.

72. The system of claim 59 wherein the wireless spread spectrum communication system is capable of employing a length-adjustable spreading code for use in the spread spectrum communication.

73. The system of claim 59 wherein the wireless spread spectrum communication system is capable of employing an adjustable frequency hopping rate for use in the spread spectrum communication.

74. One or more circuits in a wireless spread spectrum communication device, comprising:
  at least one processor that evaluates operating conditions of a radio frequency network, the at least one processor selecting one of a first data rate and a second data rate based upon the evaluation, the first data rate being lower than the second data rate; and
  the at least one processor causing transmitter circuitry to transmit information at the selected data rate, via the radio frequency network,
  wherein the evaluation of the operating conditions of the radio frequency network comprises evaluating a signal strength measurement,
  wherein the evaluation of the signal strength measurement comprises computing a weighted signal strength measurement, the weighting giving emphasis to lower signal strength measurements of fading radio frequency signals,
  wherein the wireless spread spectrum communication device cycles between a power saving state and an active state over predetermined time intervals, and
  wherein the wireless spread spectrum communication device returns to the power saving state from the active state if the wireless spread spectrum communication device receives no transmission directed to the wireless spread spectrum communication device while in the active state for a predetermined time interval.

75. The one or more circuits of claim 74 further comprising signal strength measurement circuitry operatively coupled to receiver circuitry, the signal measurement circuitry producing an indication of signal strength of a received radio frequency signal, the indication of signal strength available for use by the at least one processor.

76. The one or more circuits of claim 74 wherein the wireless spread spectrum communication device performs frequency hopping.

77. The one or more circuits of claim 74 wherein the wireless spread spectrum communication device performs direct sequence spread spectrum communication.

78. The one or more circuits of claim 74 wherein evaluating operating conditions of the radio frequency network comprises evaluating an error rate.

79. The one or more circuits of claim 78 wherein evaluating an error rate comprises evaluating at least one of a bit error rate (BER), a message error rate, a frame error rate, a rate of receipt of a negative acknowledgement, a rate of failure to receive a positive acknowledgement, a rate of failure to receive a response to a transmission, and a timeout of a communications protocol timer.

80. The one or more circuits of claim 74 wherein evaluating operating conditions of the radio frequency network is performed during reception of one or more messages.

81. The one or more circuits of claim 80 wherein at least a portion of the one or more messages is received on a substantially regular period.

82. The one or more circuits of claim 80 wherein at least a portion of the one or more messages comprise a test signal.

83. The one or more circuits of claim 80 wherein at least a portion of the one or more messages comprise a polling message.

84. The one or more circuits of claim 80 wherein at least a portion of the one or more messages is received at the second data rate to evaluate whether operation of the radio frequency network at the second data rate is sustainable.

85. The one or more circuits of claim 80 wherein each of the one or more messages has an associated type, and wherein messages of a predetermined type are always received at the first data rate.

86. The one or more circuits of claim 74 wherein a receiver and a transmitter operate on the same radio frequency.

87. The one or more circuits of claim 74 wherein the wireless spread spectrum communication device employs a length-adjustable spreading code.

88. The one or more circuits of claim 74 wherein the wireless spread spectrum communication device employs an adjustable frequency hopping rate.

* * * * *